(12) United States Patent
Hara et al.

(10) Patent No.: US 10,766,561 B2
(45) Date of Patent: Sep. 8, 2020

(54) BICYCLE OPERATING DEVICE AND BICYCLE SEATPOST APPARATUS

(71) Applicant: SHIMANO INC., Sakai (JP)

(72) Inventors: Nobukatsu Hara, Sakai (JP); Etsuyoshi Watarai, Sakai (JP)

(73) Assignee: SHIMANO INC., Sakai (JP)

( * ) Notice: Subject to any disclaimer, the term of this patent is extended or adjusted under 35 U.S.C. 154(b) by 248 days.

(21) Appl. No.: 15/140,562

(22) Filed: Apr. 28, 2016

(65) Prior Publication Data
US 2017/0158281 A1 Jun. 8, 2017

Related U.S. Application Data

(63) Continuation-in-part of application No. 14/956,738, filed on Dec. 2, 2015.

(51) Int. Cl.
| | | |
|---|---|---|
| *B62K 23/06* | (2006.01) | |
| *B62J 1/08* | (2006.01) | |
| *B62L 3/02* | (2006.01) | |
| *B62M 25/08* | (2006.01) | |
| *B62J 45/00* | (2020.01) | |

(52) U.S. Cl.
CPC .............. *B62K 23/06* (2013.01); *B62J 1/08* (2013.01); *B62L 3/02* (2013.01); *B62M 25/08* (2013.01); *B62J 45/00* (2020.02); *B62J 2001/085* (2013.01)

(58) Field of Classification Search
CPC ....... B62K 23/06; B62J 1/08; B62J 2001/085; B62J 2099/004; B62L 3/02; B62M 25/08
See application file for complete search history.

(56) References Cited

U.S. PATENT DOCUMENTS

| | | | | |
|---|---|---|---|---|
| 4,807,856 A | * | 2/1989 | Teckenbrock | B62K 19/36 188/67 |
| 8,746,106 B2 | * | 6/2014 | Miki | B62M 25/04 74/486 |
| 2007/0137388 A1 | * | 6/2007 | Dal Pra | B62K 23/06 74/502.2 |
| 2007/0137389 A1 | * | 6/2007 | Wickliffe | B62K 23/04 74/502.2 |
| 2008/0295638 A1 | * | 12/2008 | Miki | B62K 23/06 74/502.2 |

(Continued)

FOREIGN PATENT DOCUMENTS

| | | |
|---|---|---|
| CN | 101314382 | 12/2008 |
| CN | 104973194 | 10/2015 |
| CN | 104973206 | 10/2015 |

*Primary Examiner* — Vicky A Johnson
(74) *Attorney, Agent, or Firm* — Mori & Ward, LLP

(57) ABSTRACT

A bicycle operating device comprises a base member, a brake operating member, and a first operating member. The base member comprises a first end portion, a second end portion, and a grip portion. The brake operating member is movably coupled to the base member to operate a brake device. The first operating member is coupled to the base member movably between a rest position and an operated position to move a mechanical control cable relative to the base member. The first operating member is movable relative to the base member between the rest position and the operated position without mechanically positioning the mechanical control cable relative to the base member during a movement of the first operating member occurring between the rest position and the operated position.

41 Claims, 139 Drawing Sheets

(56) References Cited

U.S. PATENT DOCUMENTS

2015/0291247 A1\* 10/2015 Fukao ..................... B62L 3/023
74/473.14
2015/0291249 A1   10/2015 Fukao et al.
2017/0349238 A1\* 12/2017 Miyazaki ............... B62K 23/06

\* cited by examiner

BICYCLE OPERATING DEVICE AND BICYCLE SEATPOST APPARATUS

CROSS-REFERENCE TO RELATED APPLICATIONS

The present application is a continuation-in-part application of the U.S. patent application Ser. No. 14/956,738 filed Dec. 2, 2015. The contents of this application are incorporated herein by reference in their entirety.

BACKGROUND OF THE INVENTION

Field of the Invention

The present invention relates to a bicycle operating device and a bicycle seatpost apparatus.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, a brake operating member, and a first operating member. The base member comprises a first end portion, a second end portion, and a grip portion. The first end portion is configured to be coupled to a handlebar in a mounting state where the bicycle operating device is mounted to the handlebar. The second end portion is opposite to the first end portion. The grip portion is provided between the first end portion and the second end portion. The brake operating member is movably coupled to the base member to operate a brake device. The first operating member is coupled to the base member movably between a first rest position and an operated position to move a mechanical control cable relative to the base member. The first operating member is movable relative to the base member between the first rest position and the operated position without mechanically positioning the mechanical control cable relative to the base member during a movement of the first operating member occurring between the first rest position and the operated position.

With the bicycle operating device according to the first aspect, it is possible to easily operate a bicycle component using the first operating member via the mechanical control cable in addition to the brake device.

In accordance with a second aspect of the present invention, the bicycle operating device according to the first aspect is configured so that the first end portion is configured to be coupled to a bending portion of the handlebar in the mounting state where the bicycle operating device is mounted to the handlebar.

With the bicycle operating device according to the second aspect, it is possible to use the bicycle operating device for a drop-down handlebar.

In accordance with a third aspect of the present invention, the bicycle operating device according to the first or second aspect is configured so that the brake operating member is coupled to the base member pivotally about a brake pivot axis. The first operating member is coupled to the base member pivotally about a first pivot axis which is non-parallel to the brake pivot axis.

With the bicycle operating device according to the third aspect, it is possible to easily distinguish operation of the first operating member from operation of the brake operating member. This can improve operability of the bicycle operating device.

In accordance with a fourth aspect of the present invention, the bicycle operating device according to any one of the first to third aspects is configured so that the first operating member is pivotally coupled to the brake operating member to be movably coupled to the base member.

With the bicycle operating device according to the fourth aspect, it is possible to arrange the first operating member at a position close to the brake operating member. This can improve operability of the bicycle operating device.

In accordance with a fifth aspect of the present invention, the bicycle operating device according to any one of the first to fourth aspects is configured so that the brake operating member is integrally formed with the first operating member as a one-piece unitary member.

With the bicycle operating device according to the fifth aspect, it is possible to simplify the structure of the bicycle operating device.

In accordance with a sixth aspect of the present invention, the bicycle operating device according to any one of the first to fifth aspects is configured so that the base member includes a first lateral surface facing in a transverse direction of a bicycle in the mounting state. The first operating member is provided on the first lateral surface.

With the bicycle operating device according to the sixth aspect, it is possible to improve operability of the first operating member using the user's finger(s).

In accordance with a seventh aspect of the present invention, the bicycle operating device according to the sixth aspect is configured so that the first lateral surface faces a transverse center plane of the bicycle in the mounting state.

With the bicycle operating device according to the seventh aspect, it is possible to improve operability of the first operating member using the user's thumb.

In accordance with an eighth aspect of the present invention, the bicycle operating device according to any one of the first to seventh aspects is configured so that the brake operating member includes a first end pivotally coupled to the base member. The first operating member is closer to the first end portion of the base member than the first end of the brake operating member.

With the bicycle operating device according to the eighth aspect, it is possible to arrange the first operating member at a position closer to a handlebar than the brake operating member. This can improve operability of the bicycle operating device.

In accordance with a ninth aspect of the present invention, the bicycle operating device according to any one of the first to eighth aspects is configured so that the first end portion of the base member is configured to be coupled to a left part of the handlebar in the mounting state.

With the bicycle operating device according to the ninth aspect, this arrangement of the first end portion allows the user to operate the bicycle operating device using the user's left hand. Thus, it is possible to effectively utilize the left hand having a lower use frequency than that of a right hand.

In accordance with a tenth aspect of the present invention, the bicycle operating device according to the ninth aspect is configured so that the base member includes a first lateral surface facing a transverse center plane of the bicycle in the mounting state. The first operating member is provided on the first lateral surface.

With the bicycle operating device according to the tenth aspect, it is possible to improve operability of the first operating member using the user's finger(s).

In accordance with an eleventh aspect of the present invention, the bicycle operating device according to any one of the first to tenth aspects is configured so that the bicycle operating device is free of a shift operating structure to operate a shift changing device.

With the bicycle operating device according to the eleventh aspect, it is possible to provide the first operating member instead of the shift operating structure. This can prevent a size of the bicycle operating device from increasing.

In accordance with a twelfth aspect of the present invention, the bicycle operating device according to any one of the first to eleventh aspects is configured so that the first operating member is configured to be detachably mounted to one of the brake operating member and the base member.

With the bicycle operating device according to the twelfth aspect, it is possible to attach or detach the first operating member to and from one of the base member and the brake operating member as necessary.

In accordance with a thirteenth aspect of the present invention, the bicycle operating device according to any one of the first to twelfth aspects further comprises a cable attachment structure movably coupled to one of the brake operating member and the base member to transmit a movement of the first operating member to the mechanical control cable without mechanically positioning the mechanical control cable relative to the base member.

With the bicycle operating device according to the thirteenth aspect, it is possible to transmit the movement of the first operating member to the mechanical control cable via the cable attachment structure. This can improve design freedom of arrangement of the first operating member.

In accordance with a fourteenth aspect of the present invention, the bicycle operating device according to the thirteenth aspect is configured so that the first operating member and the cable attachment structure are detachably mounted to the one of the brake operating member and the base member.

With the bicycle operating device according to the fourteenth aspect, it is possible to attach or detach the first operating member to and from one of the base member and the brake operating member as necessary.

In accordance with a fifteenth aspect of the present invention, the bicycle operating device according to any one of the first to fourteenth aspects further comprises a second operating member and a cable operating structure. The second operating member is movably coupled to the base member. The cable operating structure includes a cable control body and a positioning structure. The cable control body is configured to be coupled to the second operating member to move a second mechanical control cable relative to the base member in a pulling direction and a releasing direction opposite to the pulling direction in response to a movement of the second operating member. The positioning structure is configured to selectively maintain the cable control body at a plurality of control positions.

With the bicycle operating device according to the fifteenth aspect, it is possible to operate an additional bicycle component having a plurality of positions corresponding to the plurality of control positions using the second operating member.

In accordance with a sixteenth aspect of the present invention, the bicycle operating device according to the fifteenth aspect is configured so that one of the first operating member and the second operating member is integrally provided with the brake operating member as a one-piece unitary member.

With the bicycle operating device according to the sixteenth aspect, it is possible to simplify the structure of the bicycle operating device.

In accordance with a seventeenth aspect of the present invention, the bicycle operating device according to the fifteenth aspect is configured so that the second operating member is integrally provided with the brake operating member as a one-piece unitary member. The second operating member is coupled to the base member pivotally about a second pivot axis which is non-parallel to the brake pivot axis.

With the bicycle operating device according to the seventeenth aspect, it is possible to differentiate the movement of the second operating member from the movement of the brake operating member even if the second operating member is integrally provided with the brake operating member as a one-piece unitary member. This allows the user to easily recognize each of the movement of the brake operating member and the movement of the second operating member with simplifying the structure of the bicycle operating device.

In accordance with a eighteenth aspect of the present invention, the bicycle operating device according to any one of the fifteenth to seventeenth aspects is configured so that the second operating member is integrally provided with the brake operating member as a one-piece unitary member. The base member includes a first lateral surface facing in a transverse direction of a bicycle in the mounting state. The first operating member is provided on the first lateral surface.

With the bicycle operating device according to the eighteenth aspect, it is possible to operate the first operating member using a thumb of the user.

In accordance with a nineteenth aspect of the present invention, the bicycle operating device according to any one of the fifteenth to eighteenth aspects is configured so that the second operating member is movable relative to the base member in a first direction. The cable control body is configured to pull the second mechanical control cable when the second operating member is moved relative to the base member in the first direction. The cable control body is configured to release the second mechanical control cable when the second operating member is moved relative to the base member in the first direction.

With the bicycle operating device according to the nineteenth aspect, it is possible to pull and release the second mechanical control cable to operate an additional bicycle component with a simple operation of the second operating member.

In accordance with a twentieth aspect of the present invention, the bicycle operating device according to any one of the fifteenth to nineteenth aspects is configured so that the second operating member is movable relative to the base member in a first direction to provide a first movement. The positioning structure is coupled to the second operating member to move the cable control body such that the second mechanical control cable is moved in the pulling direction and the releasing direction alternatingly in response to the first movement of the second operating member.

With the bicycle operating device according to the twentieth aspect, it is possible to move the second mechanical control cable alternatingly in the pulling direction and the releasing direction with a simple operation of the second operating member.

In accordance with a twenty-first aspect of the present invention, the bicycle operating device according to any one of the fifteenth to twentieth aspects is configured so that the second operating member is movable relative to the base member in a first direction to provide a first movement and a first additional movement different from the first movement. The positioning structure is coupled to the second operating member to move the cable control body such that the second mechanical control cable is moved in the releasing direction in response to the first movement of the second operating member. The positioning structure is coupled to the second operating member to move the cable control body such that the second mechanical control cable is moved in the pulling direction in response to the first additional movement of the second operating member.

With the bicycle operating device according to the twenty-first aspect, it is possible to move the second mechanical control cable in the pulling direction and the releasing direction with a simple operation of the second operating member.

In accordance with a twenty-second aspect of the present invention, the bicycle operating device according to any one of the fifteenth to twenty-first aspects is configured so that the positioning structure is coupled to the cable control body to position the cable control body relative to the base member at each of a first control position and a second control position relative to the base member.

With the bicycle operating device according to the twenty-second aspect, it is possible to operate an additional bicycle component having positions respectively corresponding to the first and second control positions via the second mechanical control cable.

In accordance with a twenty-third aspect of the present invention, the bicycle operating device according to any one of the fifteenth to twenty-second aspects is configured so that the positioning structure is coupled to the cable control body to position the cable control body relative to the base member at each of at least three control positions relative to the base member.

With the bicycle operating device according to the twenty-third aspect, it is possible to operate an additional bicycle component having at least three positions respectively corresponding to the at least three control positions via the second mechanical control cable.

In accordance with a twenty-fourth aspect of the present invention, the bicycle operating device according to any one of the fifteenth to twenty-third aspects is configured so that the second operating member is movable relative to the base member in a first direction to provide a first movement and is movable relative to the base member in a second direction to provide a second movement different from the first movement. The second direction is different from the first direction. The positioning structure is coupled to the second operating member to move the cable control body from one of the control positions to another of the control positions in a first control direction such that the second mechanical control cable is pulled in response to the first movement of the second operating member. The positioning structure is coupled to the second operating member to move the cable control body from one of the control positions to another of the control positions in a second control direction such that the second mechanical control cable is released in response to the second movement of the second operating member. The second control direction is opposite to the first control direction.

With the bicycle operating device according to the twenty-fourth aspect, it is possible to move the second mechanical control cable in the pulling direction and the releasing direction with a simple operation of the second operating member.

In accordance with a twenty-fifth aspect of the present invention, the bicycle operating device according to the twenty-fourth aspect is configured so that the first direction is opposite to the second direction.

With the bicycle operating device according to the twenty-fifth aspect, it is possible to easily recognize each of the first direction and the second direction of the second operating member.

In accordance with a twenty-sixth aspect of the present invention, the bicycle operating device according to any one of the fifteenth to twenty-fifth aspects is configured so that the first operating member is movable relative to the base member from the first rest position to the first operated position in a first direction. The second operating member is coupled to the base member movably from a second rest position to a second operated position in the first direction.

With the bicycle operating device according to the twenty-sixth aspect, it is possible to operate the additional bicycle component using a simple operation of the first operating member and the second operating member.

In accordance with a twenty-seventh aspect of the present invention, the bicycle operating device according to any one of the fifteenth to twenty-sixth aspects further comprises an additional cable operating structure coupled to the first operating member and the second operating member to move the first mechanical control cable from a first cable rest position relative to the base member in response to a movement of only one of the first operating member and the second operating member. The additional cable operating structure is coupled to the first operating member and the second operating member to maintain a position of the first mechanical control cable at the first cable rest position relative to the base member in response to a movement of the second operating member.

With the bicycle operating device according to the twenty-seventh aspect, it is possible to perform different operations of the first mechanical control cable using the first operating member and the second operating member.

In accordance with a twenty-eighth aspect of the present invention, the bicycle operating device according to the twenty-seventh aspect is configured so that the first operating member includes a first longitudinal axis and a first length defined along the first longitudinal axis. The second operating member includes a second longitudinal axis and a second length defined along the second longitudinal axis. The first length is different from the second length.

With the bicycle operating device according to the twenty-eighth aspect, it is possible to easily recognize the first operating member and the second operating member based on the first length and the second length.

In accordance with a twenty-ninth aspect of the present invention, the bicycle operating device according to the twenty-seventh or twenty-eighth aspect is configured so that the one of the first operating member and the second operating member is closer to the first end portion of the base member than the other of the first operating member and the second operating member.

With the bicycle operating device according to the twenty-ninth aspect, it is possible to easily recognize the first operating member and the second operating member based on the arrangement of the first operating member and the second operating member.

In accordance with a thirtieth aspect of the present invention, the bicycle operating device according to any one of the fifteenth to twenty-ninth aspects further comprises an additional cable operating structure coupled to the first operating member and the second operating member to maintain a position of the first mechanical control cable from a first cable rest position relative to the base member in response to a movement of only one of the first operating member and the second operating member. The additional cable operating structure is coupled to the first operating member and the second operating member to move the first mechanical control cable at the first cable rest position relative to the base member in response to a movement of the first operating member.

With the bicycle operating device according to the thirtieth aspect, it is possible to perform different operations of the first mechanical control cable using the first operating member and the second operating member.

In accordance with a thirty-first aspect of the present invention, the bicycle operating device according to the thirtieth aspect is configured so that the first operating member includes a first longitudinal axis and a first length defined along the first longitudinal axis. The second operating member includes a second longitudinal axis and a second length defined along the second longitudinal axis. The first length is different from the second length.

With the bicycle operating device according to the thirty-first aspect, it is possible to easily recognize the first operating member and the second operating member based on the first length and the second length.

In accordance with a thirty-second aspect of the present invention, the bicycle operating device according to the thirtieth or thirty-first aspect is configured so that the one of the first operating member and the second operating member is closer to the first end portion of the base member than the other of the first operating member and the second operating member.

With the bicycle operating device according to the thirty-second aspect, it is possible to easily recognize the first operating member and the second operating member based on the arrangement of the first operating member and the second operating member.

In accordance with a thirty-third aspect of the present invention, the bicycle operating device according to any one of the first to thirty-second aspects further comprises a second operating member and a cable operating structure. The second operating member is movably coupled to the base member. The cable operating structure includes a cable control body configured to be coupled to the second operating member to move a second mechanical control cable relative to the base member in one of a pulling direction and a releasing direction opposite to the pulling direction in response to a movement of the second operating member. The cable control body is coupled to one of the brake operating member and the first operating member to move the second mechanical control cable relative to the base member in the other of the pulling direction and the releasing direction in response to a movement of the one of the brake operating member and the first operating member.

With the bicycle operating device according to the thirty-third aspect, it is possible to easily recognize a relationship between a direction (the pulling direction and the releasing direction) and an operating member (the second operating member, and the brake operating member or the first operating member).

In accordance with a thirty-fourth aspect of the present invention, the bicycle operating device according to the thirty-third aspect is configured so that the base member includes a first lateral surface facing in a transverse direction of a bicycle in the mounting state. The first operating member is provided on the first lateral surface.

With the bicycle operating device according to the thirty-fourth aspect, it is possible to operate the first operating member using a thumb of the user.

In accordance with a thirty-fifth aspect of the present invention, the bicycle operating device according to the first aspect further comprises an electrical switch to operate an electrical shifting device.

With the bicycle operating device according to the thirty-fifth aspect, it is possible to operate the electrical shifting device in addition to the brake device and a mechanical bicycle component.

In accordance with a thirty-sixth aspect of the present invention, a bicycle operating device comprises a base member and an operating member. The operating member is movably coupled to the base member to operate a brake device and an additional bicycle component. The operating member is coupled to the base member movably between a rest position and an operated position to operate the additional bicycle component via a mechanical control cable. The operating member is movable relative to the base member between the rest position and the operated position without mechanically positioning the mechanical control cable relative to the base member between the rest position and the operated position.

With the bicycle operating device according to the thirty-sixth aspect, it is possible to operate the brake device and the additional bicycle component using the operating member. This can improve operability of the bicycle operating device.

In accordance with a thirty-seventh aspect of the present invention, the bicycle operating device according to the thirty-sixth aspect is configured so that the operating member is a solitary operating member.

With the bicycle operating device according to the thirty-seventh aspect, it is possible to simplify the structure of the bicycle operating device.

In accordance with a thirty-eighth aspect of the present invention, the bicycle operating device according to the thirty-sixth or thirty-seventh aspect is configured so that the operating member is coupled to the base member pivotally about a brake pivot axis to operate the brake device. The operating member is coupled to the base member pivotally about a first pivot axis to operate the additional bicycle component, and the brake pivot axis is non-parallel to the first pivot axis.

With the bicycle operating device according to the thirty-eighth aspect, it is possible to distinguish operation of the operating member about the first pivot axis from operation of the operating member about the brake pivot axis.

In accordance with a thirty-ninth aspect of the present invention, the bicycle operating device according to any one of the thirty-sixth to thirty-eighth aspects is configured so that the operating member is coupled to the base member pivotally about a pivot axis to operate the brake device in a case where the operating member rotates about the pivot axis by a first rotational angle. The operating member is coupled to the base member pivotally about the pivot axis to operate the additional bicycle component in a case where the operating member rotates about the pivot axis by a second rotational angle that is different from the first rotational angle.

With the bicycle operating device according to the thirty-ninth aspect, it is possible to simplify the structure of the bicycle operating device.

In accordance with a fortieth aspect of the present invention, the bicycle operating device according to any one of the thirty-sixth to thirty-ninth aspects is configured so that the base member includes a first end portion, a second end portion, and a grip portion. The first end portion is configured to be coupled to a handlebar in a mounting state where the bicycle operating device is mounted to the handlebar. The second end portion is opposite to the first end portion. The grip portion provided between the first end portion and the second end portion.

With the bicycle operating device according to the fortieth aspect, it is possible to use the bicycle operating device for a drop-down handlebar.

In accordance with a forty-first aspect of the present invention, a bicycle operating device comprises a base member, a brake operating member, and a first operating member. The brake operating member is movably coupled to the base member to operate a brake device. The first operating member is coupled to the base member movably between a first rest position and an operated position to operate an additional bicycle component via a mechanical control cable. The first operating member is rotatable from the first rest position to the operated position without another operated position defined between the first rest position and the operated position by a cable displacement amount that is larger than 12 mm.

With the bicycle operating device according to the forty-first aspect, it is possible to increase types of the additional bicycle component which can be operated using the first operating member.

In accordance with a forty-second aspect of the present invention, the bicycle operating device according to the forty-first aspect is configured so that the brake operating member is integrally formed with the first operating member as a one-piece unitary member.

With the bicycle operating device according to the forty-second aspect, it is possible to simplify the structure of the bicycle operating device.

In accordance with a forty-third aspect of the present invention, a bicycle seatpost apparatus comprises an adjustable seatpost assembly and a bicycle operating device to operate the adjustable seatpost assembly. The adjustable seatpost assembly has an adjustable total length. The bicycle operating device includes a base member. The base member comprises a first end portion, a second end portion, and a grip portion. The first end portion is configured to be coupled to a handlebar in a mounting state where the bicycle operating device is mounted to the handlebar. The second end portion is opposite to the first end portion. The grip portion is provided between the first end portion and the second end portion.

With the bicycle operating device according to the forty-third aspect, it is possible to operate the adjustable seatpost assembly using the bicycle operating device having a road type.

In accordance with a forty-fourth aspect of the present invention, the bicycle operating device according to the forty-third aspect is configured so that the bicycle operating device includes a seatpost operating member movably coupled to the base member to operate the adjustable seatpost assembly via a mechanical control cable.

With the bicycle operating device according to the forty-fourth aspect, it is possible to operate the adjustable seatpost assembly using the seatpost operating member. This can improve operability of the bicycle operating device to operate the adjustable seatpost assembly.

In accordance with a forty-fifth aspect of the present invention, the bicycle operating device according to the forty-third or forty-fourth aspect is configured so that the bicycle operating device includes an electrical switch to generate a control signal to operate the adjustable seatpost assembly.

With the bicycle operating device according to the forty-fifth aspect, it is possible to operate the adjustable seatpost assembly using the electrical switch. This can adapt the bicycle operating device to the adjustable seatpost assembly including an electrical component such as an electric actuator.

In accordance with a forty-sixth aspect of the present invention, the bicycle operating device according to any one of the forty-third to forty-fifth aspect is configured so that the bicycle operating device includes a hydraulic operating unit to supply a hydraulic pressure to the adjustable seatpost assembly.

With the bicycle operating device according to the forty-sixth aspect, it is possible to operate the adjustable seatpost assembly using the hydraulic operating unit. This can adapt the bicycle operating device to the adjustable seatpost assembly including a hydraulic component such as a hydraulic valve unit.

In accordance with a forty-seventh aspect of the present invention, a bicycle operating device comprises a base member, a brake operating member, a first operating member, a second operating member, and a cable operating structure. The brake operating member is movably coupled to the base member to operate a brake device. The first operating member coupled to the base member movably between a first rest position and an operated position to move a first mechanical control cable relative to the base member. The first operating member is movable relative to the base member between the first rest position and the operated position without mechanically positioning the first mechanical control cable relative to the base member during a movement of the first operating member occurring between the first rest position and the operated position. The second operating member is movably coupled to the base member. One of the first operating member and the second operating member is integrally provided with the brake operating member as a one-piece unitary member. The cable operating structure is coupled to the second operating member to move a second mechanical control cable relative to the base member in response to a movement of the second operating member.

With the bicycle operating device according to the forty-seventh aspect, it is possible to operate the brake device, a bicycle component, and an additional bicycle component using the brake operating member, the first operating member, and the second operating member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

36, with the support structure, the cable control body, the release member, and a first input member omitted.

Figure 36:
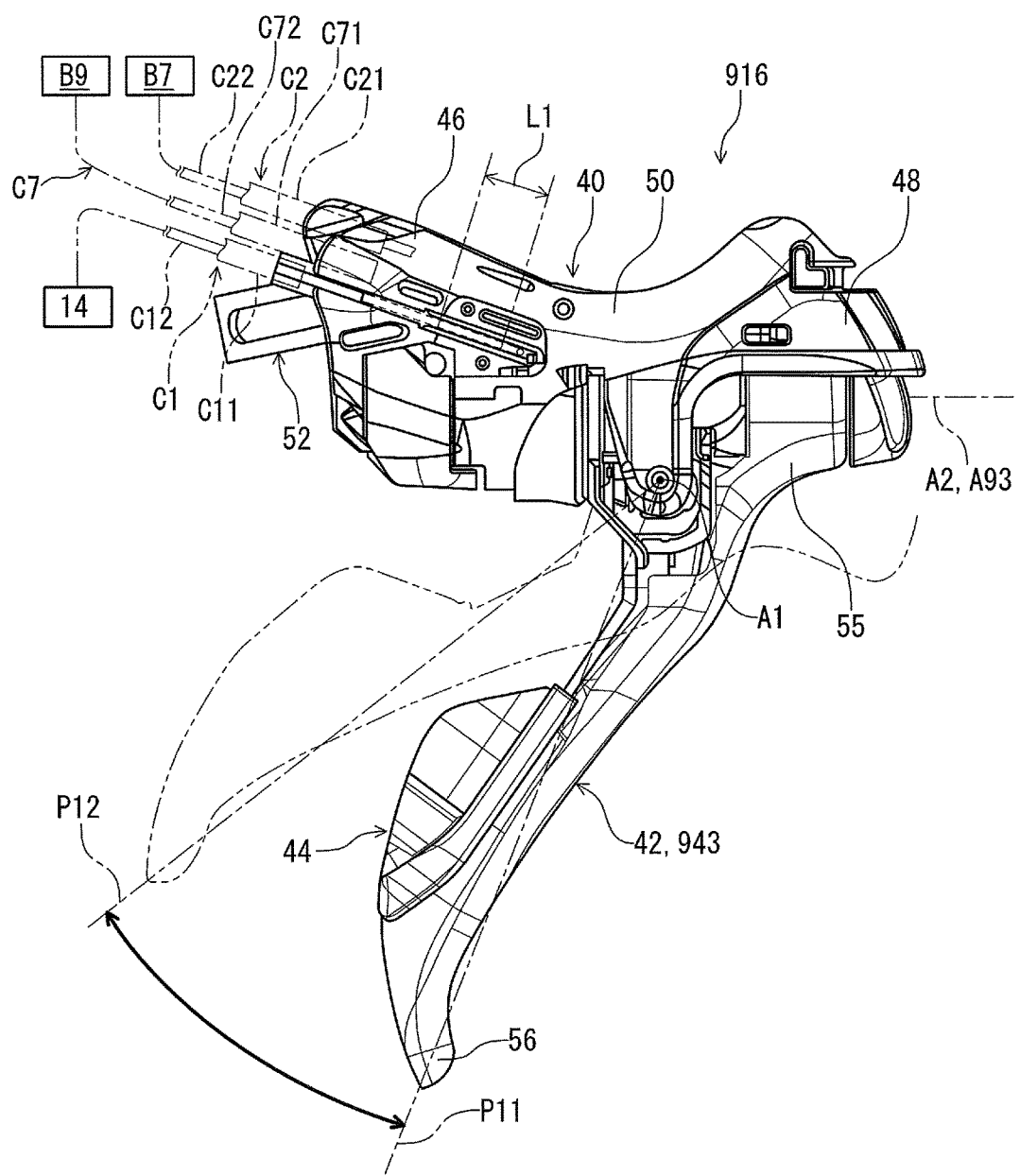
FIG. 36 is a side elevational view of a bicycle operating device of the bicycle seatpost apparatus illustrated in FIG. 35.
Figure 51:
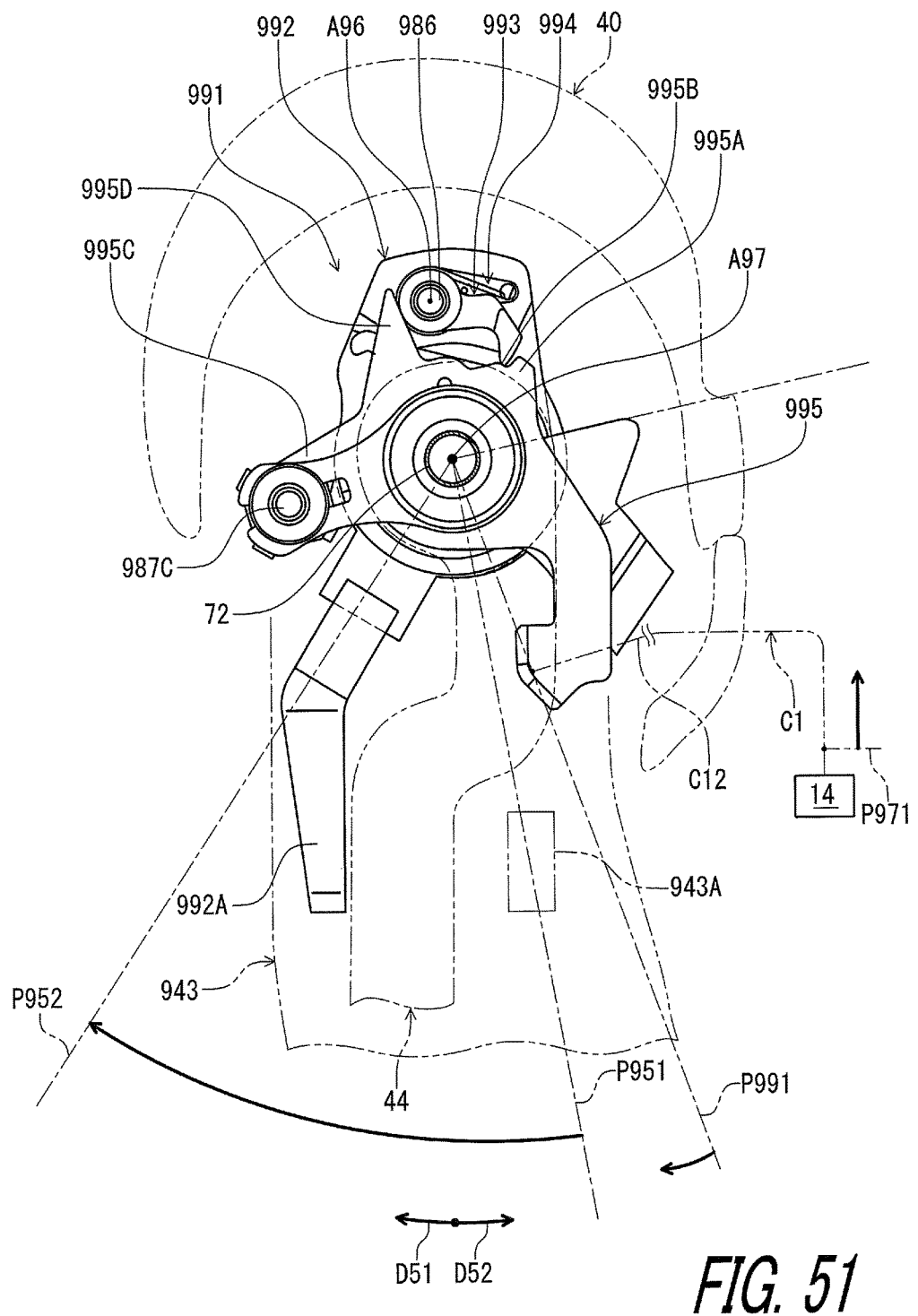

FIG. 51 is a front view of the cable operating structure of the bicycle operating device illustrated in FIG. 36, with the support structure, the cable control body, the release member, and the first input member omitted.

Figure 52:
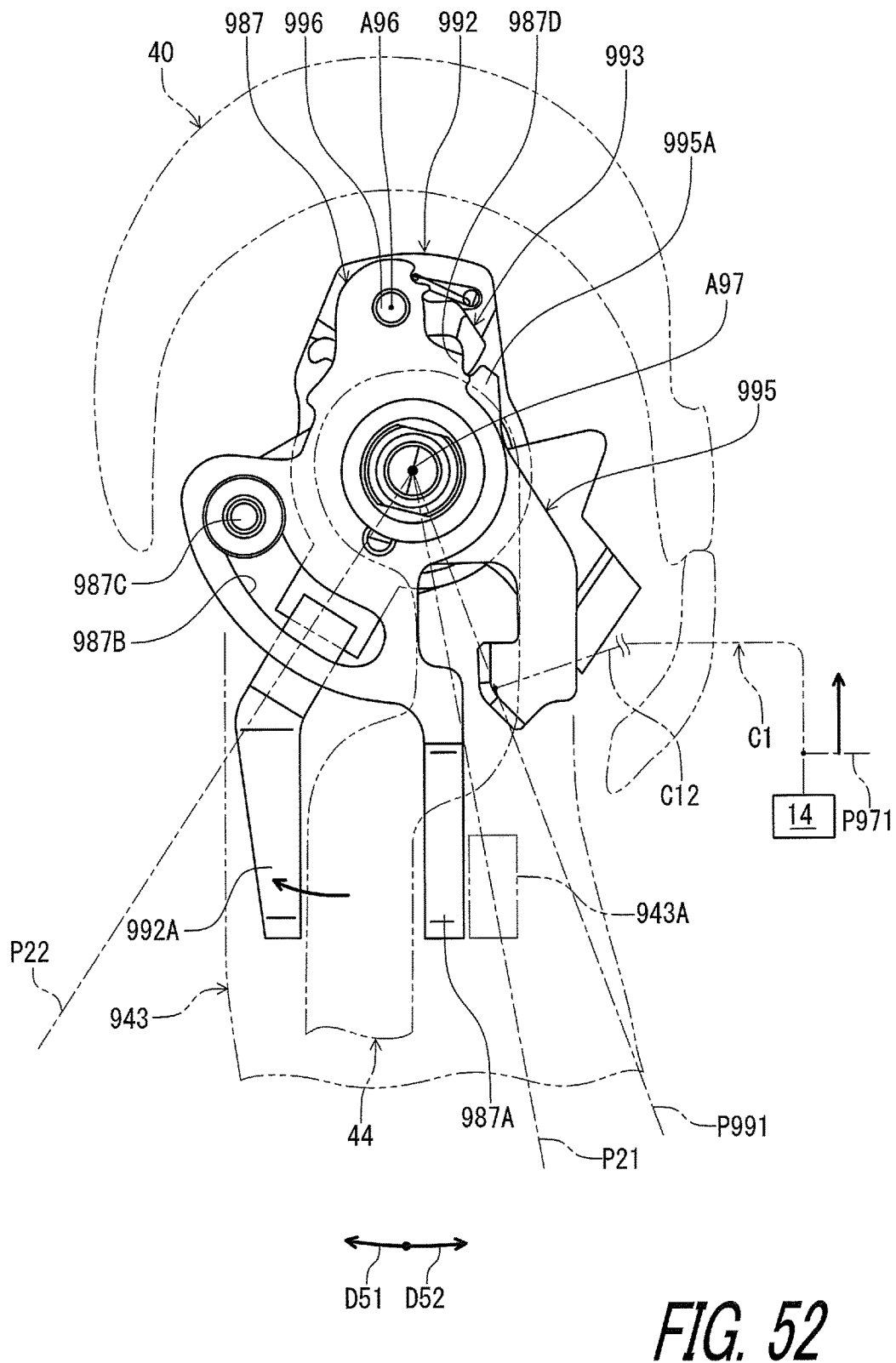
Figure 53:
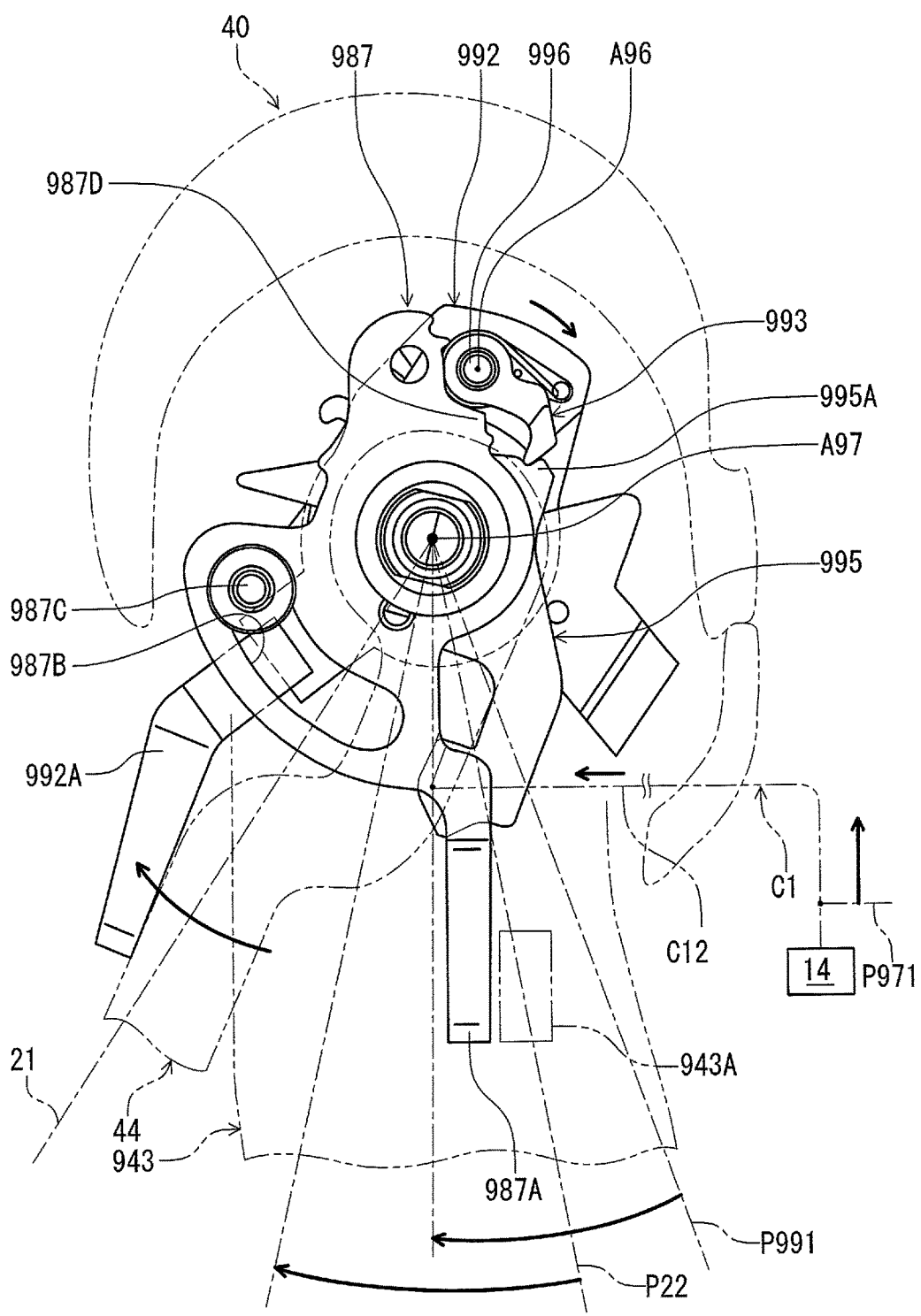
Figure 54:
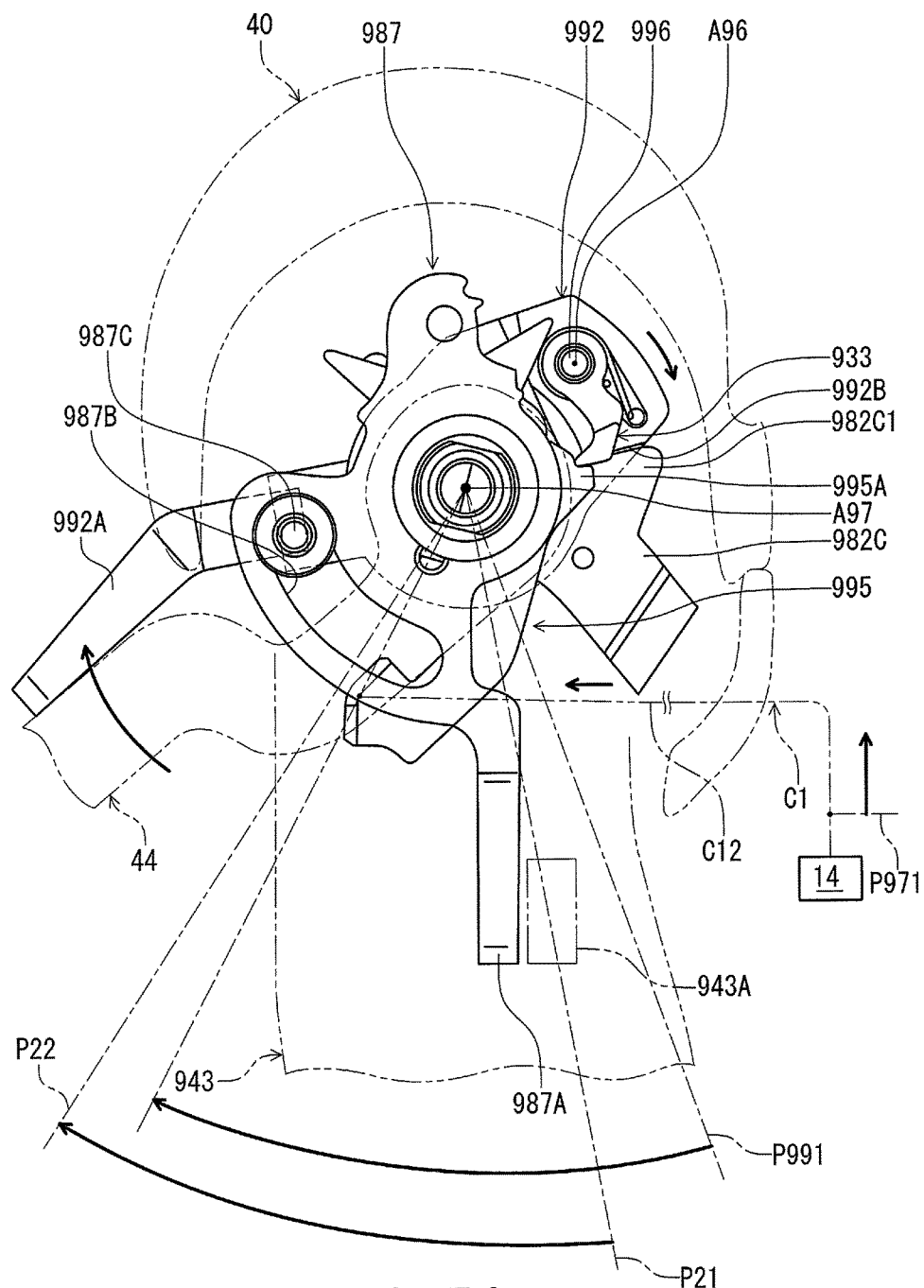

FIGS. 52 to 54 are front views of the cable operating structure of the bicycle operating device illustrated in FIG. 36 to show pulling and releasing operation of the bicycle operating device for a first mechanical control cable.

FIGS. 55 to 59 are front views of the cable operating structure of the bicycle operating device illustrated in FIG. 36 to show pulling operation of the bicycle operating device for a second mechanical control cable.

FIGS. 60 to 64 are front views of the cable operating structure of the bicycle operating device illustrated in FIG. 36 to show releasing operation of the bicycle operating device for the second mechanical control cable.

Figure 65:
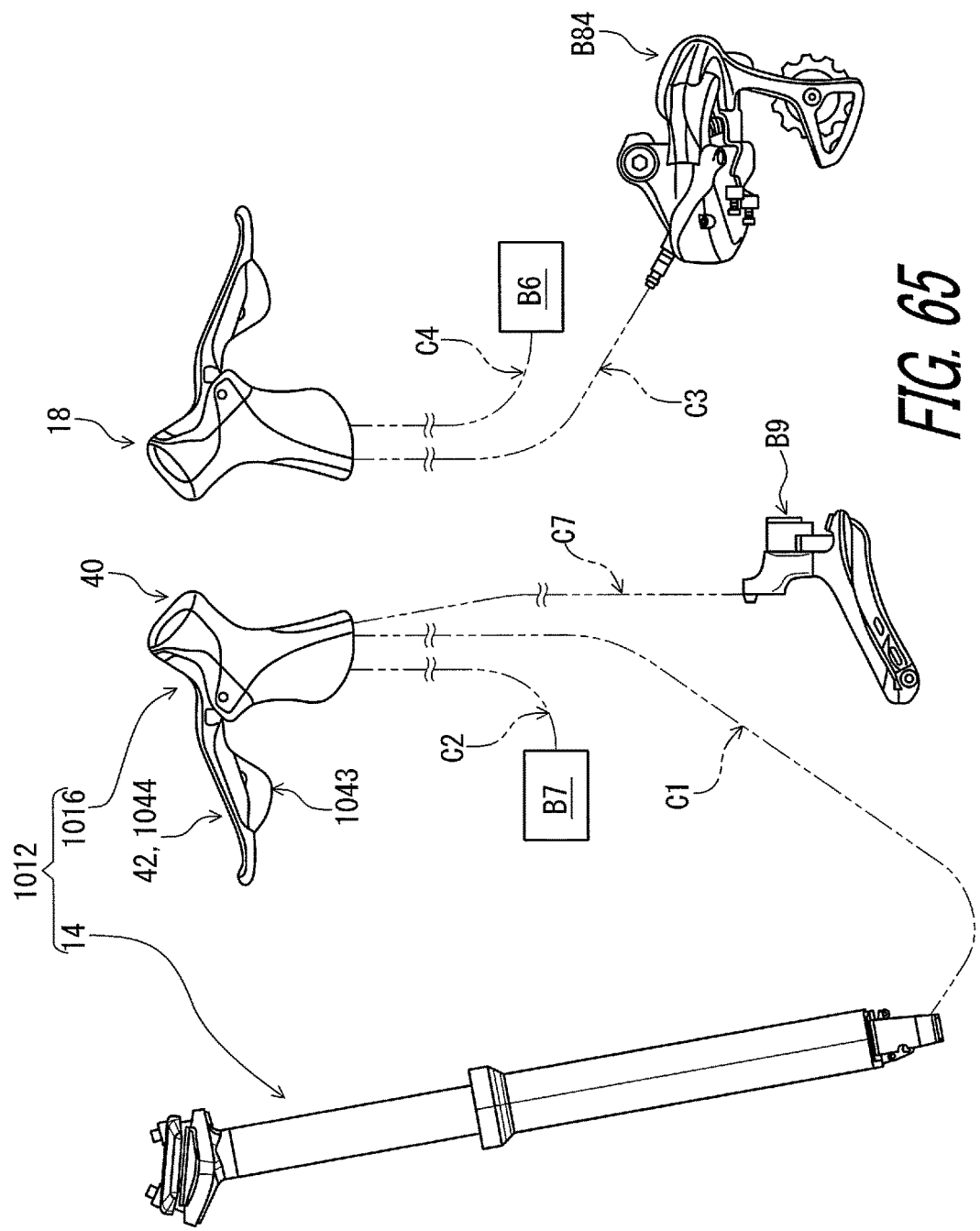

FIG. 65 is a schematic view of a bicycle seatpost apparatus in accordance with a tenth embodiment.

Figure 66:
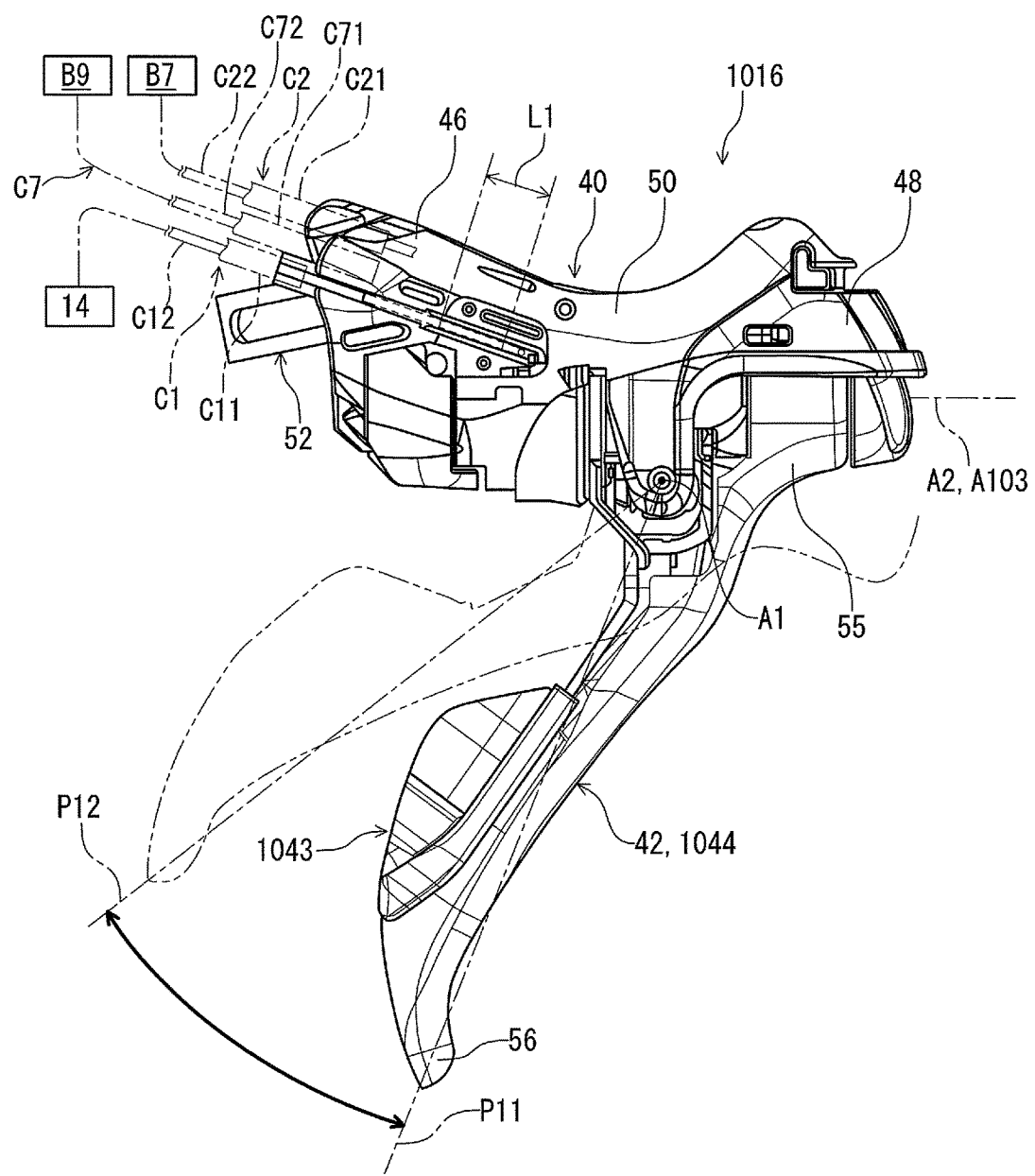

FIG. 66 is a side elevational view of a bicycle operating device of the bicycle seatpost apparatus illustrated in FIG. 65.

Figure 67:
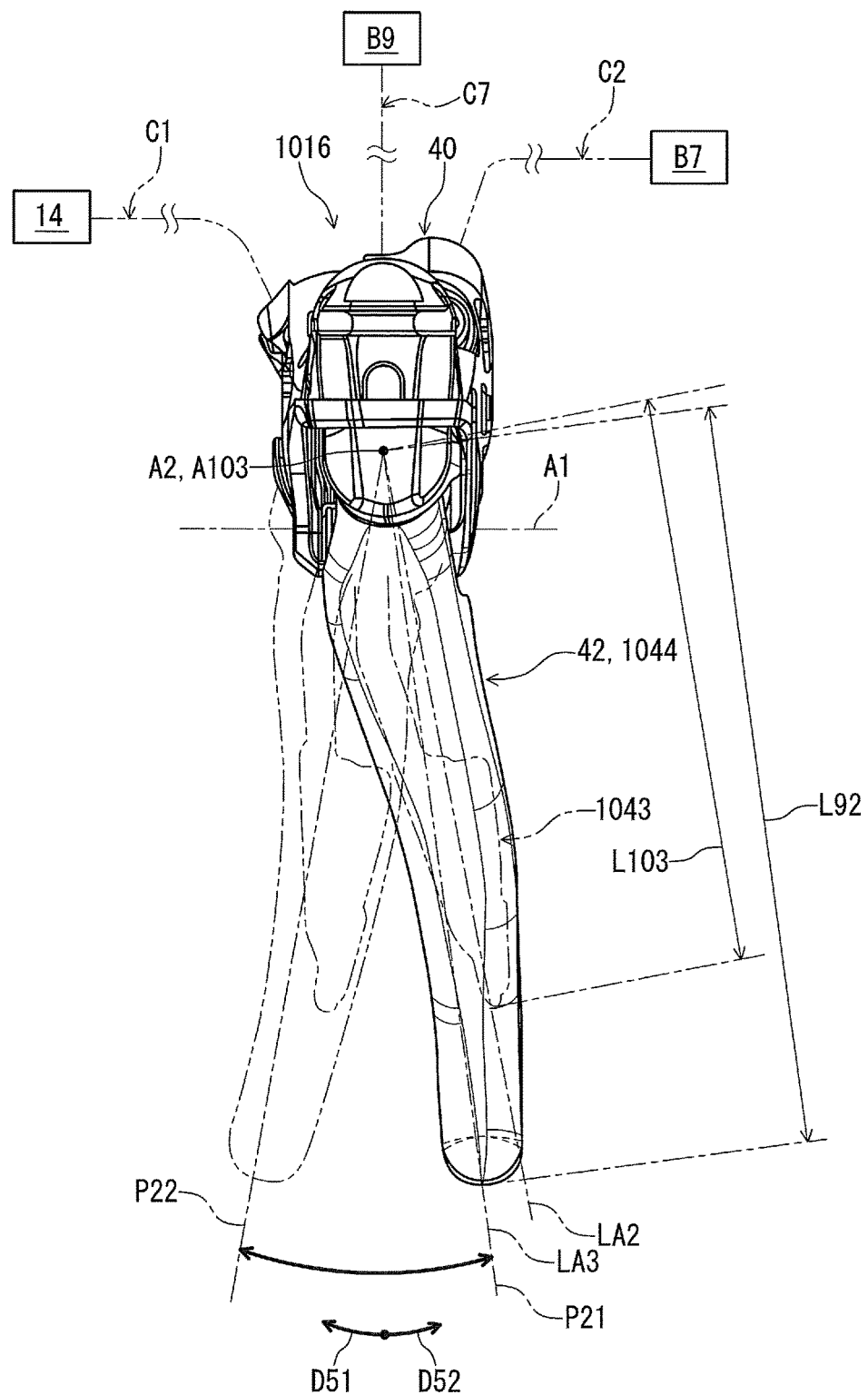

FIG. 67 is a front view of the bicycle operating device of the bicycle seatpost apparatus illustrated in FIG. 65.

Figure 68:
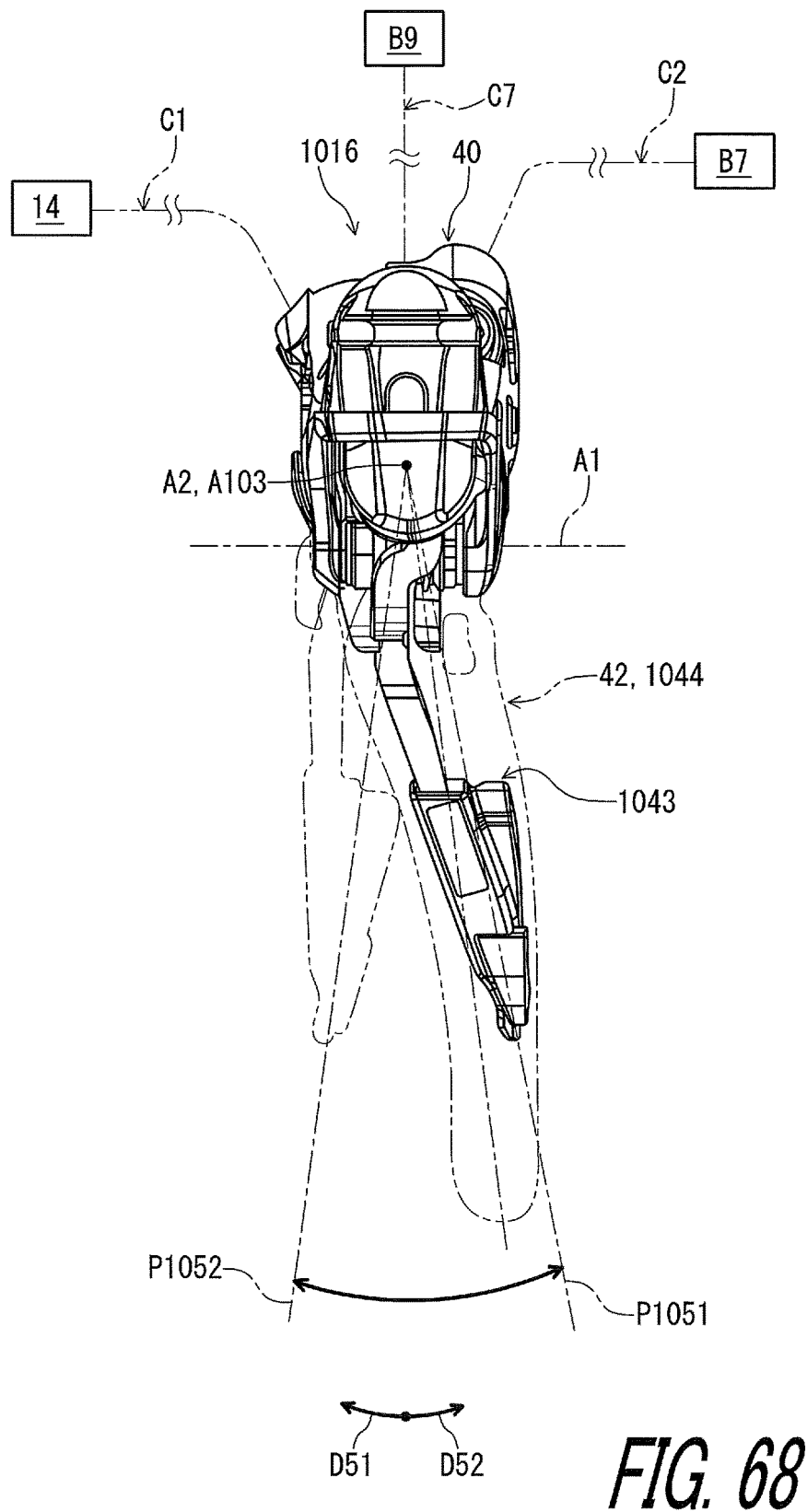

FIG. 68 is a front view of the bicycle operating device of the bicycle seatpost apparatus illustrated in FIG. 65, with a brake operating member omitted.

Figure 69:
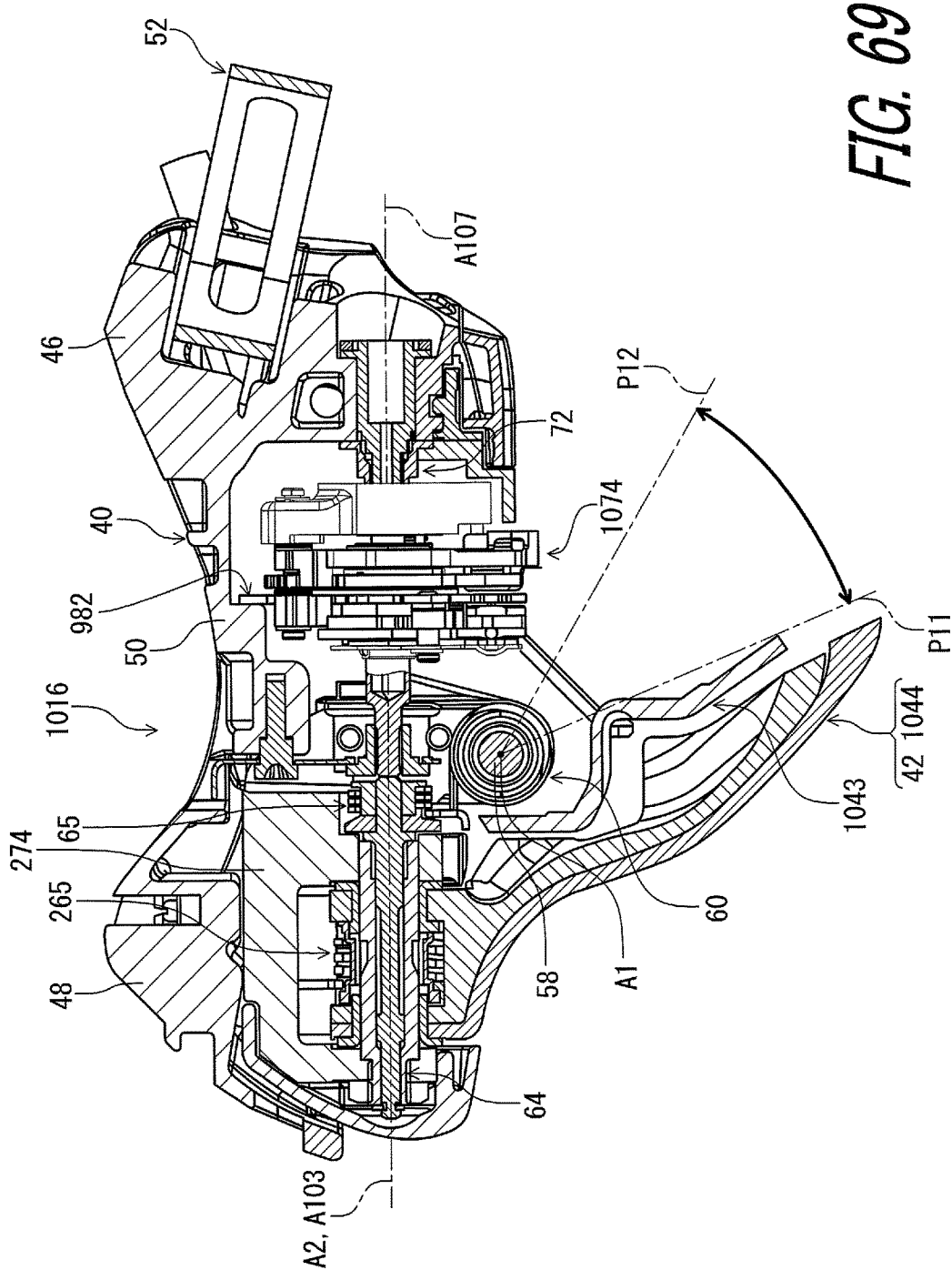

FIG. 69 is a cross-sectional view of the bicycle operating device of the bicycle seatpost apparatus illustrated in FIG. 65.

Figure 70:
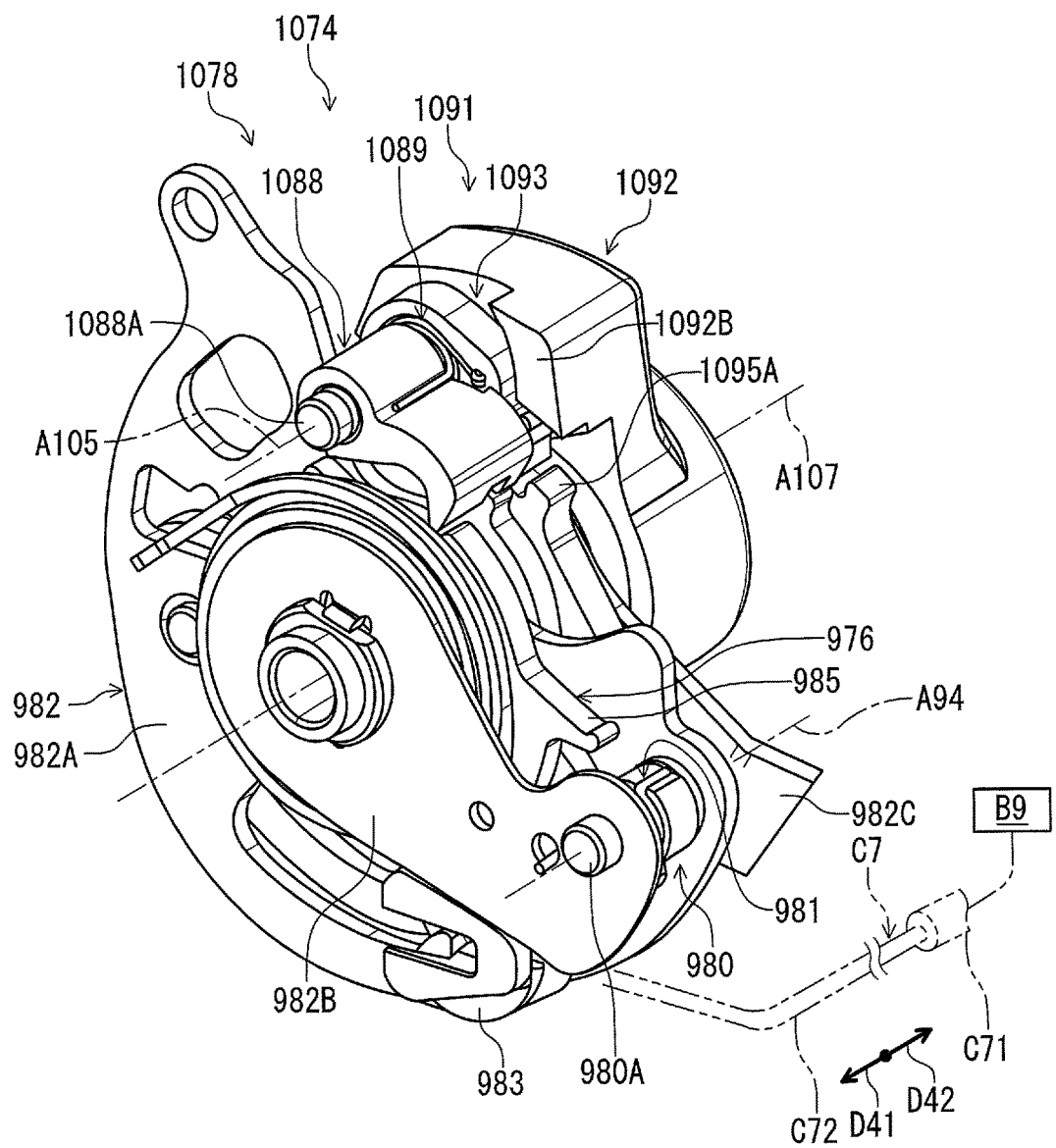

FIG. 70 is a perspective view of a cable operating structure of the bicycle operating device illustrated in FIG. 66.

Figure 71:
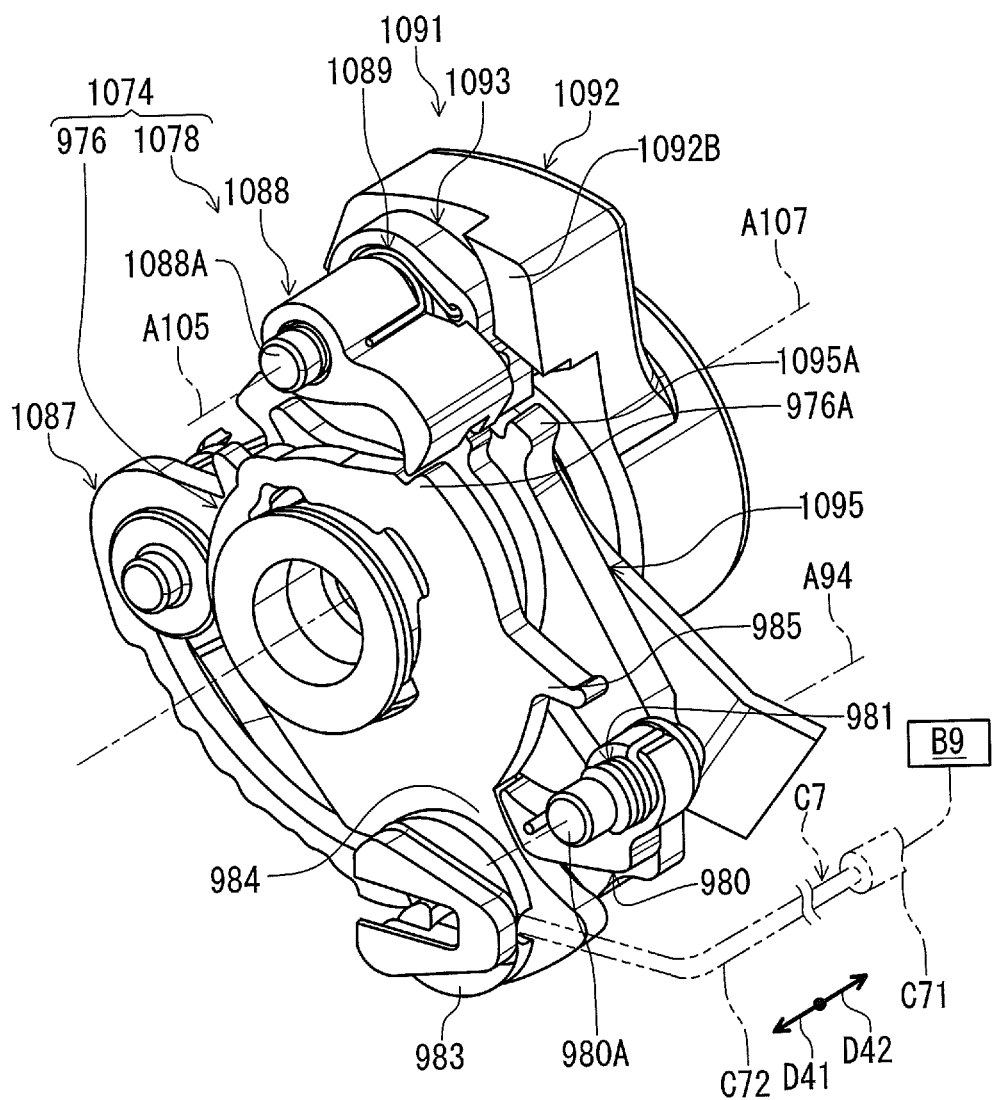

FIG. 71 is a perspective view of the cable operating structure of the bicycle operating device illustrated in FIG. 66, with a support structure omitted (first control position).

Figure 72:
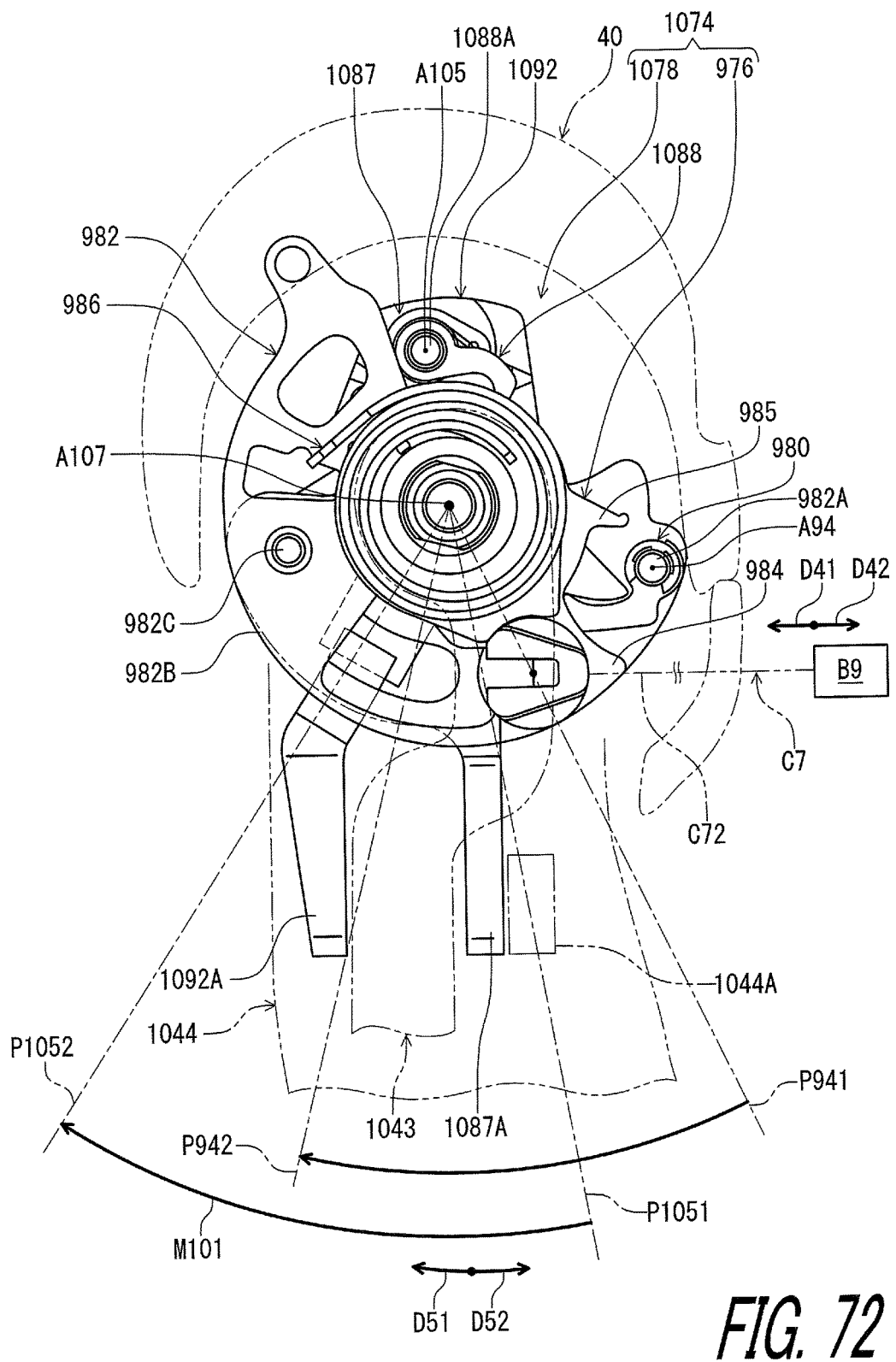

FIG. 72 is a front view of the cable operating structure of the bicycle operating device illustrated in FIG. 66.

Figure 73:
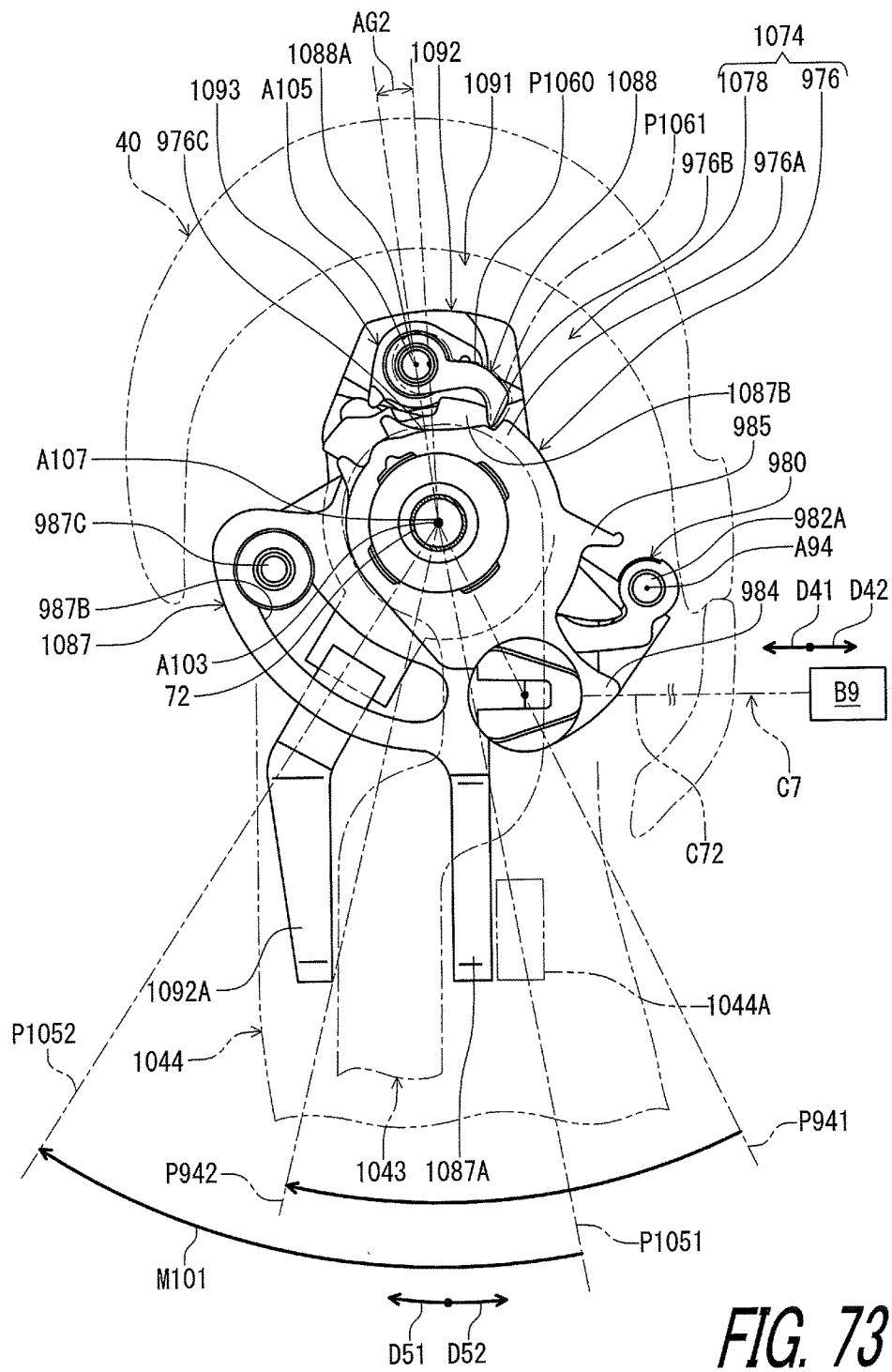

FIG. 73 is a front view of the cable operating structure of the bicycle operating device illustrated in FIG. 66, with the support structure omitted.

Figure 74:
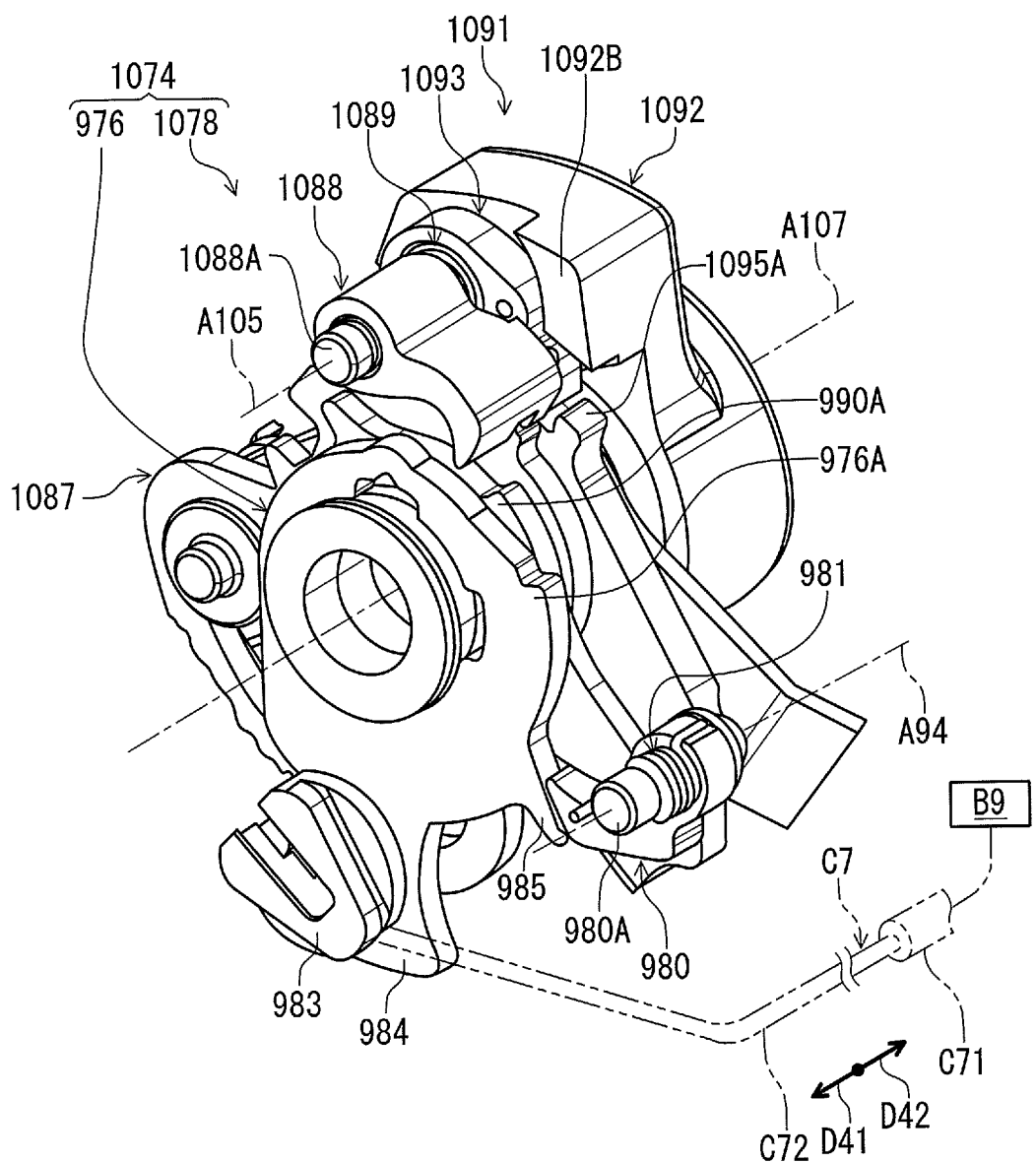

FIG. 74 is a perspective view of the cable operating structure of the bicycle operating device illustrated in FIG. 66, with the support structure omitted (second control position).

Figure 75:
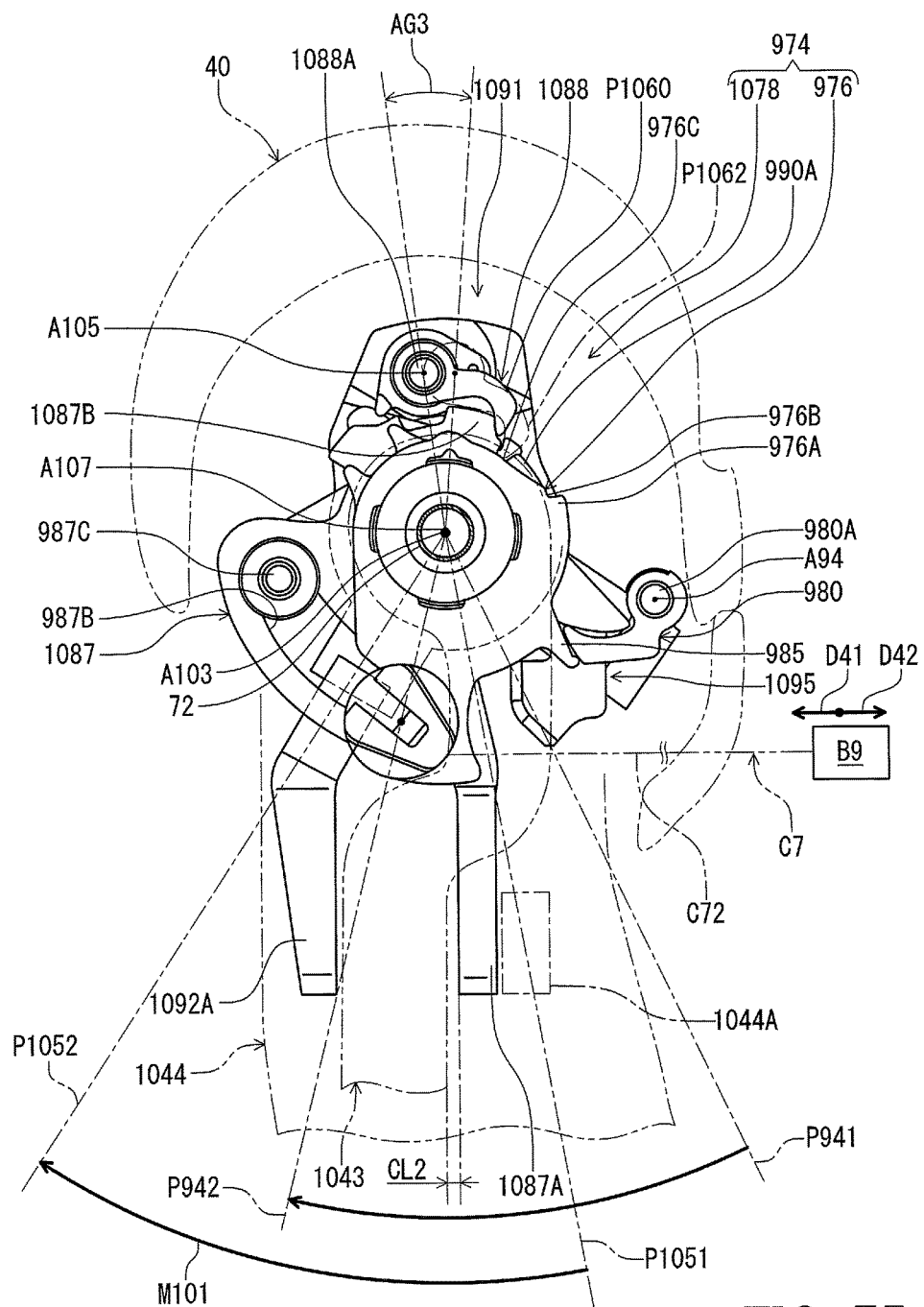

FIG. 75 is a front view of the cable operating structure of the bicycle operating device illustrated in FIG. 66, with the support structure omitted (second control position).

Figure 76:
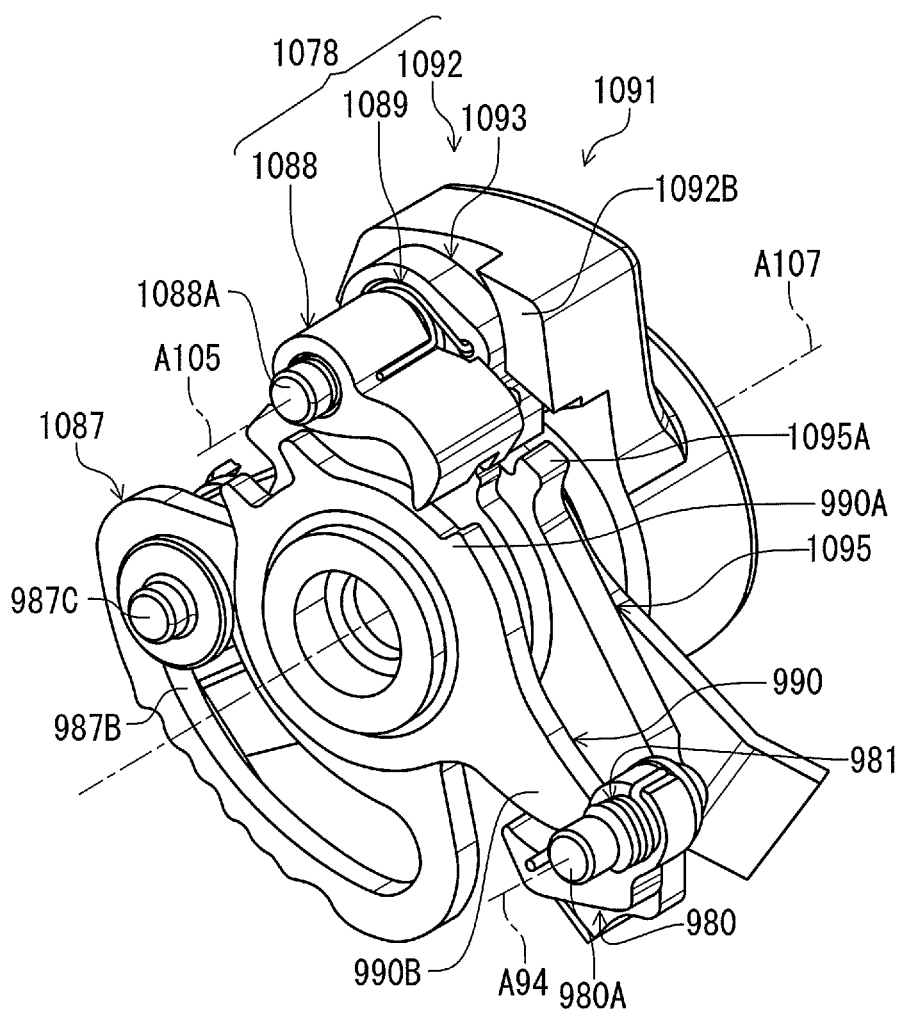

FIG. 76 is a perspective view of the cable operating structure of the bicycle operating device illustrated in FIG. 66, with the support structure and a cable control body omitted.

Figure 77:
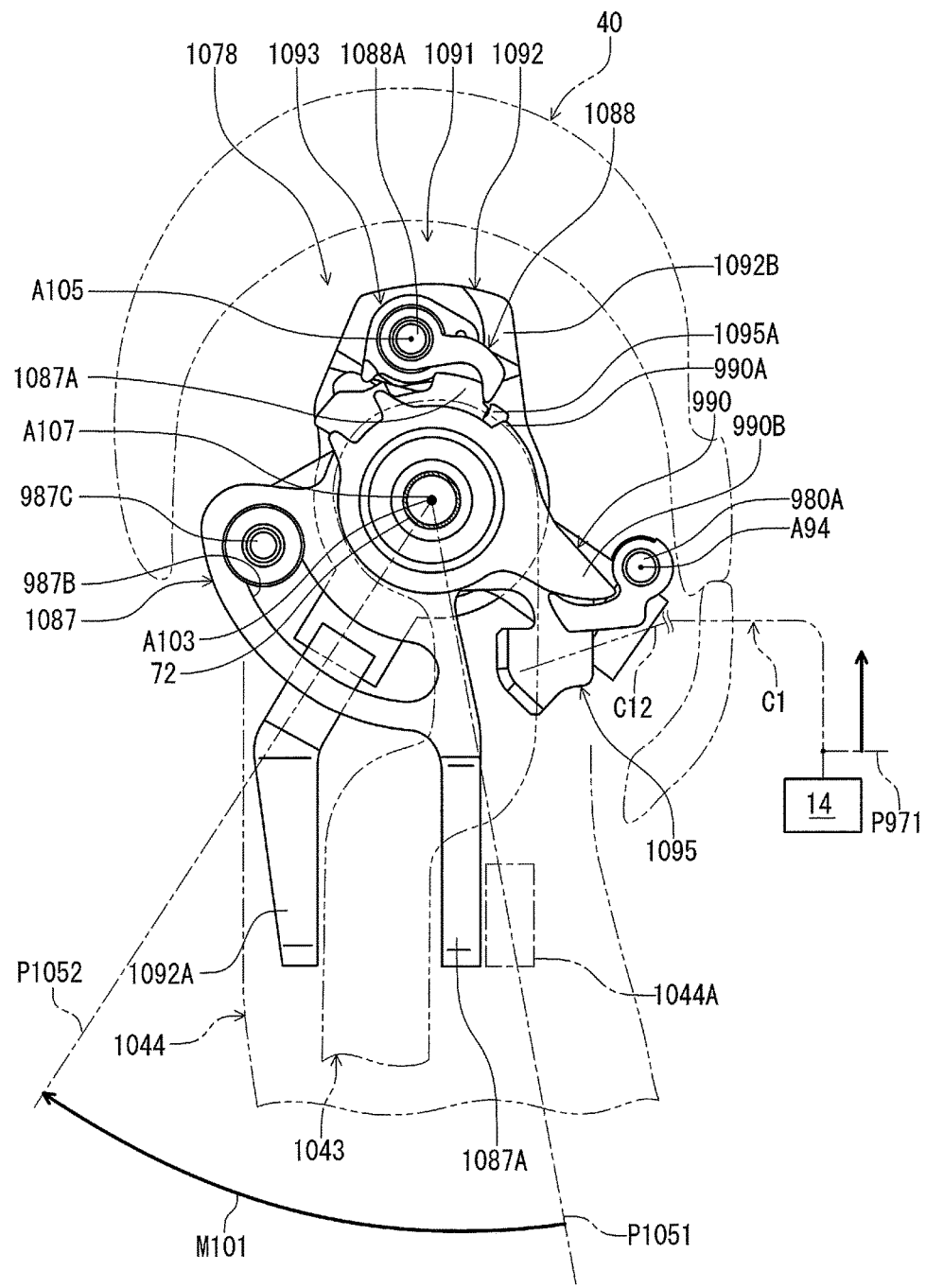

FIG. 77 is a front view of the cable operating structure of the bicycle operating device illustrated in FIG. 66, with the support structure and the cable control body omitted.

Figure 78:
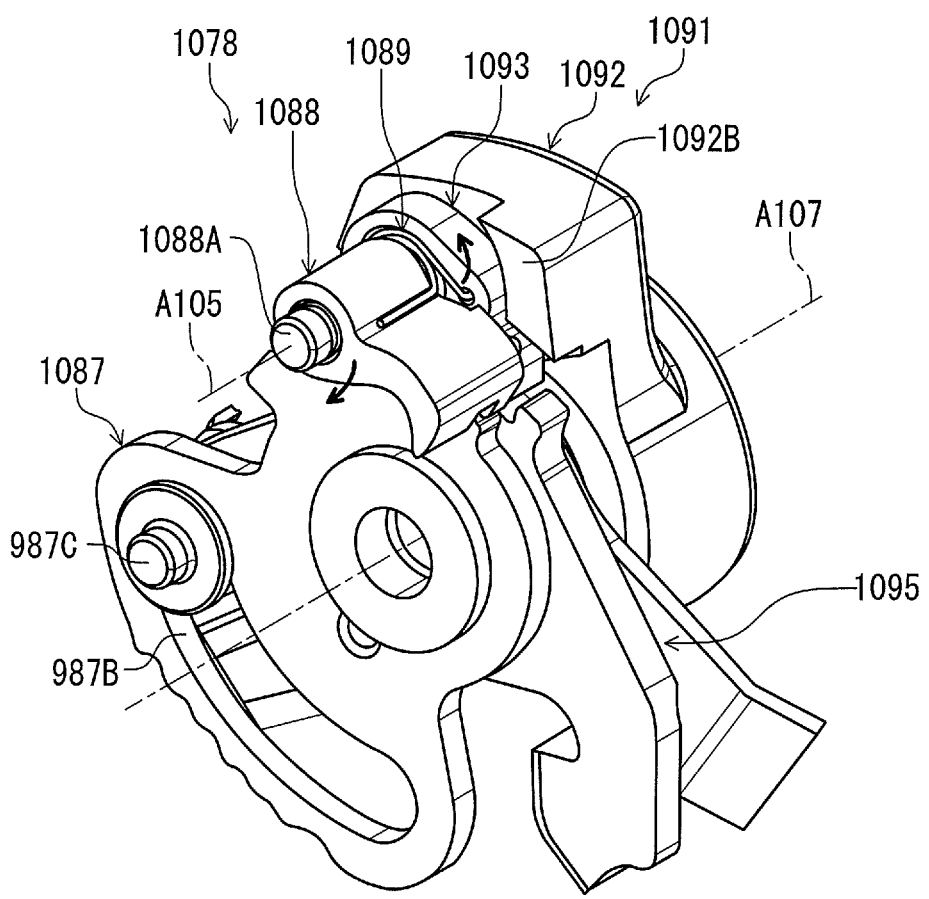

FIG. 78 is a perspective view of the cable operating structure of the bicycle operating device illustrated in FIG. 66, with the support structure, the cable control body, and a release member omitted.

Figure 79:
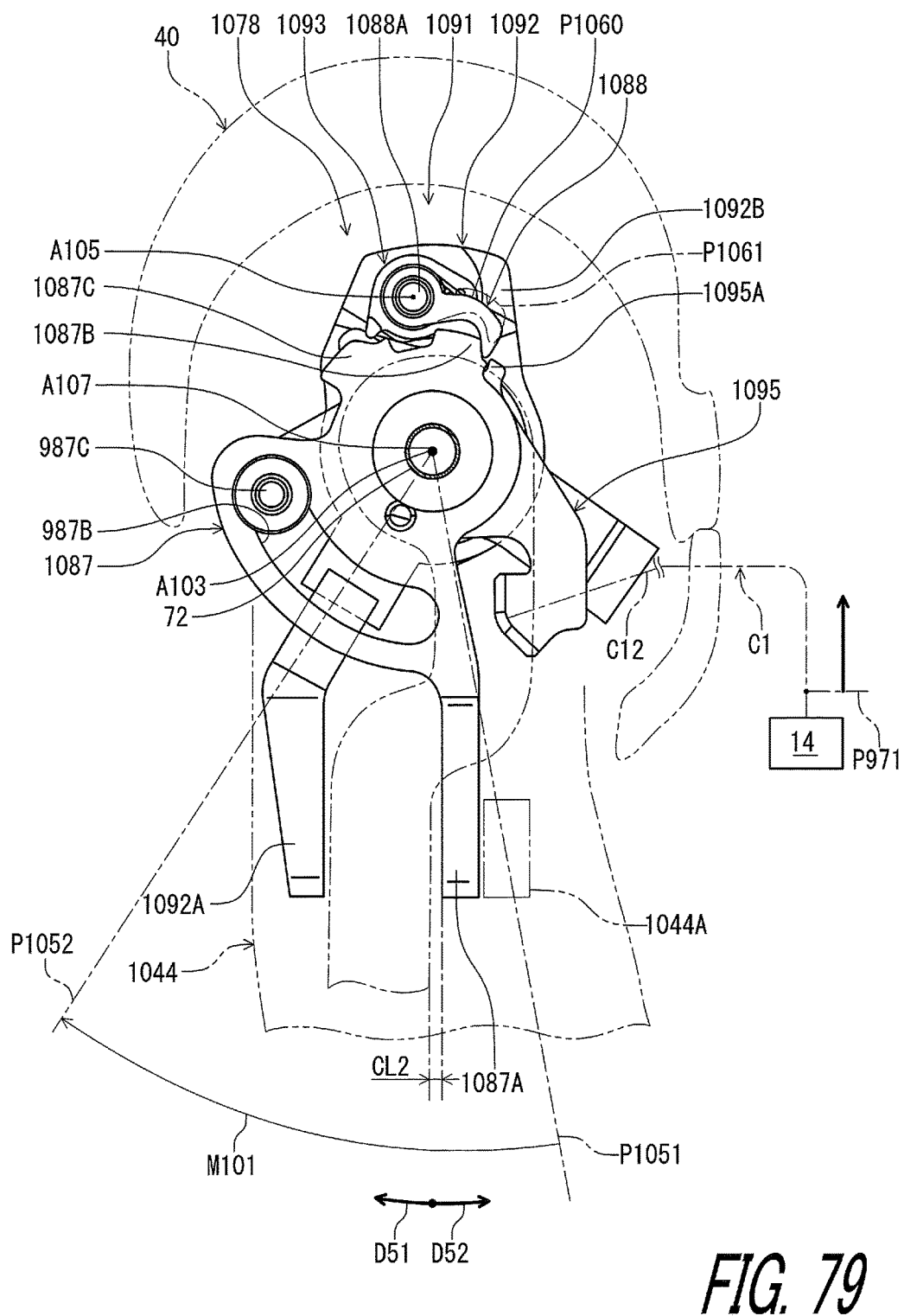

FIG. 79 is a front view of the cable operating structure of the bicycle operating device illustrated in FIG. 66, with the support structure, the cable control body, and the release member omitted.

Figure 80:
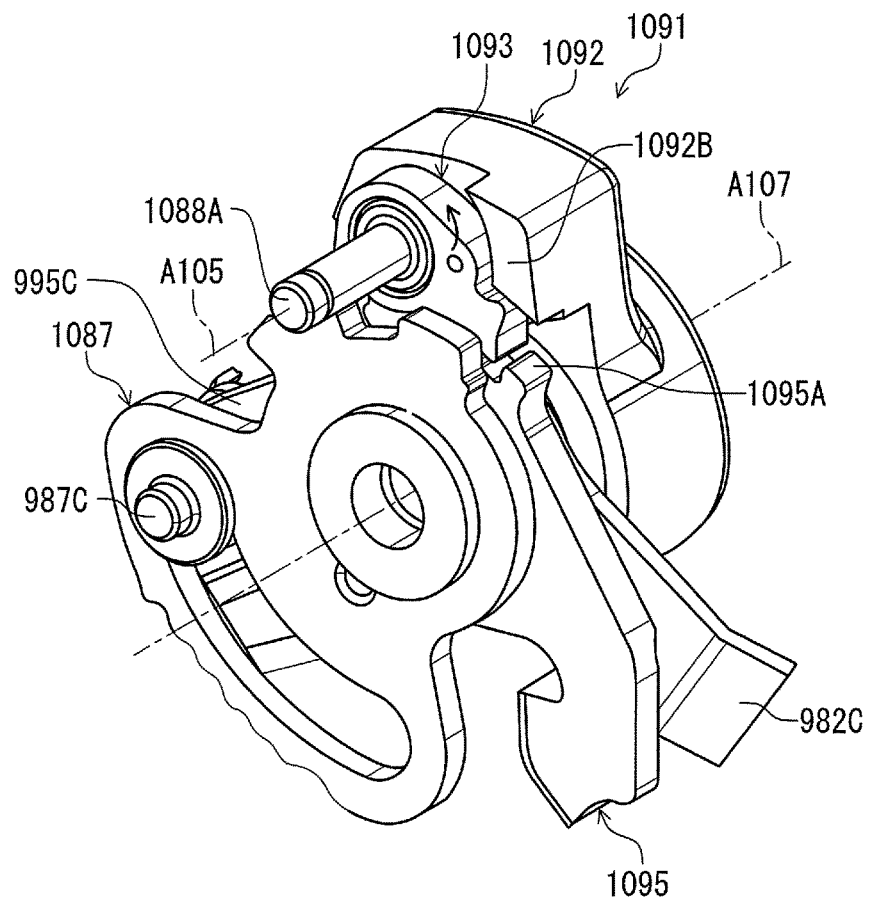

FIG. 80 is a perspective view of the cable operating structure of the bicycle operating device illustrated in FIG. 66, with the support structure, the cable control body, the release member, and a first actuation member omitted.

Figure 81:
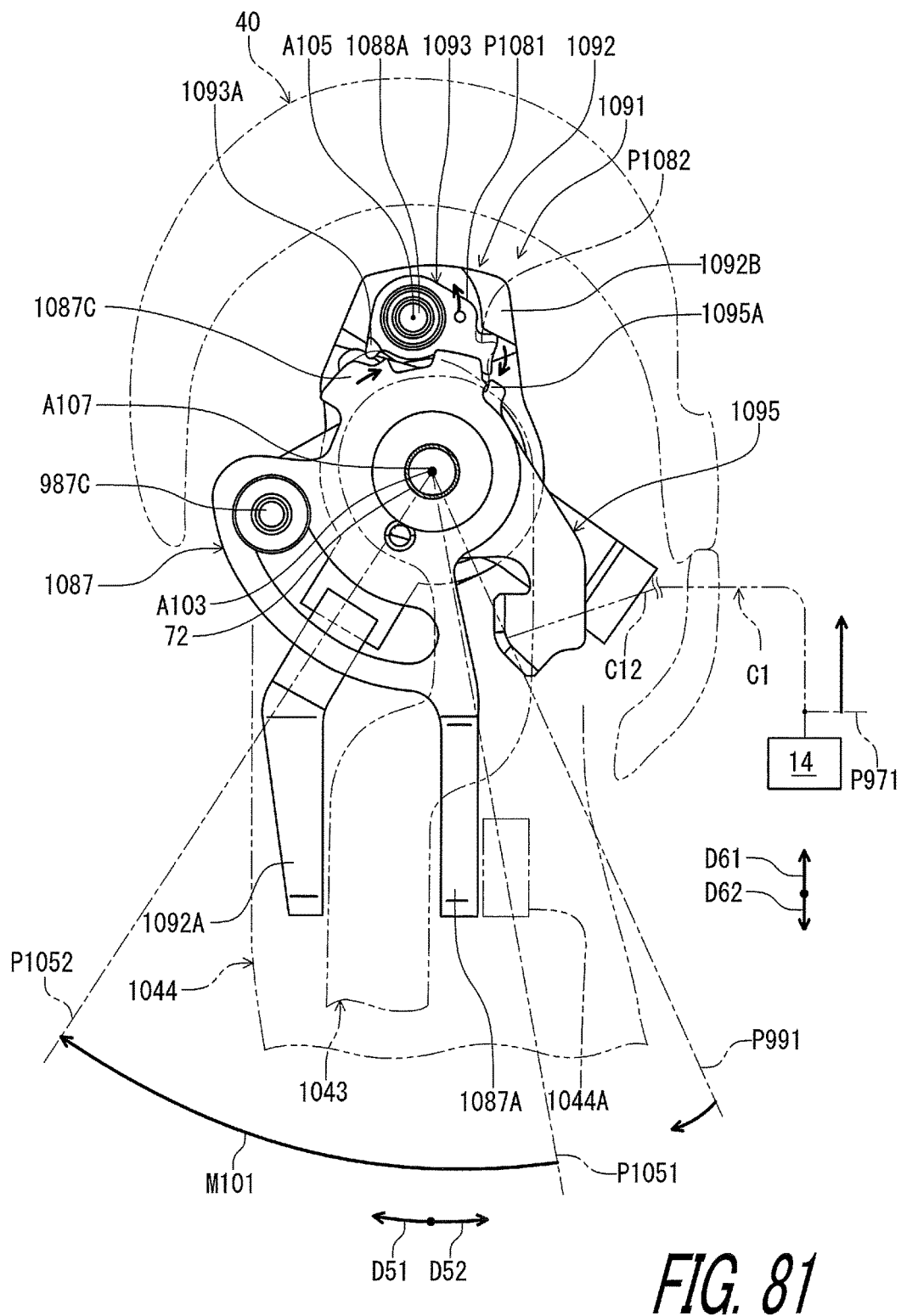

FIG. 81 is a front view of the cable operating structure of the bicycle operating device illustrated in FIG. 66, with the support structure, the cable control body, the release member, and the first actuation member omitted.

Figure 82:
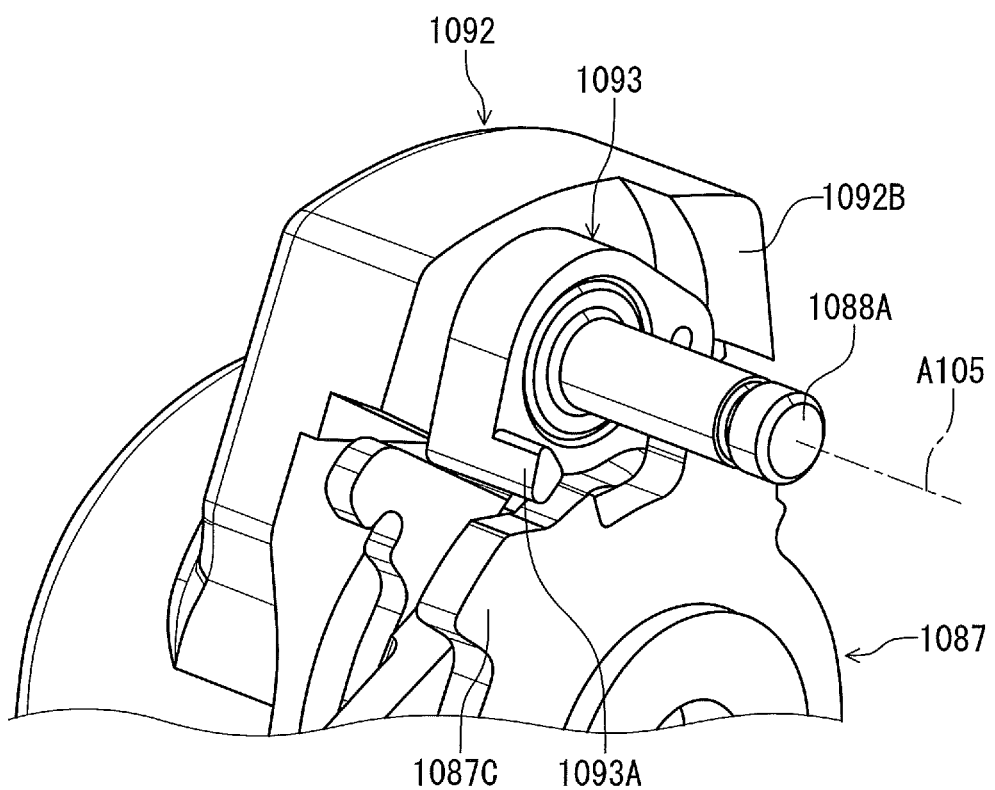

FIG. 82 is another perspective view of the cable operating structure of the bicycle operating device illustrated in FIG. 66, with the support structure, the cable control body, the release member, and the first actuation member omitted.

FIGS. 83 to 87 are front views of the cable operating structure of the bicycle operating device illustrated in FIG. 66 to show pulling and releasing operation of the bicycle operating device for the first mechanical control cable.

Figure 88:
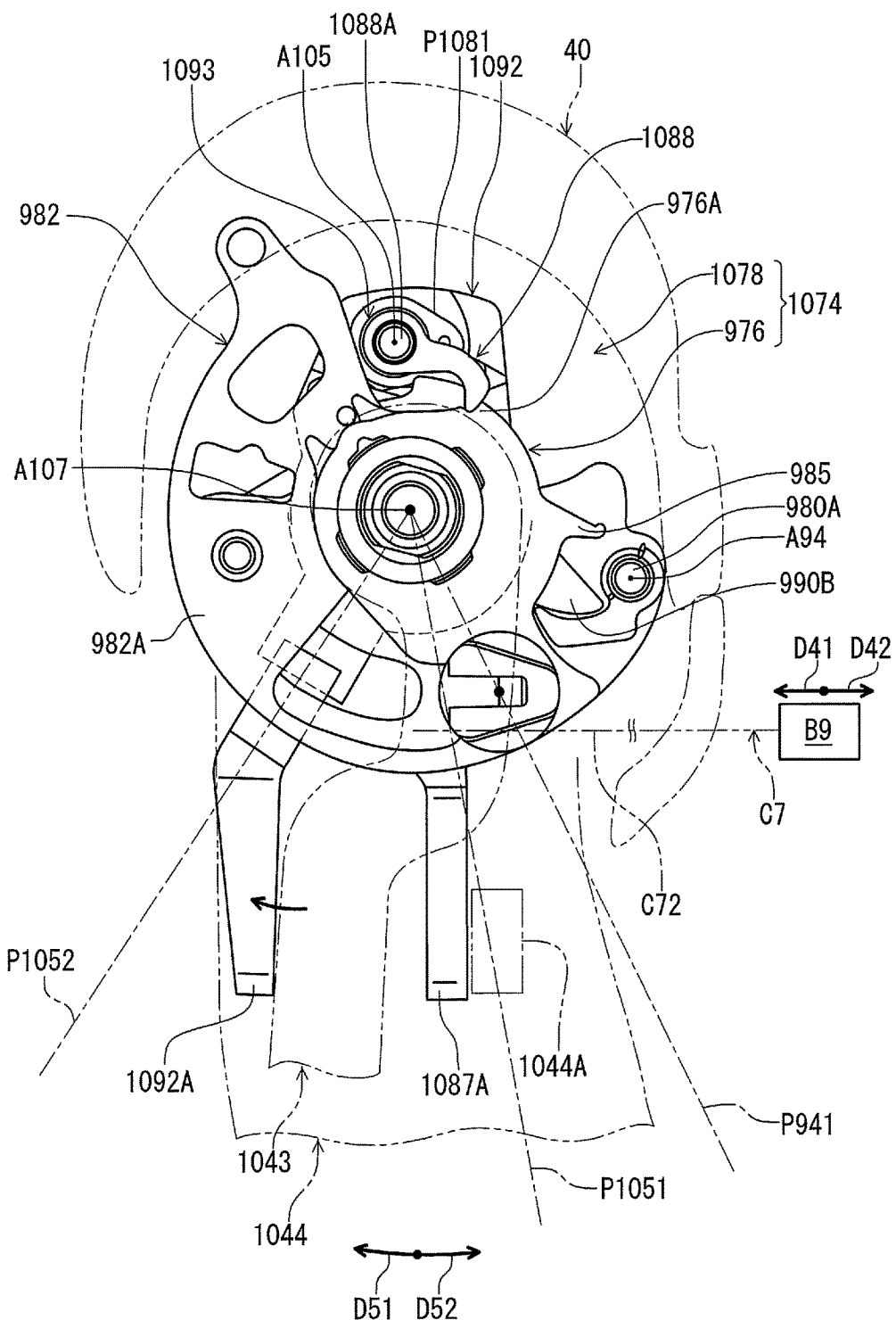
Figure 89:
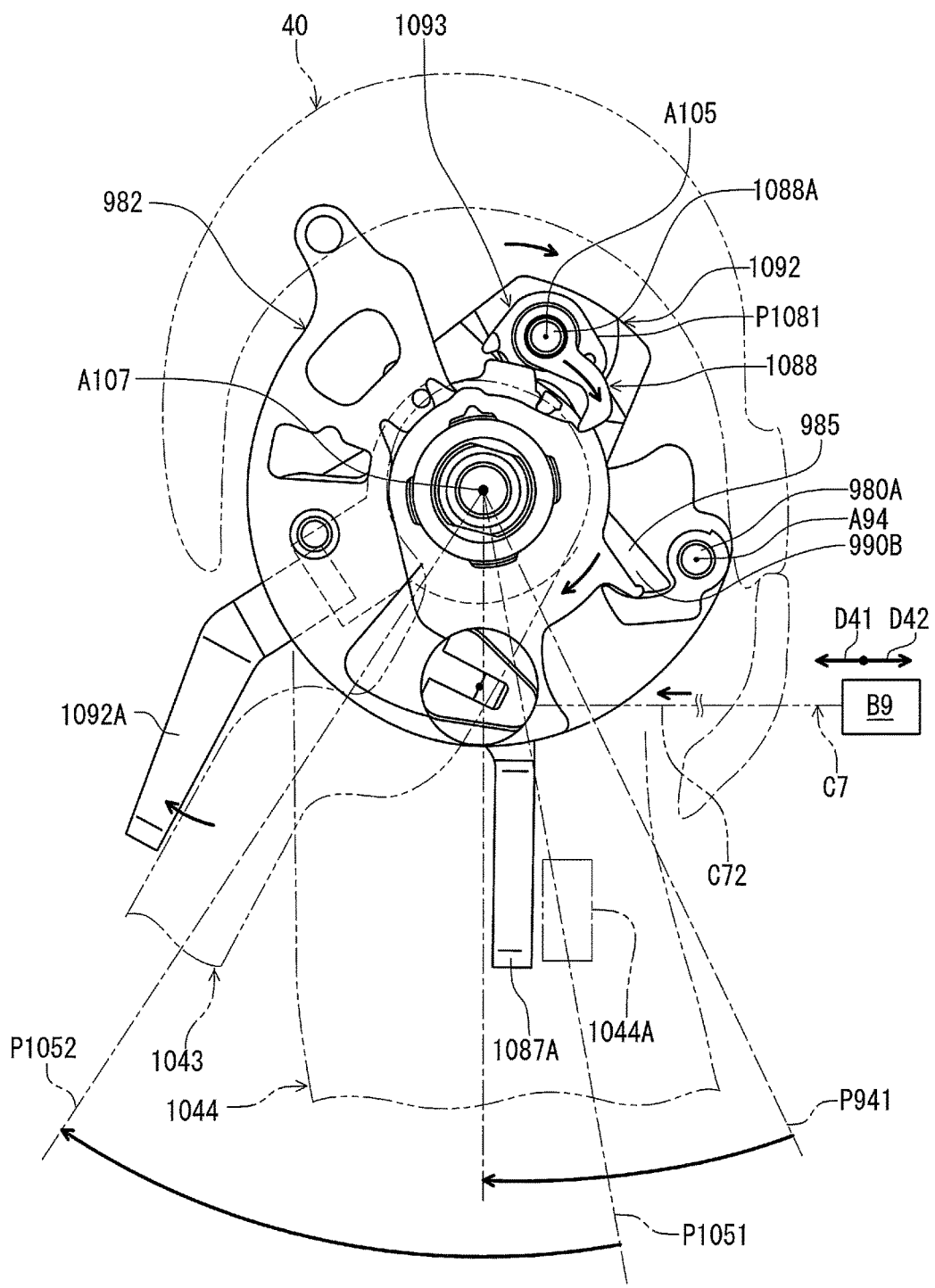

FIGS. 88 to 89 are front views of the cable operating structure of the bicycle operating device illustrated in FIG. 66 to show pulling operation of the bicycle operating device for the second mechanical control cable.

FIGS. 90 to 93 are front views of the cable operating structure of the bicycle operating device illustrated in FIG. 66 to show releasing operation of the bicycle operating device for the second mechanical control cable.

Figure 94:
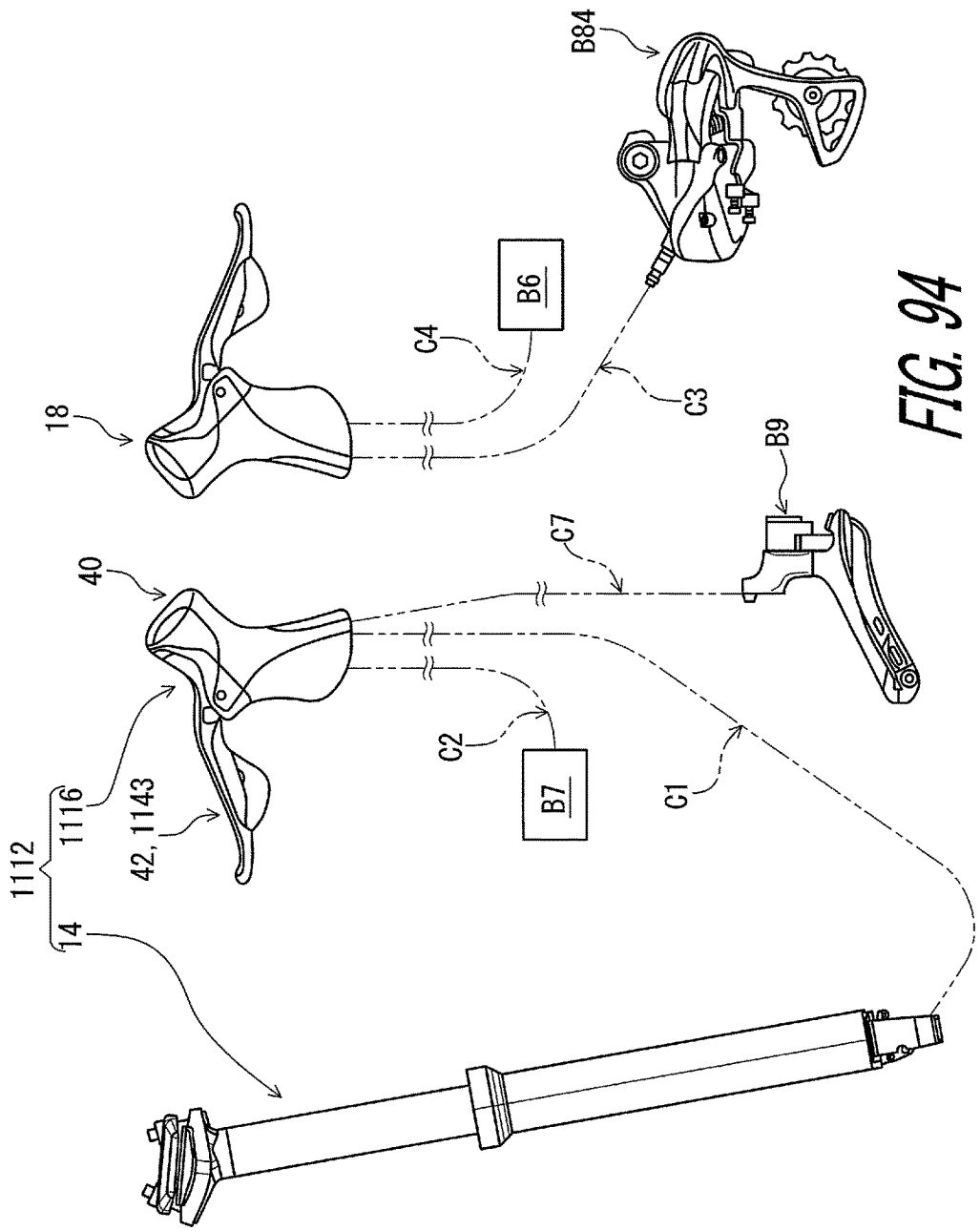

FIG. 94 is a schematic view of a bicycle seatpost apparatus in accordance with an eleventh embodiment.

Figure 95:
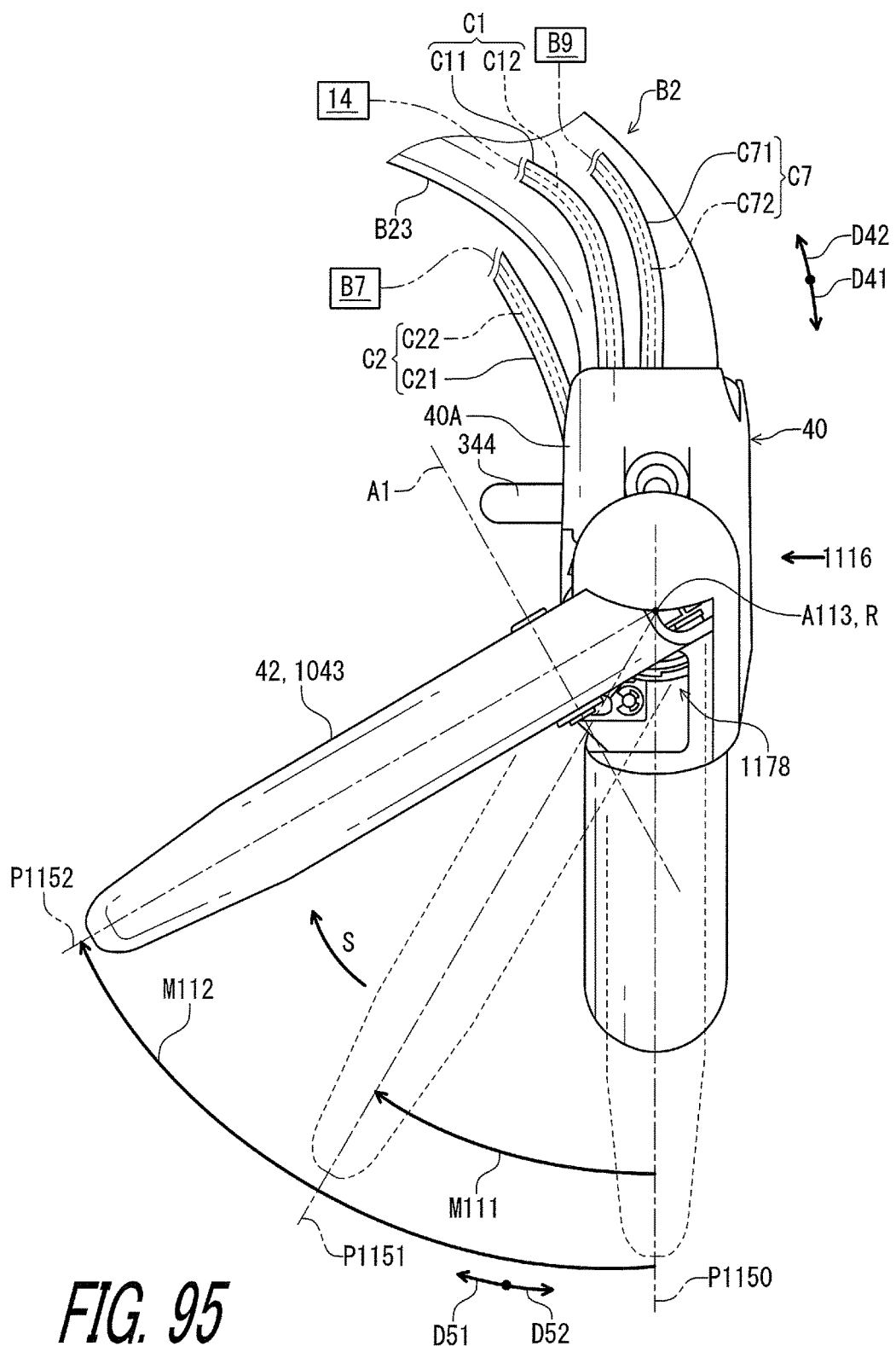

FIG. 95 is a front view of a bicycle operating device of the bicycle seatpost apparatus illustrated in FIG. 94 to show a second operating member actuated along a shifting path.

Figure 96:
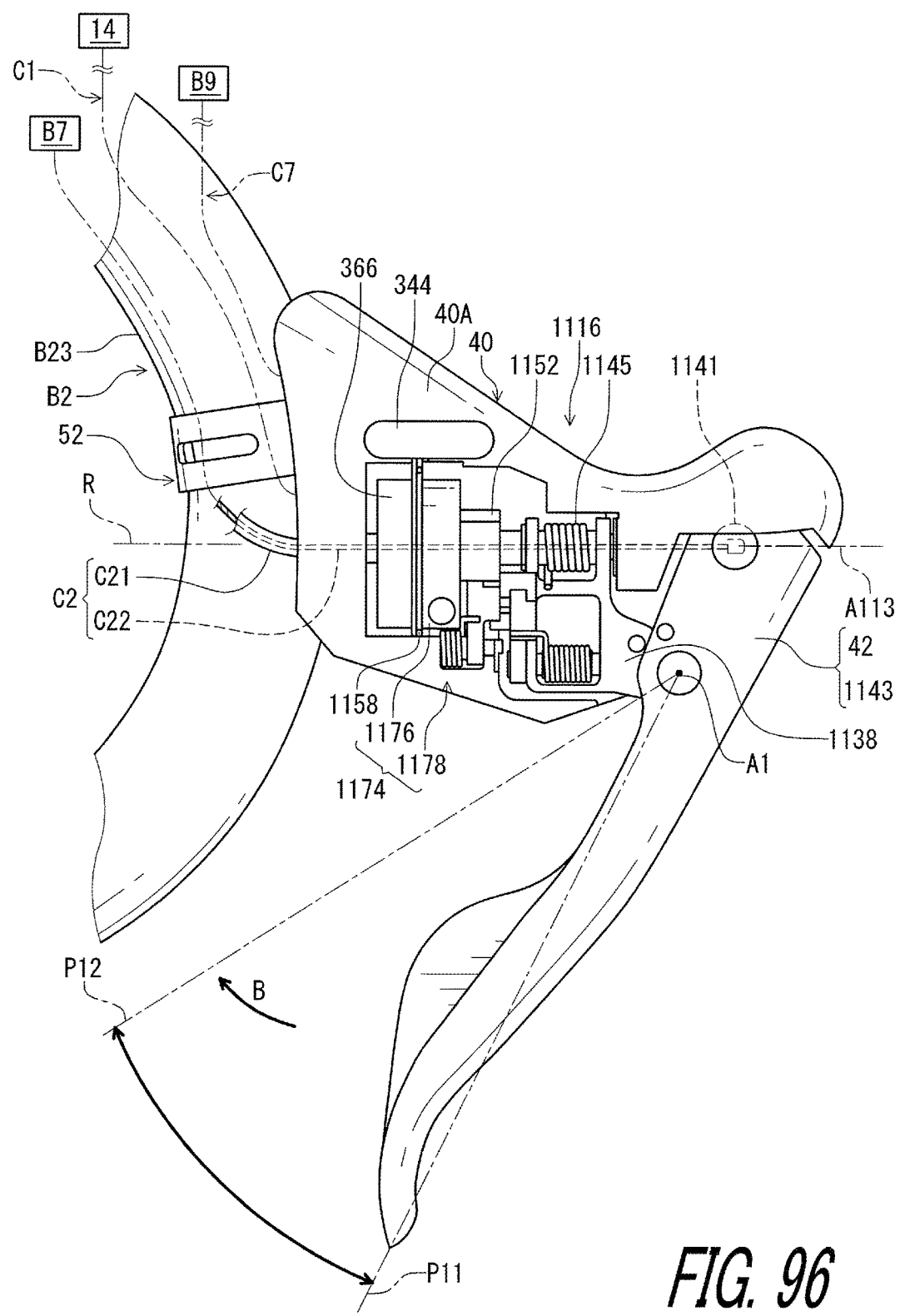

FIG. 96 is a side view of the bicycle operating device of the bicycle seatpost apparatus illustrated in FIG. 94.

Figure 97:
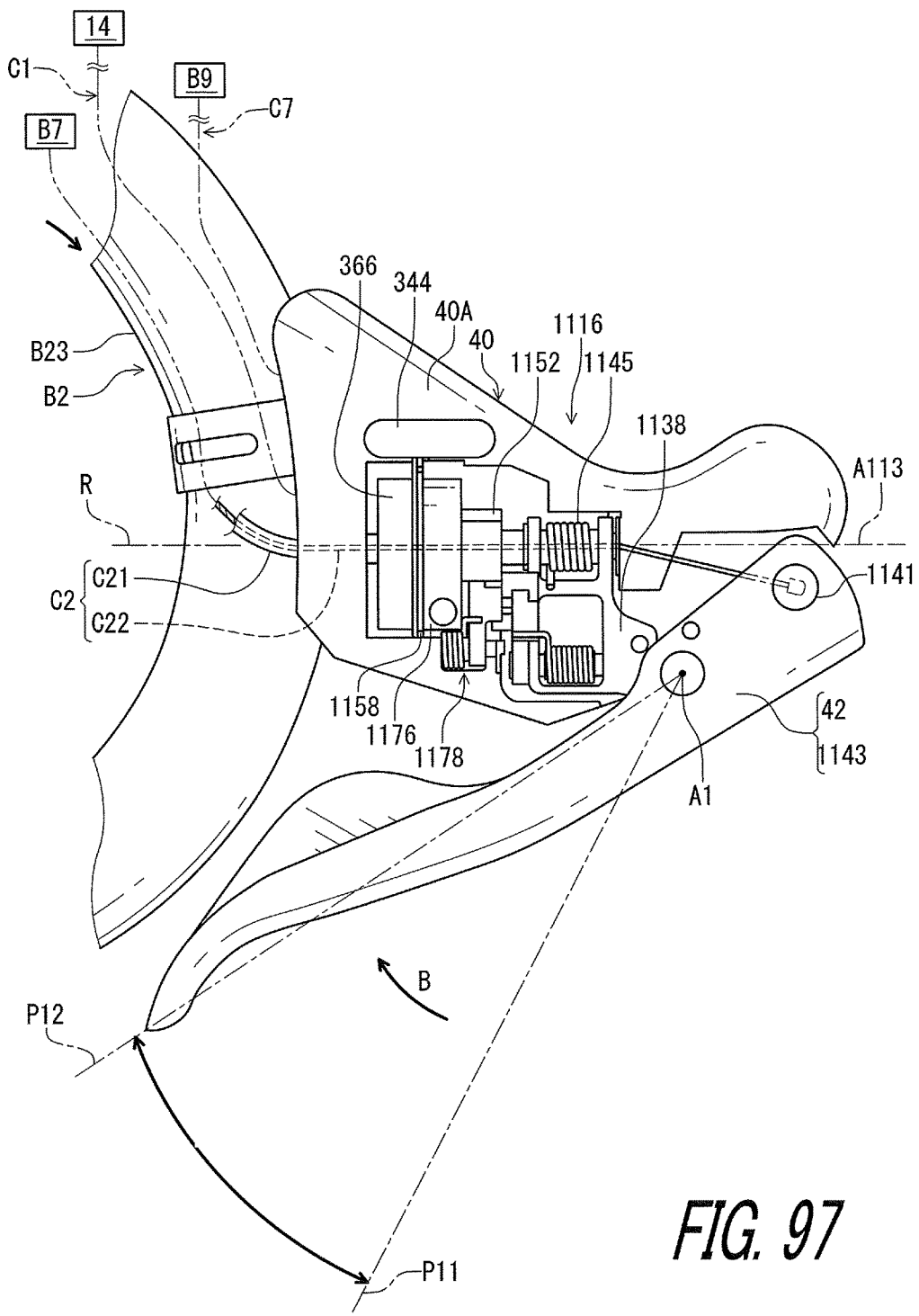

FIG. 97 is a side view of the bicycle operating device illustrated in FIG. 96 to show a brake operating member actuated along a braking path.

Figure 98:
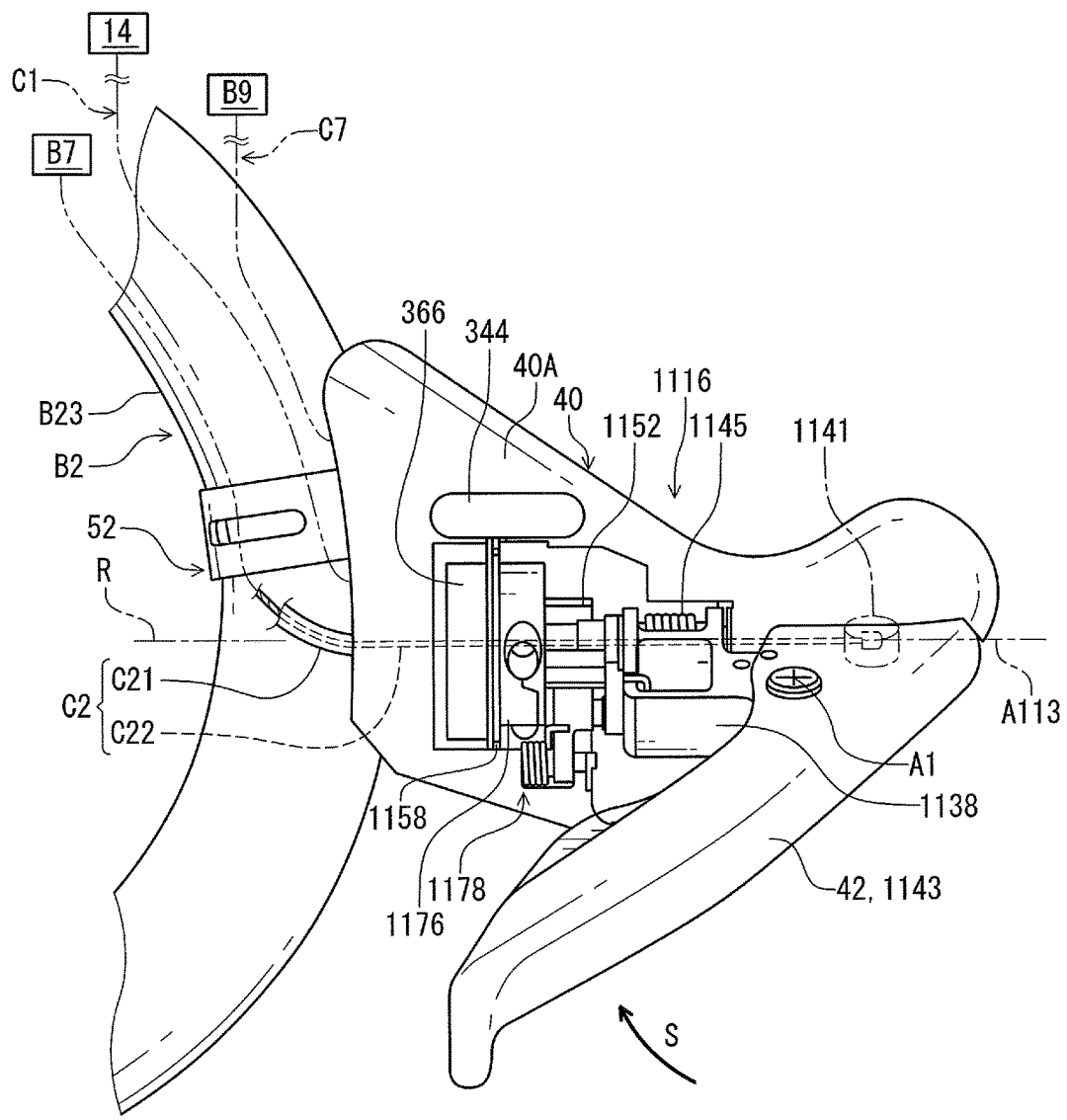

FIG. 98 is a side view of the bicycle operating device illustrated in FIG. 96 to show the second operating member actuated along the shifting path.

Figure 99:
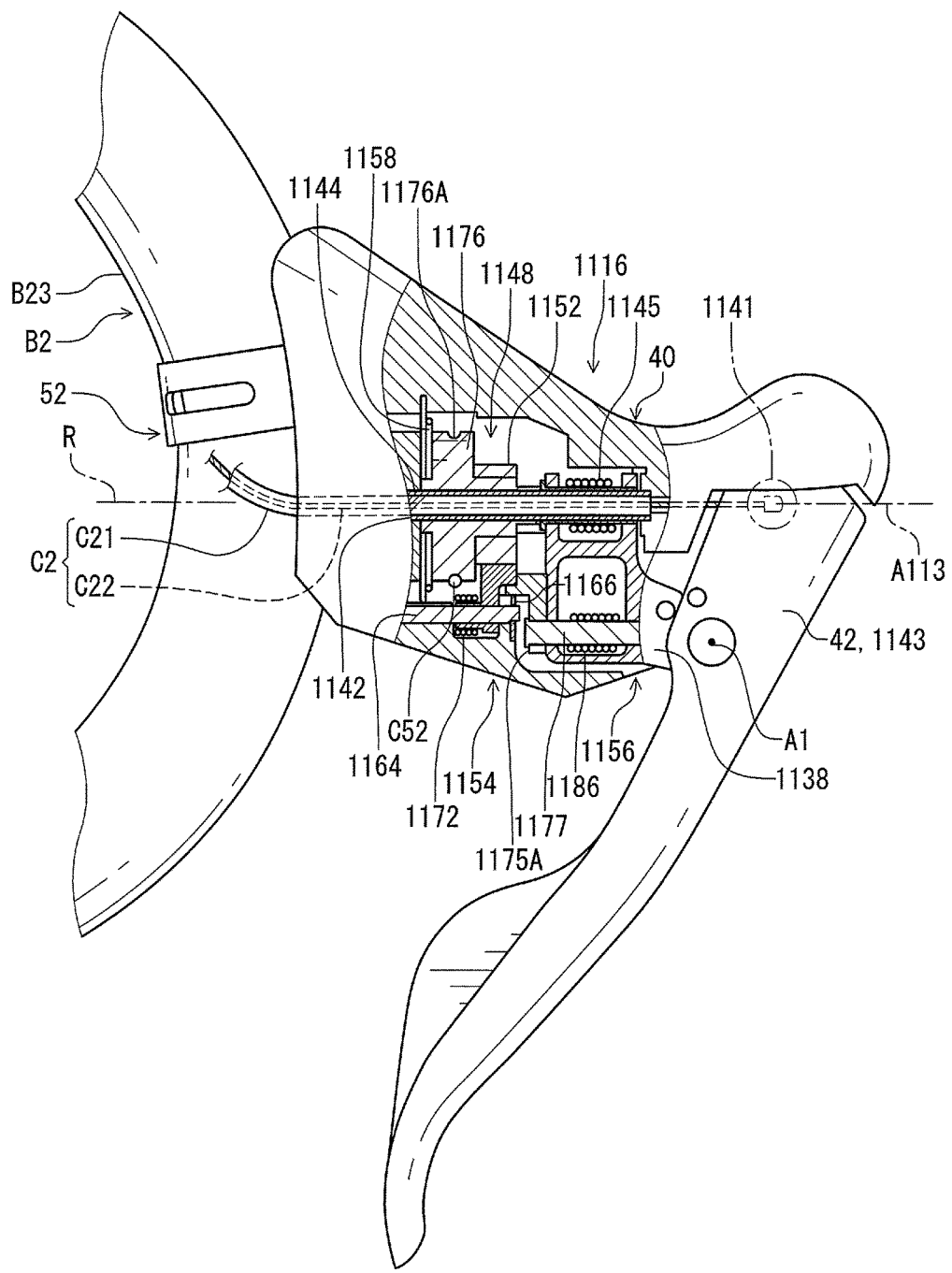
Figure 100:
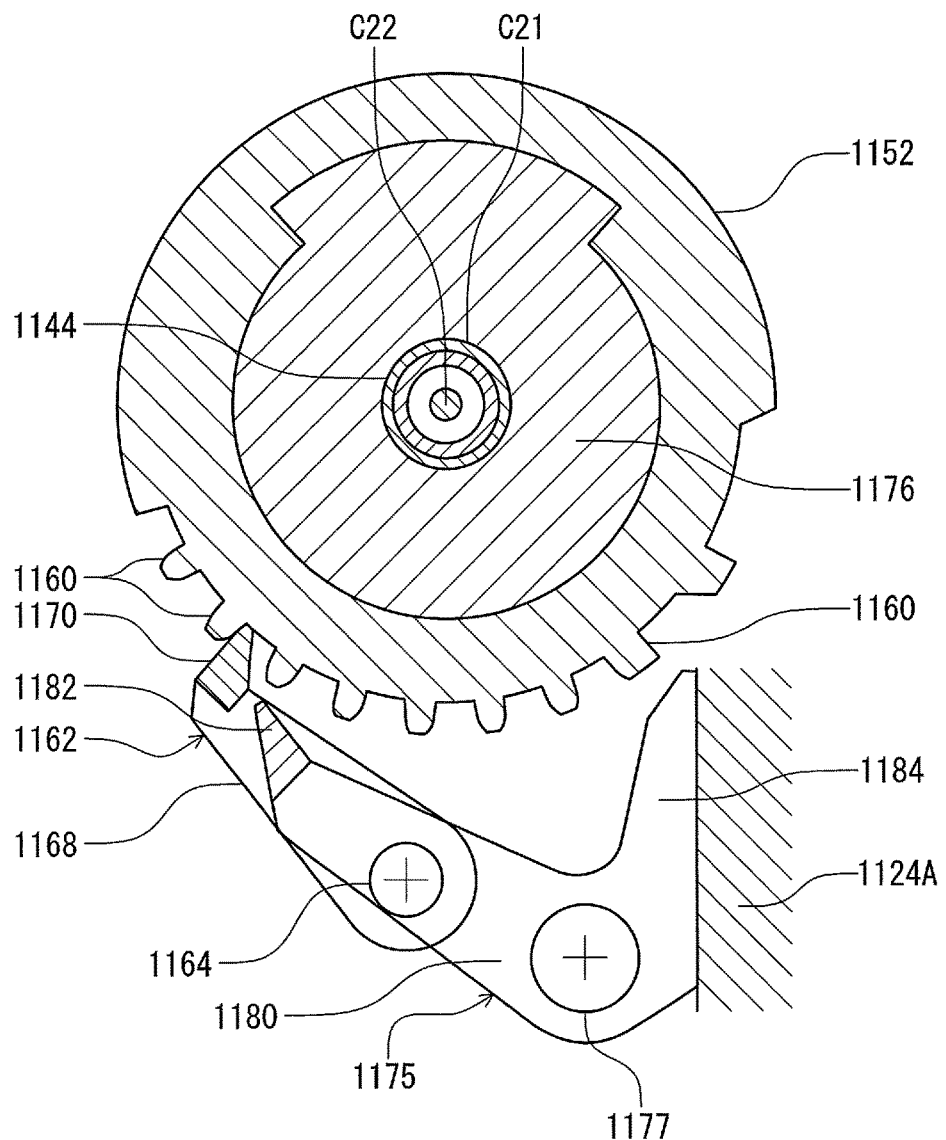

FIG. 99 is a partial cross-sectional view of the bicycle operating device illustrated in FIG. 96.

FIGS. 100 to 105 are cross-sectional views of a cable operating structure at different stages of a cable-release operation.

FIGS. 106 to 113 are cross-sectional views of the cable operating structure at different stages of a cable-pull operation.

Figure 114:
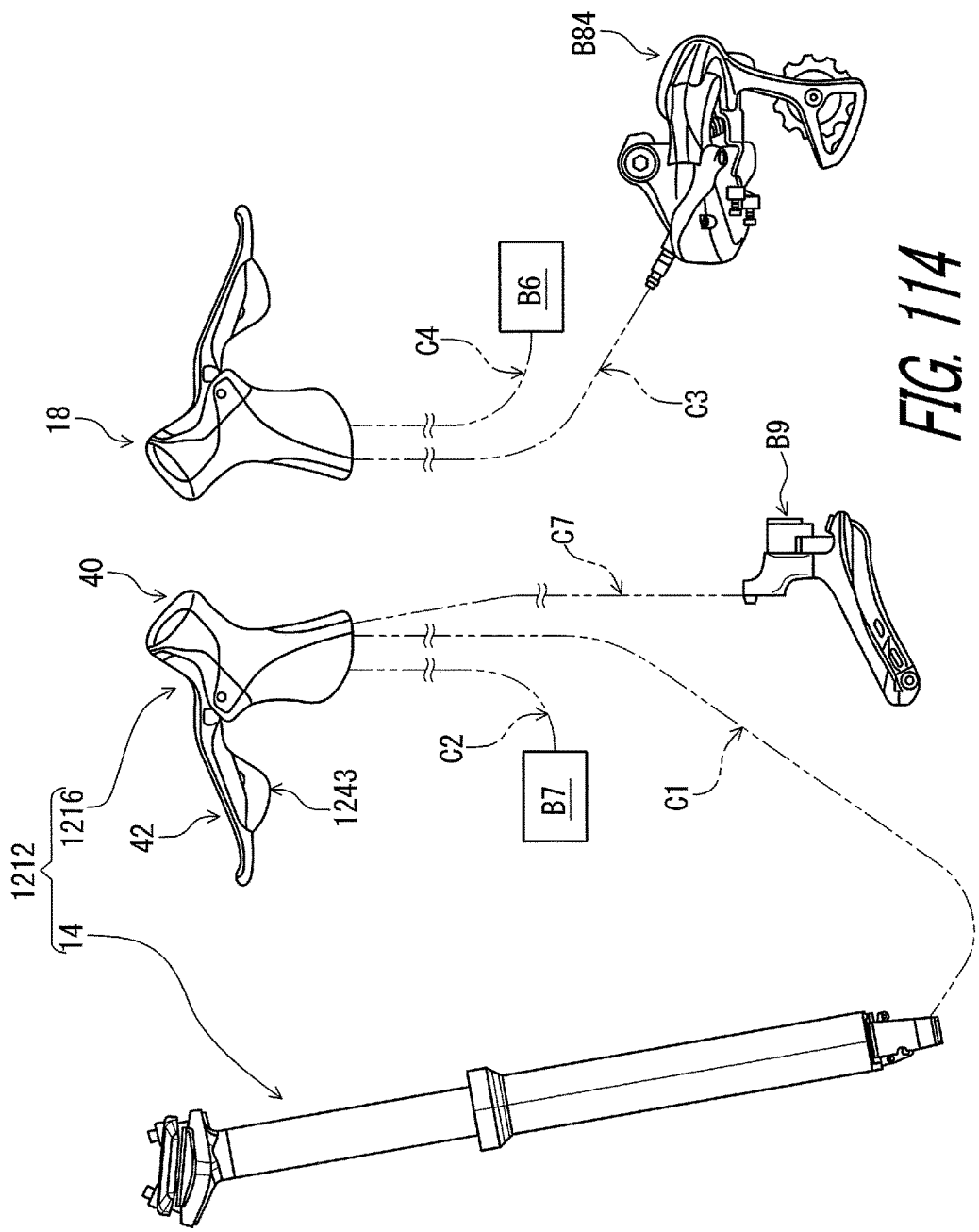

FIG. 114 is a schematic view of a bicycle seatpost apparatus in accordance with a twelfth embodiment.

Figure 115:
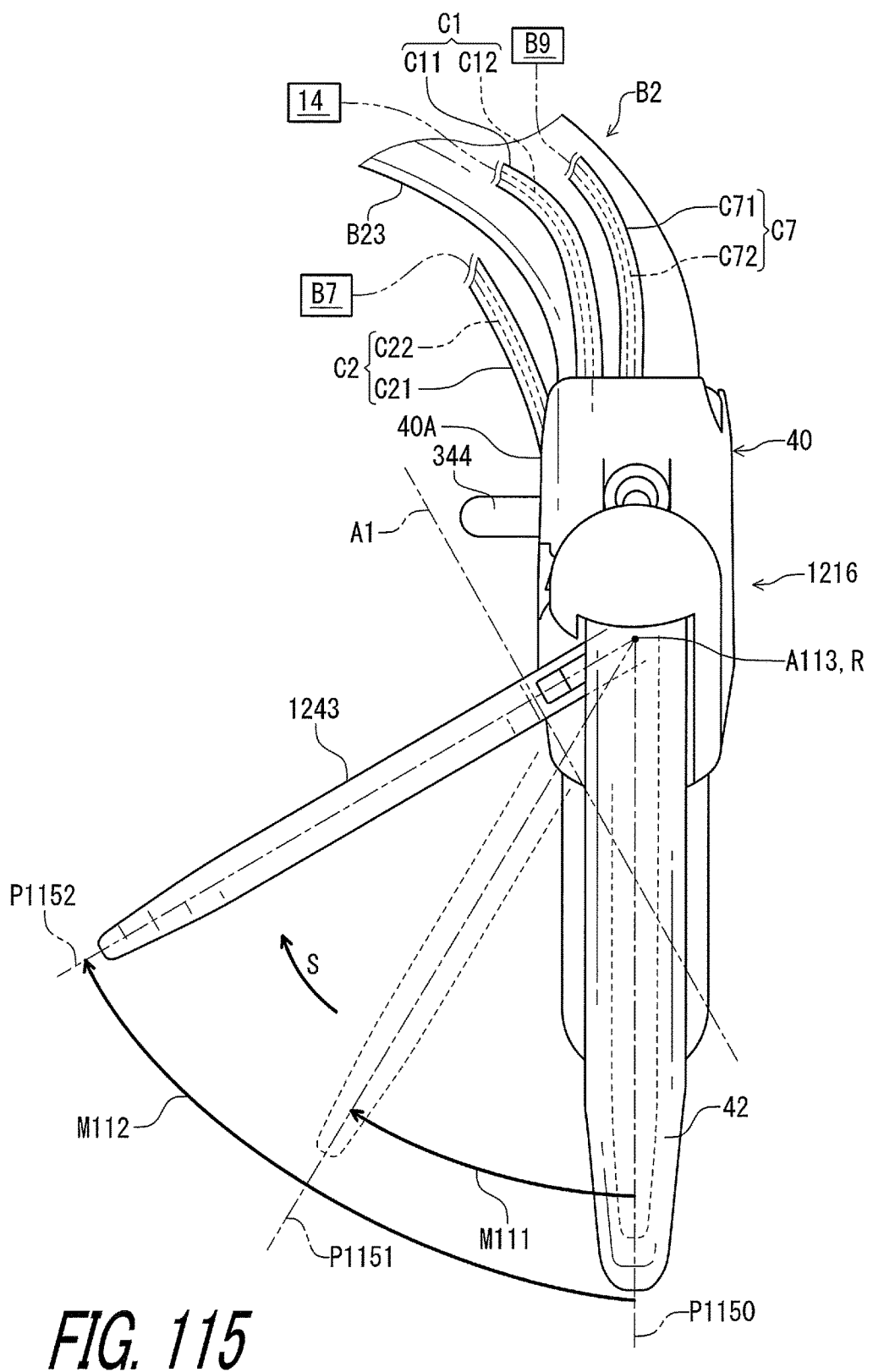

FIG. 115 is a front view of a bicycle operating device of the bicycle seatpost apparatus illustrated in FIG. 114 to show a second operating member actuated along a shifting path.

Figure 116:
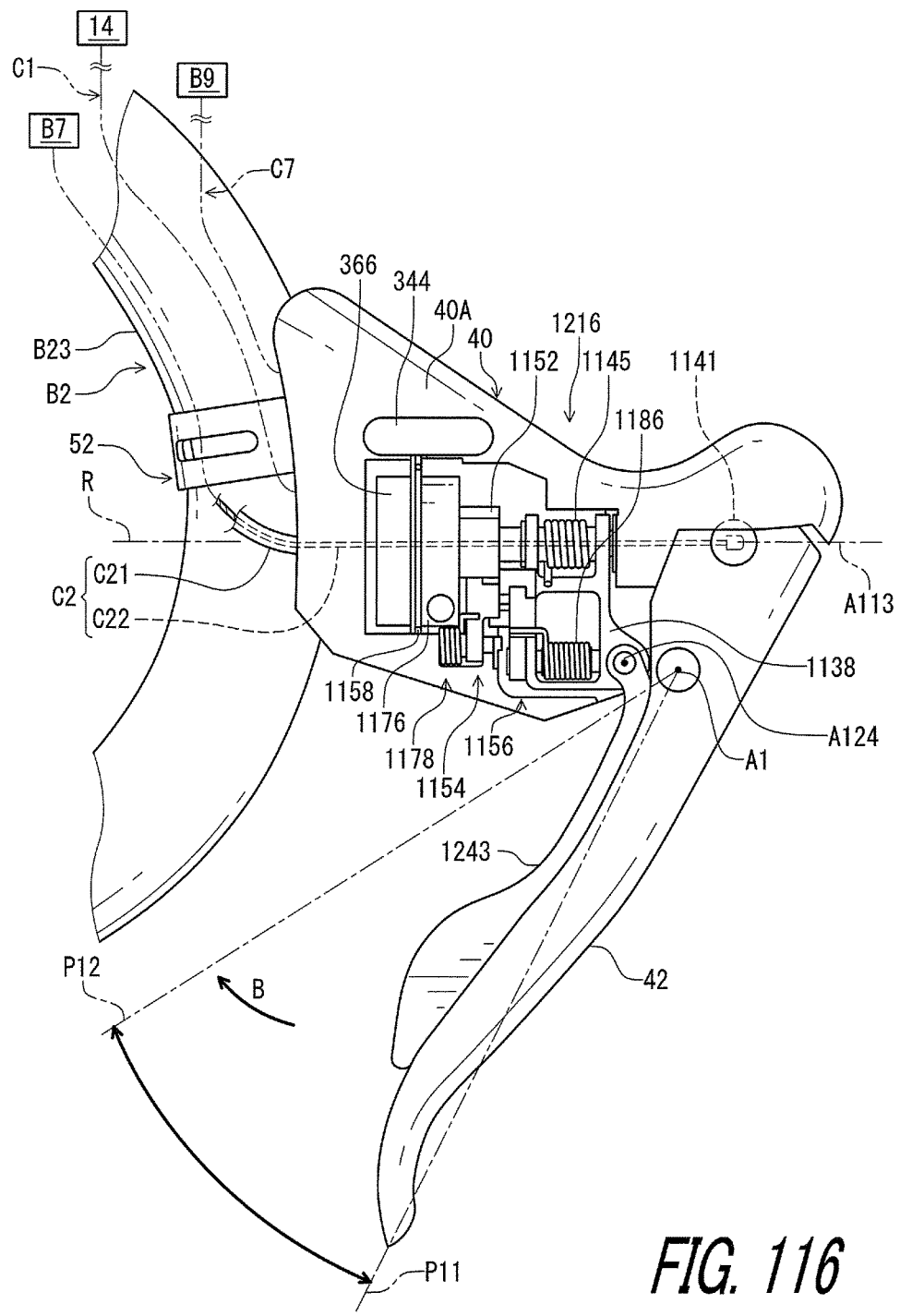

FIG. 116 is a side view of the bicycle operating device of the bicycle seatpost apparatus illustrated in FIG. 114.

Figure 117:
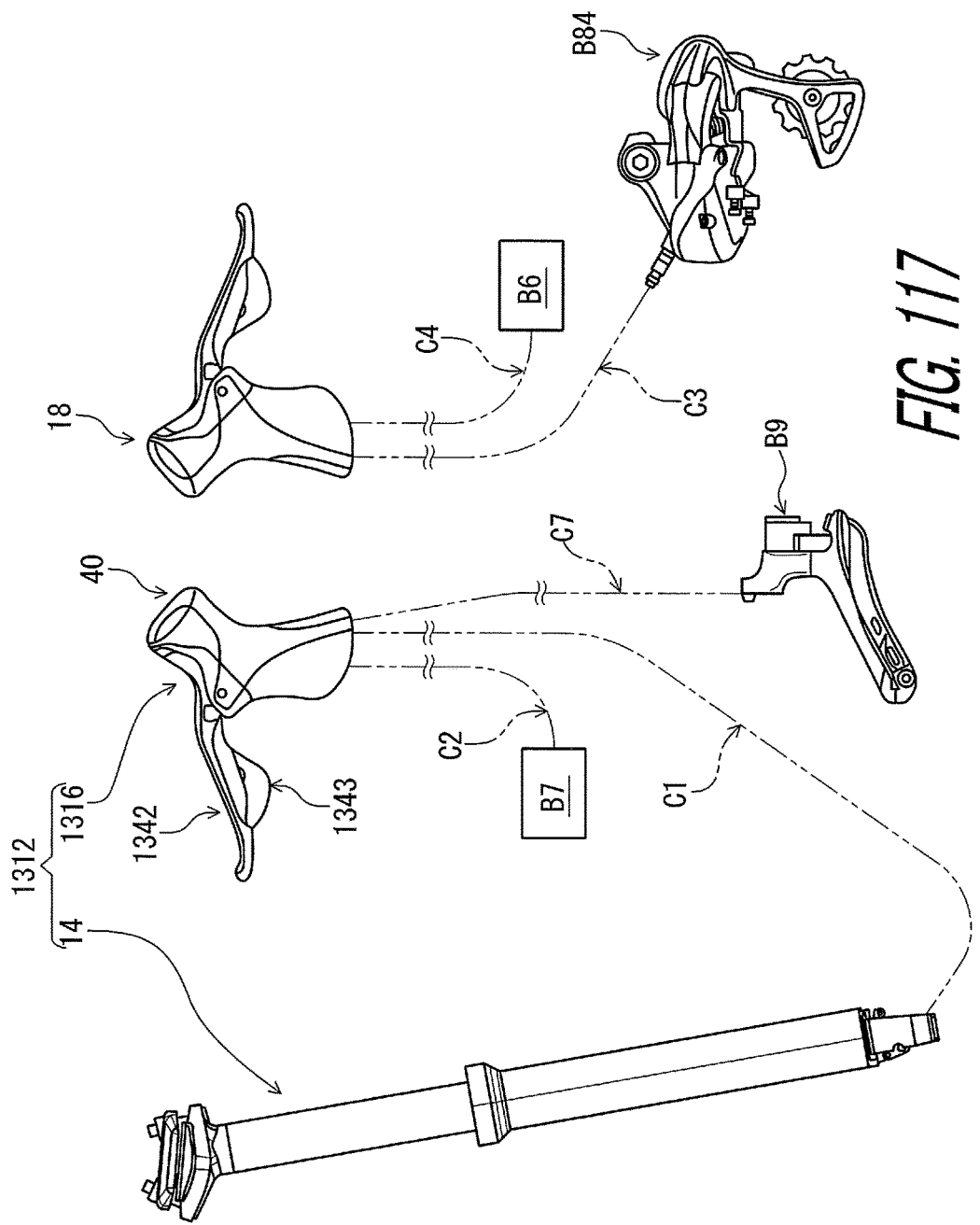

FIG. 117 is a schematic view of a bicycle seatpost apparatus in accordance with a thirteenth embodiment.

Figure 118:
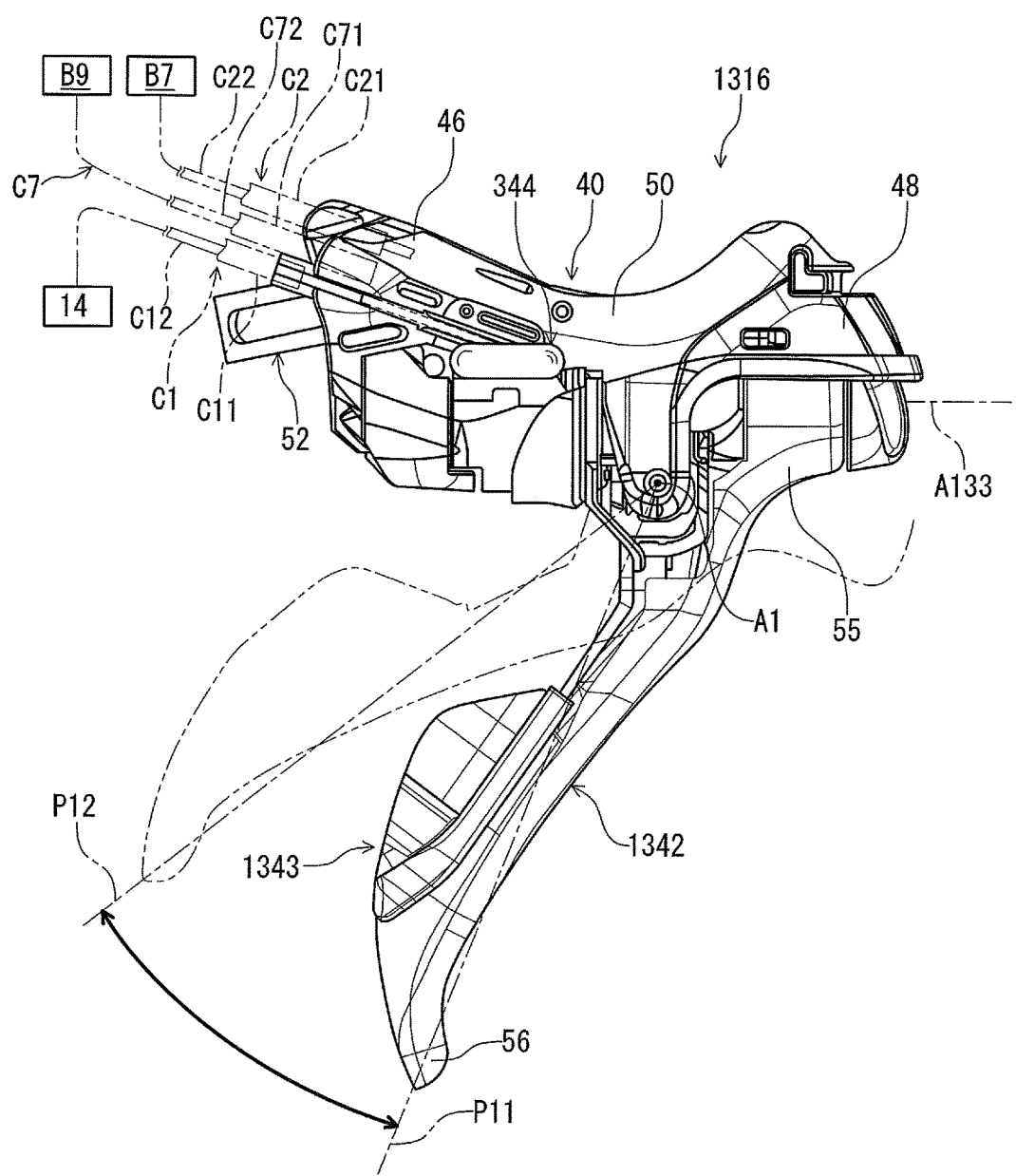

FIG. 118 is a side elevational view of a bicycle operating device of the bicycle seatpost apparatus illustrated in FIG. 117.

Figure 119:
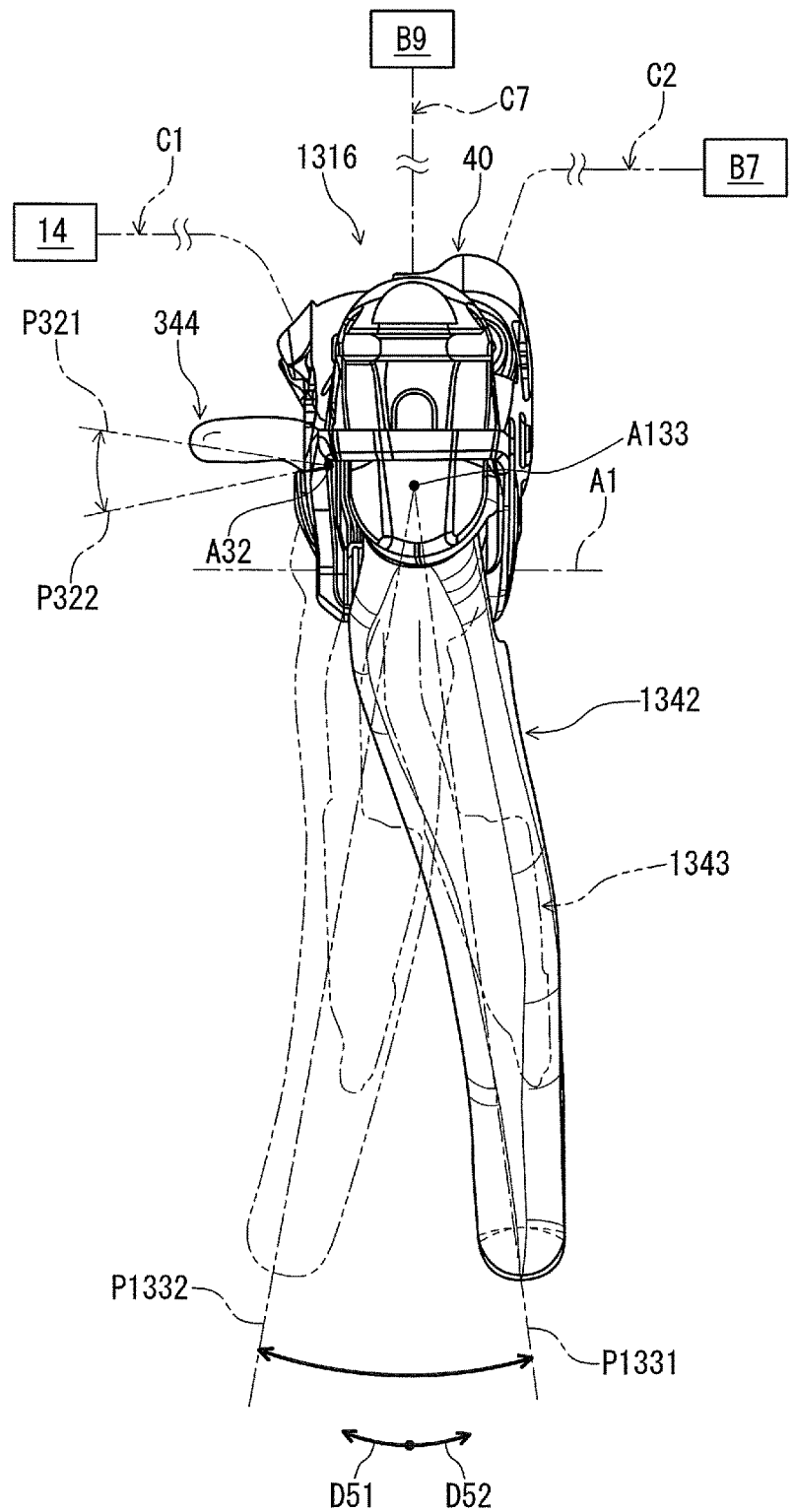

FIG. 119 is a front view of the bicycle operating device of the bicycle seatpost apparatus illustrated in FIG. 117.

Figure 120:
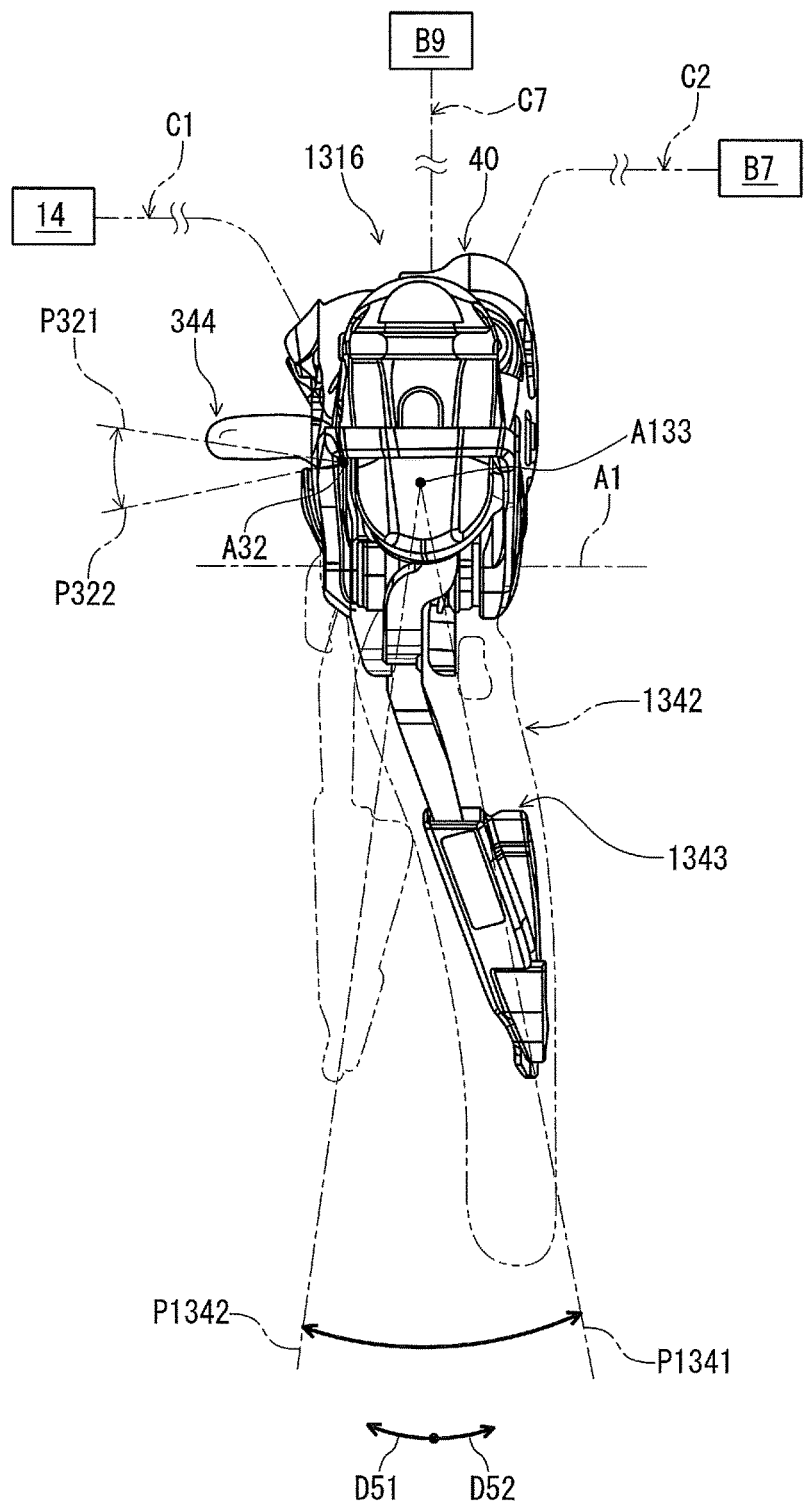

FIG. 120 is a front view of the bicycle operating device of the bicycle seatpost apparatus illustrated in FIG. 117, with a brake operating member omitted.

Figure 121:
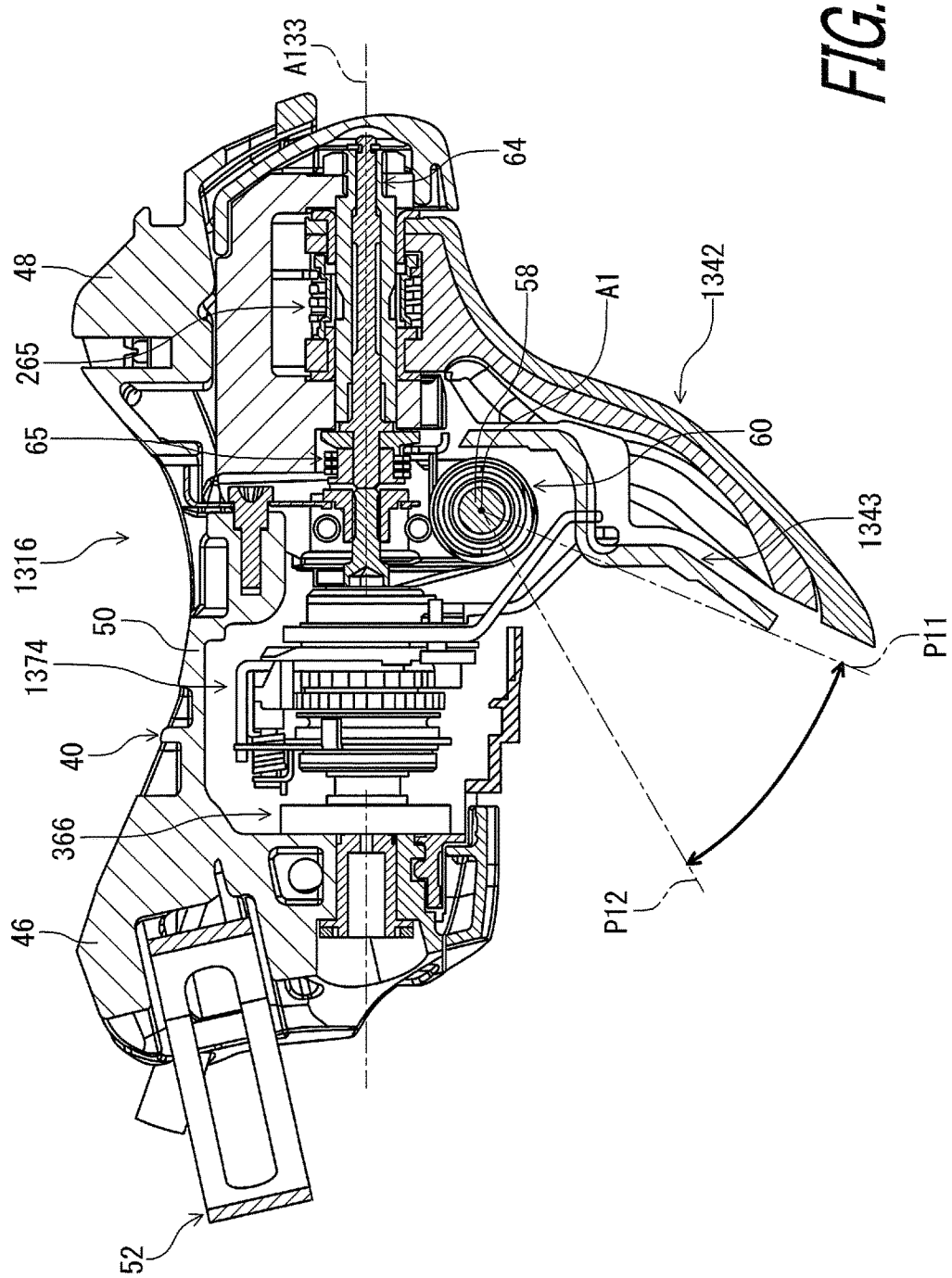

FIG. 121 is a cross-sectional view of the bicycle operating device of the bicycle seatpost apparatus illustrated in FIG. 117.

Figure 122:
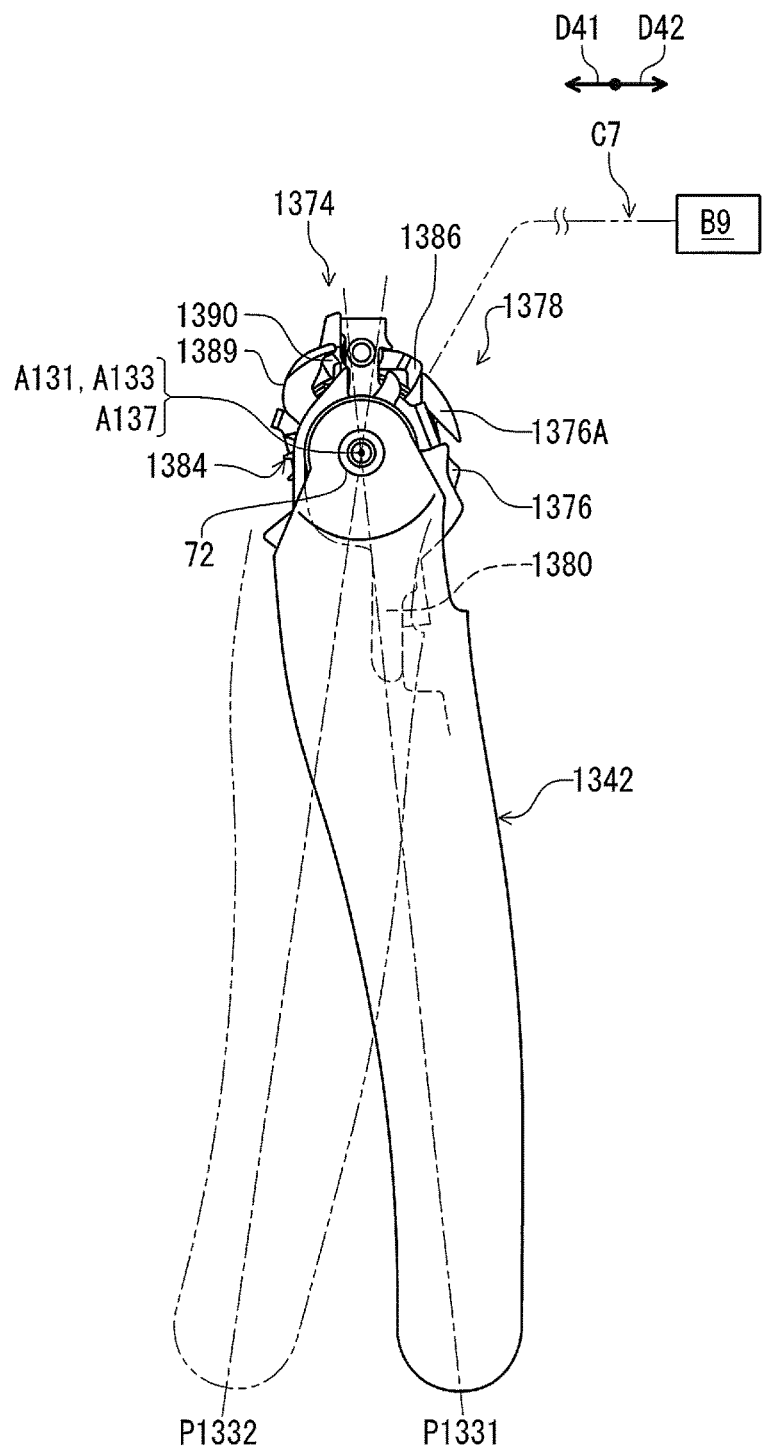

FIG. 122 is a front view of a cable operating structure and the brake operating member of the bicycle operating device illustrated in FIG. 119.

Figure 123:
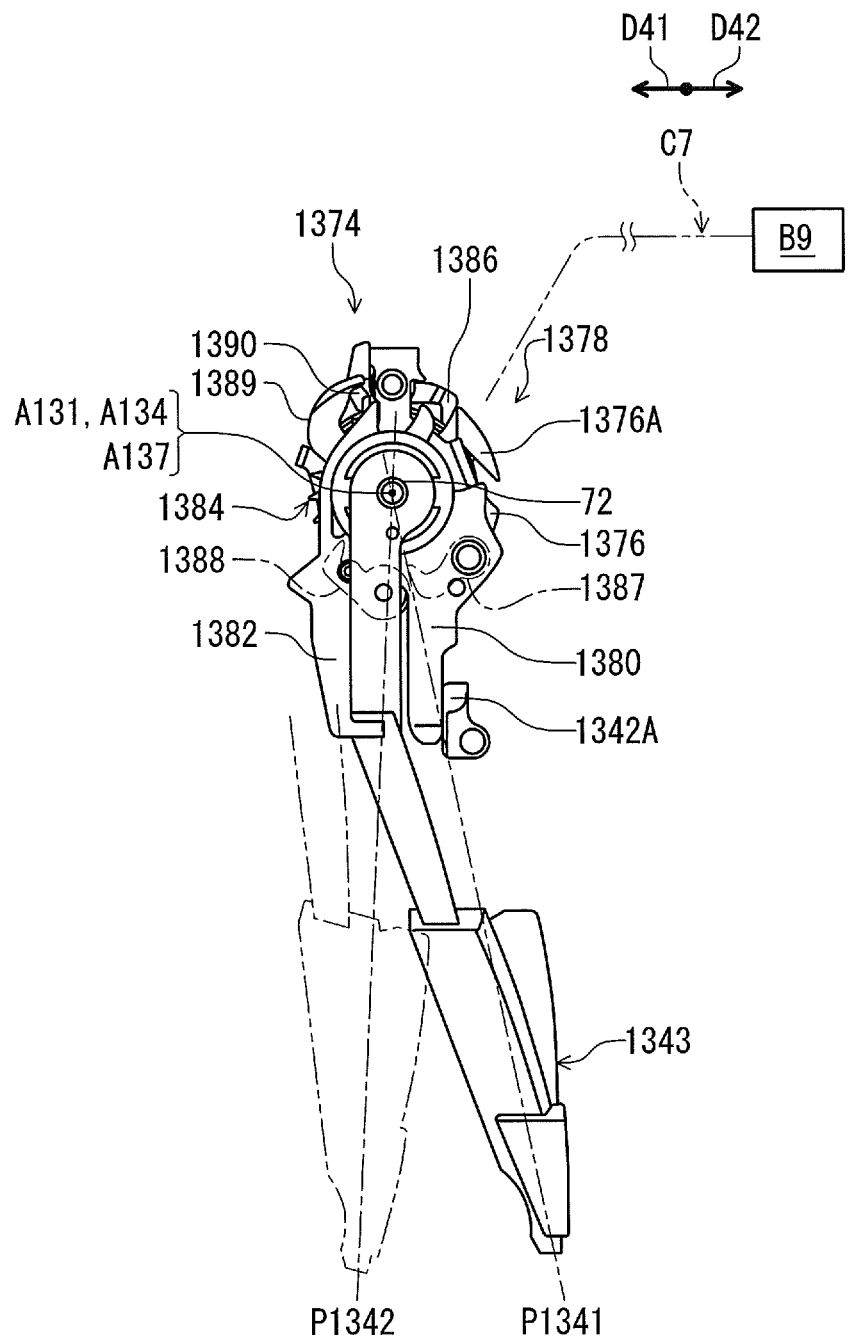

FIG. 123 is a front view of the cable operating structure and a second operating member of the bicycle operating device illustrated in FIG. 119.

Figure 124:
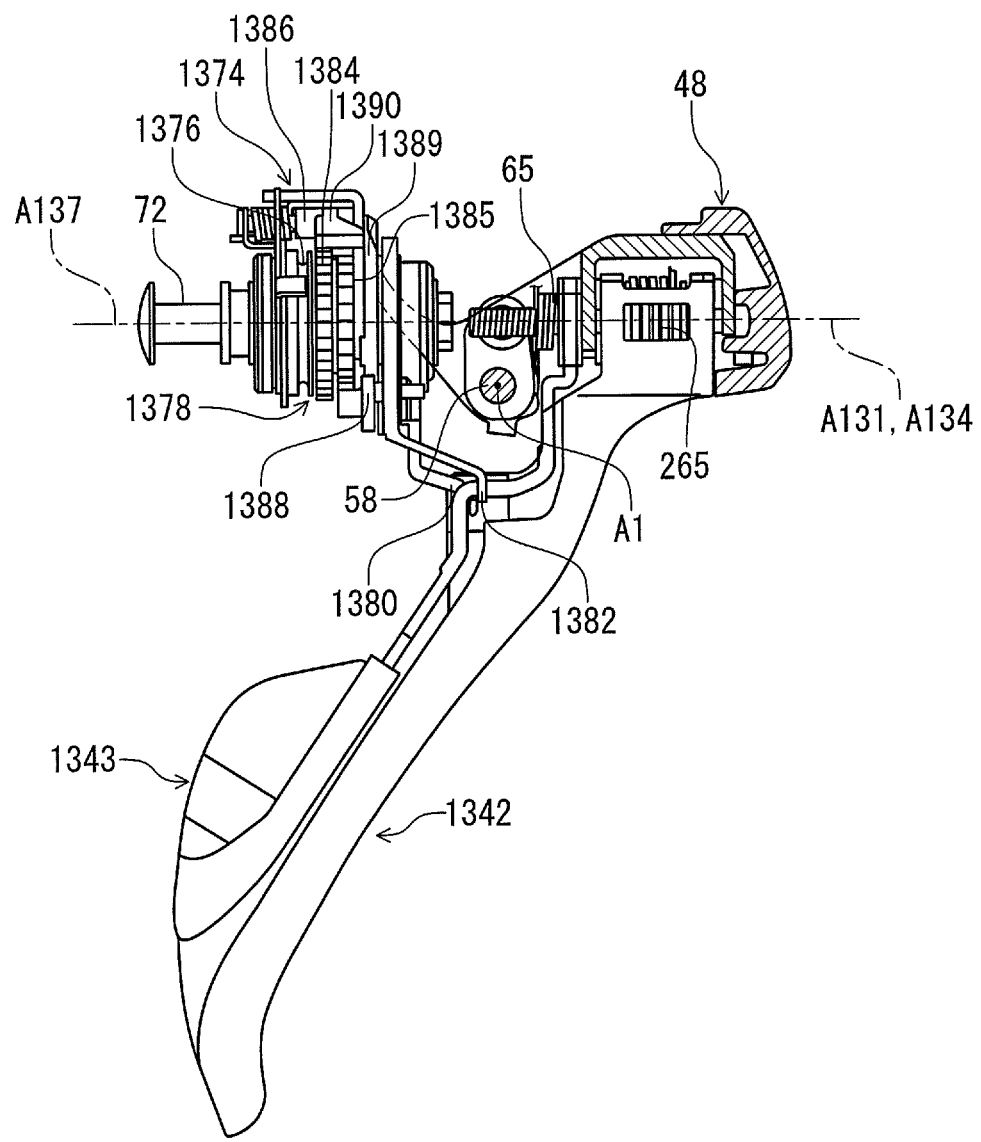

FIG. 124 is a side view of the cable operating structure, the brake operating member, and the second operating member of the bicycle operating device illustrated in FIG. 119.

Figure 125:
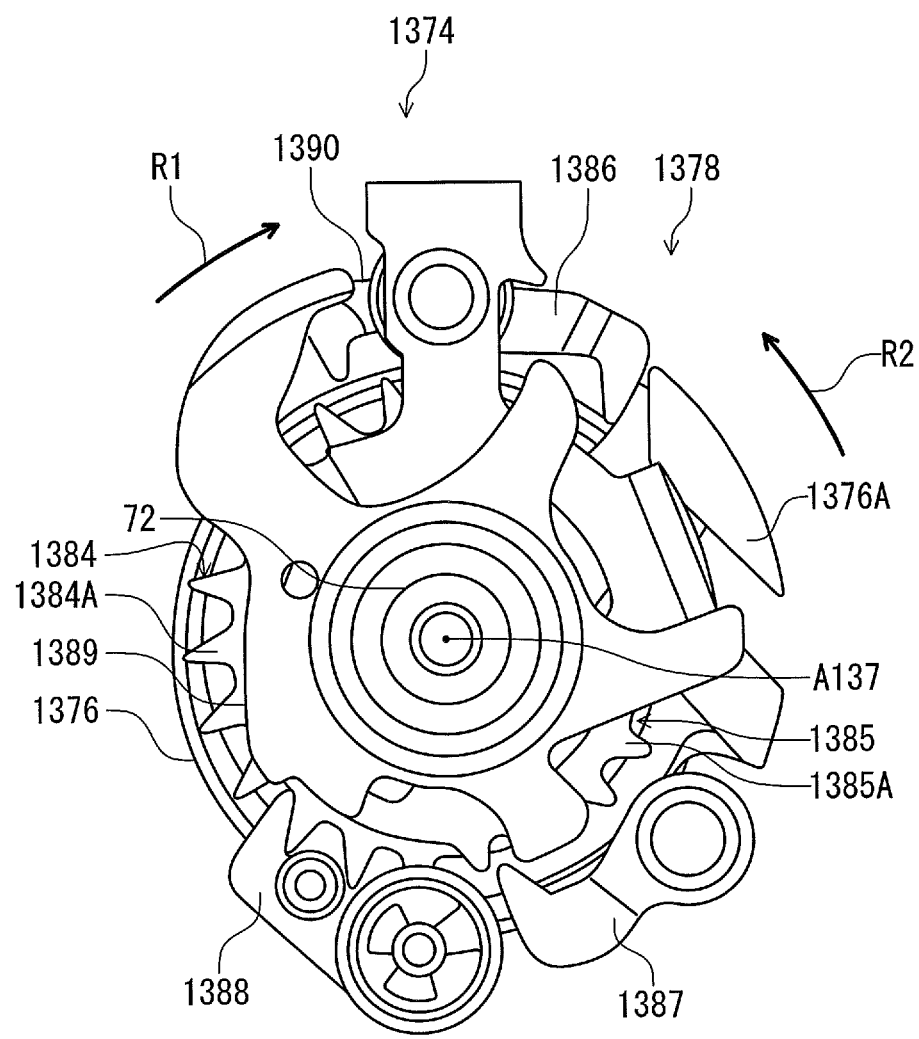

FIG. 125 is a front view of the cable operating structure of the bicycle operating device illustrated in FIG. 119.

Figure 126:
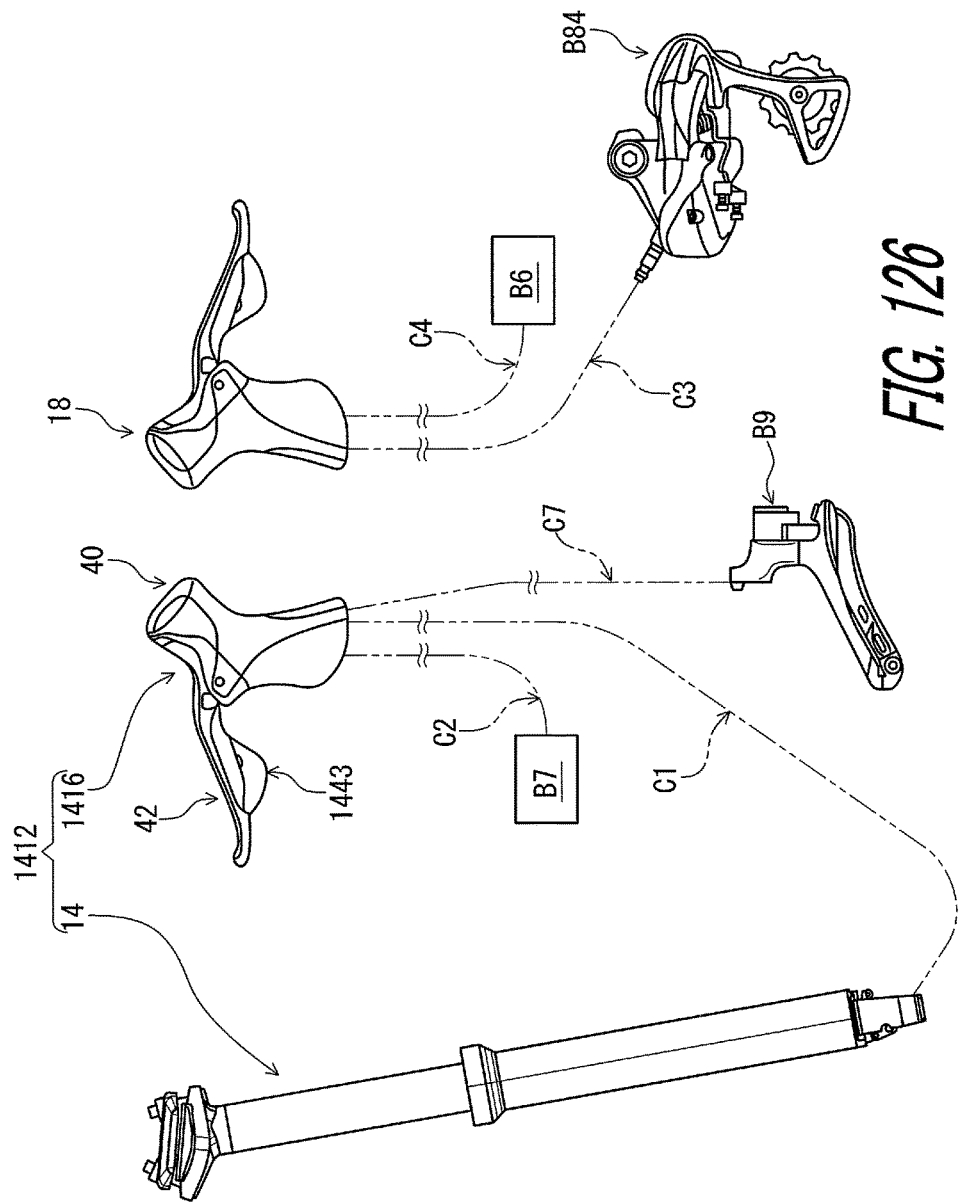

FIG. 126 is a schematic view of a bicycle seatpost apparatus in accordance with a fourteenth embodiment.

Figure 127:
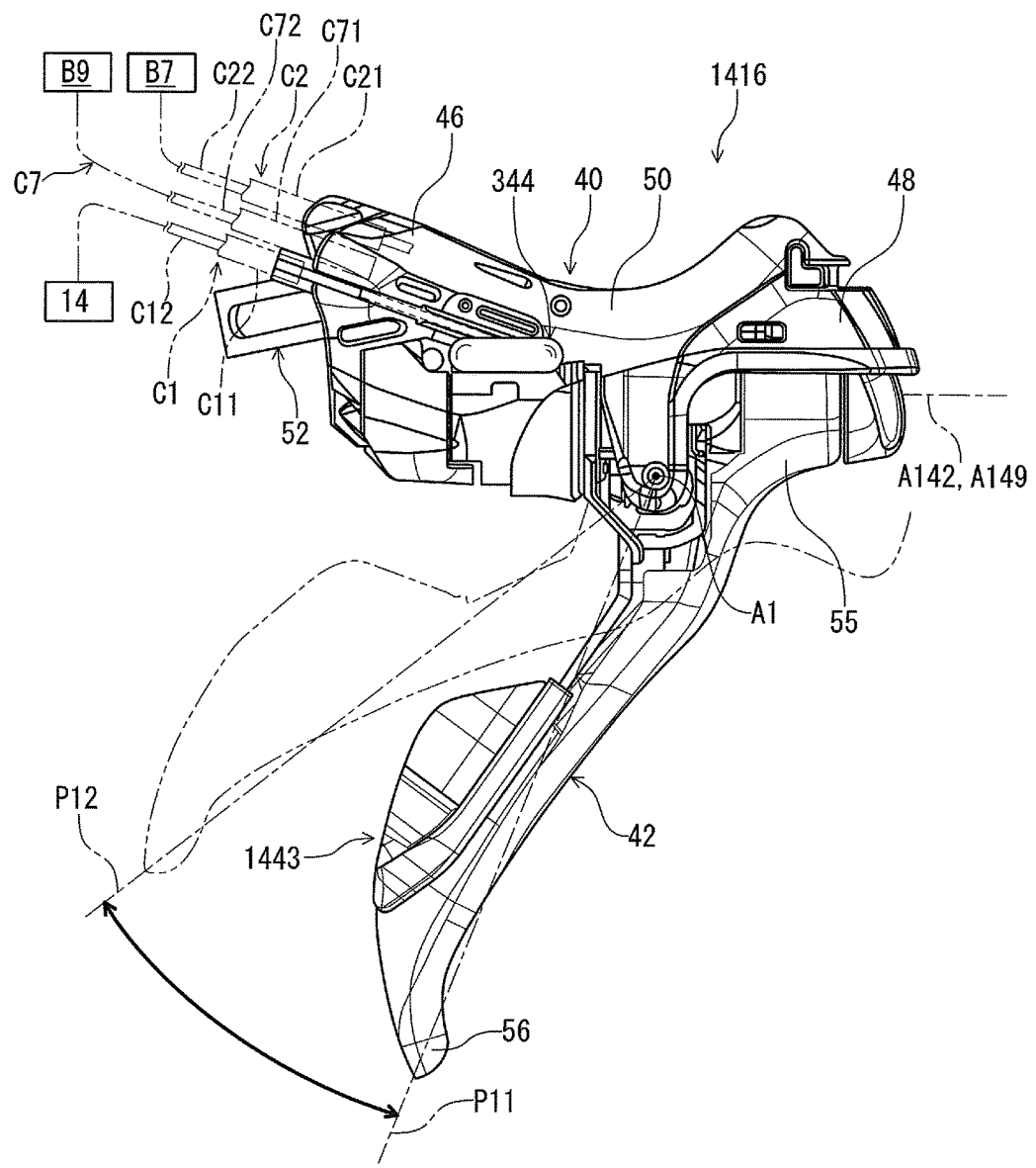

FIG. 127 is a side elevational view of a bicycle operating device of the bicycle seatpost apparatus illustrated in FIG. 126.

Figure 128:
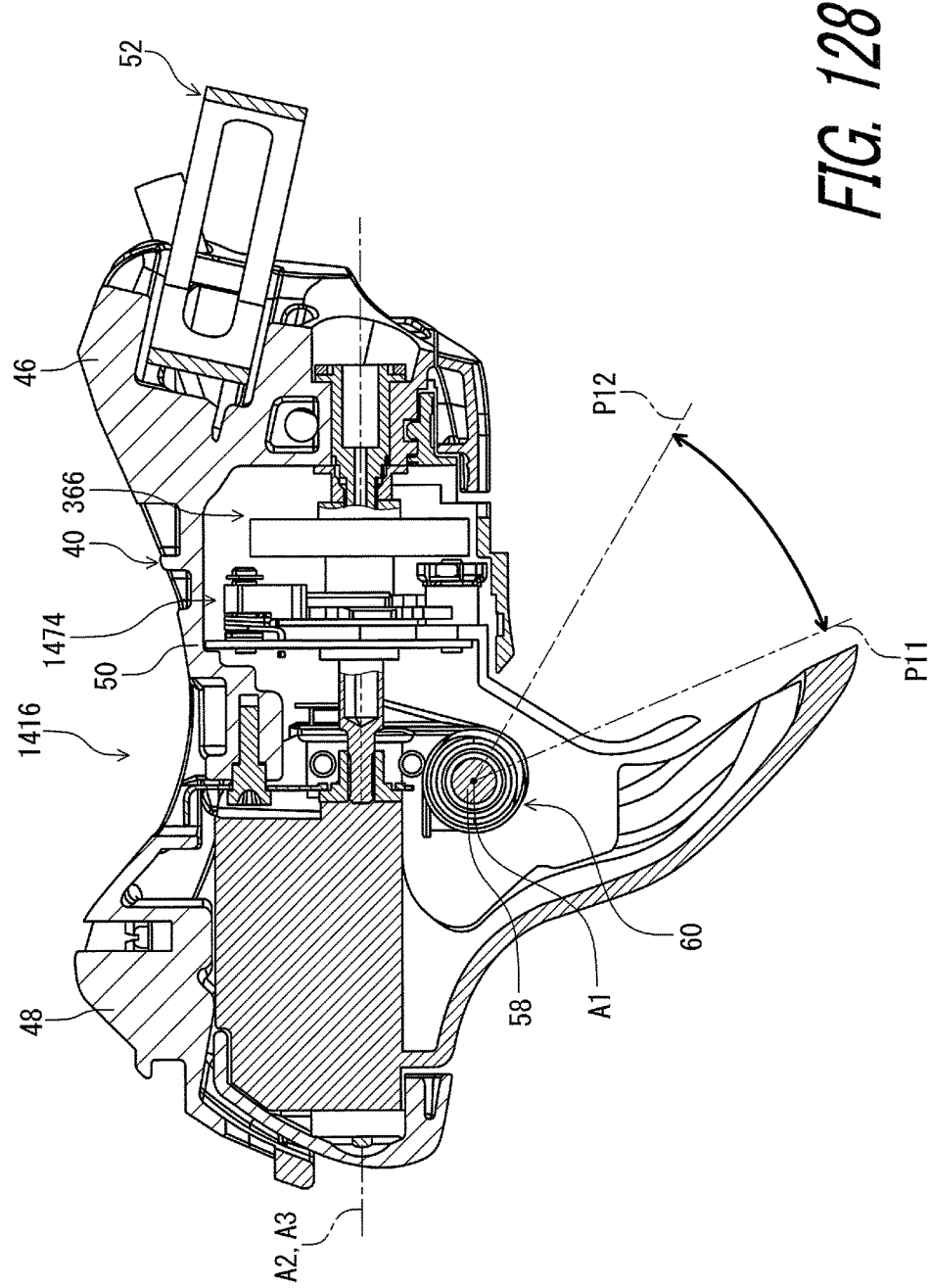

FIG. 128 is a cross-sectional view of the bicycle operating device of the bicycle seatpost apparatus illustrated in FIG. 126.

Figure 129:
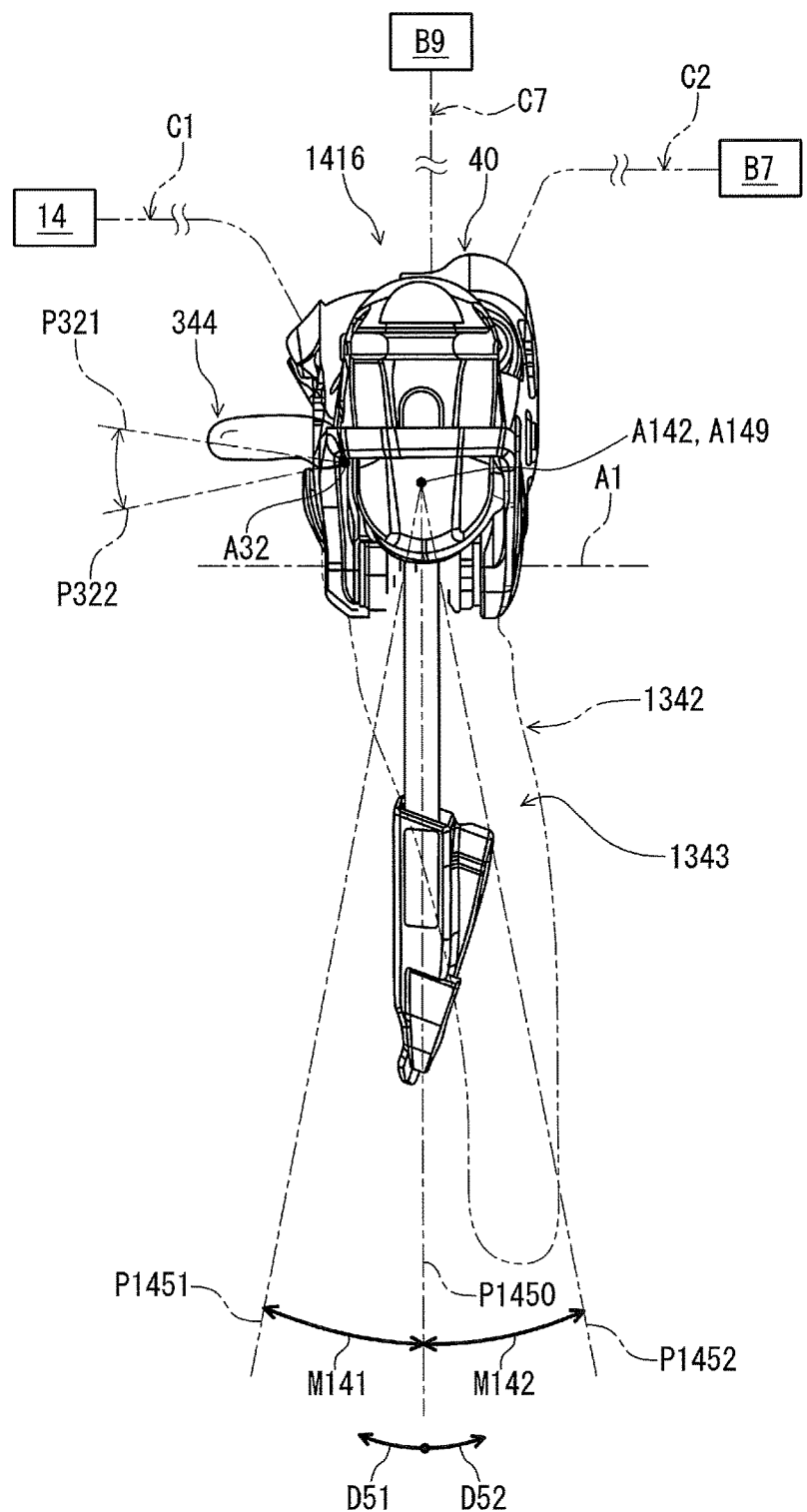

FIG. 129 is a front view of the bicycle operating device of the bicycle seatpost apparatus illustrated in FIG. 126, with a brake operating member omitted.

Figure 130:
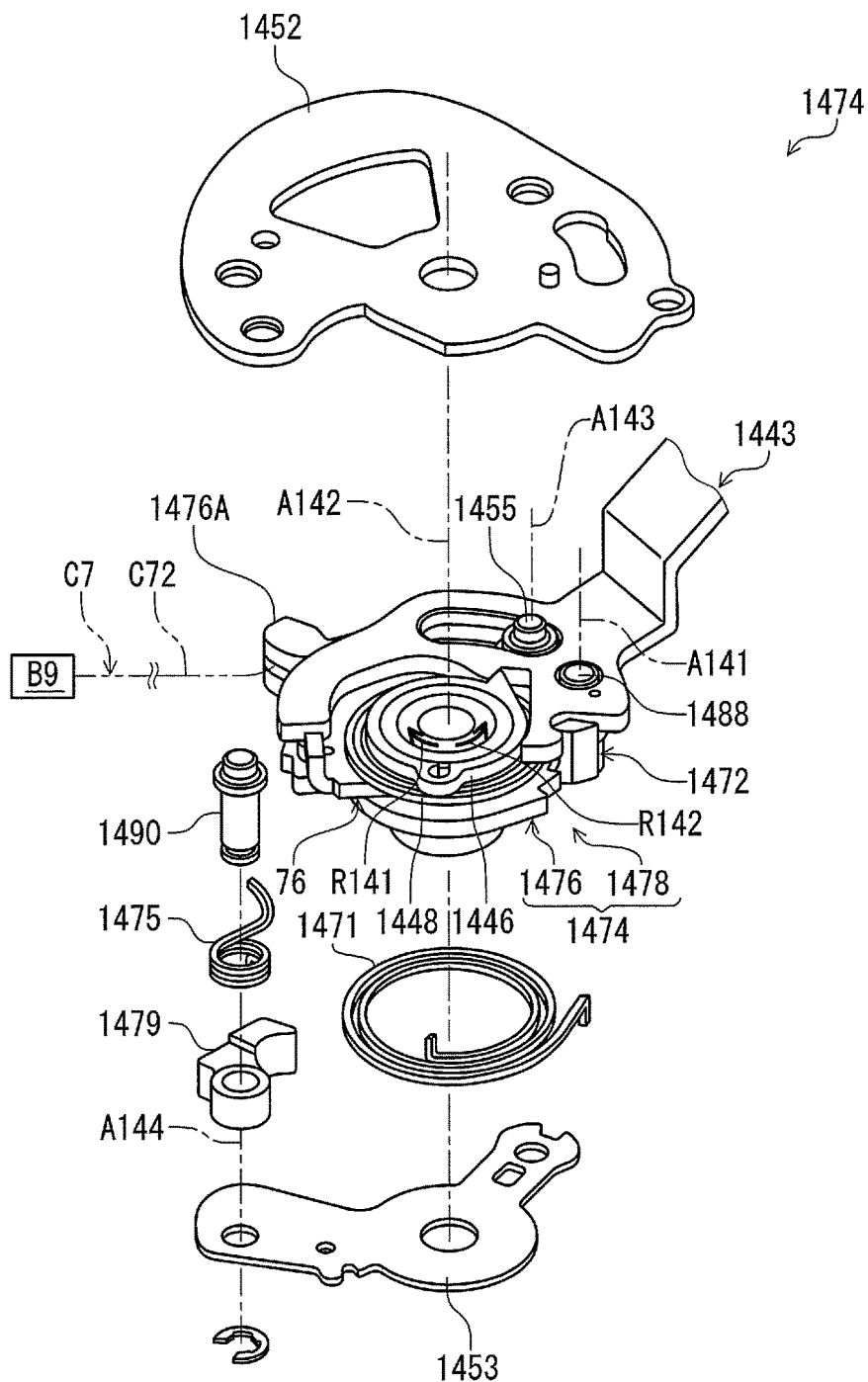

FIG. 130 is an exploded perspective view of a cable operating structure of the bicycle operating device illustrated in FIG. 128.

Figure 131:
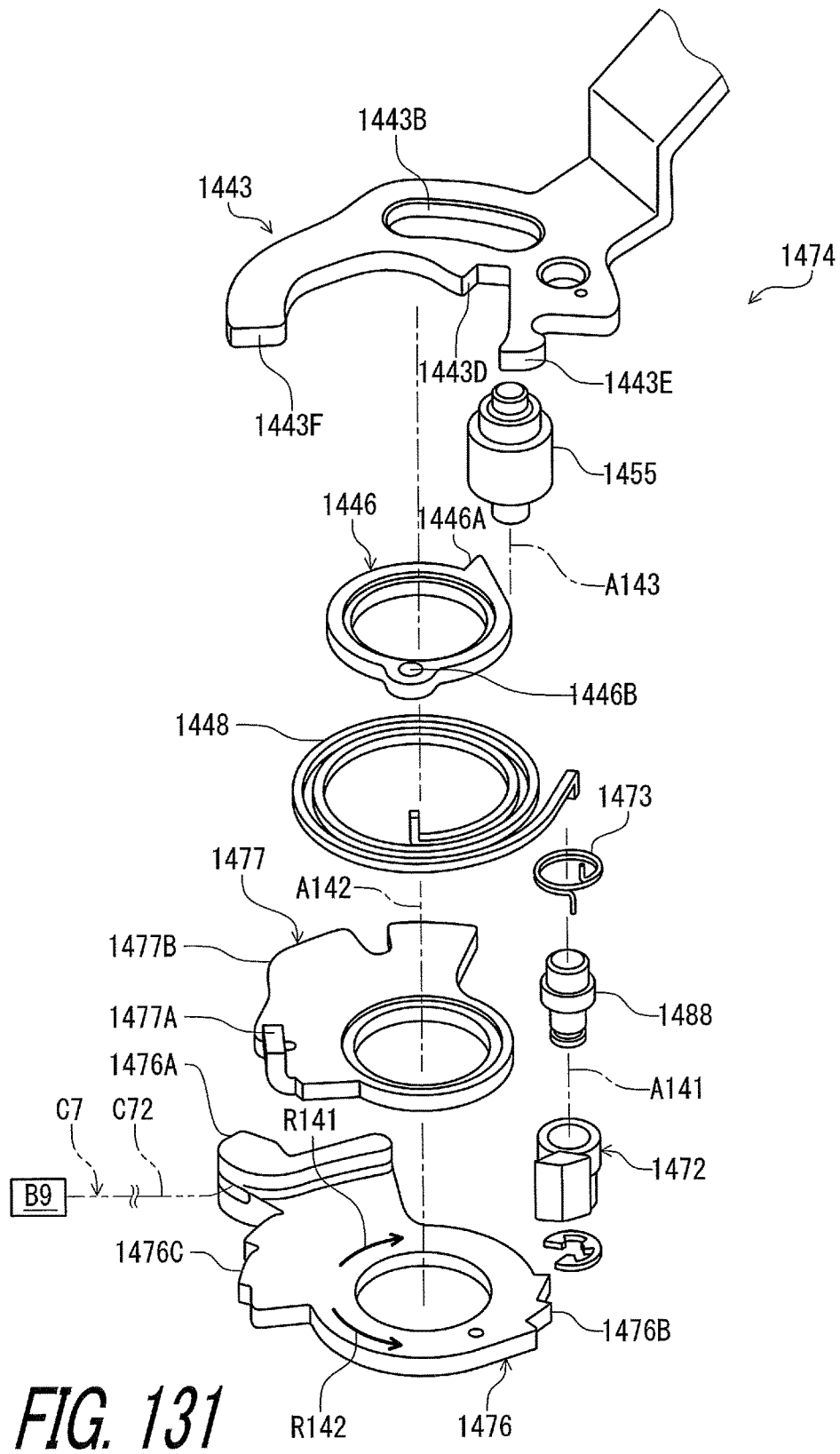

FIG. 131 is an exploded perspective view of a cable operating structure of the bicycle operating device illustrated in FIG. 128.

FIGS. 132 to 135 are front views of the cable operating structure of the bicycle operating device illustrated in FIG. 128 to show pulling operation of the bicycle operating device for the second mechanical control cable.

FIGS. 136 to 143 are front views of the cable operating structure of the bicycle operating device illustrated in FIG. 128 to show releasing operation of the bicycle operating device for the second mechanical control cable.

Figure 144:
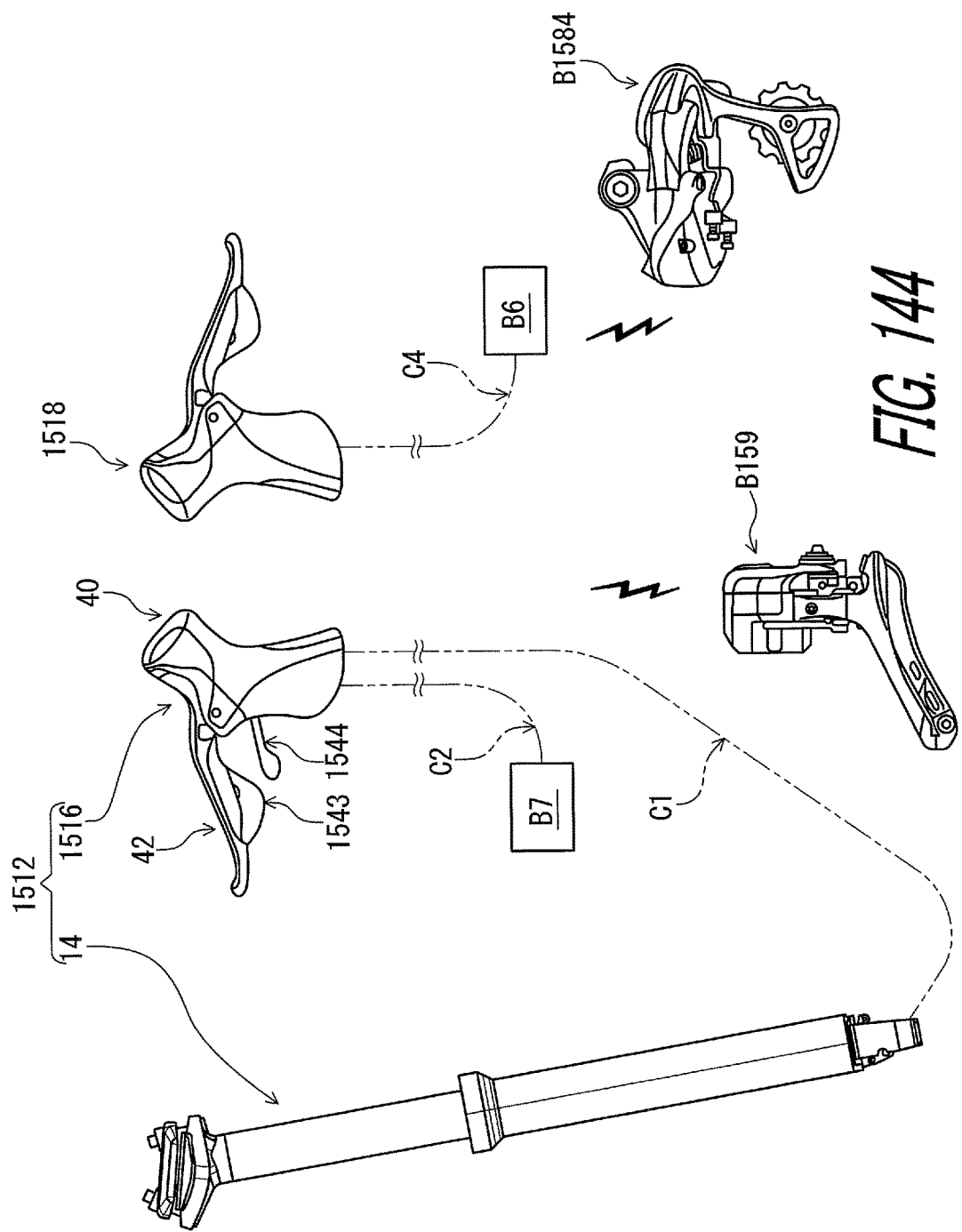

FIG. 144 is a schematic view of a bicycle seatpost apparatus in accordance with a fifteenth embodiment.

Figure 145:
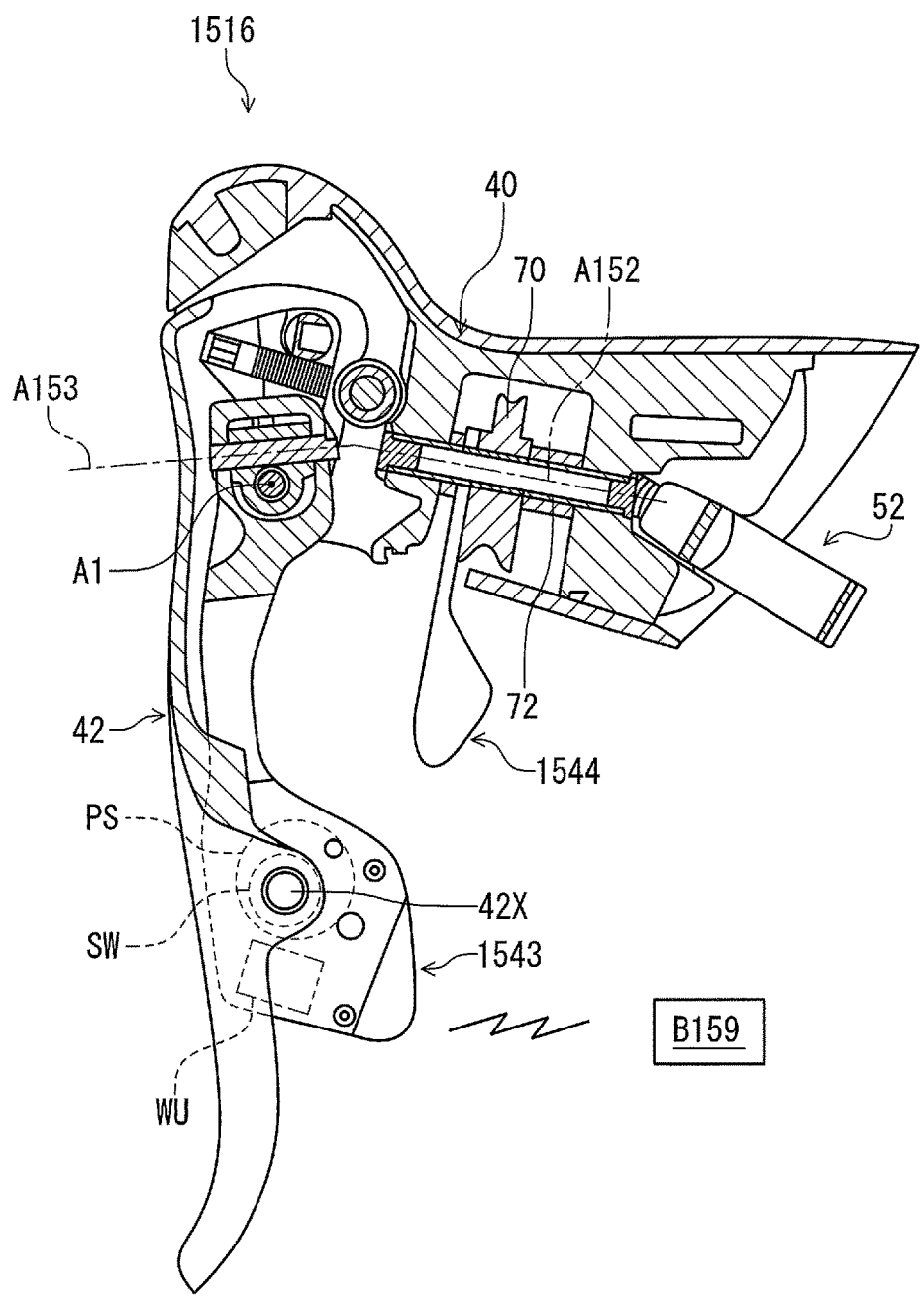

FIG. 145 is a cross-sectional view of a bicycle operating device of the bicycle seatpost apparatus illustrated in FIG. 144.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
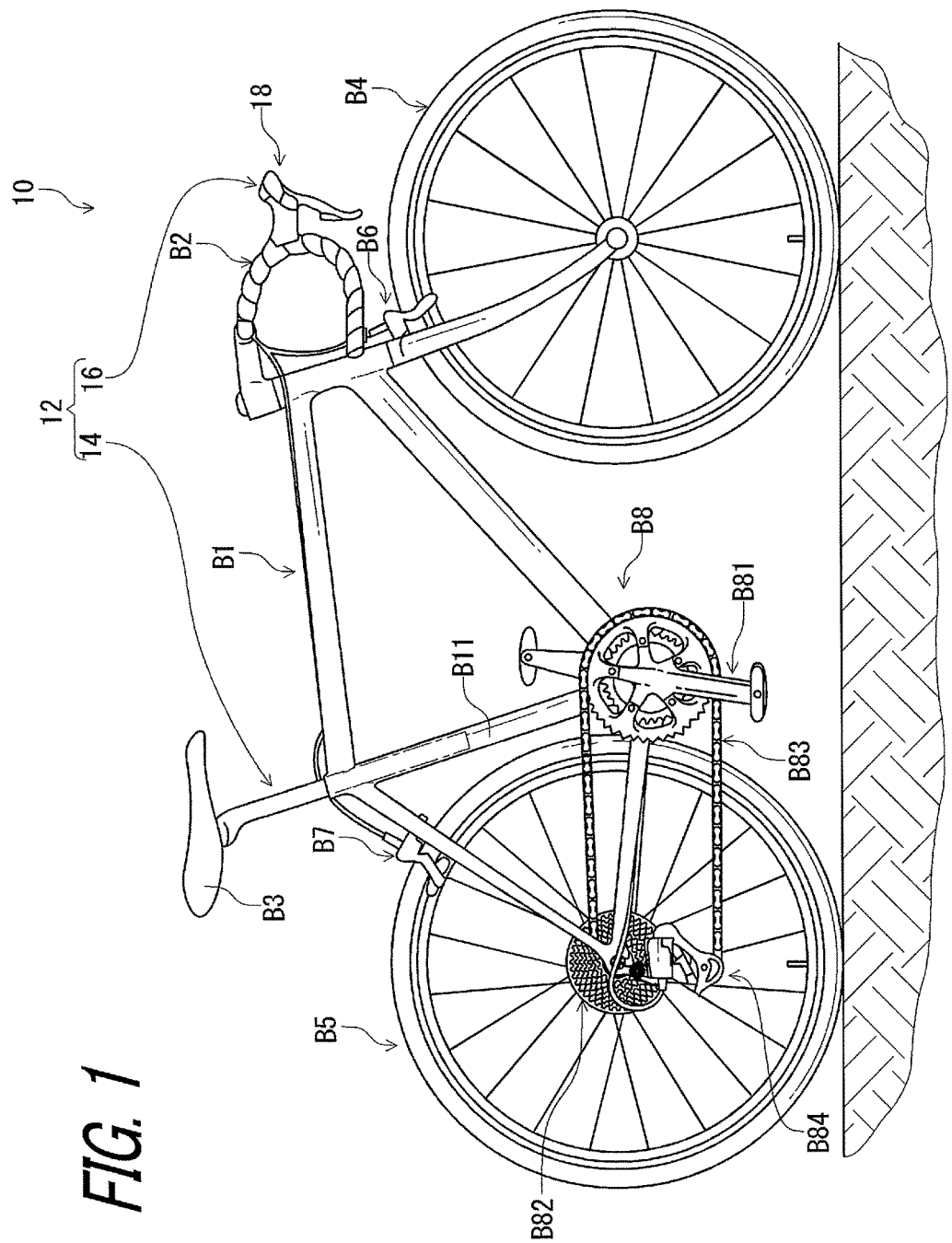
FIG. 1 is a perspective view of a bicycle including a bicycle seatpost apparatus in accordance with a first embodiment.

Referring initially to FIG. 1, a bicycle 10 includes a bicycle seatpost apparatus 12 in accordance with a first embodiment. The bicycle seatpost apparatus 12 comprises an adjustable seatpost assembly 14 and a bicycle operating device 16 to operate the adjustable seatpost assembly 14. The adjustable seatpost assembly 14 has an adjustable total length.

The bicycle 10 further includes a bicycle frame B1, a handlebar B2, a saddle B3, a front wheel B4, a rear wheel B5, a brake device B6, a brake device B7, and a drive train B8. The adjustable seatpost assembly 14 is detachably mounted to a seat tube B11 of the bicycle frame B1. The bicycle operating device 16 is mounted to the handlebar B2. The saddle B3 is attached to the adjustable seatpost assembly 14. In the illustrated embodiment, the brake device B6 includes a front brake, and the brake device B7 includes a rear brake. The adjustable seatpost assembly 14 can also be referred to as an additional bicycle component 14.

The drive train B8 is configured to convert the rider's pedaling force into driving force. The drive train B8 includes a front crankset B81, a bicycle rear sprocket B82, a bicycle chain B83, and a rear derailleur B84. The front crankset B81 is rotatably mounted on a bottom bracket of the bicycle frame B1. While the front crankset B81 includes a single front sprocket in this embodiment, the front crankset B81 can include a plurality of front sprockets. In such an embodiment, the bicycle 10 includes a front derailleur.

The bicycle rear sprocket B82 is mounted to a rear axle of the rear wheel B5 and includes a plurality of sprocket elements defining a plurality of speed stages of the bicycle 10. The bicycle chain B83 couples the front crankset B81 to the bicycle rear sprocket B82 to transmit the pedaling force from the front crankset B81 to the bicycle rear sprocket B82. The rear derailleur B84 shifts the bicycle chain B83 in a transverse direction of the bicycle 10 to change a speed stage among the plurality of speed stages.

In this embodiment, the following directional terms "front", "rear", "forward", "rearward", "left", "right", "transverse", "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle seatpost apparatus 12 should be interpreted relative to the bicycle 10 as used in an upright riding position on a horizontal surface as illustrated in FIG. 1. These terms, as utilized to describe the bicycle seatpost apparatus 12 should be interpreted relative to the bicycle seatpost apparatus 12 as mounted on the bicycle 10 used in an upright riding position on a horizontal surface as illustrated in FIG. 1.

Figure 2:
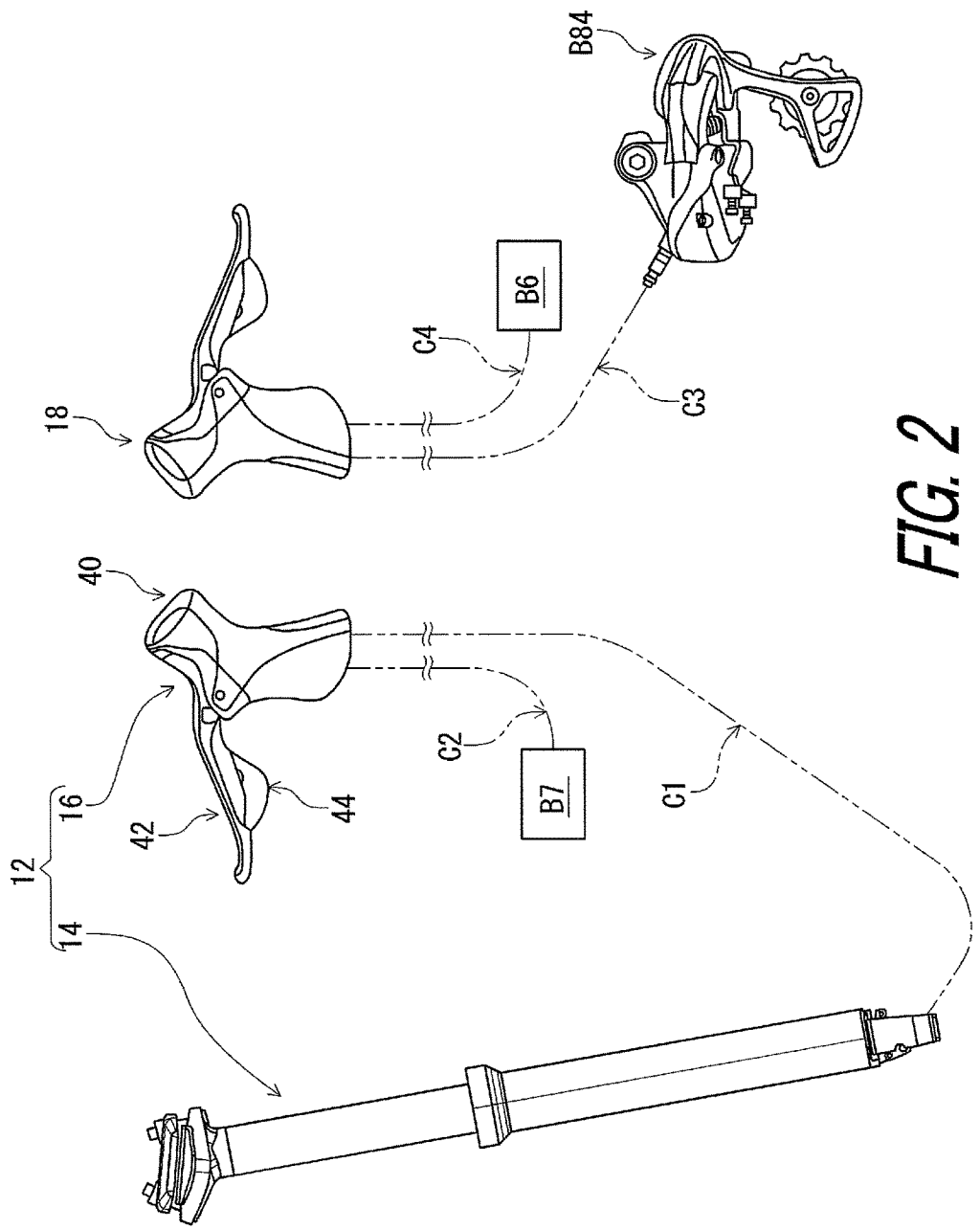
FIG. 2 is a schematic view of the bicycle seatpost apparatus illustrated in FIG. 1.

As seen in FIG. 2, the bicycle operating device 16 is operatively connected to the adjustable seatpost assembly 14 via a first mechanical control cable C1. The bicycle operating device 16 is operatively connected to the brake device B7 via a mechanical control cable C2. The bicycle 10 includes an additional bicycle operating device 18. The additional bicycle operating device 18 is operatively connected to the rear derailleur B84 via a mechanical control cable C3. The additional bicycle operating device 18 is operatively connected to the brake device B6 via a mechanical control cable C4. Examples of the mechanical control cables C1 to C4 can include a Bowden cable.

Figure 3:
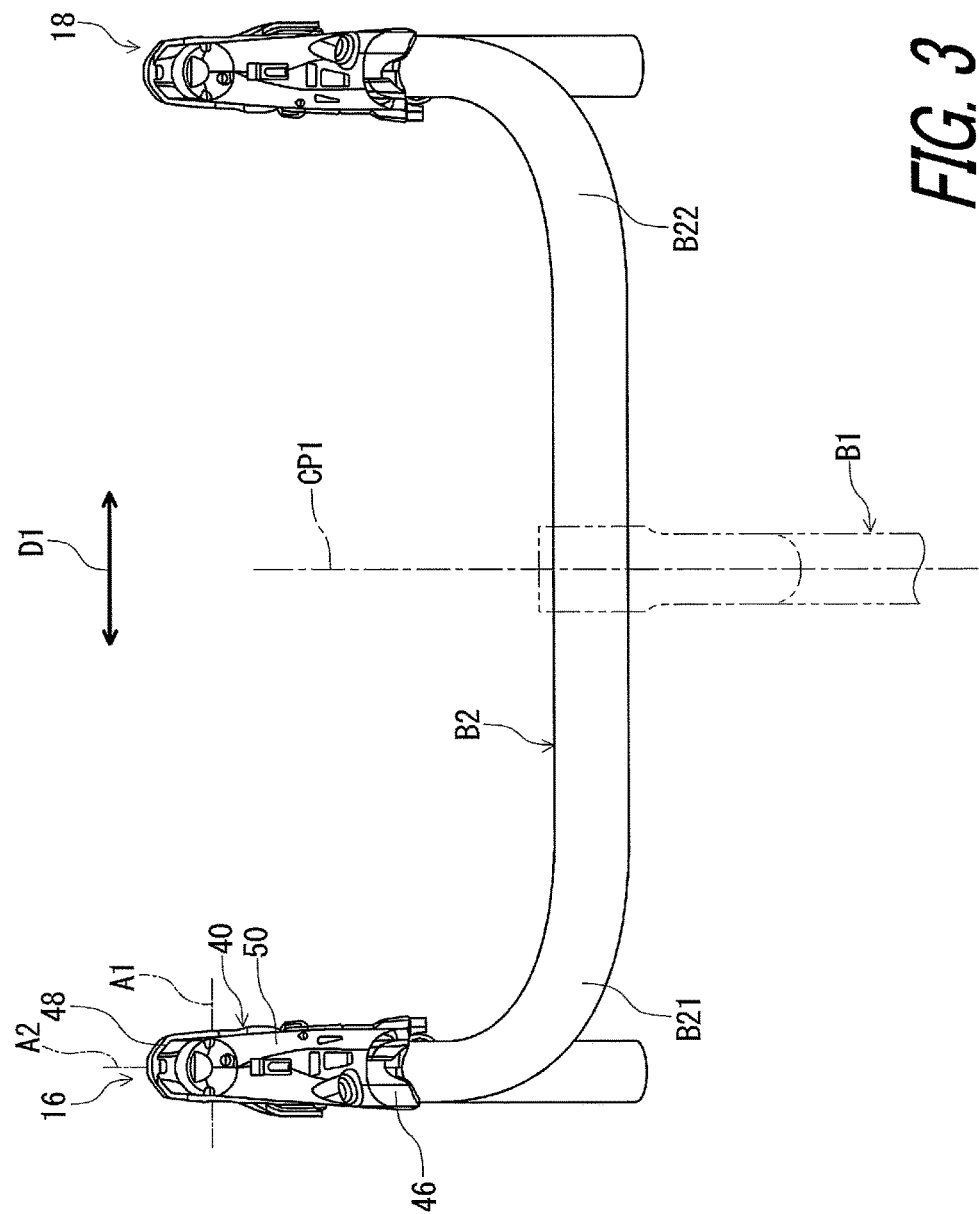
FIG. 3 is a plane view of a bicycle operating device of the bicycle seatpost apparatus illustrated in FIG. 1, with a handlebar.

As seen in FIG. 3, the bicycle operating device 16 is a left-side operating device. The bicycle operating device 16 is mounted to a left part B21 of the handlebar B2 in the mounting state where the bicycle operating device 16 is mounted to the handlebar B2. The additional bicycle operating device 18 is a right-side operating device. The additional bicycle operating device 18 is mounted to a right part B22 of the handlebar B2 in the mounting state where the bicycle operating device 16 is mounted to the handlebar B2. The bicycle operating device 16 is provided on a left side of a transverse center plane CP1 of the bicycle in the mounting state when a transverse center of the handlebar B2 is provided on the transverse center plane CP1. The additional bicycle operating device 18 is provided on a right side of the transverse center plane CP1 of the bicycle 10 in the mounting state when the transverse center of the handlebar B2 is provided on the transverse center plane CP1. The transverse center plane CP1 is defined at a center of the bicycle frame B1 in a transverse direction D1 of the bicycle 10.

Figure 4:
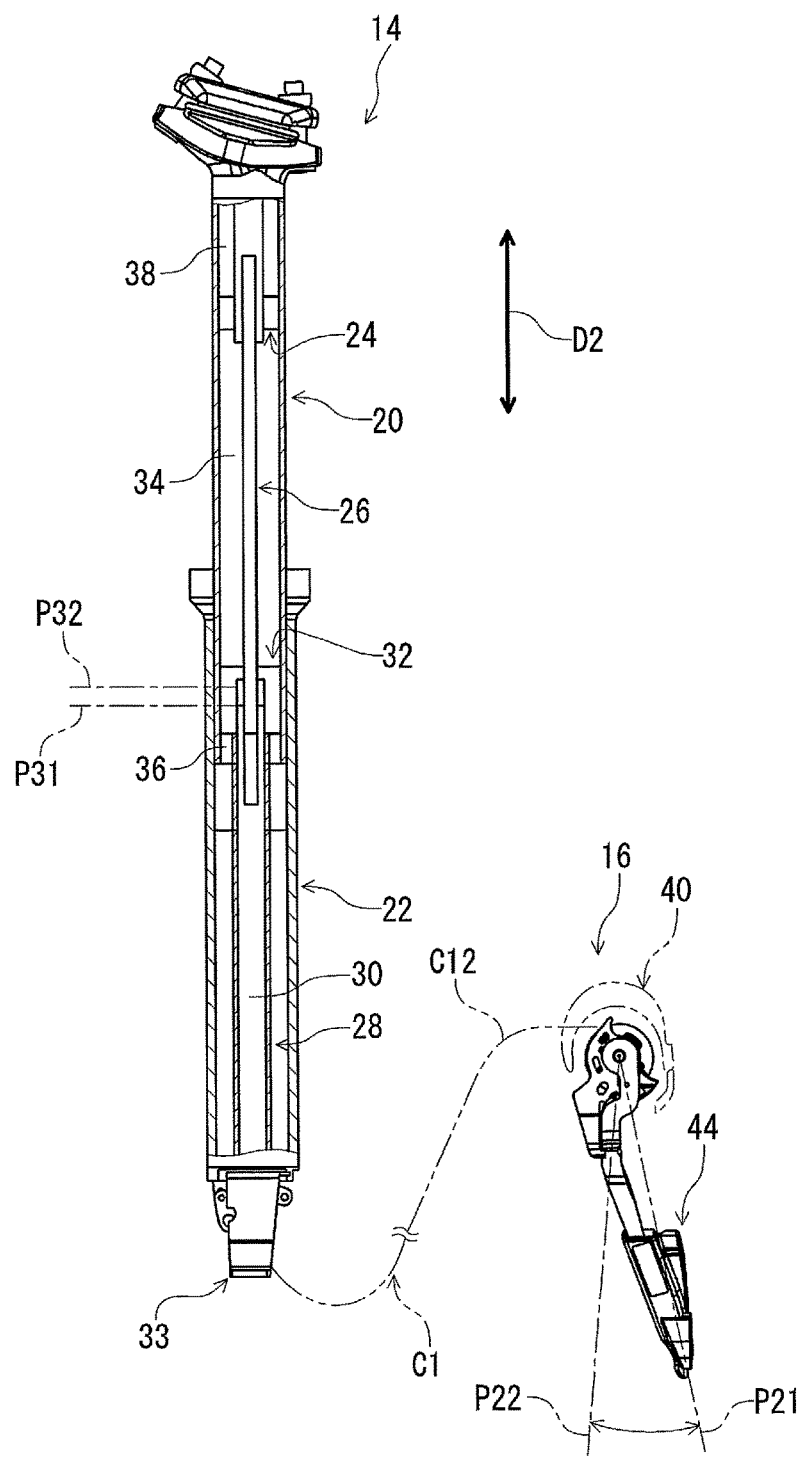
FIG. 4 is a schematic cross-sectional view of an adjustable seatpost assembly of the bicycle seatpost apparatus illustrated in FIG. 1, with the bicycle operating device.

As seen in FIG. 4, the adjustable seatpost assembly 14 includes a first tube 20, a second tube 22, a floating piston 24, a rod 26, a guide member 28, a flow control part 30, and a valve unit 32, and an actuating structure 33. The flow control part 30 is operatively coupled to the first mechanical control cable C1 via the actuating structure 33. The valve unit 32 divides an interior bore of the first tube 20 into a first fluid chamber 34 and a second fluid chamber 36. The flow control part 30 is provided in the guide member 28 to move relative to the valve unit 32 between a closed position P31 and an open position P32. The flow control part 30 is biased by a biasing element (not shown) toward the closed position P31. The valve unit 32 is closed when the flow control part 30 is positioned at the closed position P31. The valve unit 32 is open when the flow control part 30 is positioned at the open position P32. The actuating structure 33 converts a pulling movement of the first mechanical control cable C1 into an upward movement of the flow control part 30 from the closed position P31 to the open position P32. The first tube 20 and the second tube 22 are telescopically arranged, with the amount of insertion of the first tube 20 into the second tube 22 being adjustable. The second tube 22 is secured to the seat tube B11 (FIG. 1) by a conventional clamping arrangement (not shown) provided on an upper end of the seat tube B11.

The valve unit 32 is coupled to the second tube 22 via the guide member 28 to move together relative to the first tube 20. The first fluid chamber 34 is disposed between the valve unit 32 and the floating piston 24. The second fluid chamber 36 is disposed between the valve unit 32 and a lower end of the first tube 20. The flow control part 30 cooperates with the guide member 28 and the valve unit 32 to control flow of fluid between the first fluid chamber 34 and the second fluid chamber 36 to change a position of the first tube 20 relative to the second tube 22. When the valve unit 32 is closed, the first tube 20 is positioned relative to the second tube 22 in a telescopic direction D2. When the valve unit 32 is open, the first tube 20 is movable relative to the second tube 22 in the telescopic direction D2. The floating piston 24 is disposed in the interior bore of the first tube 20 and forms a gas chamber 38 disposed between the floating piston 24 and an upper end of the first tube 20. The shorter total length of the adjustable seatpost assembly 14 increases an inner pressure of the gas chamber 38. Since structures of the adjustable seatpost assembly 14 have been known in the bicycle field, they will not be described and/or illustrated in detail here for the sake of brevity.

Figure 5:
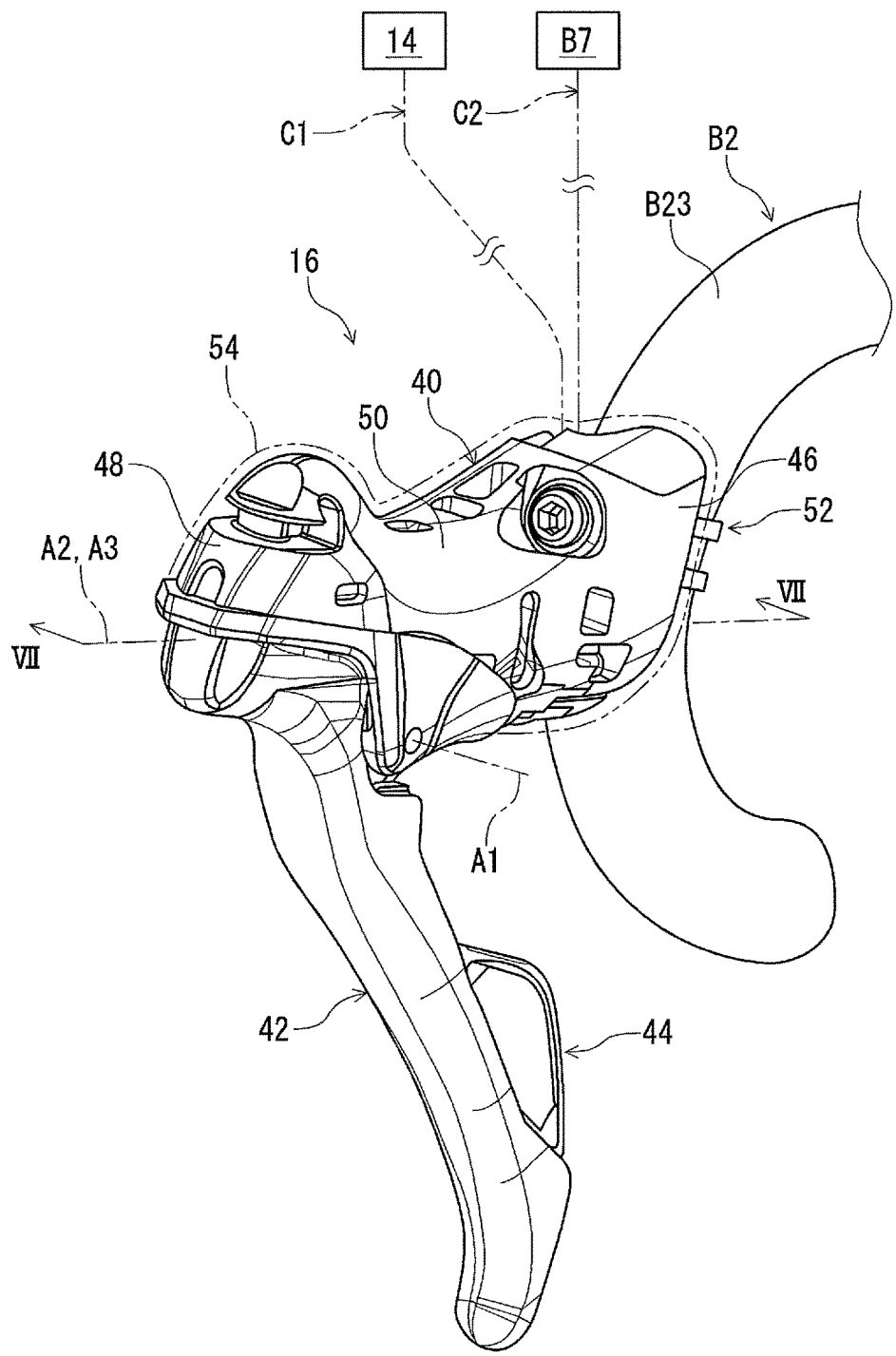
FIG. 5 is a perspective view of the bicycle operating device of the bicycle seatpost apparatus illustrated in FIG. 1.

As seen in FIG. 5, the bicycle operating device 16 comprises a base member 40, a brake operating member 42, and a first operating member 44. The first operating member 44 can also be referred to as a seatpost operating member 44. The base member 40 comprises a first end portion 46, a second end portion 48, and a grip portion 50. The first end portion 46 is configured to be coupled to the handlebar B2 in the mounting state where the bicycle operating device 16 is mounted to the handlebar B2. The second end portion 48 is opposite to the first end portion 46. The grip portion 50 is provided between the first end portion 46 and the second end portion 48.

In this embodiment, the first end portion 46 is configured to be coupled to a bending portion B23 of the handlebar B2 in the mounting state where the bicycle operating device 16 is mounted to the handlebar B2. However, the first end portion 46 can be coupled to other types of handlebar. As seen in FIG. 3, the first end portion 46 of the base member 40 is configured to be coupled to the left part B21 of the handlebar B2 in the mounting state.

As seen in FIG. 5, the bicycle operating device 16 includes a mounting structure 52. The base member 40 is mounted to the handlebar B2 via the mounting structure 52.

The base member 40 is a stationary member when mounted to the handlebar B2. The mounting structure 52 preferably includes a band clamp or similar structure that is used in a road shifter for mounting to the drop-down handlebar B2. The base member 40 is covered by a grip cover 54 made of a non-metallic material such as rubber. Riders sometimes grip the base member 40 via the grip cover 54 and lean on the base member 40 via the grip cover 54 during riding. The grip cover 54 can be omitted from the bicycle operating device 16.

Figure 6:
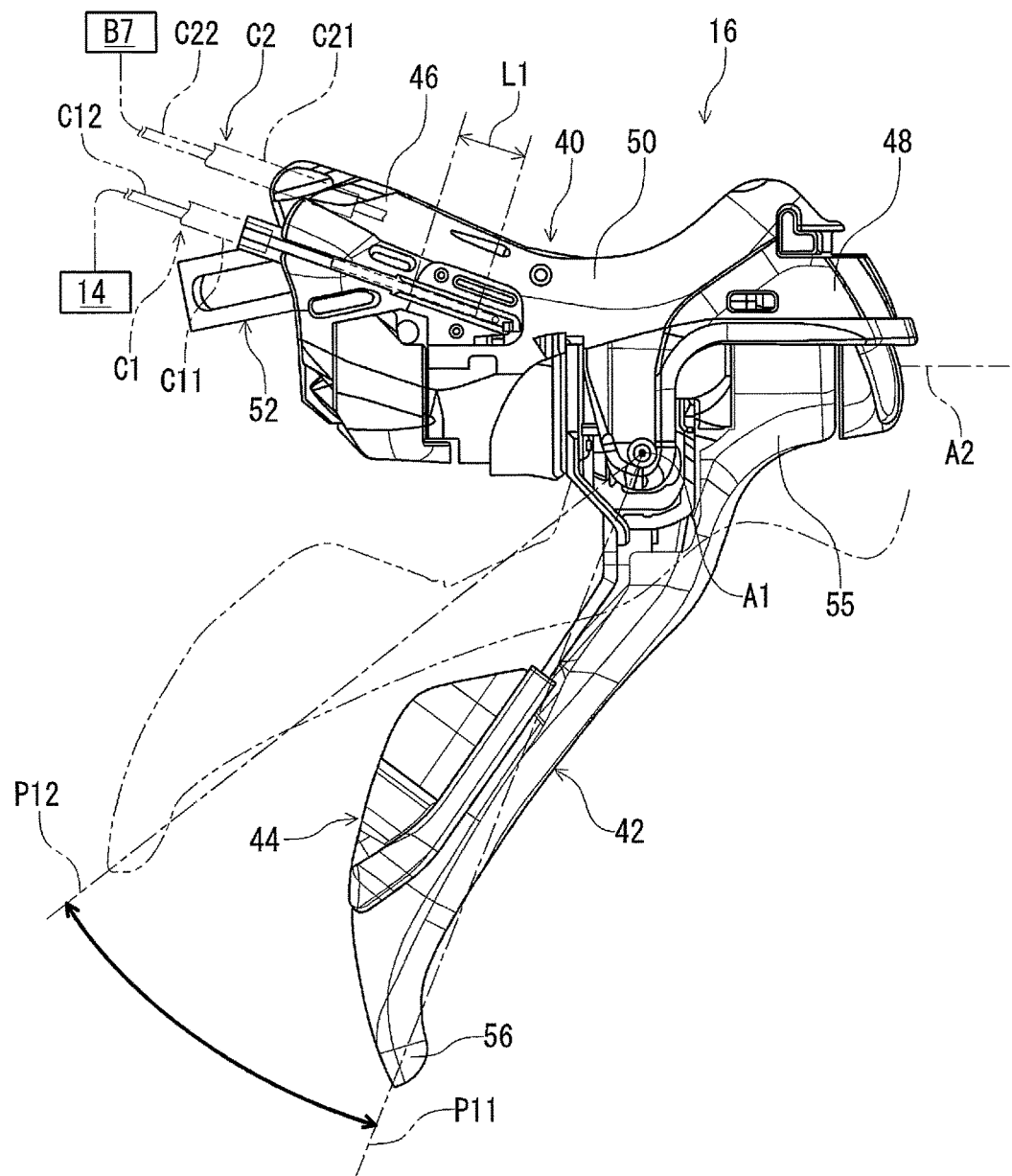
FIG. 6 is a side elevational view of the bicycle operating device of the bicycle seatpost apparatus illustrated in FIG. 1.

As seen in FIG. 6, the brake operating member 42 is movably coupled to the base member 40 to operate the brake device B7. The brake operating member 42 is coupled to the base member 40 pivotally about a brake pivot axis A1. The brake operating member 42 includes a first end 55 pivotally coupled to the base member 40. The first operating member 44 is closer to the first end portion 46 of the base member 40 than the first end 55 of the brake operating member 42. The brake operating member 42 is coupled to the base member 40 pivotally between a brake rest position P11 and a brake operated position P12. The brake operating member 42 includes a second end 56 opposite to the first end 55 and is elongated between the first end 55 and the second end 56. The brake rest position P11 and the brake operated position P12 are defined based on the brake pivot axis A1 and the second end 56 of the brake operating member 42.

In the present application, the term "rest position" as used herein refers to a position at which a movable part such as the brake operating member 42 or the first operating member 44 remains stationary in a state where the movable part is not operated by the user. The term "operated position" as used herein refers to a position at which the movable part has been operated by the user to perform the operation of a bicycle component such as the brake device B6, the brake device B7, the adjustable seatpost assembly 14, or the rear derailleur B84.

The mechanical control cable C2 includes an outer casing C21 and an inner wire C22 provided in the outer casing C21. An end of the inner wire C22 is coupled to the first end 55 of the brake operating member 42. The outer casing C21 is attached to the base member 40. The inner wire C22 is pulled relative to the outer casing C21 and the base member 40 when the brake operating member 42 is pivoted relative to the base member 40 about the brake pivot axis A1 from the brake rest position P11 to the brake operated position P12. The inner wire C22 is returned relative to the outer casing C21 and the base member 40 when the brake operating member 42 is returned relative to the base member 40 about the brake pivot axis A1 from the brake operated position P12 to the brake rest position P11.

Figure 7:
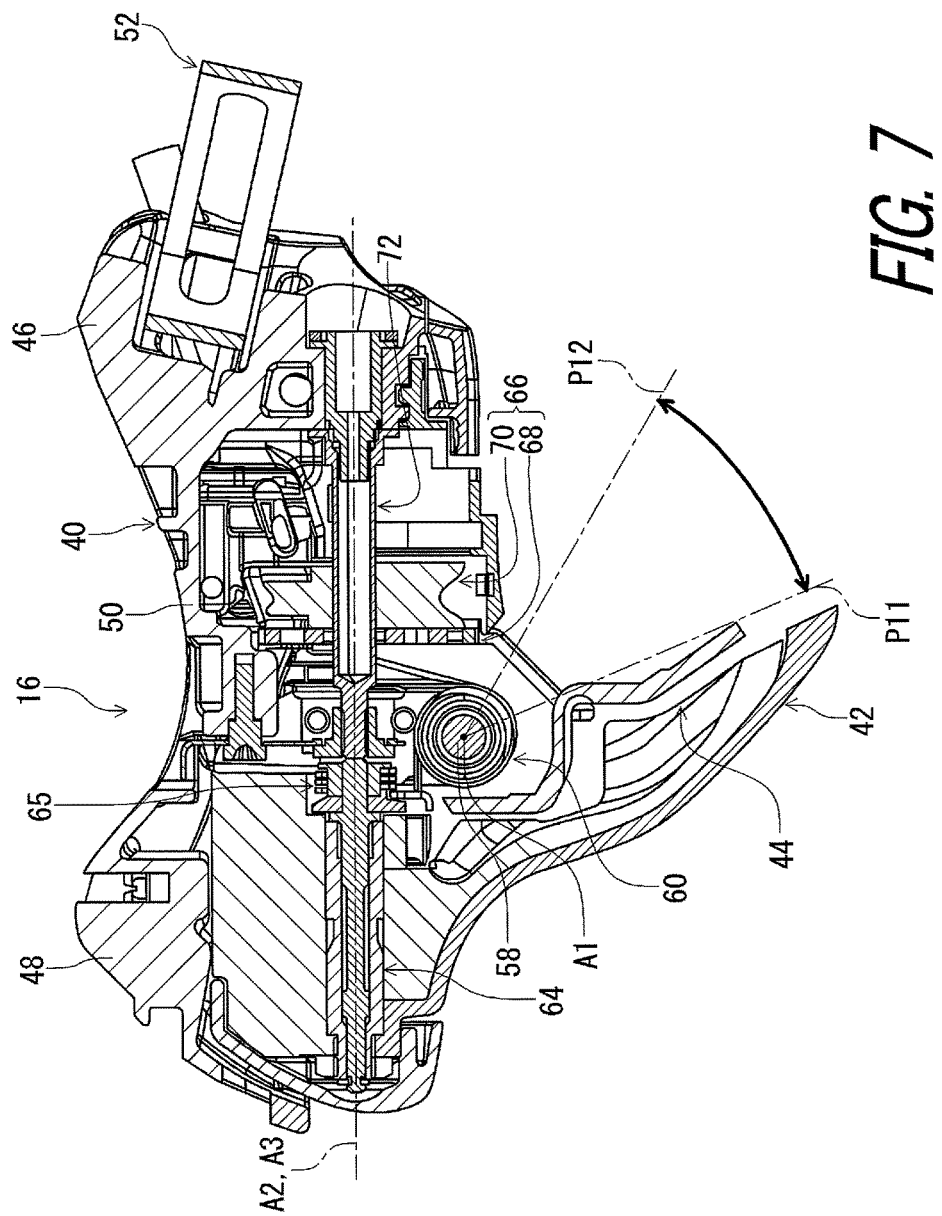
FIG. 7 is a cross-sectional view of the bicycle operating device taken along line VII-VII of FIG. 5.

As seen in FIG. 7, the bicycle operating device 16 includes a first shaft 58 and a first biasing member 60. The first shaft 58 defines the brake pivot axis A1 and is attached to the base member 40. The brake operating member 42 is pivotally coupled to the base member 40 by the first shaft 58. The first biasing member 60 biases the brake operating member 42 toward the brake rest position P11. The first biasing member 60 is mounted to the first shaft 58.

Figure 8:
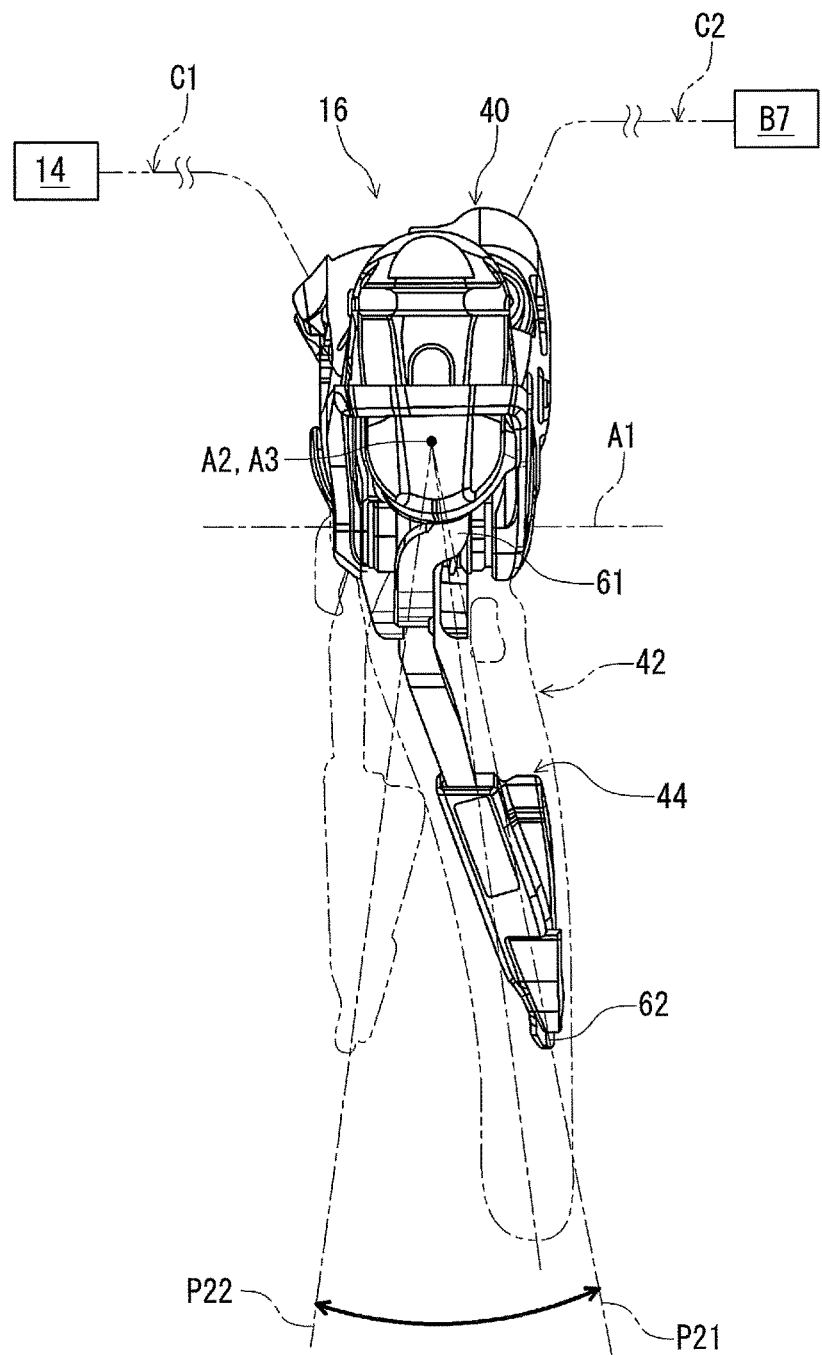
FIG. 8 is a front view of the bicycle operating device of the bicycle seatpost apparatus illustrated in FIG. 1.

As seen in FIG. 8, the first operating member 44 is coupled to the base member 40 movably between a first rest position P21 and a first operated position P22 to move the first mechanical control cable C1 relative to the base member 40. The first operating member 44 is coupled to the base member 40 movably between the first rest position P21 and the first operated position P22 to operate the additional bicycle component 14 via the first mechanical control cable C1. Namely, the seatpost operating member 44 is movably coupled to the base member 40 to operate the adjustable seatpost assembly 14 via the first mechanical control cable C1.

In this embodiment, the first operating member 44 is coupled to the base member 40 pivotally about a first pivot axis A2 which is non-parallel to the brake pivot axis A1. In the illustrated embodiment, the first operating member 44 is pivotally coupled to the brake operating member 42 to be movably coupled to the base member 40. However, the first operating member 44 can be directly coupled to the base member 40 pivotally about the first pivot axis A2.

As seen in FIG. 3, the brake pivot axis A1 and the first pivot axis A2 are disposed to intersect with each other when viewed from a predetermined direction (e.g., from above of the bicycle operating device 16 in the mounting state) perpendicular to the brake pivot axis A1. Specifically, the brake pivot axis A1 is disposed perpendicularly to the first pivot axis A2 when viewed from the predetermined direction. The brake pivot axis A1 extends along a direction perpendicular to the transverse center plane CP1 in the mounting state where the bicycle operating device 16 is mounted to the handlebar B2. The first pivot axis A2 extends along a direction parallel to the transverse center plane CP1 in the mounting state where the bicycle operating device 16 is mounted to the handlebar B2. The arrangement of the brake pivot axis A1 and the first pivot axis A2 is not limited to this embodiment.

The first operating member 44 is movable relative to the base member 40 between the first rest position P21 and the first operated position P22 without mechanically positioning the first mechanical control cable C1 relative to the base member 40 between the first rest position P21 and the first operated position P22. Specifically, the first operating member 44 is movable relative to the base member 40 between the first rest position P21 and the first operated position P22 without mechanically positioning the first mechanical control cable C1 relative to the base member 40 during a movement of the first operating member 44 occurring between the first rest position P21 and the first operated position P22.

In the present application, the term "mechanically positioning" as used herein refers to as positioning a movable element such as the inner wire of the mechanical control cable relative to a stationary element such as the base member 40 at a predetermined position in a state where the first operating member 44 is not operated by the user.

The first operating member 44 is positioned at the first rest position P21 relative to the base member 40 in a state where the first operating member 44 is not operated by the user. The first operating member 44 is not mechanically positioned relative to the base member 40 at any position other than the first rest position P21.

The first operating member 44 includes a first end 61 and a second end 62 opposite to the first end 61. The first end 61 is pivotally coupled to the brake operating member 42 about the first pivot axis A2. The first rest position P21 and the first operated position P22 are defined based on the first pivot axis A2 and the second end 62 of the first operating member 44. The first operating member 44 is elongated between the first end 61 and the second end 62.

As seen in FIG. 7, the bicycle operating device 16 includes a second shaft 64 and a second biasing member 65. The second shaft 64 defines the first pivot axis A2 and is attached to the brake operating member 42. The first operating member 44 is pivotally coupled to the brake operating member 42 by the second shaft 64. The second biasing member 65 biases the first operating member 44 toward the first rest position P21 (FIG. 8). The second biasing member 65 is mounted to the second shaft 64. The second biasing member 65 can be omitted if needed and/or desired.

Figure 9:
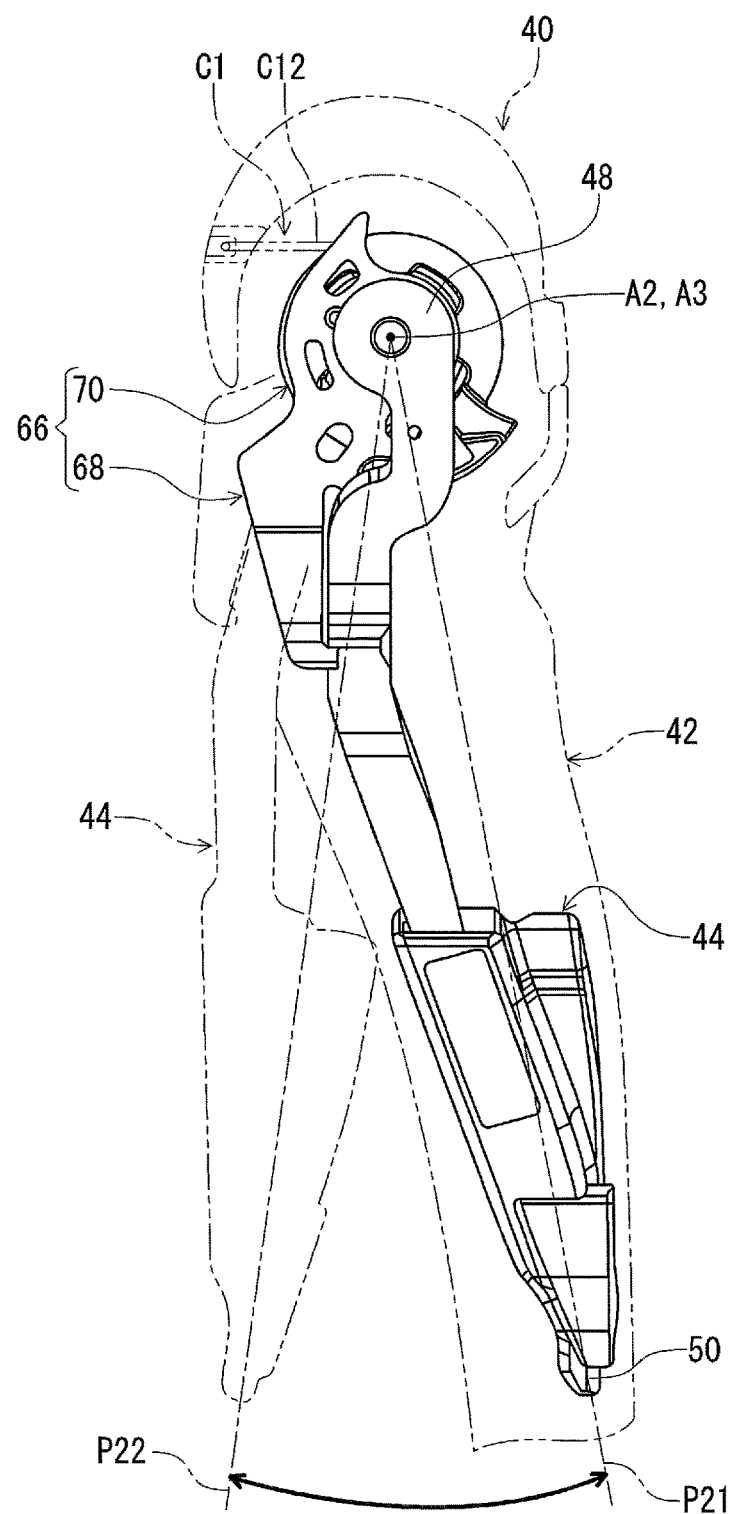
FIG. 9 shows a structure of the bicycle operating device of the bicycle seatpost apparatus illustrated in FIG. 1.

The bicycle operating device 16 is free of a shift operating structure to operate a shift changing device. Instead, as seen in FIG. 9, the bicycle operating device 16 further comprises a cable attachment structure 66 movably coupled to one of the brake operating member 42 and the base member 40 to transmit a movement of the first operating member 44 to the first mechanical control cable C1 without mechanically positioning the first mechanical control cable C1 relative to the base member 40.

In the illustrated embodiment, the cable attachment structure 66 is movably coupled to the base member 40 to transmit the movement of the first operating member 44 to the first mechanical control cable C1 without mechanically positioning the first mechanical control cable C1 relative to the base member 40. However, the cable attachment structure 66 can be movably coupled to the brake operating member 42 to transmit the movement of the first operating member 44 to the first mechanical control cable C1 without mechanically positioning the first mechanical control cable C1 relative to the base member 40.

In the illustrated embodiment, the cable attachment structure 66 includes a receiving member 68 and an attachment member 70. The attachment member 70 is secured to the receiving member 68 to rotate integrally.

As seen in FIG. 7, the receiving member 68 is pivotally coupled to the base member 40 about a pivot axis A3. The pivot axis A3 coincides with the first pivot axis A2 in a state where the brake operating member 42 is positioned at the brake rest position P11. In the illustrated embodiment, the bicycle operating device 16 includes a third shaft 72. The third shaft 72 defines the pivot axis A3 and is attached to the base member 40. The receiving member 68 and the attachment member 70 are pivotally coupled to the base member 40 by the third shaft 72.

As seen in FIG. 9, the receiving member 68 receives a pivotal movement of the first operating member 44 toward the first operated position P22 regardless of a position of the brake operating member 42.

As seen in FIG. 6, the first mechanical control cable C1 includes an outer casing C11 and an inner wire C12 provided in the outer casing C11. As seen in FIG. 8, an end of the inner wire C12 of the first mechanical control cable C1 is coupled to the attachment member 70. The first operating member 44 and the cable attachment structure 66 are coupled to the base member 40 pivotally together between the first rest position P21 and the first operated position P22. The inner wire C12 is pulled relative to the outer casing C11 and the base member 40 when the first operating member 44 and the cable attachment structure 66 are pivoted relative to the base member 40 about the first pivot axis A2 from the first rest position P21 to the first operated position P22. The inner wire C12 is returned relative to the outer casing C11 and the base member 40 when the first operating member 44 and the cable attachment structure 66 are returned relative to the base member 40 about the first pivot axis A2 from the first operated position P22 to the first rest position P21.

The first operating member 44 is rotatable from the first rest position P21 to the first operated position P22 without another operated position defined between the first rest position P21 and the first operated position P22 by a cable displacement amount L1 (FIG. 6) that is larger than 12 mm. When the first operating member 44 rotates relative to the base member 40 from the first rest position P21 to the first operated position P22, the inner wire C12 of the first mechanical control cable C1 moves relative to the base member 40 by the cable displacement amount L1. However, the cable displacement amount L1 can be equal to or smaller than 12 mm.

As seen in FIG. 4, the valve unit 32 of the adjustable seatpost assembly 14 is closed when the first operating member 44 is positioned at the first rest position P21. The first tube 20 is fixedly positioned relative to the second tube 22 when the valve unit 32 is closed.

The valve unit 32 is open when the first operating member 44 is pivoted relative to the base member 40 from the first rest position P21 to the first operated position P22. The valve unit 32 is in an open state when the first operating member 44 is being positioned at the first operated position P22 by the user. The first cylinder is movable relative to the second cylinder when the valve unit 32 is open. This allows the user to adjust a position of the saddle B3 (FIG. 1) in the telescopic direction D1 using the adjustable seatpost assembly 14 and the bicycle operating device 16.

The first operating member 44 returns from the first operated position P22 to the first rest position P21 when an operation force applied from the user is released from the first operating member 44. This allows the user to fixedly position the saddle B3 at an adjusted position.

The bicycle seatpost apparatus 12 and the bicycle operating device 16 have the following features.

(1) As seen in FIG. 8, the first operating member 44 is movable relative to the base member 40 between the first rest position P21 and the first operated position P22 without mechanically positioning the first mechanical control cable C1 relative to the base member 40 during the movement of the first operating member 44 occurring between the first rest position P21 and the first operated position P22. Accordingly, it is possible to easily operate a bicycle component such as the adjustable seatpost assembly 14 using the first operating member 44 via the first mechanical control cable C1 in addition to the brake device B7.

(2) As seen in FIG. 5, the first end portion 46 is configured to be coupled to the bending portion B23 of the handlebar B2 in the mounting state where the bicycle operating device 16 is mounted to the handlebar B2. Accordingly, it is possible to use the bicycle operating device 16 for a drop-down handlebar such as the handlebar B2.

(3) As seen in FIGS. 6 and 8, the first operating member 44 is coupled to the base member 40 pivotally about the first pivot axis A2 which is non-parallel to the brake pivot axis A1. Accordingly, it is possible to easily distinguish operation of the first operating member 44 from operation of the brake operating member 42. This can improve operability of the bicycle operating device 16.

(4) As seen in FIG. 8, the first operating member 44 is pivotally coupled to the brake operating member 42 to be movably coupled to the base member 40. Accordingly, it is possible to arrange the first operating member 44 at a position close to the brake operating member 42. This can improve operability of the bicycle operating device 16.

(5) As seen in FIG. 6, the first operating member 44 is closer to the first end portion 46 of the base member 40 than the first end 55 of the brake operating member 42. Accordingly, it is possible to arrange the first operating member 44 at a position closer to the handlebar B2 than the brake operating member 42. This can improve operability of the bicycle operating device 16.

(6) As seen in FIG. 3, the first end portion 46 of the base member 40 is configured to be coupled to the left part B21 of the handlebar B2 in the mounting state. This arrangement of the first end portion 46 allows the user to operate the bicycle operating device 16 using the user's left hand. Thus, it is possible to effectively utilize the left hand having a lower use frequency than that of a right hand.

(7) As seen in FIG. 7, the bicycle operating device 16 is free of a shift operating structure to operate a shift changing device. Accordingly, it is possible to provide the first operating member 44 instead of the shift operating structure. This can prevent a size of the bicycle operating device 16 from increasing.

(8) As seen in FIG. 9, the cable attachment structure 66 is movably coupled to one of the brake operating member 42 and the base member 40 to transmit the movement of the first operating member 44 to the first mechanical control cable C1 without mechanically positioning the first mechanical control cable C1 relative to the base member 40. Accordingly, it is possible to transmit the movement of the first operating member 44 to the first mechanical control cable C1 via the cable attachment structure 66. This can improve design freedom of arrangement of the first operating member 44.

(9) As seen in FIGS. 6 and 8, the first operating member 44 is rotatable from the first rest position P21 to the first operated position P22 without another operated position defined between the first rest position P21 and the first operated position P22 by the cable displacement amount L1 that is larger than 12 mm. Accordingly, it is possible to increase types of the additional bicycle component which can be operated using the first operating member 44.

(10) As seen in FIG. 6, the bicycle operating device 16 to operate the adjustable seatpost assembly 14 includes the base member 40. The base member 40 comprises the first end portion 46, the second end portion 48, and the grip portion 50. The first end portion 46 is configured to be coupled to the handlebar B2 in the mounting state where the bicycle operating device 16 is mounted to the handlebar B2. The second end portion 48 is opposite to the first end portion 46. The grip portion 50 is provided between the first end portion 46 and the second end portion 48. Accordingly, it is possible to operate the adjustable seatpost assembly 14 using the bicycle operating device 16 having a road type.

(11) As seen in FIG. 8, the seatpost operating member 44 is movably coupled to the base member 40 to operate the adjustable seatpost assembly 14 via the first mechanical control cable C1. Accordingly, it is possible to operate the adjustable seatpost assembly 14 using the seatpost operating member 44. This can improve operability of the bicycle operating device 16 to operate the adjustable seatpost assembly 14.

Second Embodiment

A bicycle seatpost apparatus 212 including a bicycle operating device 216 in accordance with a second embodiment will be described below referring to FIGS. 10 to 13. The bicycle seatpost apparatus 212 has the same structures as those of the bicycle seatpost apparatus 12 except for structures of the brake operating member and the first operating member. Thus, elements having substantially the same function as those in the first embodiment will be numbered the same here, and will not be described and/or illustrated again in detail here for the sake of brevity.

Figure 10:
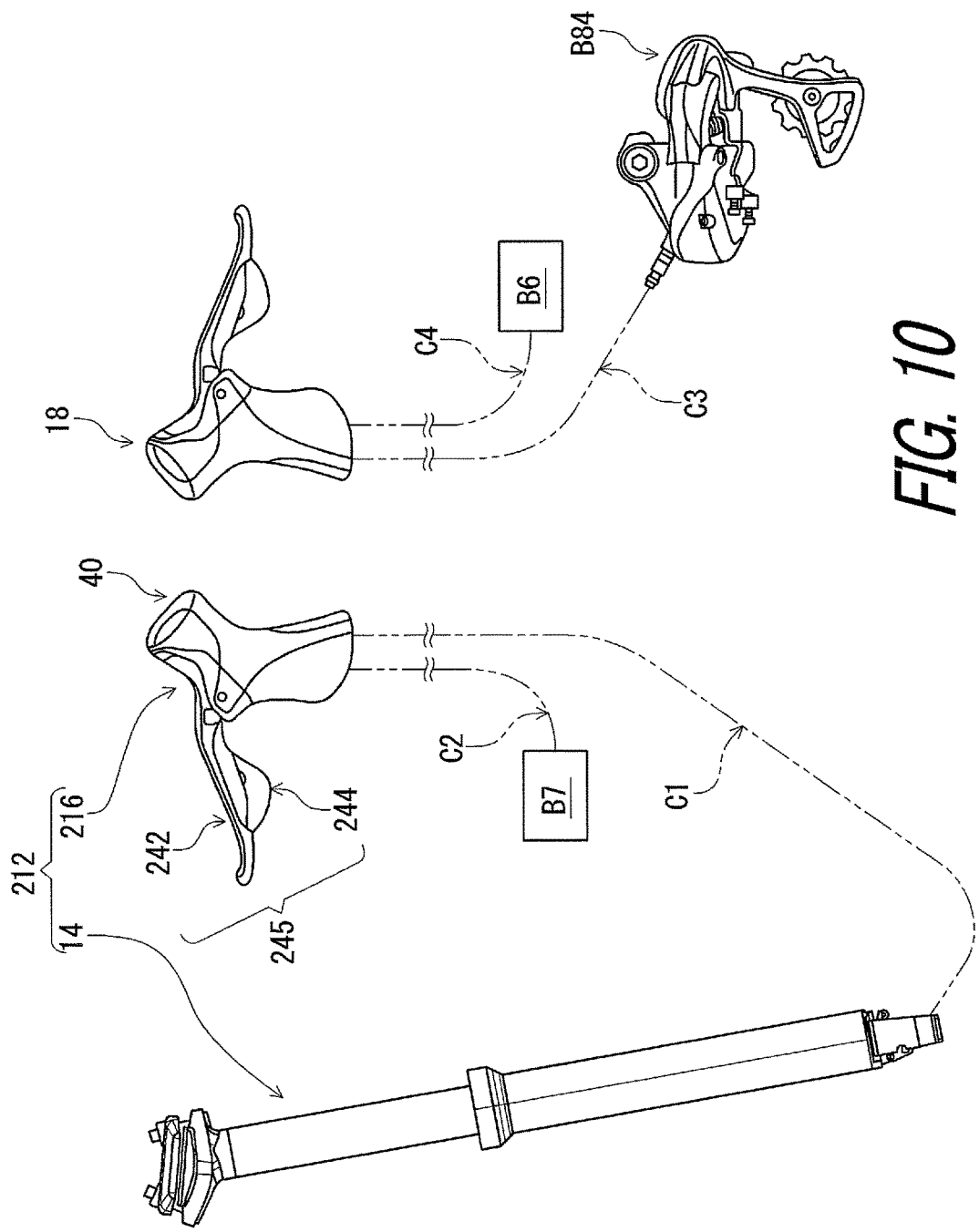
FIG. 10 is a schematic view of a bicycle seatpost apparatus in accordance with a second embodiment.

As seen in FIG. 10, in the bicycle seatpost apparatus 212, the bicycle operating device 216 comprises the base member 40, a brake operating member 242, and a first operating member 244. Unlike the brake operating member 42 and the first operating member 44 of the first embodiment, the brake operating member 242 is integrally formed with the first operating member 244 as a one-piece unitary member.

Specifically, the bicycle operating device 216 comprises an operating member 245. The operating member 245 includes the brake operating member 242 and the first operating member 244. The operating member 245 is a solitary operating member in the bicycle operating device 216. The operating member 245 is movably coupled to the base member 40 to operate the brake device B7 and the additional bicycle component 14.

Figure 11:
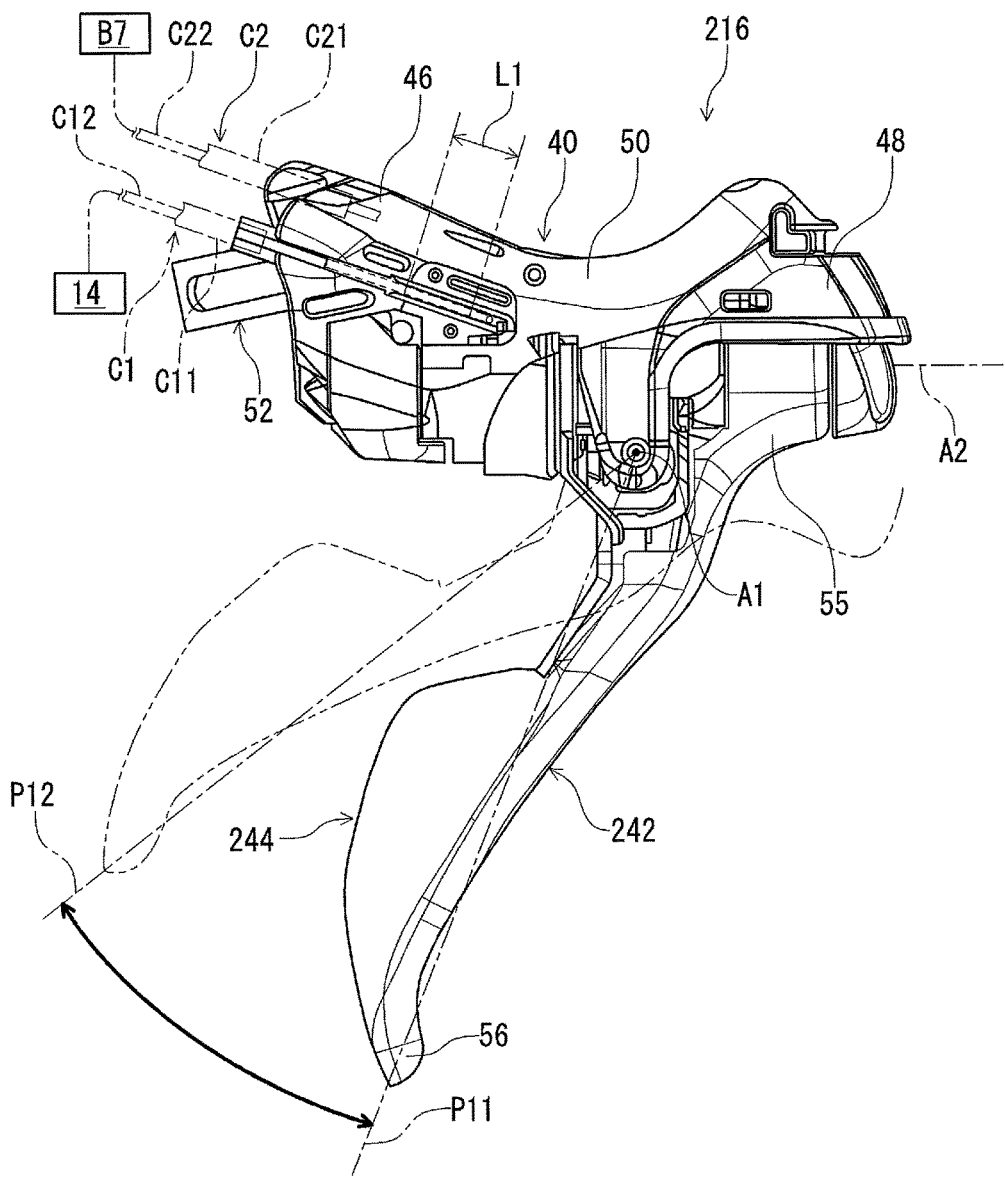
FIG. 11 is a side elevational view of the bicycle operating device of the bicycle seatpost apparatus illustrated in FIG. 10.

As seen in FIG. 11, the operating member 245 is coupled to the base member 40 pivotally about the brake pivot axis A1 to operate the brake device B7. The operating member 245 is coupled to the base member 40 pivotally between the brake rest position P11 and the brake operated position P12.

Figure 12:
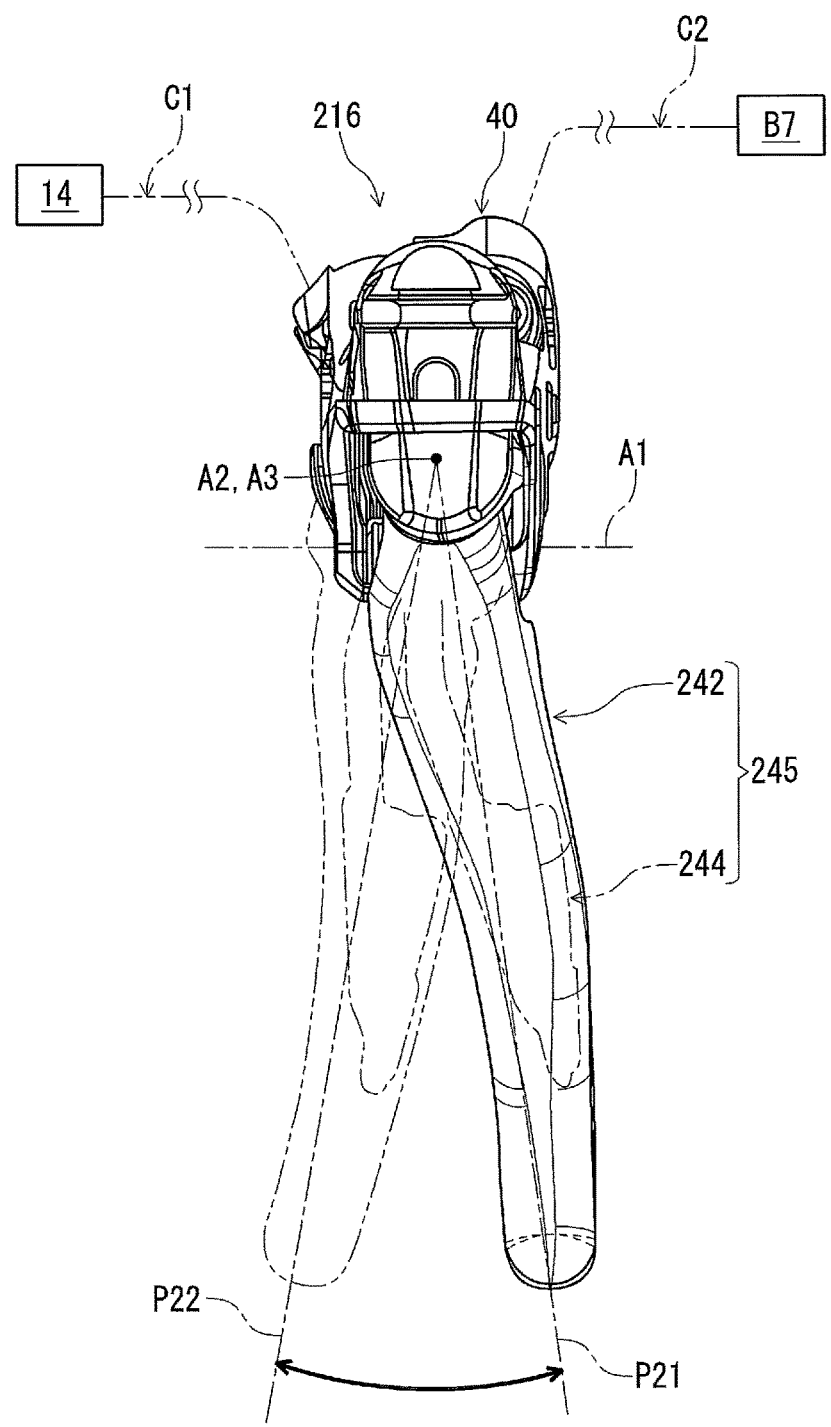
FIG. 12 is a front view of the bicycle operating device of the bicycle seatpost apparatus illustrated in FIG. 10.

As seen in FIG. 12, the operating member 245 is coupled to the base member 40 movably between the first rest position P21 and the first operated position P22 to operate the additional bicycle component 14 via the first mechanical control cable C1. The operating member 245 is movable relative to the base member 40 between the first rest position P21 and the first operated position P22 without mechanically positioning the first mechanical control cable C1 relative to the base member 40 between the first rest position P21 and the first operated position P22. Specifically, the operating member 245 is movable relative to the base member 40 between the first rest position P21 and the first operated position P22 without mechanically positioning the first mechanical control cable C1 relative to the base member 40 during a movement of the operating member 245 occurring between the first rest position P21 and the first operated position P22. The operating member 245 is coupled to the base member 40 pivotally about the first pivot axis A2 to operate the additional bicycle component 14.

The first operating member 244 (i.e., the operating member 245) is rotatable from the first rest position P21 to the first operated position P22 without another operated position defined between the first rest position P21 and the first operated position P22 by the cable displacement amount L1 (FIG. 11) that is larger than 12 mm. When the first operating member 244 rotates relative to the base member 40 from the first rest position P21 to the first operated position P22, the inner wire C12 of the first mechanical control cable C1 moves relative to the base member 40 by the cable displacement amount L1. The operating member 245 can also be referred to as a seatpost operating member 245. The seatpost operating member 245 is movably coupled to the base member 40 to operate the adjustable seatpost assembly 14 via the first mechanical control cable C1.

Figure 13:
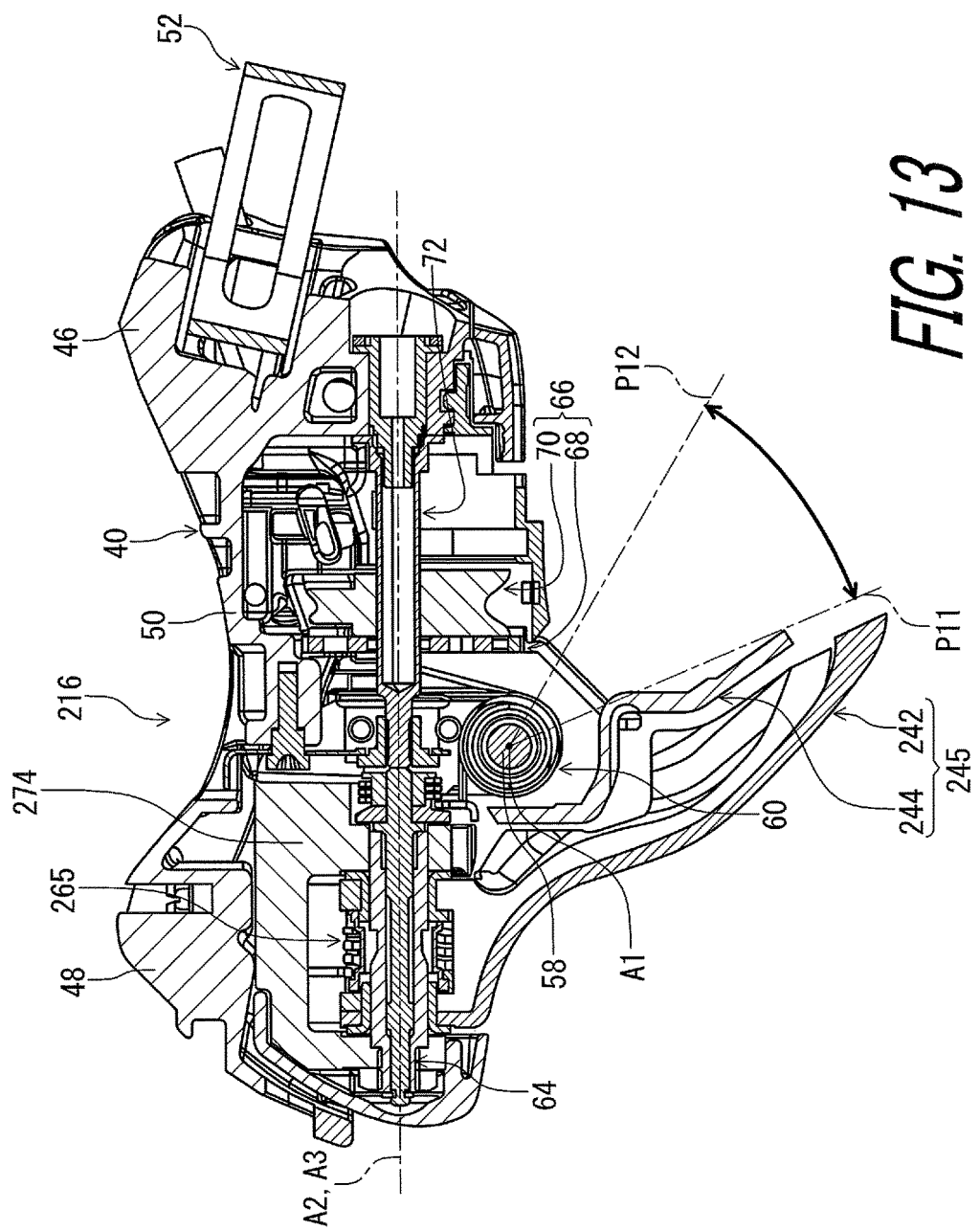
FIG. 13 is a cross-sectional view of the bicycle operating device of the bicycle seatpost apparatus illustrated in FIG. 10.

As seen in FIG. 13, the bicycle operating device 216 includes a coupling member 274. The coupling member 274 is pivotally coupled to the base member 40 by the first shaft 58. The operating member 245 is pivotally coupled to the coupling member 274 by the second shaft 64. As seen in FIG. 11, the operating member 245 is pivotable relative to the base member 40 about the brake pivot axis A1 between the brake rest position P11 and the brake operated position P12. As seen in FIG. 12, the operating member 245 is pivotable relative to the base member 40 about the first pivot axis A2 between the first rest position P21 and the first operated position P22.

As seen in FIG. 13, the bicycle operating device 216 includes a second biasing member 265 instead of the second biasing member 65 of the first embodiment. The second biasing member 265 biases the operating member 245 toward the first rest position P21 (FIG. 12).

With the bicycle seatpost apparatus 212 and the bicycle operating device 216, it is possible to obtain substantially the same effects as those of the bicycle seatpost apparatus 12 and the bicycle operating device 16 of the first embodiment.

The bicycle seatpost apparatus 212 and the bicycle operating device 216 have the following features instead of and/or in addition to the features of the bicycle seatpost apparatus 12 and the bicycle operating device 16 of the first embodiment.

(1) As seen in FIG. 11, the brake operating member 242 is integrally formed with the first operating member 244 as a one-piece unitary member. Accordingly, it is possible to simplify the structure of the bicycle operating device 216.

(2) As seen in FIG. 12, the operating member 245 is movable relative to the base member 40 between the first rest position P21 and the first operated position P22 without mechanically positioning the first mechanical control cable C1 relative to the base member 40 during the movement of the operating member 245 occurring between the first rest position P21 and the first operated position P22. Accordingly, it is possible to operate the brake device B7 and the additional bicycle component 14 using the operating member 245. This can improve operability of the bicycle operating device 216.

(3) As seen in FIG. 11, since the operating member 245 is a solitary operating member, it is possible to simplify the structure of the bicycle operating device 216.

(4) As seen in FIGS. 11 and 12, the operating member 245 is coupled to the base member 40 pivotally about the brake pivot axis A1 to operate the brake device B7. The operating member 245 is coupled to the base member 40 pivotally about the first pivot axis A2 to operate the additional bicycle component 14. The brake pivot axis A1 is non-parallel to the first pivot axis A2. Accordingly, it is possible to distinguish operation of the operating member 245 about the first pivot axis A2 from operation of the operating member 245 about the brake pivot axis A1.

Third Embodiment

A bicycle seatpost apparatus 312 including a bicycle operating device 316 in accordance with a third embodiment will be described below referring to FIGS. 14 to 18. The bicycle seatpost apparatus 312 has the same structures as those of the bicycle seatpost apparatus 12 except for a structure of the first operating member. Thus, elements having substantially the same function as those in the above embodiments will be numbered the same here, and will not be described and/or illustrated again in detail here for the sake of brevity.

Figure 14:
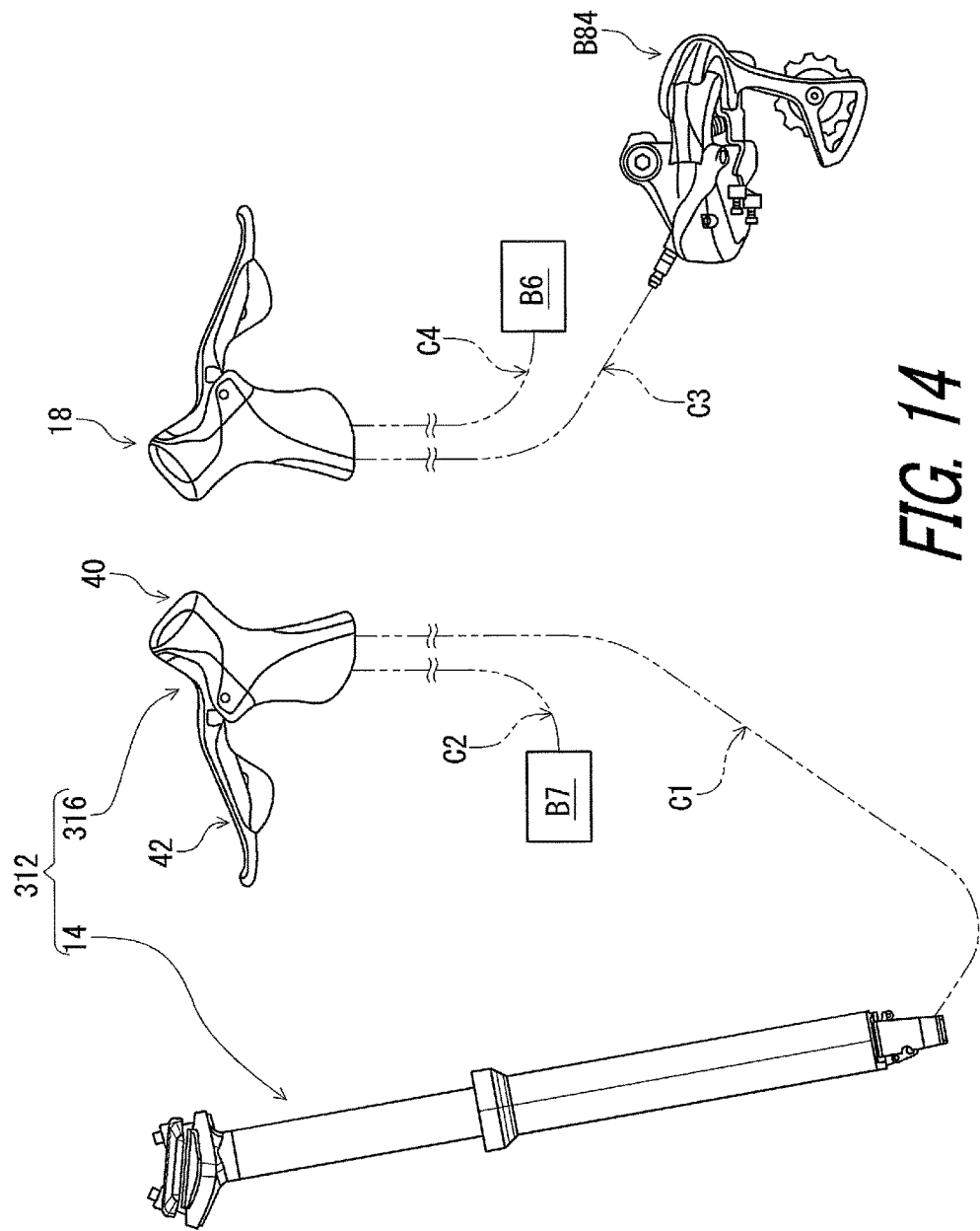
FIG. 14 is a schematic view of a bicycle seatpost apparatus in accordance with a third embodiment.

As seen in FIG. 14, in the bicycle operating device 316 of the bicycle seatpost apparatus 312, the first operating member 44 is not pivotally coupled to the brake operating member 42.

Figure 15:
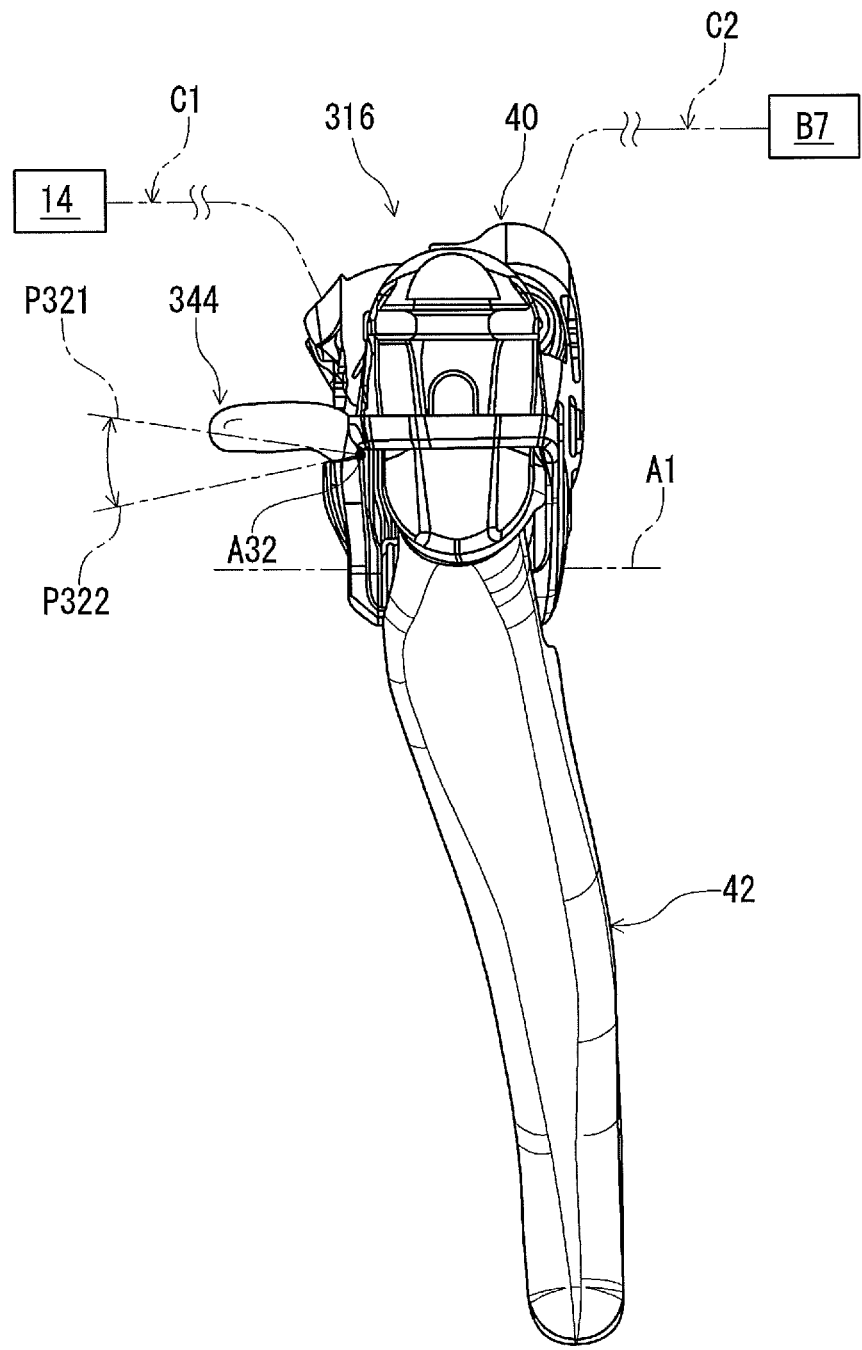
FIG. 15 is a front view of the bicycle operating device of the bicycle seatpost apparatus illustrated in FIG. 14.

As seen in FIG. 15, the bicycle operating device 316 comprises a first operating member 344. The first operating member 344 is coupled to the base member 40 movably between a first rest position P321 and a first operated position P322 to move the first mechanical control cable C1 relative to the base member 40. The first operating member 344 is coupled to the base member 40 movably between the first rest position P321 and the first operated position P322 to operate the additional bicycle component 14 via the first mechanical control cable C1. In other words, the bicycle operating device 16 includes a seatpost operating member 344 movably coupled to the base member 40 to operate the adjustable seatpost assembly 14 via the first mechanical control cable C1. The first operating member 344 is movable relative to the base member 40 between the first rest position P321 and the first operated position P322 without mechanically positioning the first mechanical control cable C1 relative to the base member 40 between the first rest position P321 and the first operated position P322. Specifically, the first operating member 344 is movable relative to the base member 40 between the first rest position P321 and the first operated position P322 without mechanically positioning the first mechanical control cable C1 relative to the base member 40 during a movement of the first operating member 344 occurring between the first rest position P321 and the first operated position P322. The first operating member 344 is coupled to the base member 40 pivotally about a first pivot axis A32 which is non-parallel to the brake pivot axis A1. However, the first operating member 344 can be coupled to the base member 40 so that the first operating member 344 slidably moves with respect to the base member 40 between the first rest position P321 and the first operated position P322.

Figure 16:
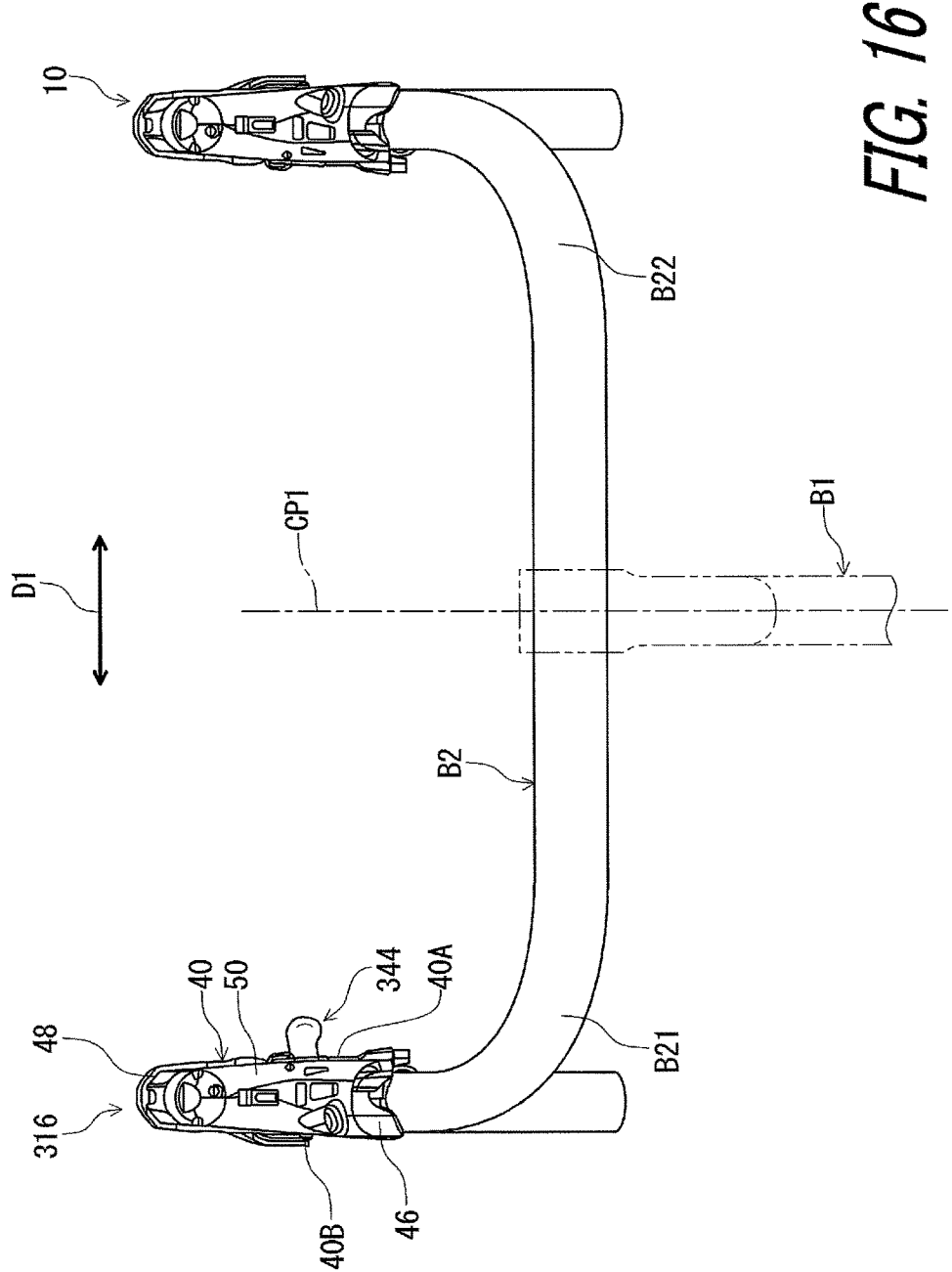
FIG. 16 is a plane view of a bicycle operating device of the bicycle seatpost apparatus illustrated in FIG. 15, with a handlebar.

As seen in FIG. 16, the base member 40 includes a first lateral surface 40A facing in the transverse direction D1 of the bicycle 10 in the mounting state. The first operating member 344 is provided on the first lateral surface 40A. The first lateral surface 40A faces the transverse center plane CP1 of the bicycle 10 in the mounting state. However, the first operating member 344 can be provided on a second lateral surface 40B opposite to the first lateral surface 40A.

Figure 17:
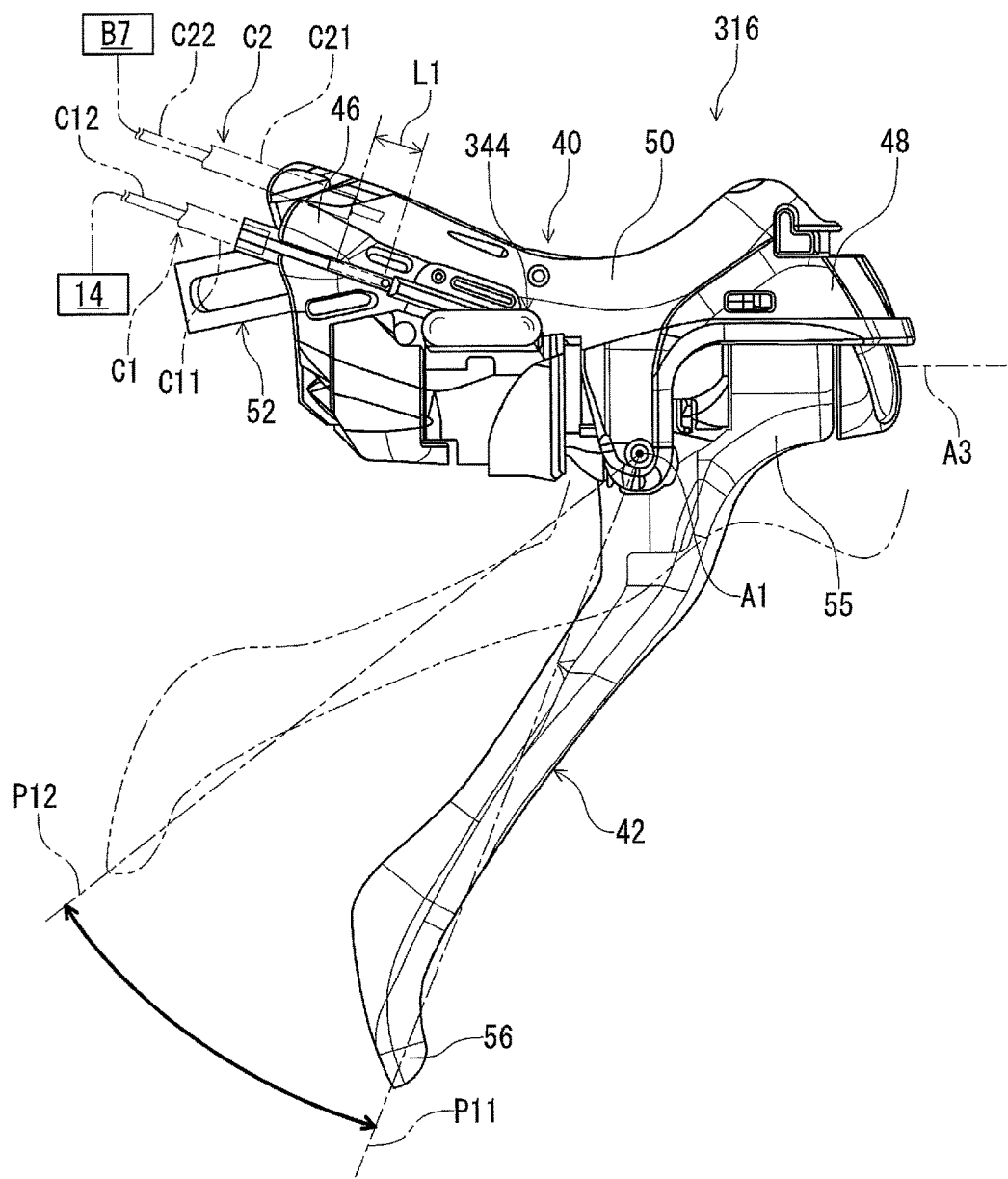
FIG. 17 is a side elevational view of the bicycle operating device of the bicycle seatpost apparatus illustrated in FIG. 15.

As seen in FIG. 17, the first operating member 344 is closer to the first end portion 46 of the base member 40 than the first end 55 of the brake operating member 42. The first operating member 344 is rotatable from the first rest position P321 to the first operated position P322 without another operated position defined between the first rest position P321 and the first operated position P322 by the cable displacement amount L1 that is larger than 12 mm. When the first operating member 344 rotates relative to the base member 40 from the first rest position P321 to the first operated position P322, the inner wire C12 of the first mechanical control cable C1 moves relative to the base member 40 by the cable displacement amount L1.

Figure 18:
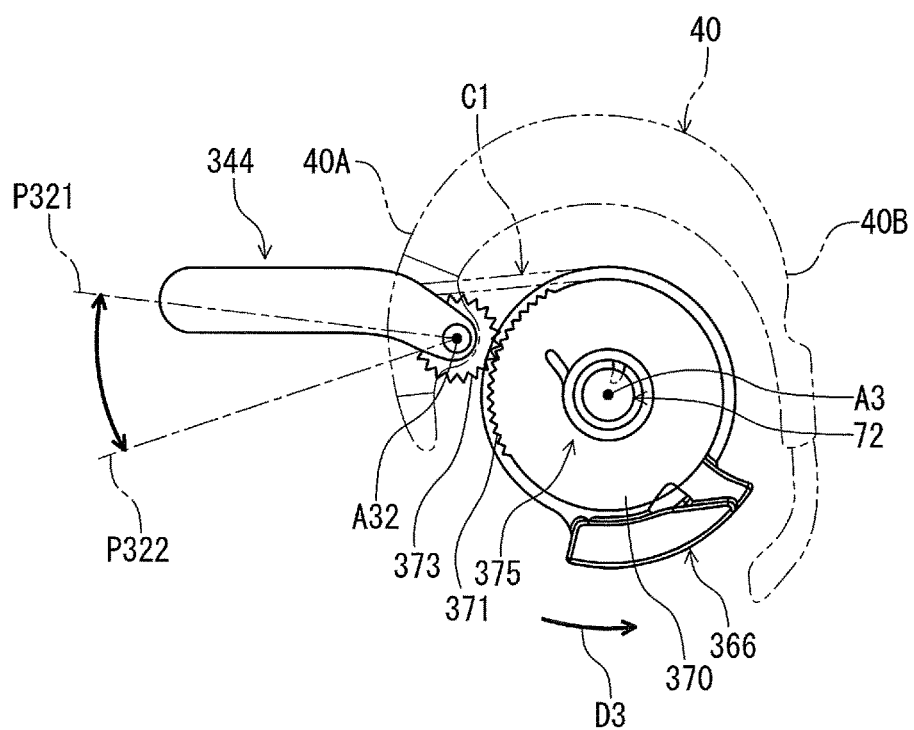
FIG. 18 shows a structure of the bicycle operating device of the bicycle seatpost apparatus illustrated in FIG. 15.

As seen in FIG. 18, the bicycle operating device 316 further comprises a cable attachment structure 366 movably coupled to one of the brake operating member 42 and the base member 40 to transmit a movement of the first operating member 44 to the first mechanical control cable C1 without mechanically positioning the first mechanical control cable C1 relative to the base member 40.

In the illustrated embodiment, the cable attachment structure 366 is movably coupled to the base member 40 to transmit the movement of the first operating member 344 to the first mechanical control cable C1 without mechanically positioning the first mechanical control cable C1 relative to the base member 40. However, the attachment structure 366 can be movably coupled to the brake operating member 42 (FIG. 17) to transmit the movement of the first operating member 44 to the first mechanical control cable C1 without mechanically positioning the first mechanical control cable C1 relative to the base member 40.

The cable attachment structure 366 includes an attachment member 370 and a gear part 371. The attachment member 370 has substantially the same structure as that of the attachment member 70 of the first embodiment. The attachment member 370 is pivotally coupled to the base member 40 by the third shaft 72. The gear part 371 is secured to the attachment member 370 to rotate integrally.

The first operating member 344 includes a gear part 373 engaged with the gear part 371. The pivotal movement of the first operating member 344 is transmitted to the attachment member 370 via the gear parts 371 and 373. The cable attachment structure 366 includes a biasing element 375. The biasing element 375 biases the attachment member 370 to pivot relative to the base member 40 in a rotational direction D3. The base member 40 includes a stopper 377 to position the attachment member 370 at an initial position P33. The first operating member 344 is positioned at the first rest position P321 in a state where the attachment member 370 is positioned at the initial position P33.

The inner wire C12 is pulled relative to the base member 40 when the first operating member 344 is pivoted relative to the base member 40 from the first rest position P321 to the first operated position P322. The inner wire C12 is returned relative to the base member 40 when the first operating member 344 is returned relative to the base member 40 from the first operated position P322 to the first rest position P321.

With the bicycle seatpost apparatus 312 and the bicycle operating device 316, it is possible to obtain substantially the same effects as those of the bicycle seatpost apparatus 12 and the bicycle operating device 16 of the first embodiment.

The bicycle seatpost apparatus 312 and the bicycle operating device 316 have the following features instead of and/or in addition to the features of the bicycle seatpost apparatus 12 and the bicycle operating device 16 of the first embodiment.

(1) As seen in FIG. 16, the base member 40 includes the first lateral surface 40A facing in the transverse direction D1 of the bicycle 10 in the mounting state. The first operating member 344 is provided on the first lateral surface 40A. Accordingly, it is possible to improve operability of the first operating member 344 using the user's finger(s).

(2) As seen in FIG. 16, since the first lateral surface 40A faces the transverse center plane CP1 of the bicycle 10 in the mounting state, it is possible to improve operability of the first operating member 344 using the user's thumb.

Fourth Embodiment

A bicycle seatpost apparatus 412 including a bicycle operating device 416 in accordance with a fourth embodiment will be described below referring to FIGS. 19 to 21. The bicycle seatpost apparatus 412 has the same structures as those of the bicycle seatpost apparatus 12 except for a structure of the first operating member. Thus, elements having substantially the same function as those in the above embodiments will be numbered the same here, and will not be described and/or illustrated again in detail here for the sake of brevity.

Figure 19:
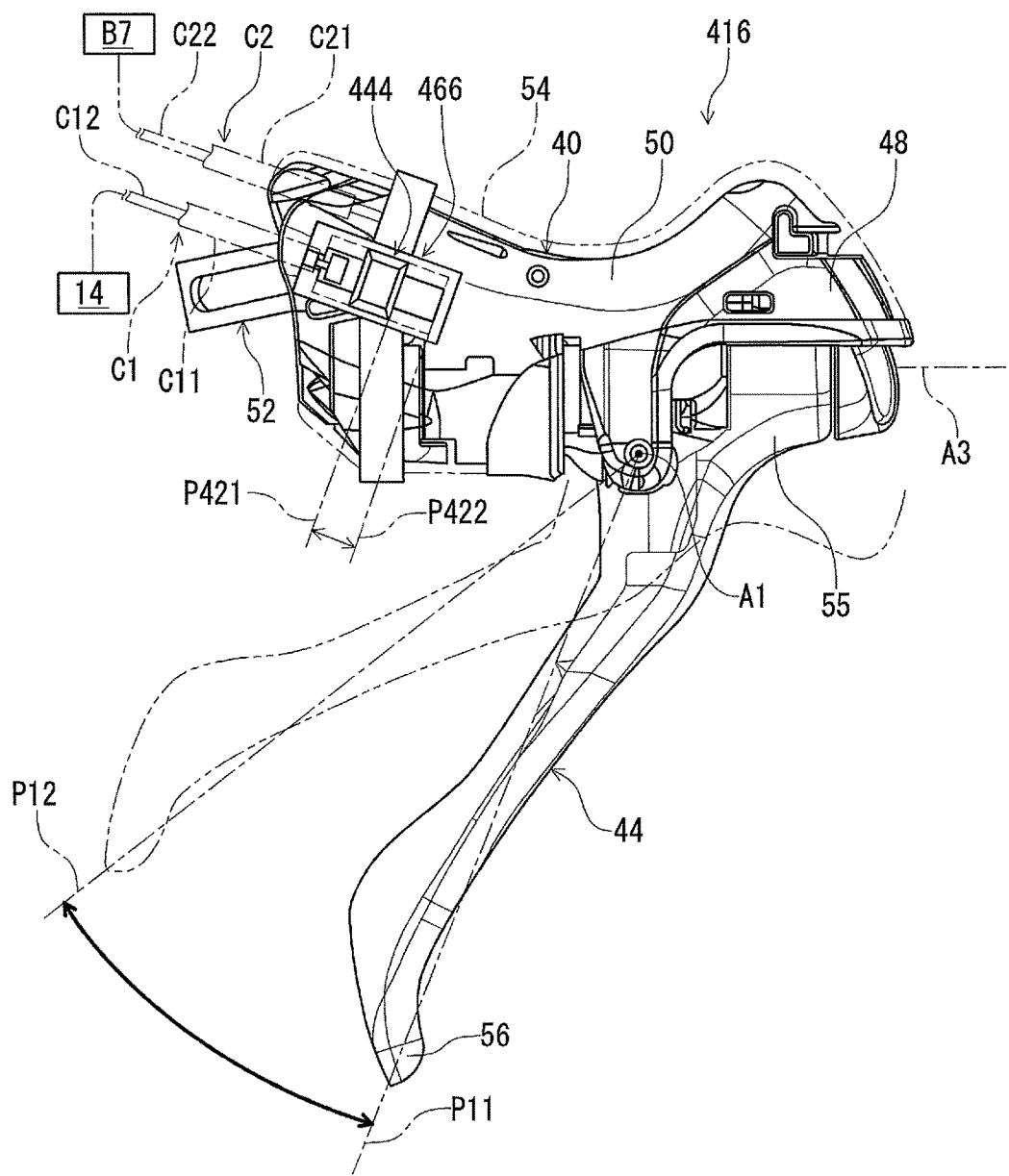
FIG. 19 is a side elevational view of a bicycle operating device of a bicycle seatpost apparatus in accordance with a fourth embodiment.

As seen in FIG. 19, in the bicycle seatpost apparatus 412, the bicycle operating device 416 comprises the base member 40, the brake operating member 42, and a first operating member 444. The first operating member 444 is coupled to the base member 40 movably between a first rest position P421 and a first operated position P422 to move the first mechanical control cable C1 relative to the base member 40. The first operating member 444 is movable relative to the base member 40 between the first rest position P421 and the first operated position P422 without mechanically positioning the first mechanical control cable C1 relative to the base member 40 between the first rest position P421 and the first operated position P422. Specifically, the first operating member 444 is movable relative to the base member 40 between the first rest position P421 and the first operated position P422 without mechanically positioning the first mechanical control cable C1 relative to the base member 40 during a movement of the first operating member 444 occurring between the first rest position P421 and the first operated position P422. The first operating member 444 is closer to the first end portion 46 of the base member 40 than the first end 55 of the brake operating member 42.

Unlike the first operating member 44 of the first embodiment, the first operating member 444 is configured to be detachably mounted to one of the brake operating member 42 and the base member 40. In the illustrated embodiment, the first operating member 444 is configured to be detachably mounted to the base member 40. However, the first operating member 444 can be configured to be detachably mounted to the brake operating member 42.

The bicycle operating device 416 further comprises a cable attachment structure 466 movably coupled to one of the brake operating member 42 and the base member 40 to transmit the movement of the first operating member 444 to the first mechanical control cable C1 without mechanically positioning the first mechanical control cable C1 relative to the base member 40.

In this embodiment, the cable attachment structure 466 is movably coupled to the base member 40 to transmit the movement of the first operating member 444 to the first mechanical control cable C1 without mechanically positioning the first mechanical control cable C1 relative to the base member 40. However, the cable attachment structure 466 can be movably coupled to one of the brake operating member 42 and the base member 40 to transmit the movement of the first operating member 444 to the first mechanical control cable C1 without mechanically positioning the first mechanical control cable C1 relative to the base member 40.

The first operating member 444 and the cable attachment structure 466 are detachably mounted to the one of the brake operating member 42 and the base member 40. In this embodiment, the first operating member 444 and the cable attachment structure 466 are detachably mounted to the base member 40. However, the first operating member 444 and the cable attachment structure 466 can be detachably mounted to the one of the brake operating member 42 and the base member 40.

Figure 20:
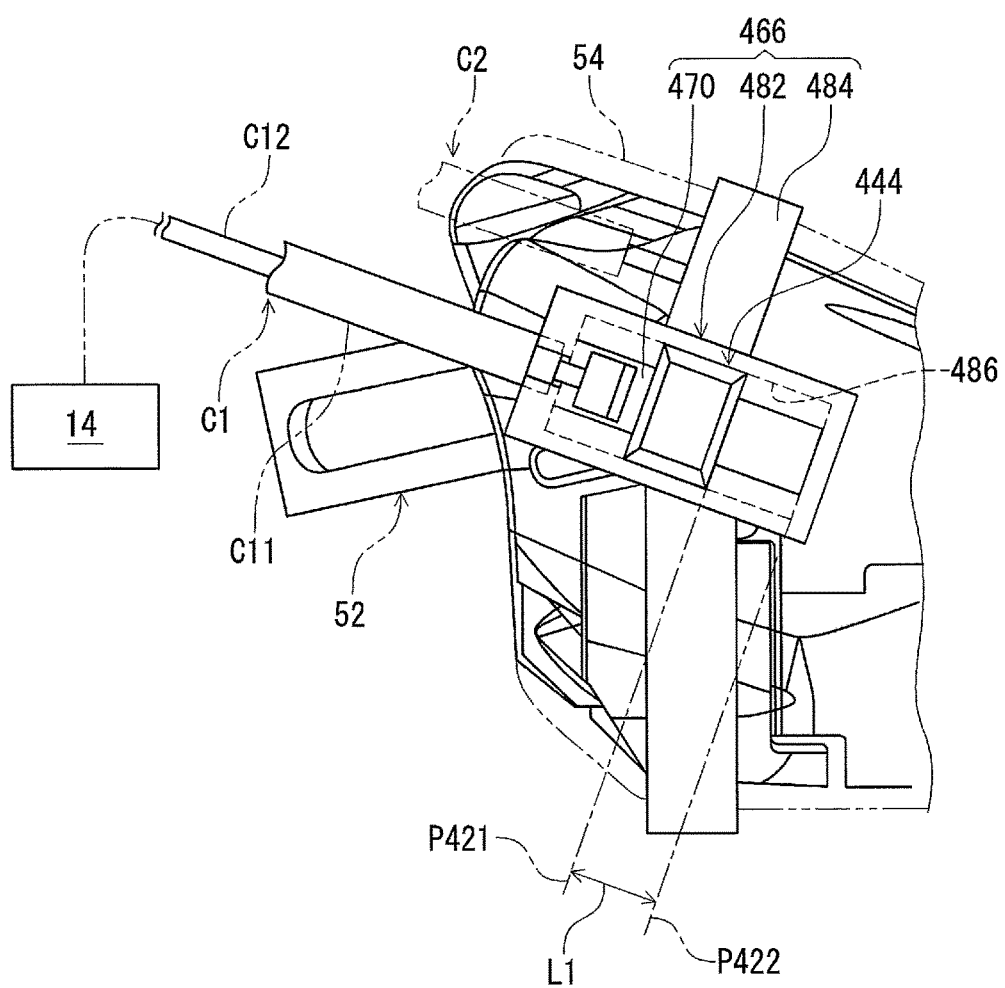
FIG. 20 is an enlarged partial view of the bicycle operating device illustrated in FIG. 19.

As seen in FIG. 20, the cable attachment structure 466 includes an attachment member 470, a support 482, and an attachment band 484. The attachment member 470 is coupled to the first operating member 444. The end of the inner wire C12 of the first mechanical control cable C1 is attached to the attachment member 470. The first operating member 444 and the attachment member 470 are movably mounted to the support 482 between the first rest position P421 and the first operated position P422.

The support 482 includes a guide groove 486. The attachment member 470 is movably provided in the guide groove 486. The support 482 positions the first operating member 444 at the first rest position P421 via the attachment member 470 when the first operating member 444 is not operated by the user. The support 482 is detachably mounted to the base member 40 using the attachment band 484. Examples of the attachment band 484 can include a rubber band. In this embodiment, the support 482 and the attachment band 484 are provided on the grip cover 54.

Figure 21:
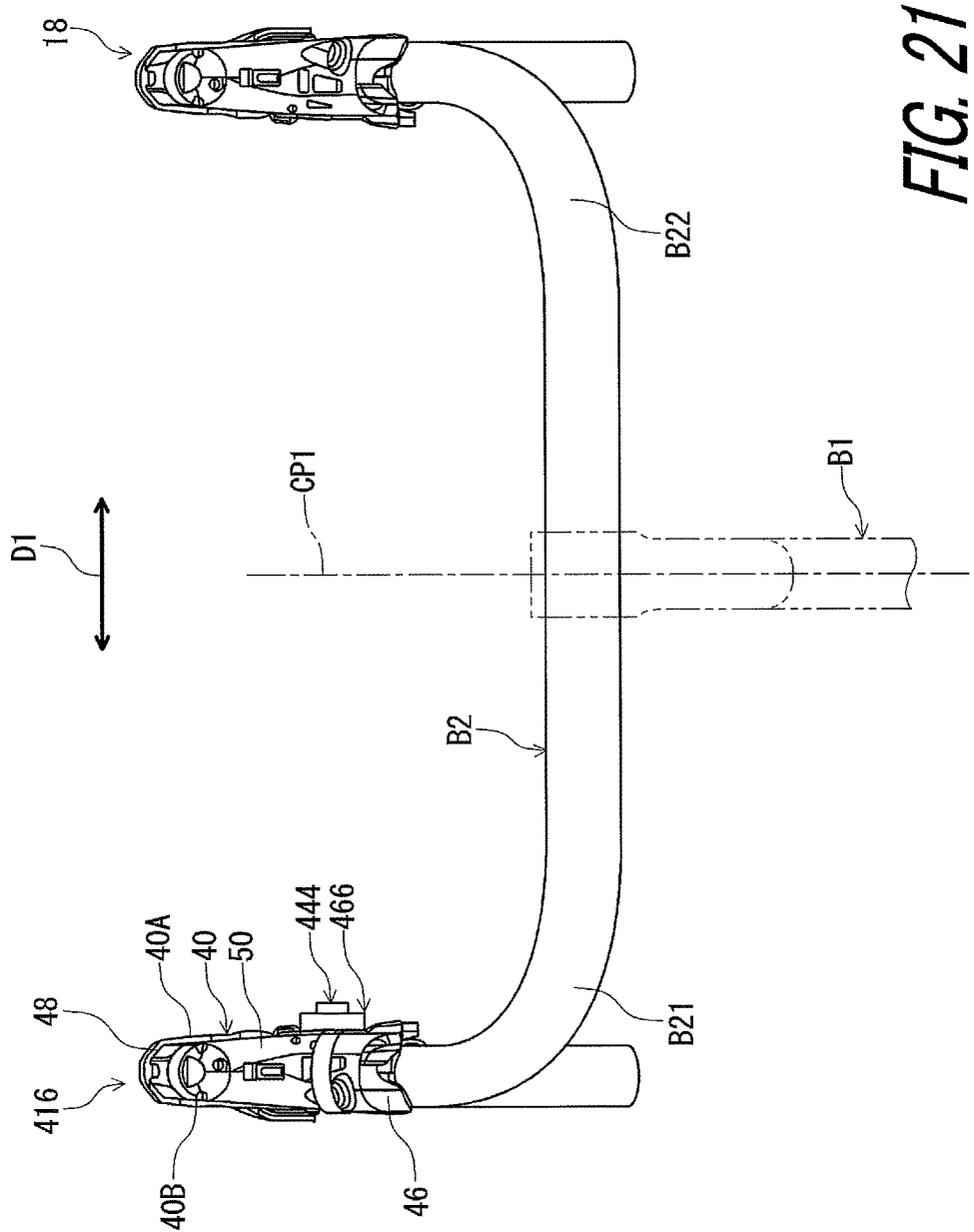
FIG. 21 is a plane view of the bicycle operating device illustrated in FIG. 19, with a handlebar.

As seen in FIG. 21, the first operating member 444 is provided on the first lateral surface 40A. The cable attachment structure 466 is provided on the first lateral surface 40A. However, the first operating member 444 and the cable attachment structure 466 can be provided on the second lateral surface 40B.

With the bicycle seatpost apparatus 412 and the bicycle operating device 416, it is possible to obtain substantially the same effects as those of the bicycle seatpost apparatus 12 and the bicycle operating device 16 of the first embodiment.

The bicycle seatpost apparatus 412 and the bicycle operating device 416 have the following features instead of and/or in addition to the features of the bicycle seatpost apparatus 12 and the bicycle operating device 16 of the first embodiment.

(1) As seen in FIG. 21, the base member 40 includes the first lateral surface 40A facing in the transverse direction D1 of the bicycle 10 in the mounting state. The first operating member 444 is provided on the first lateral surface 40A. Accordingly, it is possible to improve operability of the first operating member 444 using the user's finger(s).

(2) As seen in FIG. 21, since the first lateral surface 40A faces the transverse center plane CP1 of the bicycle 10 in the mounting state, it is possible to improve operability of the first operating member 444 using the user's thumb.

(3) As seen in FIG. 19, the first operating member 444 is configured to be detachably mounted to one of the brake operating member 42 and the base member 40. Accordingly, it is possible to attach or detach the first operating member 444 to and from one of the base member 40 and the brake operating member 42 as necessary.

(4) As seen in FIG. 19, the first operating member 444 and the cable attachment structure 466 are detachably mounted to the one of the brake operating member 42 and the base member 40. Accordingly, it is possible to attach or detach the first operating member 444 and the cable attachment structure 466 to and from one of the base member 40 and the brake operating member 42 as necessary.

Fifth Embodiment

A bicycle seatpost apparatus 512 including a bicycle operating device 516 in accordance with a fifth embodiment will be described below referring to FIGS. 22 to 24. The bicycle seatpost apparatus 512 has the same structures as those of the bicycle seatpost apparatus 12 except for use of electrical components. Thus, elements having substantially the same function as those in the above embodiments will be numbered the same here, and will not be described and/or illustrated again in detail here for the sake of brevity.

Figure 22:
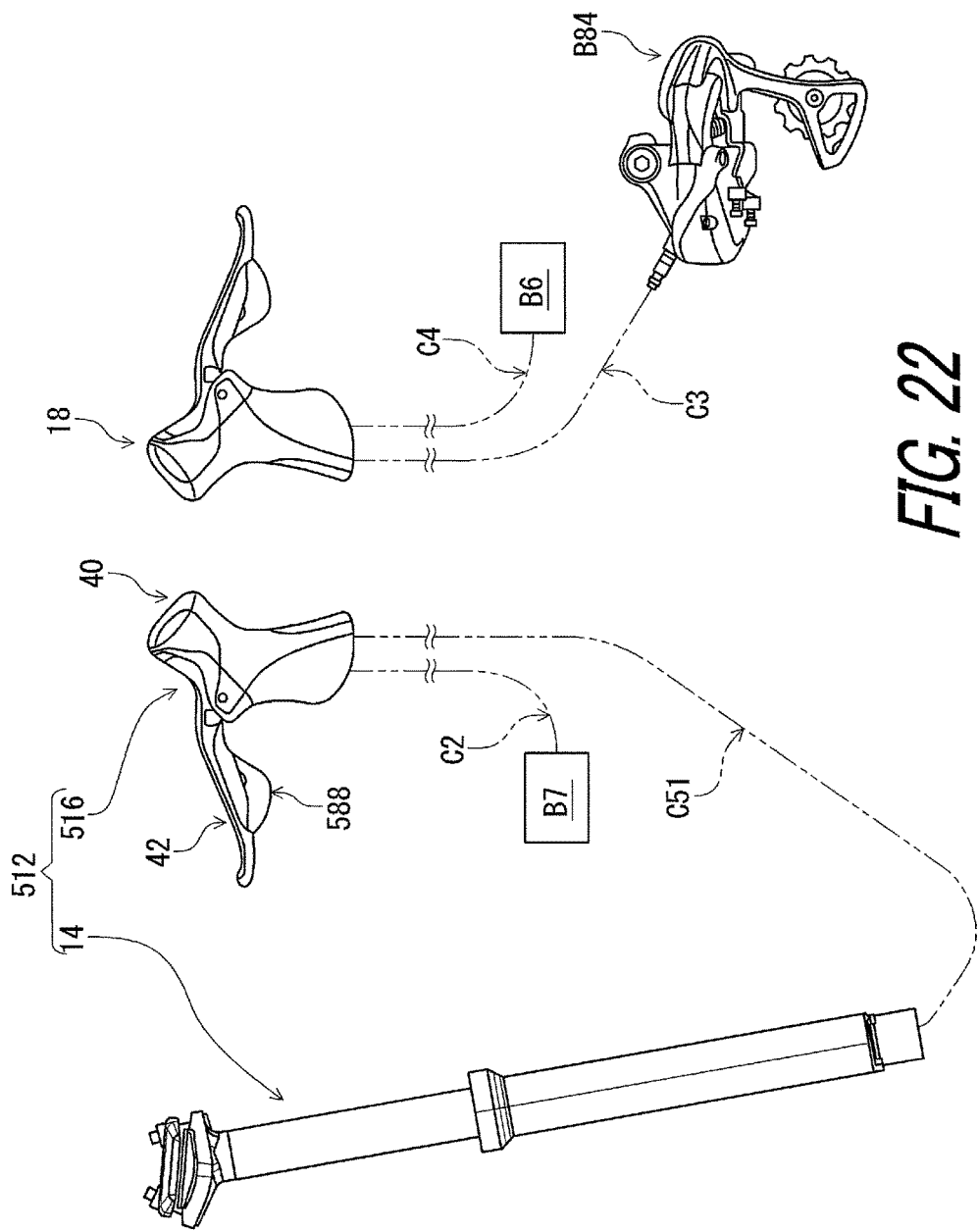
FIG. 22 is a schematic view of a bicycle seatpost apparatus in accordance with a fifth embodiment.

As seen in FIG. 22, the bicycle seatpost apparatus 512 comprises an adjustable seatpost assembly 514 and a bicycle operating device 516 to operate the adjustable seatpost assembly 514. The adjustable seatpost assembly 514 has an adjustable total length. The adjustable seatpost assembly 514 has substantially the same structure as that of the adjustable seatpost assembly 14 of the first embodiment. The bicycle operating device 516 has substantially the same structure as that of the bicycle operating device 16 of the first embodiment.

Figure 23:
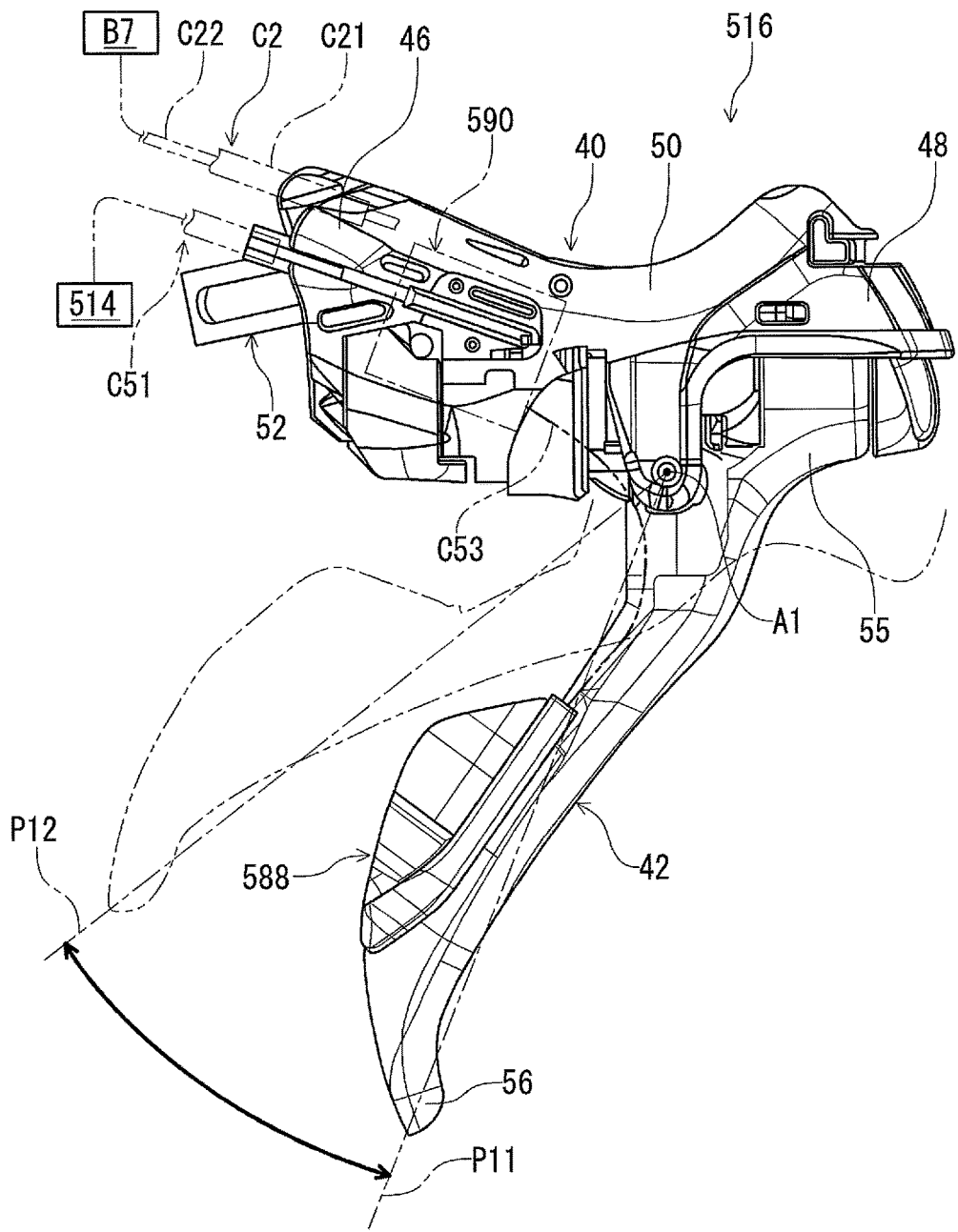
FIG. 23 is a side elevational view of a bicycle operating device of the bicycle seatpost apparatus illustrated in FIG. 22.

As seen in FIG. 23, unlike the bicycle operating device 16 of the first embodiment, the bicycle operating device 516 includes an electrical switch 588 to generate a control signal to operate the adjustable seatpost assembly 514. In this embodiment, the electrical switch 588 is mounted to the brake operating member 42. However, the electrical switch 588 can be mounted to the base member 40. The first operating member 44 is omitted from the bicycle operating device 516. However, the electrical switch 588 can be operated via another member such as the first operating member 44 of the first embodiment.

As seen in FIG. 23, the bicycle operating device 516 includes a signal controller 590 configured to transmit the control signal to the adjustable seatpost assembly 514. The electrical switch 588 is operatively connected to the signal controller 590 via an electric control cable C53. While the electrical switch 588 is electrically connected to the signal controller 590 via the electric control cable C53, the electrical switch 588 can be wirelessly connected to the signal controller 590 via wireless communication path without the electric control cable C53. The electrical switch 588 generates, as the control signal, an ON signal corresponding to a time period during the electrical switch 588 is operated by the user. The signal controller 590 is operatively connected to the adjustable seatpost assembly 514 via an electric control cable C51. The signal controller 590 transmits the ON signal to the adjustable seatpost assembly 514 using a power line communication (PLC) technology, for example. Since the configuration of the signal controller 590 and the PLC technology have been known in the bicycle field, they will not be described and/or illustrated in detail here for the sake of brevity.

Figure 24:
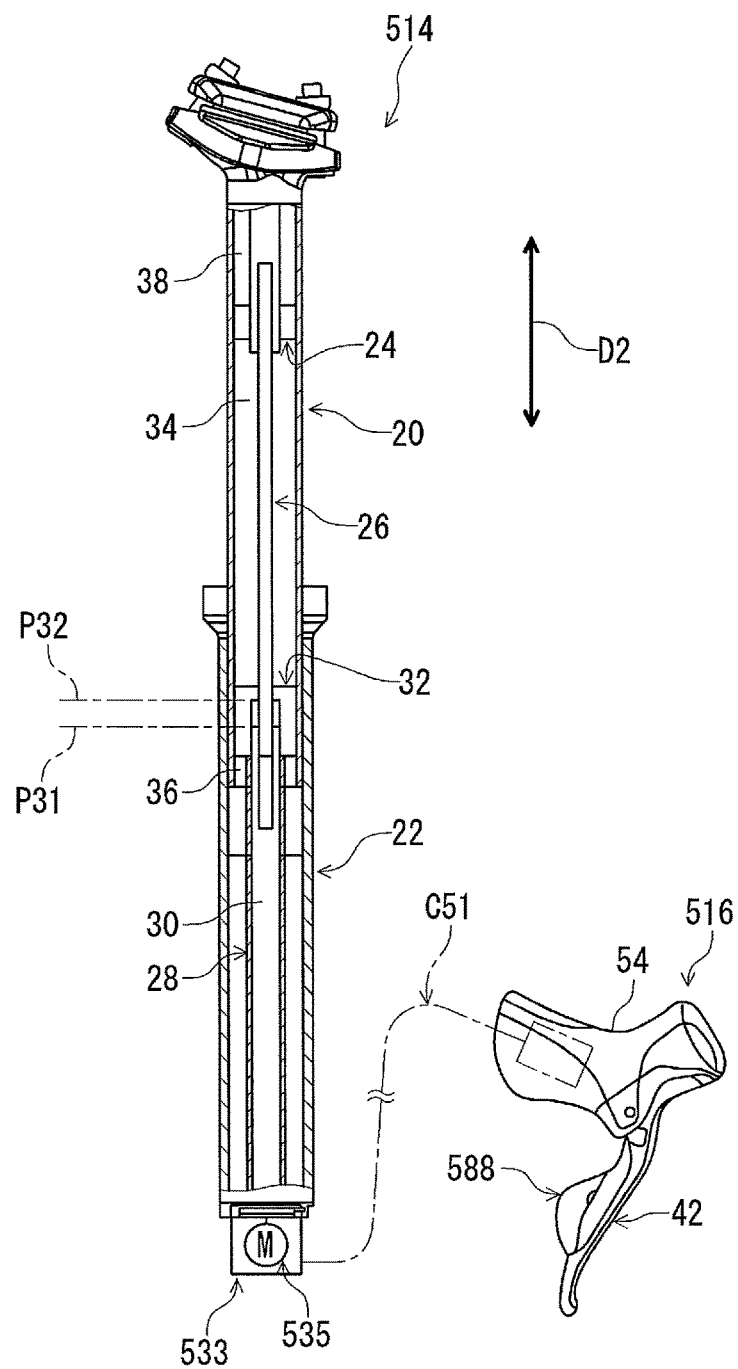
FIG. 24 is a schematic cross-sectional view of an adjustable seatpost assembly of the bicycle seatpost apparatus illustrated in FIG. 22, with the bicycle operating device.

As seen in FIG. 24, the adjustable seatpost assembly 514 includes an actuation structure 533. The actuation structure 533 is operatively connected to the signal controller 590 via the electric control cable C51. The actuation structure 533 includes an electric actuator 535 such as a motor. The electric actuator 535 is coupled to the flow control part 30. The actuation structure 533 moves the flow control part 30 relative to the second tube 22 in the telescopic direction D1 between the closed position P31 and the open position P32. The actuation structure 533 moves the flow control part 30 from the closed position P31 to the open position P32 in response to the control signal transmitted from the bicycle operating device 516. The actuation structure 533 keeps the flow control part 30 at the open position P32 while receiving the control signal from the bicycle operating device 516. The actuation structure 533 keeps the flow control part 30 at the closed position P31 when the actuation structure 533 does not receive the control signal from the bicycle operating device 516.

With the bicycle seatpost apparatus 512 and the bicycle operating device 516, it is possible to obtain substantially the same effects as those of the bicycle seatpost apparatus 12 and the bicycle operating device 16 of the first embodiment.

The bicycle seatpost apparatus 512 and the bicycle operating device 516 have the following feature instead of and/or in addition to the features of the bicycle seatpost apparatus 12 and the bicycle operating device 16 of the first embodiment.

(1) As seen in FIG. 24, the bicycle operating device 516 includes the electrical switch 588 to generate the control signal to operate the adjustable seatpost assembly 514. Accordingly, it is possible to operate the adjustable seatpost assembly 514 using the electrical switch 588. This can adapt the bicycle operating device 516 to the adjustable seatpost assembly 514 including an electrical component such as the electric actuator 535.

Sixth Embodiment

A bicycle seatpost apparatus 612 including a bicycle operating device 616 in accordance with a sixth embodiment will be described below referring to FIGS. 25 to 27. The bicycle seatpost apparatus 612 has the same structures as those of the bicycle seatpost apparatus 12 except for use of hydraulic components. Thus, elements having substantially the same function as those in the above embodiments will be numbered the same here, and will not be described and/or illustrated again in detail here for the sake of brevity.

Figure 25:
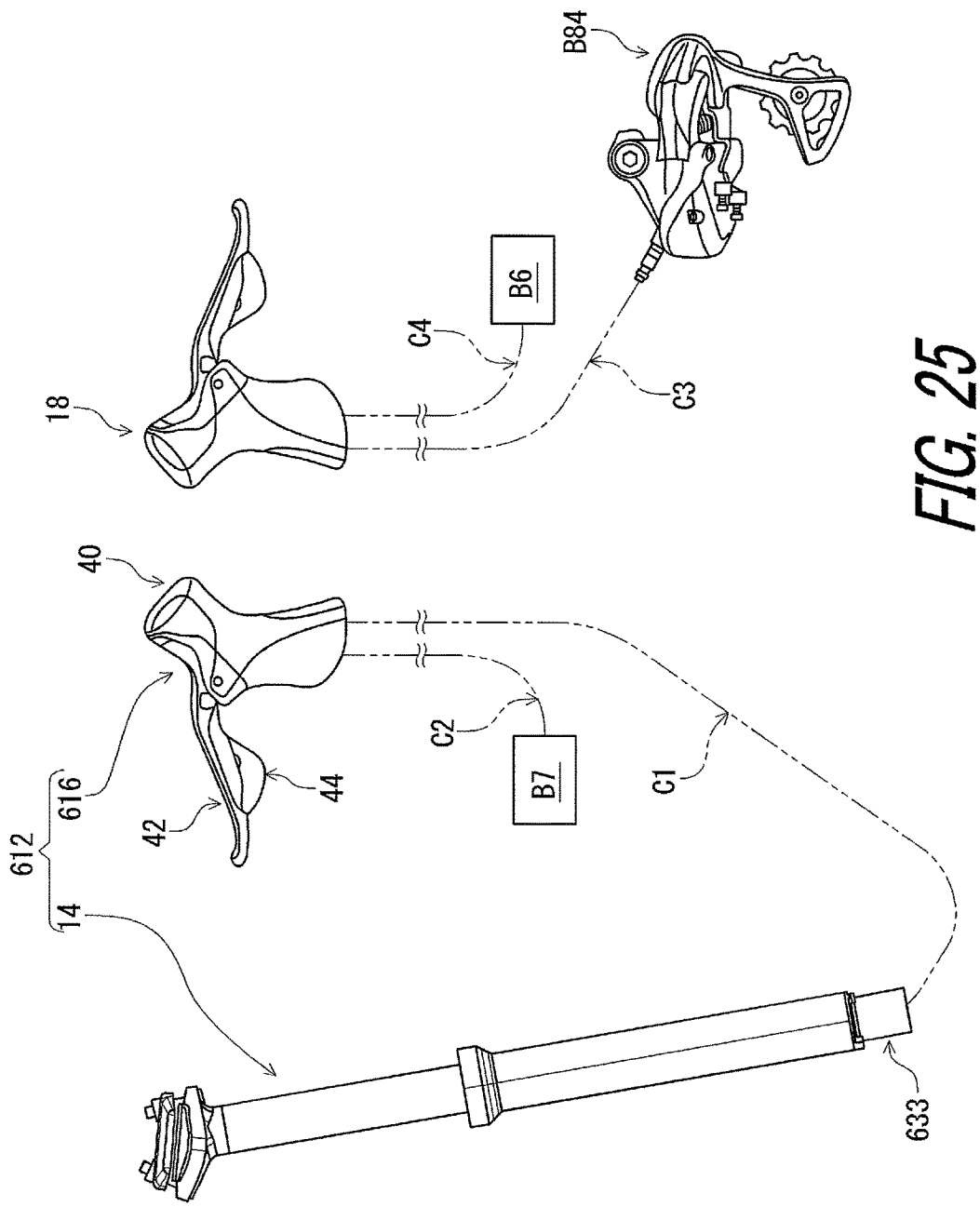
FIG. 25 is a schematic view of a bicycle seatpost apparatus in accordance with a sixth embodiment.

As seen in FIG. 25, the bicycle seatpost apparatus 612 comprises an adjustable seatpost assembly 614 and a bicycle operating device 616. The adjustable seatpost assembly 614 has an adjustable total length. The bicycle operating device 616 is to operate the adjustable seatpost assembly 614. The adjustable seatpost assembly 614 has substantially the same structure as that of the adjustable seatpost assembly 14 of the first embodiment. The bicycle operating device 616 has substantially the same structure as that of the bicycle operating device 16 of the first embodiment.

Figure 26:
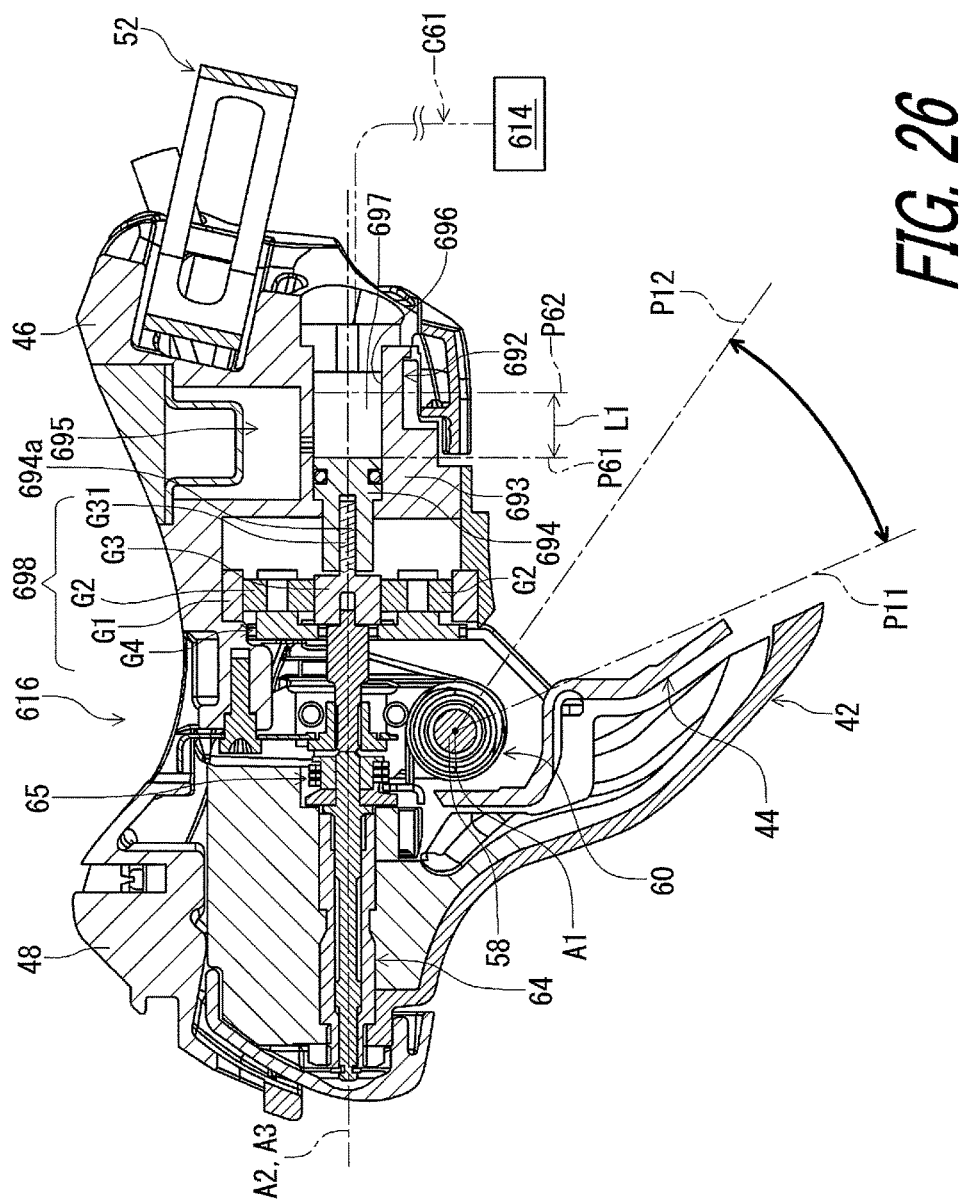
FIG. 26 is a cross-sectional view of a bicycle operating device of the bicycle seatpost apparatus illustrated in FIG. 25.

As seen in FIG. 26, unlike the bicycle operating device 16 of the first embodiment, the bicycle operating device 616 includes a hydraulic operating unit 692 to supply a hydraulic pressure to the adjustable seatpost assembly 614. The hydraulic operating unit 692 includes a hydraulic cylinder 693, a piston 694, and a reservoir 695. The hydraulic cylinder 693 is provided in the base member 40 and includes a cylinder bore 696. The piston 694 is movably provided in the cylinder bore 696 between an initial position P61 and an actuated position P62. The piston 694 is movable relative to the hydraulic cylinder 693 without rotating relative to the hydraulic cylinder 693. The hydraulic cylinder 693 and the piston 694 define a cylinder chamber 697. The reservoir 695 is connected to the cylinder chamber 697. The cylinder chamber 697 is connected to the adjustable seatpost assembly 614 via a hydraulic hose C61.

The bicycle operating device 616 includes a gear structure 698 convert the pivotal motion of the first operating member 44 to the linear motion of the piston 694. The gear structure 698 includes a ring gear G1, planetary gears G2, a sun gear G3, and a carrier G4. The planetary gears G2 are provided between the ring gear G1 and the sun gear G3. The carrier G4 couples the planetary gears G2 to revolve about the sun gear G3. The pivotal motion of the first operating member 44 is transmitted to the carrier G4. The gear structure 698 increases an output rotational angle of the sun gear G3 compared with an input rotational angle of the first operating member 44. The sun gear G3 includes a thread bolt G31. The piston 694 includes a threaded hole 694a engaged with the thread bolt G31. The carrier G4 is biased by a carrier biasing element (not shown) to rotate the sun gear G3 so that the piston 694 moves toward the initial position P61.

Figure 27:
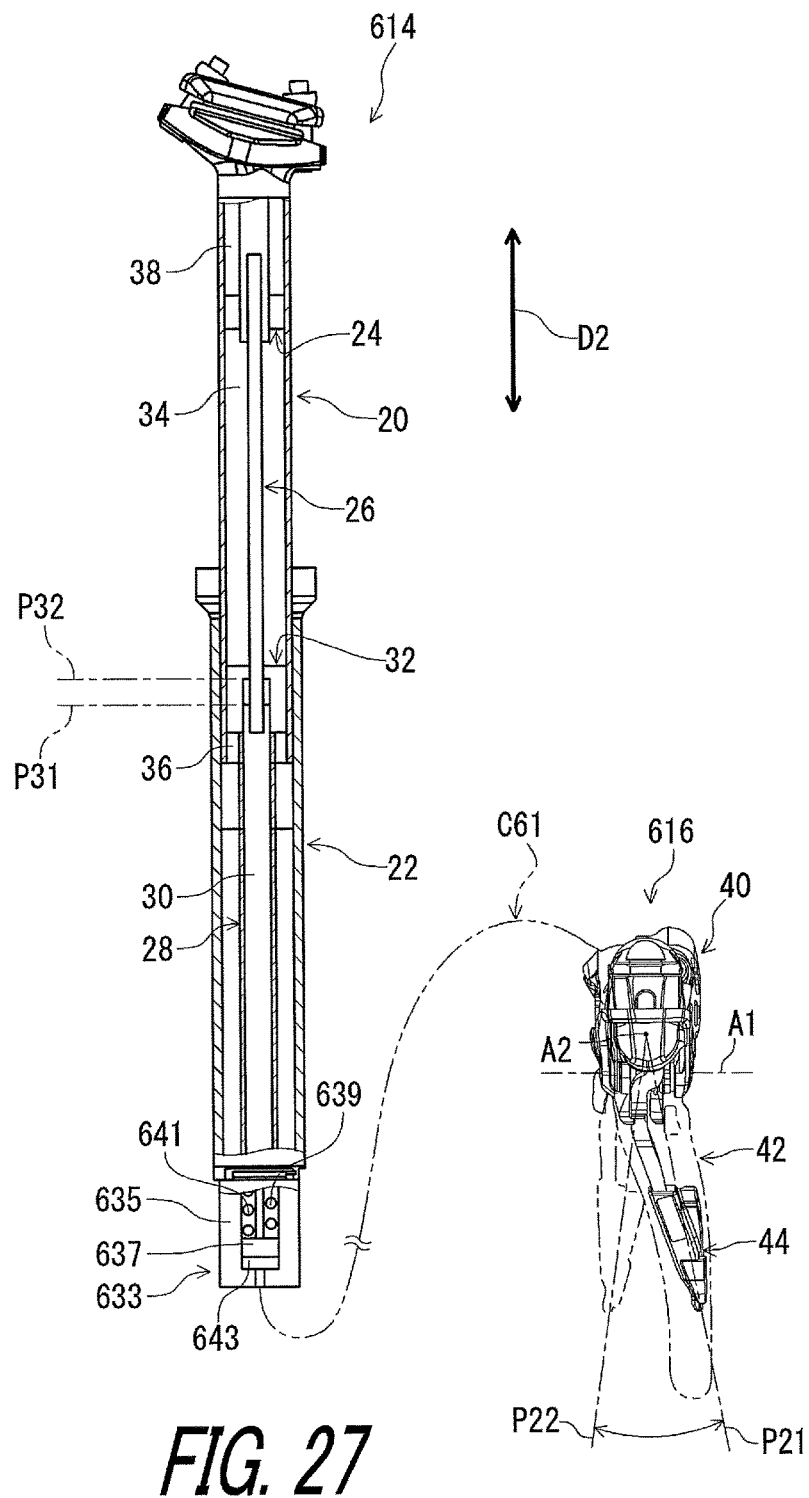
FIG. 27 is a schematic cross-sectional view of an adjustable seatpost assembly of the bicycle seatpost apparatus illustrated in FIG. 25, with the bicycle operating device.

The piston 694 is moved from the initial position P61 to the actuated position P62 when the first operating member 44 is pivoted relative to the base member 40 from the first rest position P21 to the first operated position P22 (FIG. 27). This supplies the hydraulic pressure from the hydraulic operating unit 692 to the adjustable seatpost assembly 614. The piston 694 is returned from the actuated position P62 to the initial position P61 when the first operating member 44 is returned relative to the base member 40 from the first operated position P22 to the first rest position P21 (FIG. 27).

As seen in FIG. 27, the adjustable seatpost assembly 614 includes an actuation structure 633. The actuation structure 633 is connected to the hydraulic operating unit 692 via the hydraulic hose C61. The actuation structure 633 includes a slave cylinder 635, a slave piston 637, and a slave biasing element 639. The slave cylinder 635 includes a cylinder bore 641. The slave piston 637 is movably provided in the cylinder bore 641. The slave piston 637 is coupled to the flow control part 30. The slave biasing element 639 biases the slave piston 637 so that the flow control part 30 moves toward the closed position P31. The slave cylinder 635 and the slave piston 637 define a cylinder chamber 643. The cylinder chamber 643 is connected to the cylinder chamber 697 of the hydraulic operating unit 692 via the hydraulic hose C61.

The flow control part 30 is moved from the closed position P31 to the open position P32 when the first operating member 44 is pivoted from the first rest position P21 to the first operated position P22. The flow control part 30 is returned from the open position P32 to the closed position P31 when the first operating member 44 is pivoted from the first operated position P22 to the first rest position P21.

With the bicycle seatpost apparatus 612 and the bicycle operating device 616, it is possible to obtain substantially the same effects as those of the bicycle seatpost apparatus 12 and the bicycle operating device 16 of the first embodiment.

The bicycle seatpost apparatus 612 and the bicycle operating device 616 have the following feature instead of and/or in addition to the features of the bicycle seatpost apparatus 12 and the bicycle operating device 16 of the first embodiment.

(1) As seen in FIG. 26, the bicycle operating device 616 includes the hydraulic operating unit 692 to supply the hydraulic pressure to the adjustable seatpost assembly 614. Accordingly, it is possible to operate the adjustable seatpost assembly 614 using the hydraulic operating unit 692. This can adapt the bicycle operating device 616 to the adjustable seatpost assembly 614 including a hydraulic component such as the actuation structure 633.

Seventh Embodiment

A bicycle seatpost apparatus 712 including a bicycle operating device 716 in accordance with a seventh embodiment will be described below referring to FIGS. 28 and 29. The bicycle seatpost apparatus 712 has the same structures as those of the bicycle seatpost apparatus 12 except for the operating member. Thus, elements having substantially the same function as those in the above embodiments will be numbered the same here, and will not be described and/or illustrated again in detail here for the sake of brevity.

Figure 28:
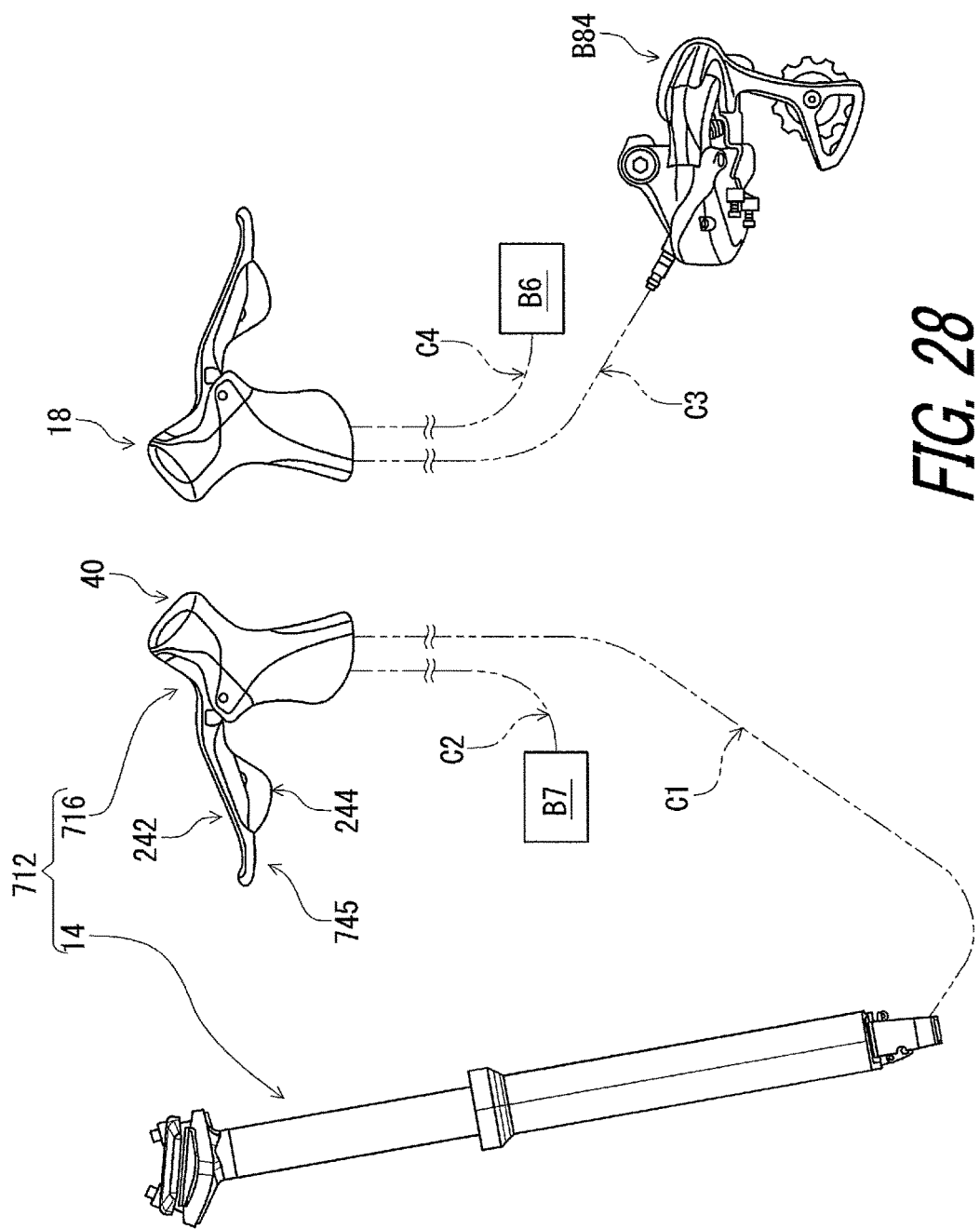
FIG. 28 is a schematic view of a bicycle seatpost apparatus in accordance with a seventh embodiment.

As seen in FIG. 28, in the bicycle seatpost apparatus 712, the bicycle operating device 716 comprises the base member 40 and an operating member 745. The operating member 745 has substantially the same structure as that of the operating member 245 of the second embodiment. The operating member 745 is movably coupled to the base member 40 to operate the brake device B7 and the additional bicycle component 14. The operating member 745 is coupled to the base member 40 movably between a rest position P711 and an operated position P712 to operate the additional bicycle component 14 via the first mechanical control cable C1. The operating member 745 is movable relative to the base member 40 between the rest position P711 and the operated position P712 without mechanically positioning the first mechanical control cable C1 relative to the base member 40 between the rest position P711 and the operated position P712. Specifically, the operating member 745 is movable relative to the base member 40 between the rest position P711 and the operated position P712 without mechanically positioning the first mechanical control cable C1 relative to the base member 40 during a movement of the operating member 745 occurring between the rest position P711 and the operated position P712.

Figure 29:
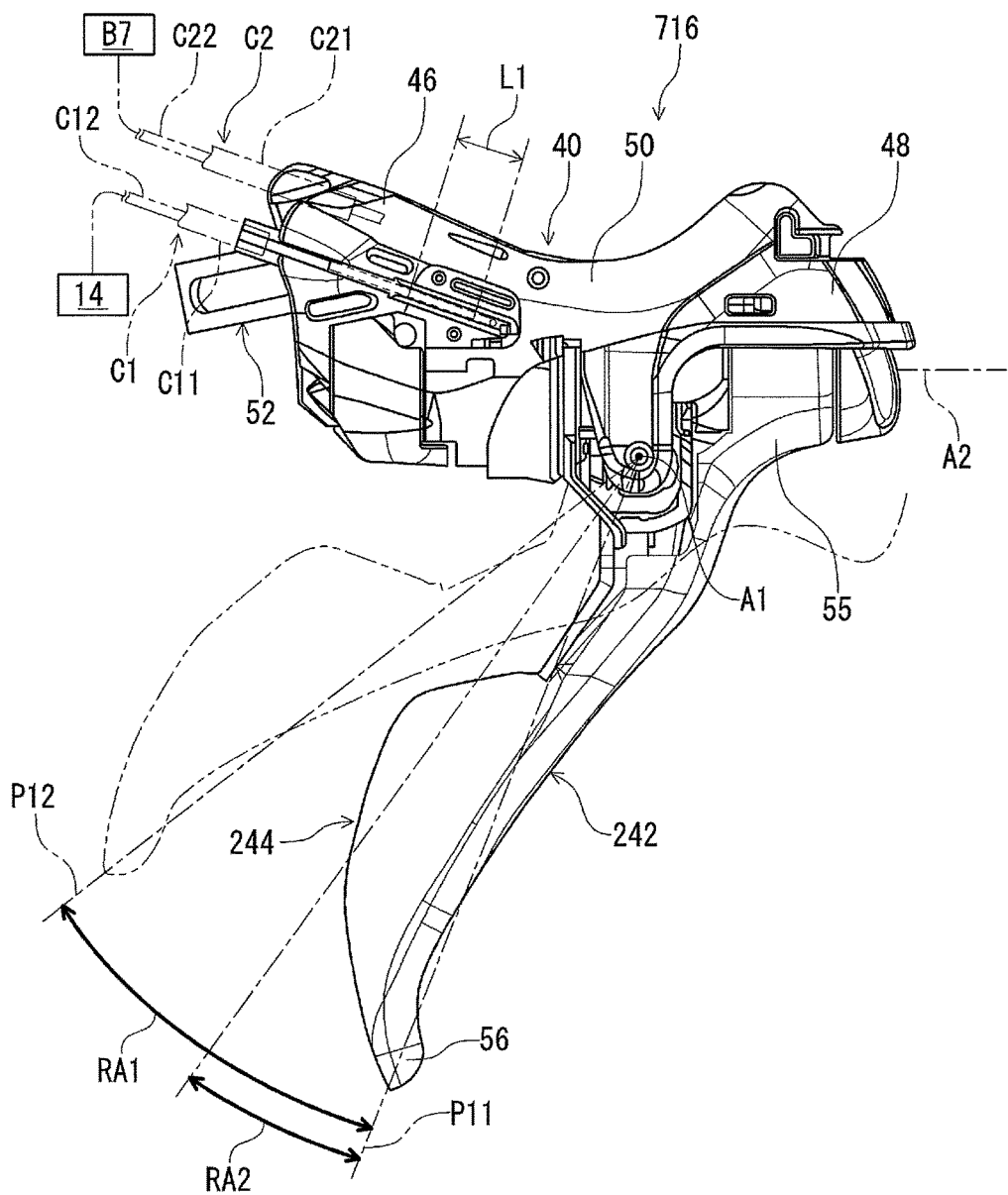
FIG. 29 is a side elevational view of a bicycle operating device of the bicycle seatpost apparatus illustrated in FIG. 28.

As seen in FIG. 29, unlike the operating member 245 of the second embodiment, the first pivot axis A2 coincides with the brake pivot axis A1. Specifically, the operating member 745 is coupled to the base member 40 pivotally about a pivot axis A71 to operate the brake device B7 and the additional bicycle component 14.

The operating member 745 is coupled to the base member 40 pivotally about the pivot axis A71 to operate the brake device B7 in a case where the operating member 745 rotates about the pivot axis A71 by a first rotational angle RA1. The operating member 745 is coupled to the base member 40 pivotally about the pivot axis A71 to operate the additional bicycle component 14 in a case where the operating member 745 rotates about the pivot axis A71 by a second rotational angle RA2 that is different from the first rotational angle RA1. In the illustrated embodiment, the second rotational angle RA2 is smaller than the first rotational angle RA1. However, the second rotational angle RA2 can be larger than the first rotational angle RA1.

The first rotational angle RA1 and the second rotational angle RA2 are defined from the rest position P711. The first rotational angle RA1 is defined from the rest position P711 to the operated position P712. The second rotational angle RA2 is defined from the rest position P711 to an intermediate position P713 defined between the rest position P711 and the operated position P712. An amount of movement of the inner wire C12 corresponding to the second rotational angle RA2 is smaller than an amount of movement of the inner wire C12 corresponding to the first rotational angle RA1. The bicycle operating device 716 can include a detent structure to inform the user of the intermediate position P713 of the operating member 745.

The operating member 745 is rotatable from the rest position P711 to the intermediate position P713 without another operated position defined between the rest position P711 and the operated position P712 by the cable displacement amount L1 that is larger than 12 mm. When the operating member 745 rotates relative to the base member 40 from the rest position P711 to the intermediate position P713, the inner wire C12 of the first mechanical control cable C1 moves relative to the base member 40 by the cable displacement amount L1.

With the bicycle seatpost apparatus 712 and the bicycle operating device 716, it is possible to obtain substantially the same effects as those of the bicycle seatpost apparatus 12 and the bicycle operating device 16 of the first embodiment.

The bicycle seatpost apparatus 712 and the bicycle operating device 716 have the following feature instead of and/or in addition to the features of the bicycle seatpost apparatus 12 and the bicycle operating device 16 of the first embodiment.

(1) As seen in FIG. 29, the operating member 745 is coupled to the base member 40 pivotally about the pivot axis A71 to operate the brake device B7 in a case where the operating member 745 rotates about the pivot axis A71 by the first rotational angle RA1. The operating member 745 is coupled to the base member 40 pivotally about the pivot axis A71 to operate the additional bicycle component 14 in a case where the operating member 745 rotates about the pivot axis A71 by the second rotational angle RA2 that is different from the first rotational angle RA1. Accordingly, it is possible to simplify the structure of the bicycle operating device 716.

Eighth Embodiment

A bicycle seatpost apparatus 812 including a bicycle operating device 816 in accordance with an eighth embodiment will be described below referring to FIGS. 30 to 34. The bicycle seatpost apparatus 812 has the same structures as those of the bicycle seatpost apparatus 12 except for the seatpost operating member. Thus, elements having substantially the same function as those in the above embodiments will be numbered the same here, and will not be described and/or illustrated again in detail here for the sake of brevity.

Figure 30:
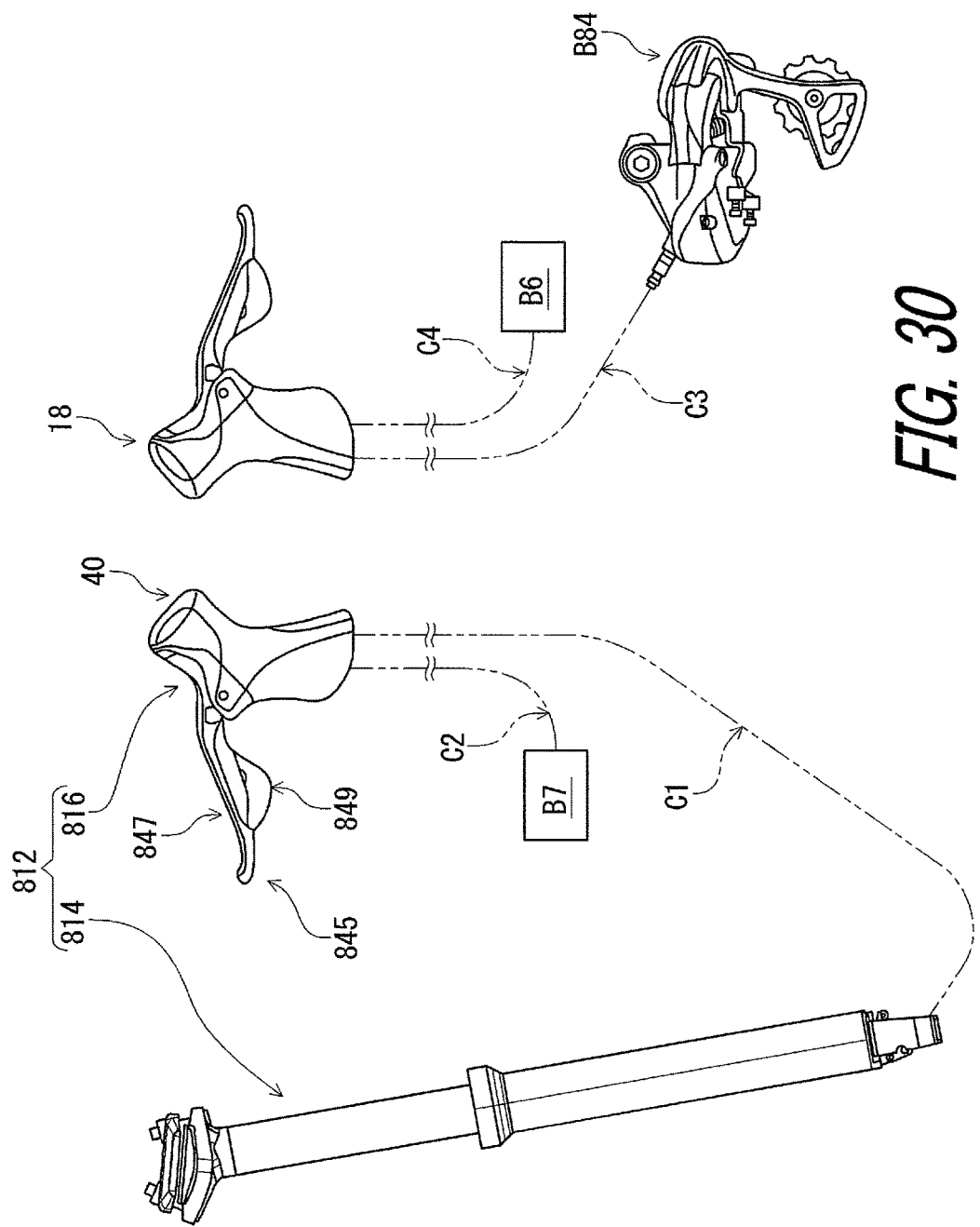
FIG. 30 is a schematic view of a bicycle seatpost apparatus in accordance with an eighth embodiment.

As seen in FIG. 30, the bicycle seatpost apparatus 812 comprises an adjustable seatpost assembly 814 and the bicycle operating device 816 to operate the adjustable seatpost assembly 814. The adjustable seatpost assembly 814 has an adjustable total length. The bicycle operating device 816 comprises the base member 40 and a seatpost operating member 845. The seatpost operating member 845 is movably coupled to the base member 40 to operate the adjustable seatpost assembly 814 via the first mechanical control cable C1.

In the illustrated embodiment, the seatpost operating member 845 includes a first seatpost operating member 847 and a second seatpost operating member 849. The first seatpost operating member 847 has substantially the same structure as that of the seatpost operating member 245 of the second embodiment. The second seatpost operating member 849 has substantially the same structure as that of the first operating member 44 of the first embodiment.

Figure 31:
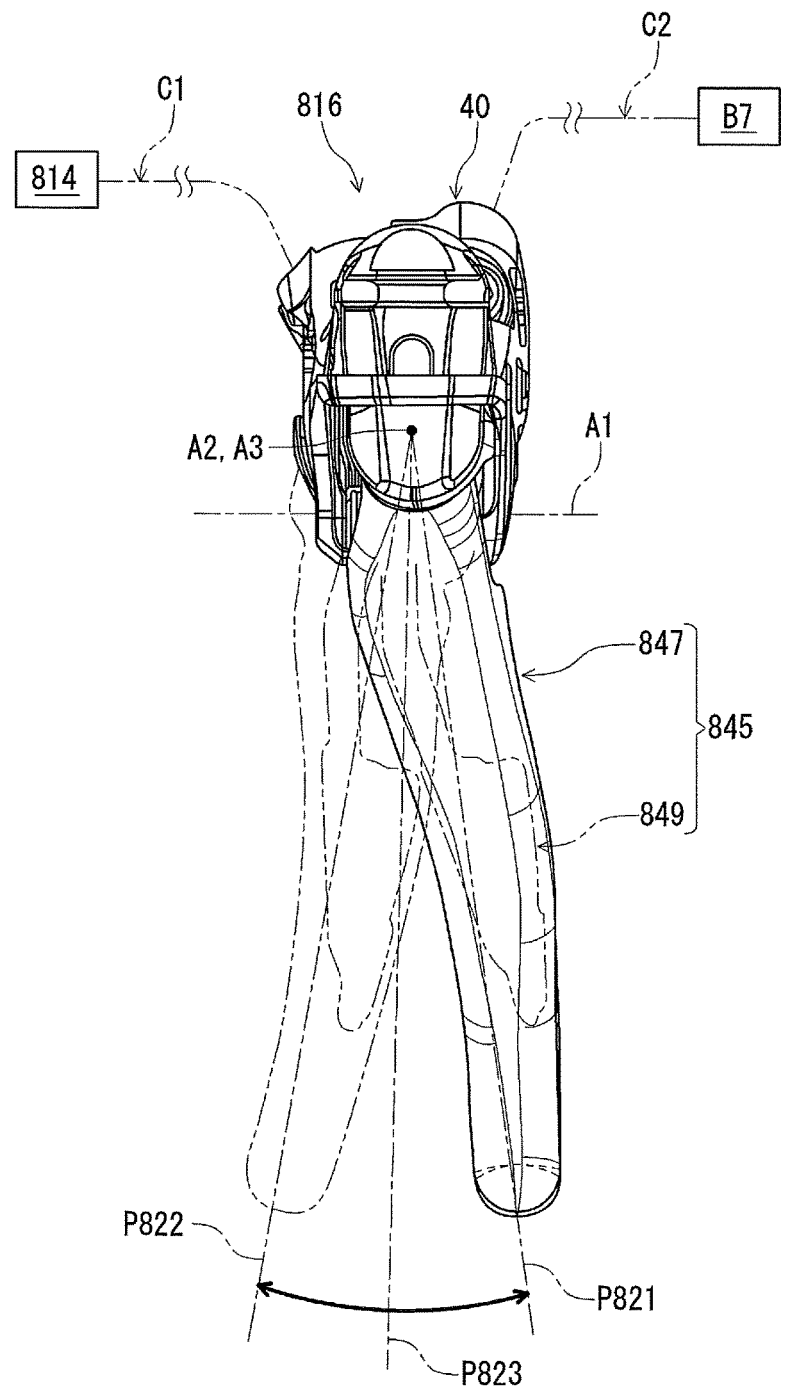
FIG. 31 is a front view of a bicycle operating device of the bicycle seatpost apparatus illustrated in FIG. 30.

As seen in FIG. 31, the first seatpost operating member 847 is coupled to the base member 40 movably between a first seatpost rest position P821 and a first seatpost operated position P822 through a first additional operated position P823 to operate the adjustable seatpost assembly 814 via the first mechanical control cable C1.

Figure 32:
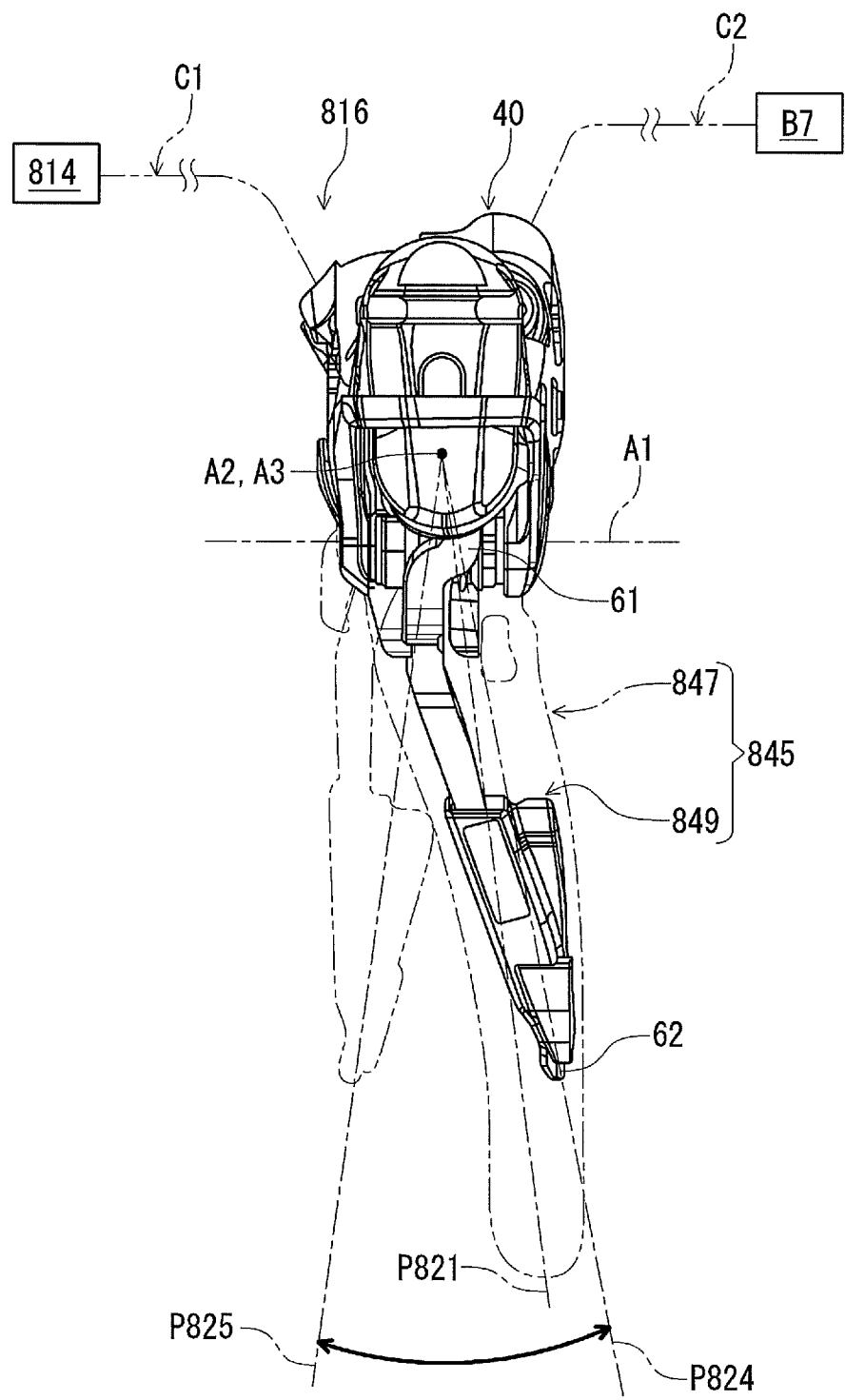
FIG. 32 is a front view of the bicycle operating device of the bicycle seatpost apparatus illustrated in FIG. 30, with a first seatpost operating member omitted.

As seen in FIG. 32, the second seatpost operating member 849 is coupled to the base member 40 movably between a second seatpost rest position P824 and a second seatpost operated position P825 to operate the adjustable seatpost assembly 814 via the first mechanical control cable C1.

Figure 33:
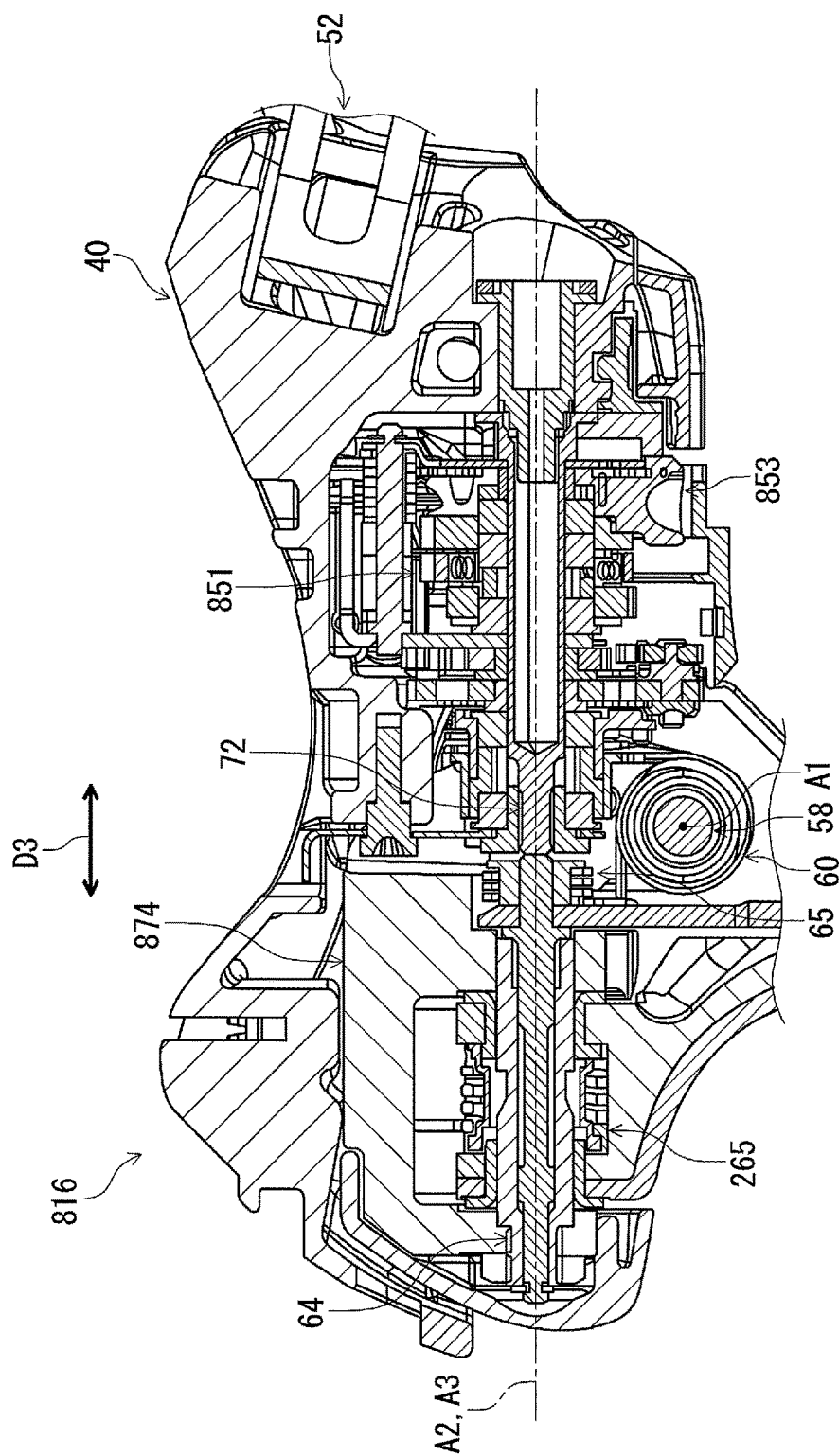
FIG. 33 is a cross-sectional view of the bicycle operating device of the bicycle seatpost apparatus illustrated in FIG. 30.

As seen in FIG. 33, the bicycle operating device 816 includes the coupling member 274 of the second embodiment. The coupling member 274 is pivotally coupled to the base member 40 by the first shaft 58. The first seatpost operating member 847 is pivotally coupled to the coupling member 874 by the second shaft 64. The second seatpost operating member 849 is pivotally coupled to the first seatpost operating member 847 and the coupling member 274 by the second shaft 64.

The first biasing member 265 (the second biasing member 265 of the second embodiment) biases the first seatpost operating member 847 toward the first seatpost rest position P821 (FIG. 31). The second biasing member 65 biases the second seatpost operating member 849 toward the second seatpost rest position P824 (FIG. 32). The first seatpost operating member 847 is positioned at the first seatpost rest position P821 by the base member 40. The second seatpost operating member 849 is positioned at the second seatpost rest position P824 by the first seatpost operating member 847.

As seen in FIG. 33, the bicycle operating device 816 includes a cable control structure 851. The first seatpost operating member 847 and the second seatpost operating member 849 are coupled to the cable control structure 851. The cable control structure 851 is mounted to the base member 40 via the third shaft 72. The cable control structure 851 includes an attachment member 853 rotatably coupled to the base member 40 via the third shaft 72. The end of the inner wire C12 is coupled to the attachment member 853.

Figure 34:
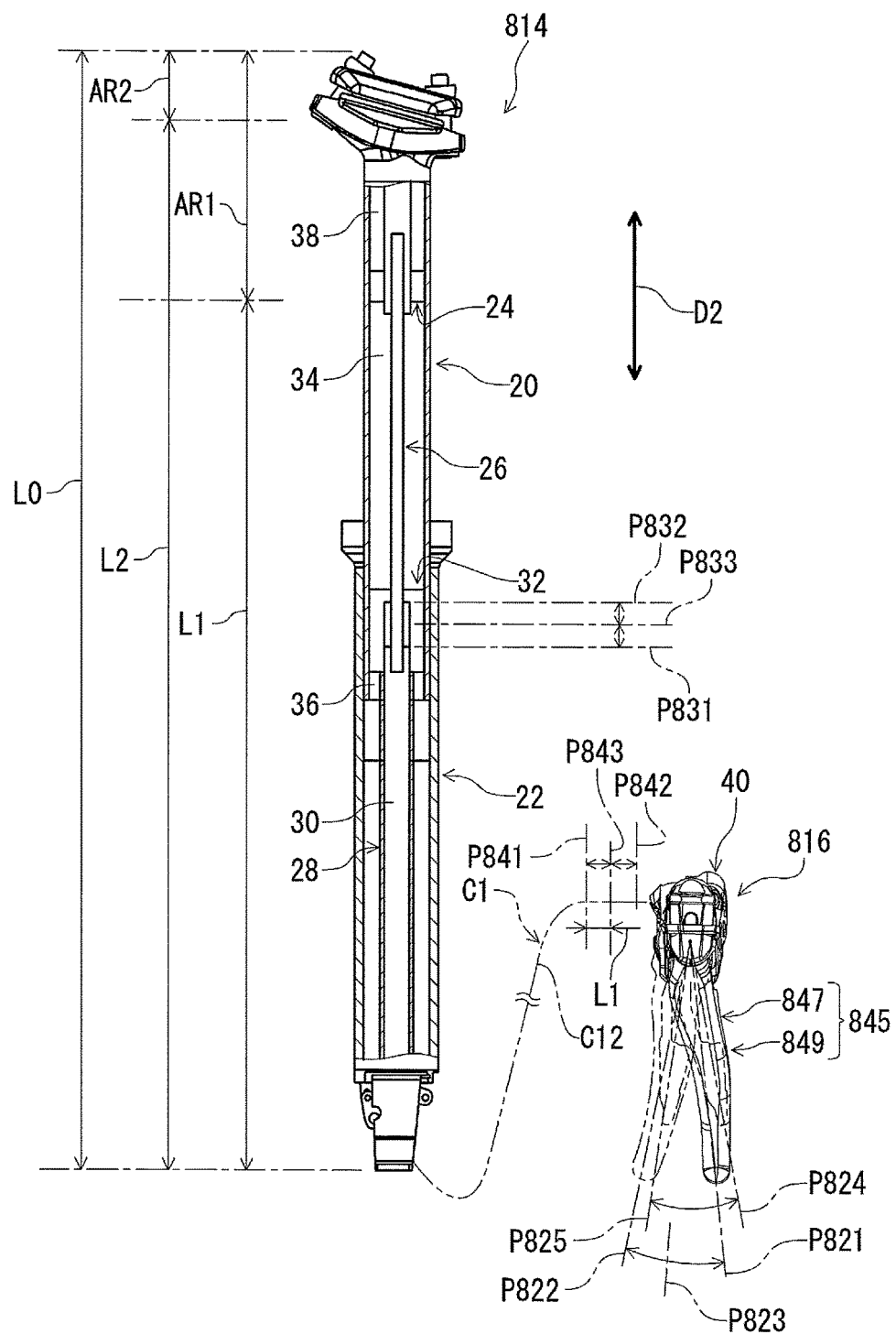
FIG. 34 is a schematic cross-sectional view of an adjustable seatpost assembly of the bicycle seatpost apparatus illustrated in FIG. 30, with the bicycle operating device.

As seen in FIG. 34, the cable control structure 851 positions the inner wire C12 of the first mechanical control cable C1 relative to the base member 40 at each of an initial position P841, a first pulled position P842, and a second pulled position P843. Since structures of the cable control structure 851 have been known in the bicycle field, they will not be described and/or illustrated in detail here for the sake of brevity.

The flow control part 30 has a closed position P831, a first open position P832, and a second open position P833. The second open position P833 is defined between the closed position P831 and the first open position P832. The valve unit 32 is closed when the flow control part 30 is positioned at the closed position P831. The valve unit 32 is open when the flow control part 30 is positioned at each of the first open position P832 and the second open position P833.

The adjustable seatpost assembly 814 has a maximum overall length L0 and a minimum overall length L1. The overall length of the adjustable seatpost assembly 814 is adjustable within a first adjustable range AR1 defined as a difference between the maximum overall length L0 and the minimum overall length L1. Unlike the adjustable seatpost assembly of the above embodiments, the adjustable seatpost assembly 814 has an intermediate overall length L2. The intermediate overall length L2 is defined between the maximum overall length L0 and the minimum overall length L1.

In this embodiment, the adjustable seatpost assembly 814 has a locked state, a first adjustable state, and a second adjustable state. In the locked state, the flow control part 30 is positioned at the closed position P831. In the locked state, the overall length of the adjustable seatpost assembly 814 is maintained at an adjusted overall length.

In the first adjustable state, the flow control part 30 is positioned at the first open position P832. The inner wire C12 is pulled from the initial position P841 to the first pulled position P842 through the second pulled position P843 when the first seatpost operating member 847 is pivoted relative to the base member 40 from the first seatpost rest position P821 to the first seatpost operated position P822 through the first additional operated position P823 (FIG. 31). This switches the state of the adjustable seatpost assembly 814 from the locked state to the first adjustable state. The cable control structure 851 positions the inner wire C12 at the first pulled position P842 relative to the base member 40 even when the first seatpost operating member 847 is returned to the first seatpost rest position P821 (FIG. 31).

In the first adjustable state, the overall length of the adjustable seatpost assembly 814 is continuously adjustable within the first adjustable range AR1 by moving the flow control part 30 from the closed position P831 to the first open position P832. The cable control structure 851 releases the inner wire C12 from the first pulled position P842 when the second seatpost operating member 849 is pivoted relative to the base member 40 from the second seatpost rest position P824 to the second seatpost operated position P825 (FIG. 32). This switches the state of the adjustable seatpost assembly 814 from the first adjustable state to the locked state.

In the second adjustable state, the flow control part 30 is positioned at the second open position P833. The inner wire C12 is pulled from the initial position P841 to the second pulled position P843 when the first seatpost operating member 847 is pivoted relative to the base member 40 from the first seatpost rest position P821 to the first additional operated position P823 (FIG. 31). This switches the state of the adjustable seatpost assembly 814 from the locked state to the second adjustable state. The cable control structure 851 positions the inner wire C12 at the second pulled position P843 relative to the base member 40 even when the first seatpost operating member 847 is returned to the first seatpost rest position P821 (FIG. 31).

In the second adjustable state, the overall length of the adjustable seatpost assembly 814 is adjustable to the intermediate overall length L2 by moving the flow control part 30 from the closed position P831 to the second open position P833. More specifically, in the second adjustable state, the second tube 22 stops relative to the first tube 20 at a position corresponding to the intermediate overall length L2 when the second tube 22 downwardly moves relative to the first tube 20 from a position corresponding to the maximum overall length L0. The cable control structure 851 releases the inner wire C12 from the second pulled position P843 (FIG. 33) when the second seatpost operating member 849 is pivoted relative to the base member 40 from the second seatpost rest position P824 to the second seatpost operated position P825 (FIG. 32).

The first seatpost operating member 847 is rotatable from the first seatpost rest position P821 to the first additional operated position P823 without another operated position defined between the first seatpost rest position P821 and the first additional operated position P823 by the cable displacement amount L1 that is larger than 12 mm. When the first seatpost operating member 847 rotates relative to the base member 40 from the first seatpost rest position P821 to the first additional operated position P823, the inner wire C12 of the first mechanical control cable C1 moves relative to the base member 40 by the cable displacement amount L1. Namely, the cable displacement amount L1 is defined from the initial position P841 to the second pulled position P843.

Since structures of the adjustable seatpost assembly 814 have been known in the bicycle field, they will not be described and/or illustrated in detail here for the sake of brevity.

With the bicycle seatpost apparatus 812 and the bicycle operating device 816, it is possible to obtain substantially the same effects as those of the bicycle seatpost apparatus 12 and the bicycle operating device 16 of the first embodiment.

The bicycle seatpost apparatus 812 and the bicycle operating device 816 have the following feature instead of and/or in addition to the features of the bicycle seatpost apparatus 12 and the bicycle operating device 16 of the first embodiment.

Furthermore, as seen in FIG. 34, the bicycle operating device 816 includes the seatpost operating member 845 movably coupled to the base member 40 to operate the adjustable seatpost assembly 814 via the first mechanical control cable C1. Accordingly, it is possible to operate the adjustable seatpost assembly 814 using the seatpost operating member 845. This can improve operability of the bicycle operating device 816 to operate the adjustable seatpost assembly 814.

Ninth Embodiment

A bicycle seatpost apparatus 912 including a bicycle operating device 916 in accordance with a ninth embodiment will be described below referring to FIGS. 35 to 64. The bicycle seatpost apparatus 912 has the same structures as those of the bicycle seatpost apparatus 12 except for the bicycle operating device 16. Thus, elements having substantially the same function as those in the above embodiments will be numbered the same here, and will not be described and/or illustrated again in detail here for the sake of brevity.

Figure 35:
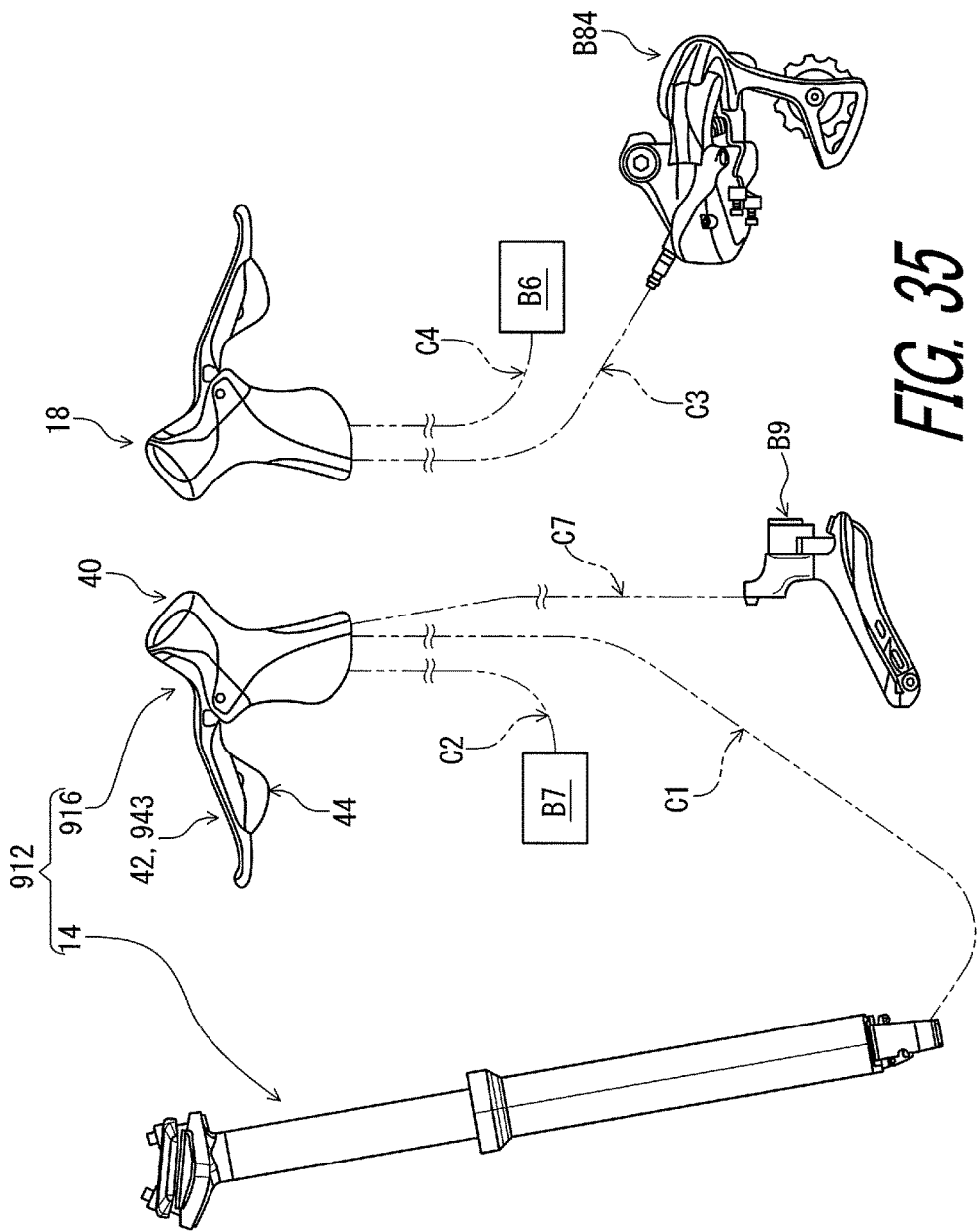
FIG. 35 is a schematic view of a bicycle seatpost apparatus in accordance with a ninth embodiment.

As seen in FIGS. 35 and 36, the bicycle operating device 916 has substantially the same structure as that of the bicycle operating device 16 of the first embodiment. Unlike the bicycle operating device 16 of the first embodiment, however, the bicycle operating device 916 further comprises a second operating member 943 movably coupled to the base member 40. One of the first operating member and the second operating member 943 is integrally provided with the brake operating member 42 as a one-piece unitary member. In this embodiment, the second operating member 943 is integrally provided with the brake operating member 42 as a one-piece unitary member. The second operating member 943 is a separate member from the first operating member 44 and is movable relative to the first operating member 44. However, the first operating member 44 can be integrally provided with the brake operating member 42 as a one-piece unitary member instead of the second operating member 943. The second operating member 943 can be a separate member from each of the brake operating member 42 and the first operating member 44. In this embodiment, a front derailleur B9 is operated via the second operating member 943. Other bicycle components can be operated via the second operating member 943.

Figure 37:
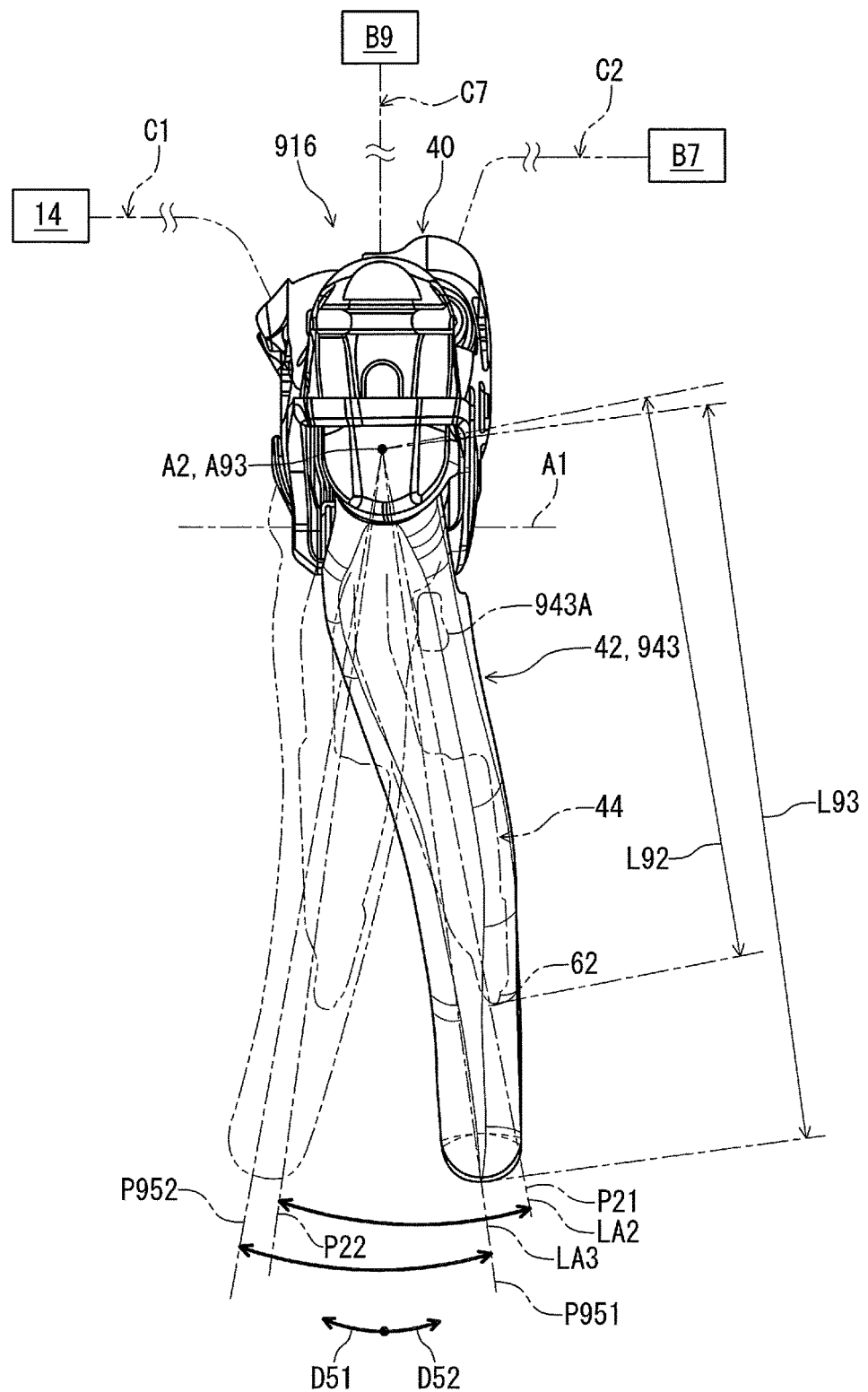
FIG. 37 is a front view of the bicycle operating device of the bicycle seatpost apparatus illustrated in FIG. 35.

As seen in FIG. 37, the second operating member 943 is coupled to the base member 40 pivotally about a second pivot axis A93 which is non-parallel to the brake pivot axis A1. In this embodiment, the second pivot axis A93 coincides with the first pivot axis A2 of the first operating member 44. However, the second pivot axis A93 can be offset from the first pivot axis A2. The brake operating member 42 and the second operating member 943 are pivotable relative to the base member 40 about the second pivot axis A93 between a second rest position P951 and a second operated position P952.

Figure 38:
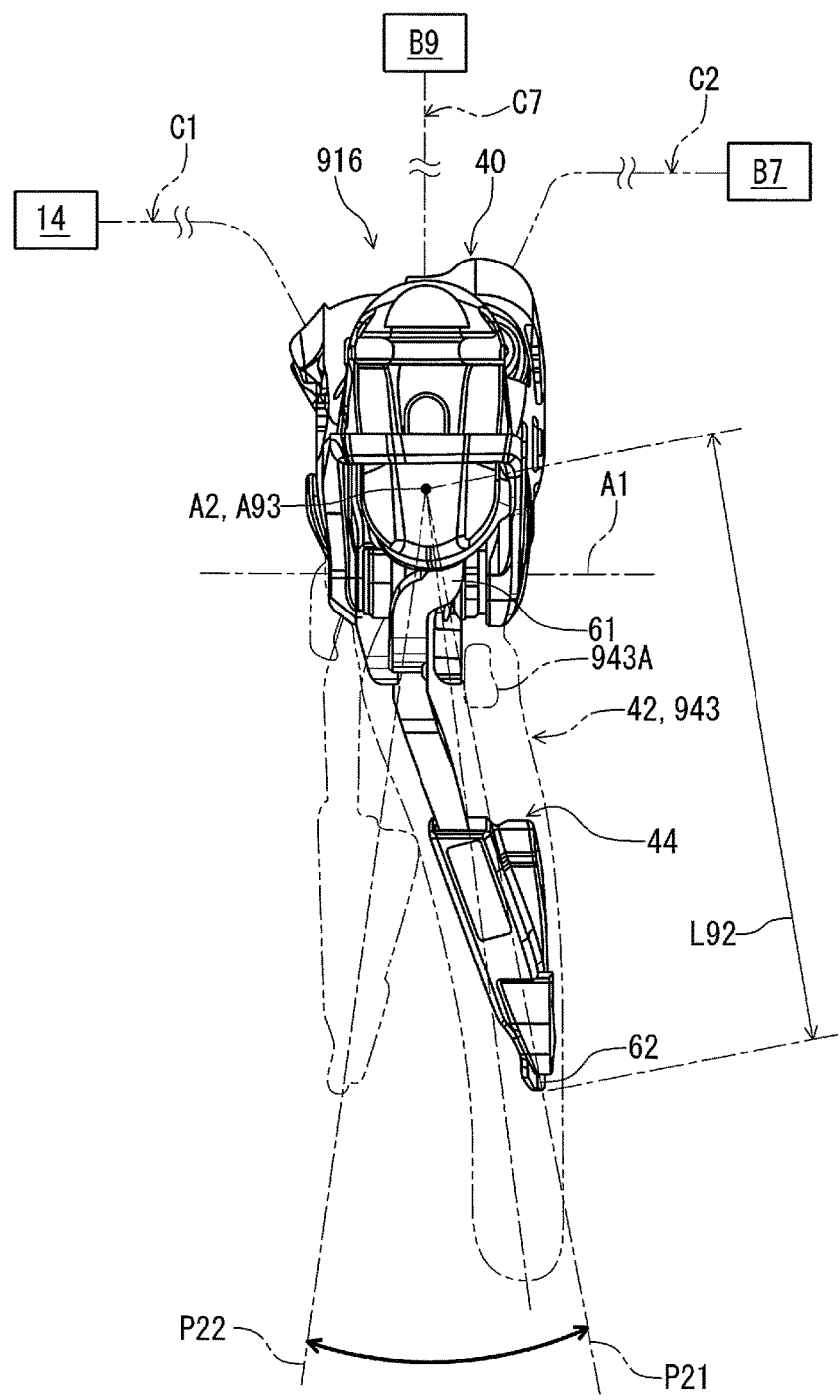
FIG. 38 is a front view of the bicycle operating device of the bicycle seatpost apparatus illustrated in FIG. 35, with a brake operating member omitted.

As seen in FIG. 38, the first operating member 44 is coupled to the base member 40 movably between the first rest position P21 and the first operated position P22 to move the first mechanical control cable C1 relative to the base member 40. The first operating member 44 is movable relative to the base member 40 between the first rest position P21 and the first operated position P22 without mechanically positioning the first mechanical control cable C1 relative to the base member 40 during a movement of the first operating member 44 occurring between the first rest position P21 and the first operated position P22.

As seen in FIG. 37, the first operating member 44 is pivoted together with the second operating member 943 relative to the base member 40 from the first rest position P21 to the first operated position P22 when the second operating member 943 is pivoted relative to the base member 40 from the second rest position P951 to the second operated position P952 even if the first operating member 44 is not operated. Specifically, the second end 62 of the first operating member 44 is in contact with the second operating member 943 in the state where the first operating member 44 and the second operating member 943 are at the first rest position P21 and the second rest position P951. Thus, the pivotal movement of the second operating member 943 is transmitted to the first operating member 44 when the second operating member 943 is pivoted from the second rest position P951 toward the second operated position P952. This causes the first operating member 44 to pivot together with the second operating member 943 when the second operating member 943 is pivoted from the second rest position P951 toward the second operated position P952. The second end 62 of the first operating member 44 can be spaced apart from the second operating member 943 in the state where the first operating member 44 and the second operating member 943 are at the first rest position P21 and the second rest position P951. As seen in FIG. 38, the first operating member 44 is pivoted relative to the base member 40 and the brake and second operating members 42 and 943 from the first rest position P21 to the first operated position P22 when only the first operating member 44 is operated.

Figure 39:
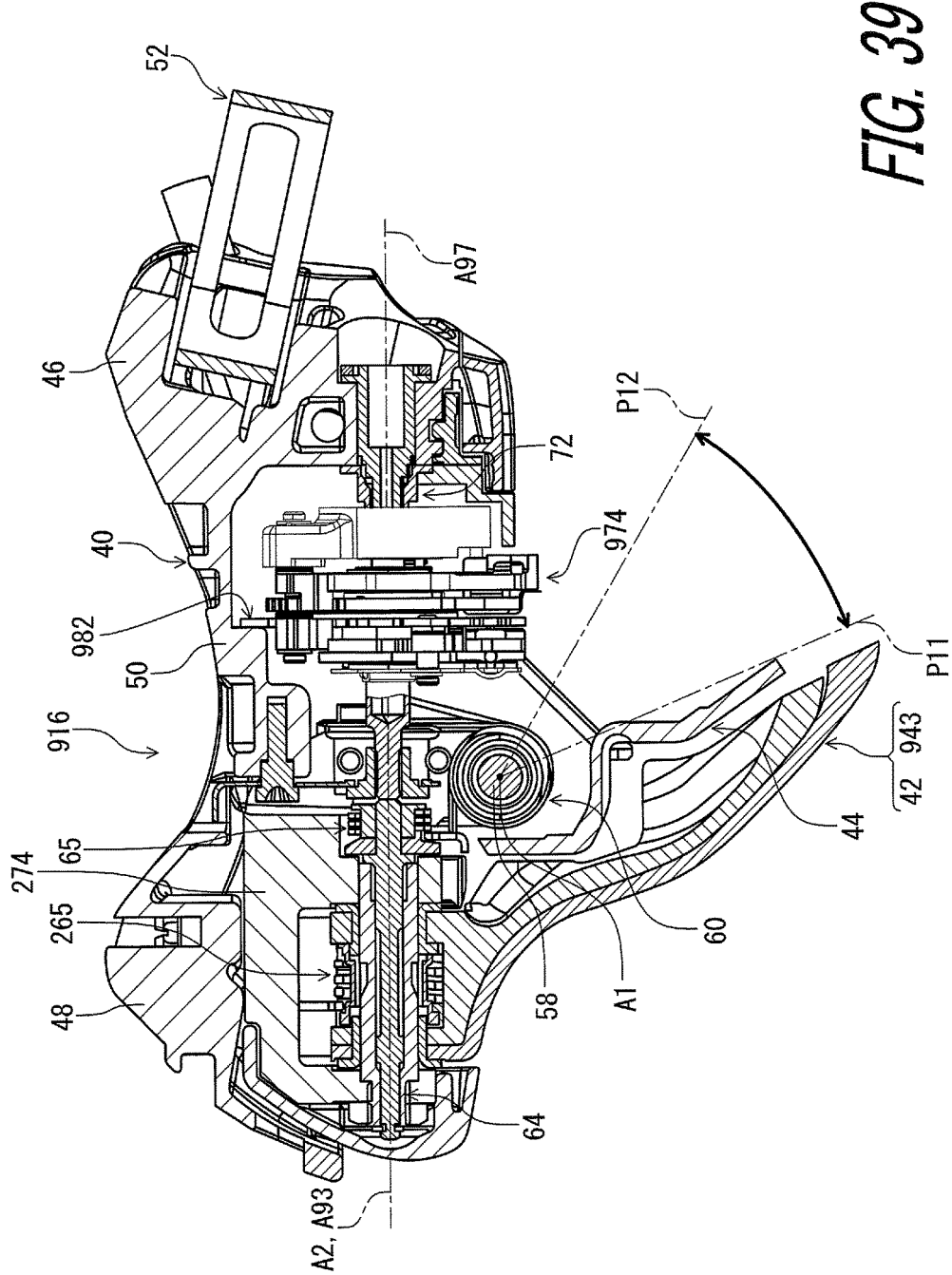
FIG. 39 is a cross-sectional view of the bicycle operating device of the bicycle seatpost apparatus illustrated in FIG. 35.

As seen in FIG. 39, the bicycle operating device 916 comprises the coupling member 274 of the second embodiment. The coupling member 274 is pivotally coupled to the base member 40 about the brake pivot axis A1 via the first shaft 58. The brake operating member 42 and the second operating member 943 are pivotally coupled to the coupling member 274 about the second pivot axis A93 via the second shaft 64. The first operating member 44 is pivotally coupled to the coupling member 274 about the first pivot axis A2 via the second shaft 64. The second biasing member 265 is mounted on the second shaft 64 to bias the brake operating member 42 and the second operating member 943 toward the second rest position P951 (FIG. 37). The second biasing member 65 is mounted on the second shaft 64 to bias the first operating member 44 toward the first rest position P21 (FIG. 38). The second shaft 64 is coaxial with the third shaft 72 in a state where the brake operating member 42 is at the rest position P11.

Figure 40:
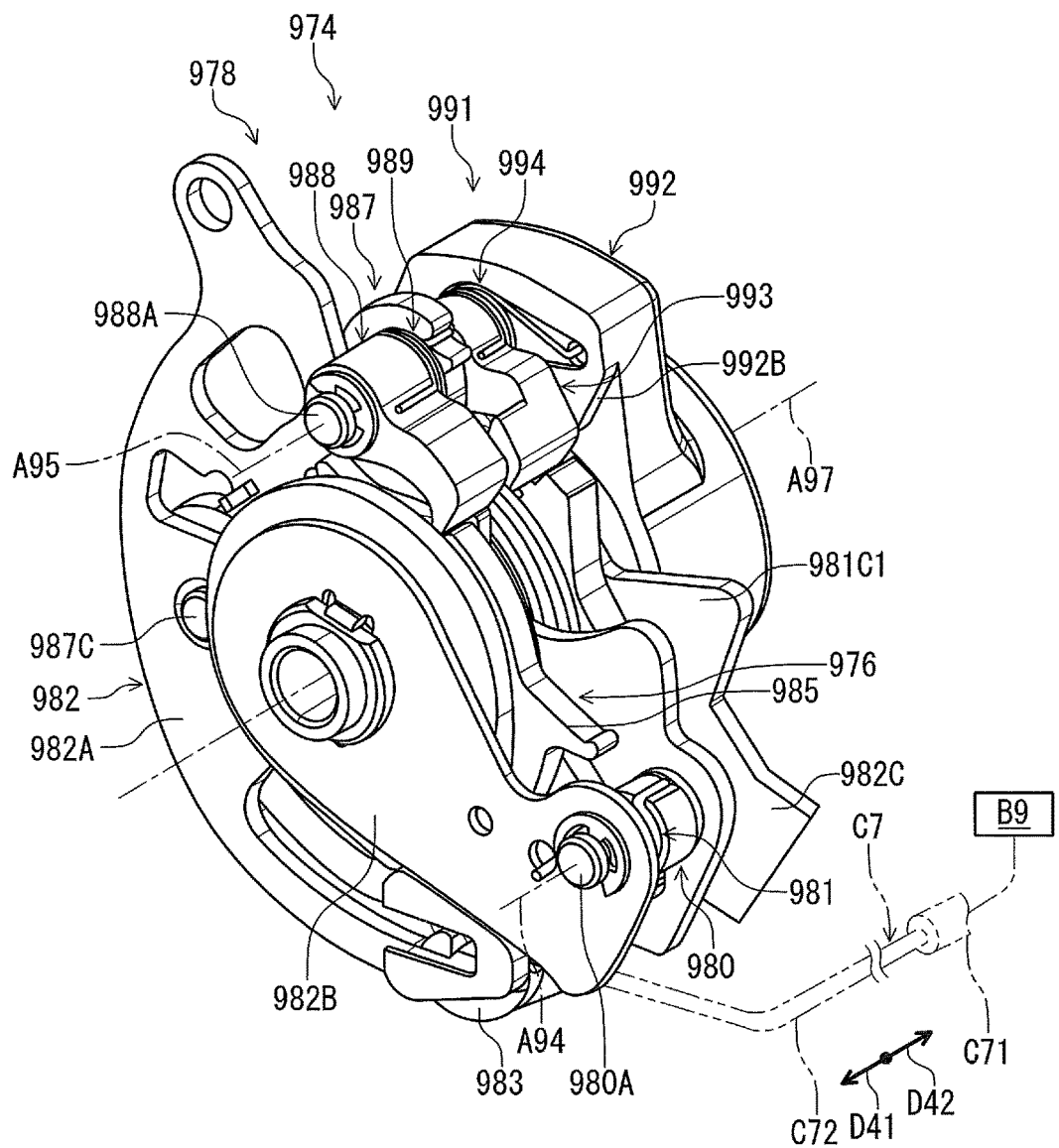
FIG. 40 is a perspective view of a cable operating structure of the bicycle operating device illustrated in FIG. 36.
Figure 41:
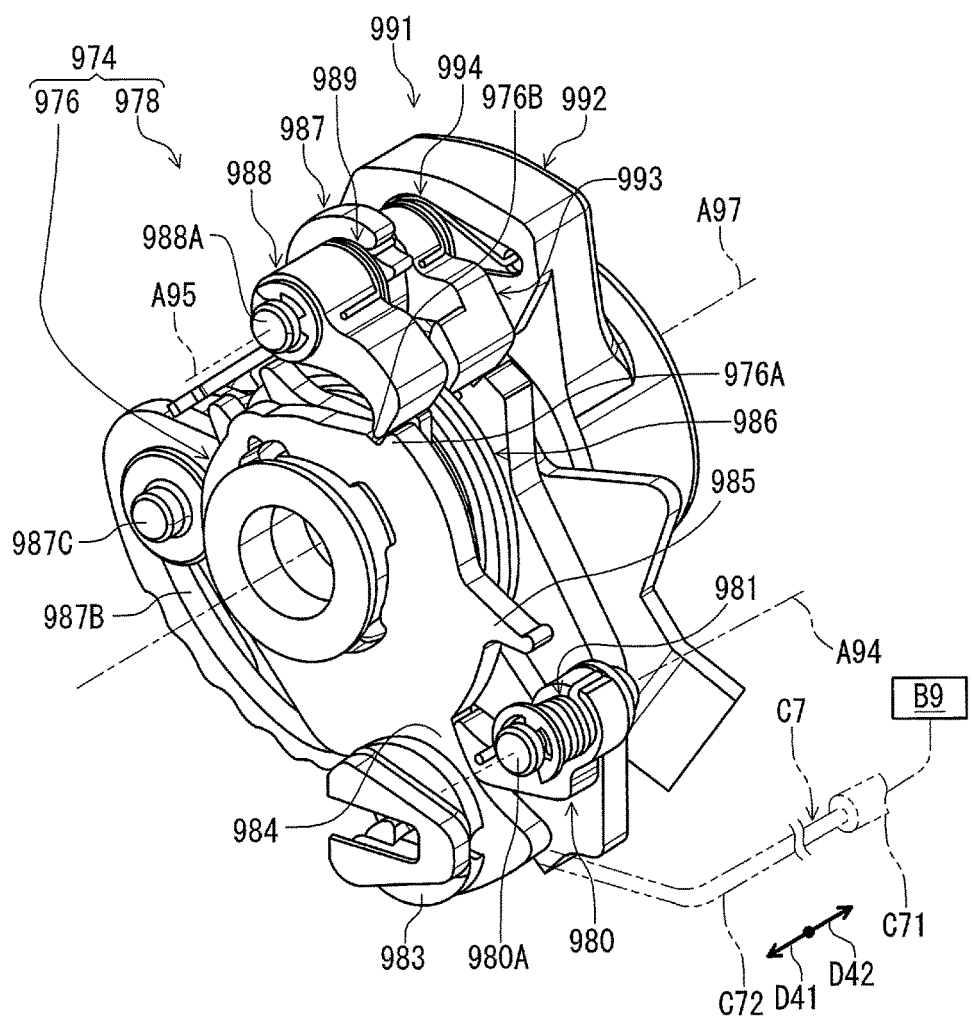
FIG. 41 is a perspective view of the cable operating structure of the bicycle operating device illustrated in FIG. 36, with a support structure omitted (first control position).

As seen in FIG. 39, the bicycle operating device 916 further comprises a cable operating structure 974. The cable operating structure 974 is mounted on the third shaft 72. As seen in FIGS. 40 and 41, the cable operating structure 974 includes a cable control body 976 and a positioning structure 978. The cable control body 976 is configured to be coupled to the second operating member 943 to move a second mechanical control cable C7 relative to the base member 40 in a pulling direction D41 and a releasing direction D42 opposite to the pulling direction D41 in response to a movement of the second operating member 943. The positioning structure 978 is configured to selectively maintain the cable control body 976 at a plurality of control positions. The pulling direction D41 and the releasing direction D42 are defined along the second mechanical control cable C7.

Examples of the second mechanical control cable C7 include a Bowden cable. The second mechanical control cable C7 includes an outer casing C71 and an inner wire C72 provided in the outer casing C71. An end of the inner wire C72 is coupled to the cable control body 976. The outer casing C71 is attached to the base member 40 (FIG. 36).

Figure 42:
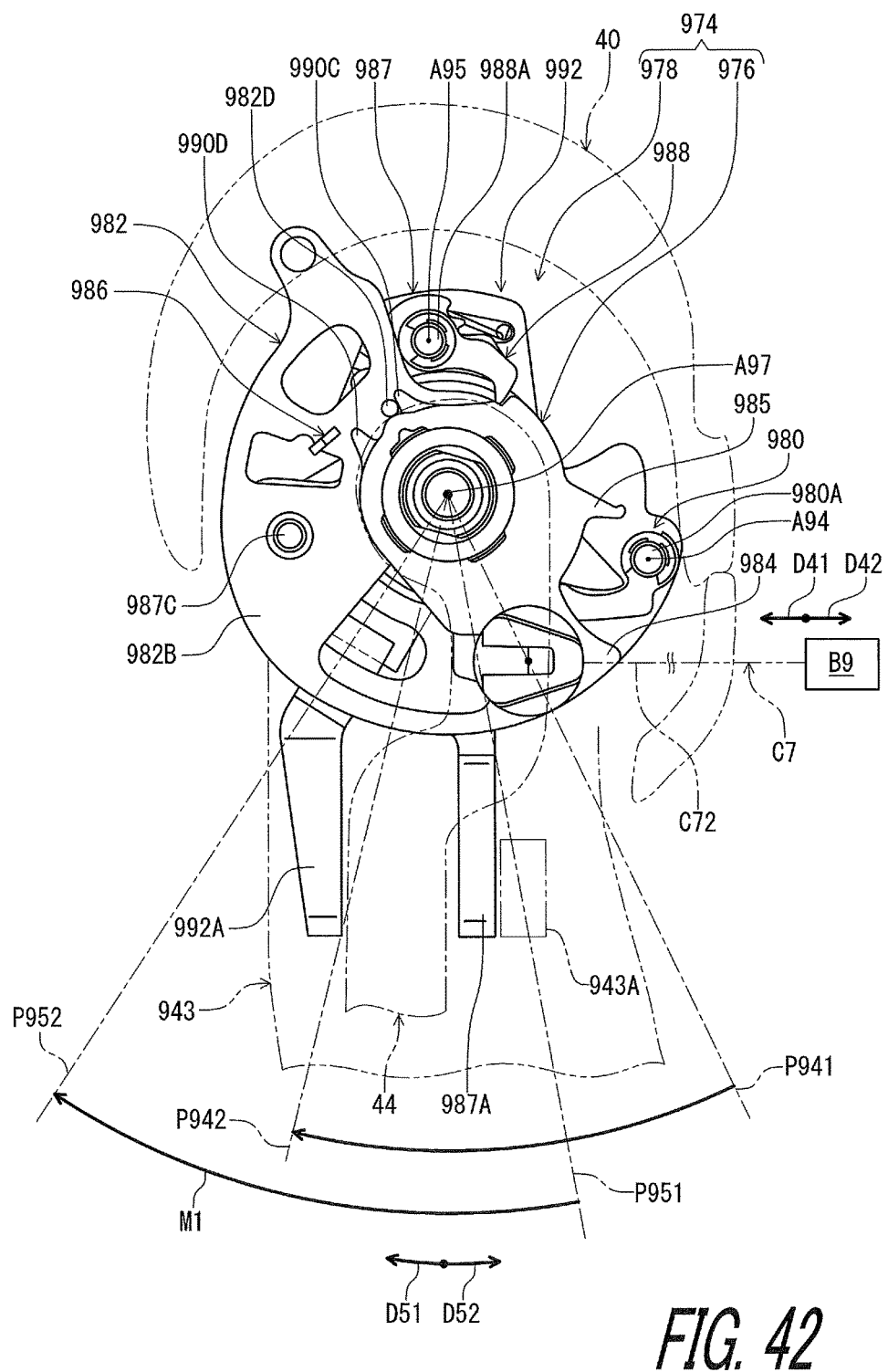
FIG. 42 is a front view of the cable operating structure of the bicycle operating device illustrated in FIG. 36.
Figure 43:
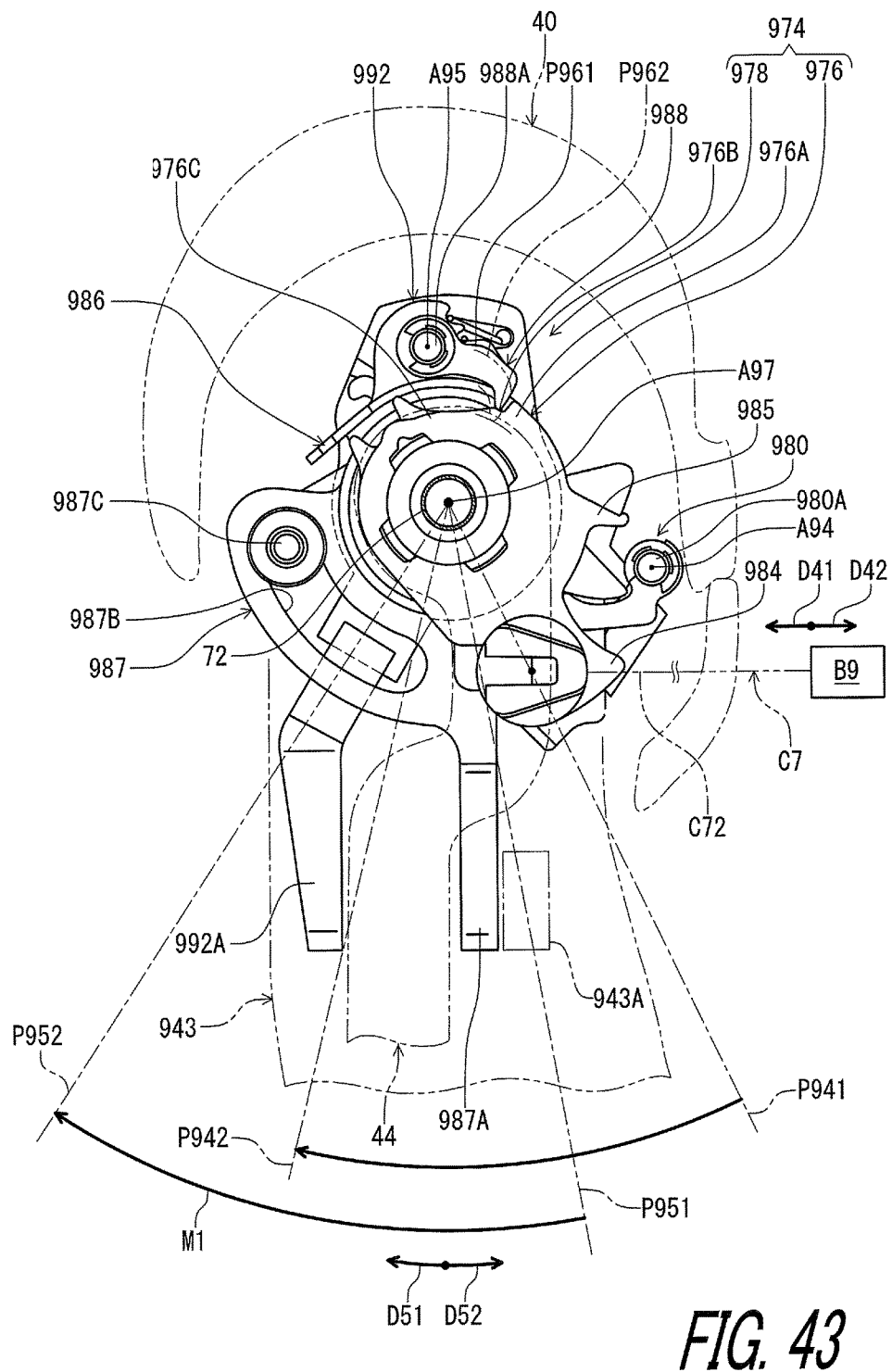
FIG. 43 is a front view of the cable operating structure of the bicycle operating device illustrated in FIG. 36, with the support structure omitted.

As seen in FIGS. 42 and 43, the positioning structure 978 is coupled to the cable control body 976 to position the cable control body 976 relative to the base member 40 at each of a first control position P941 and a second control position P942 relative to the base member 40. In this embodiment, the positioning structure 978 is coupled to the cable control body 976 to position the cable control body 976 relative to the base member 40 at each of only two control positions (the first control position P941 and the second control position P942) relative to the base member 40. However, the total number of the control positions is not limited to this embodiment and it can be three and more.

The inner wire C72 is pulled relative to the outer casing C71 and the base member 40 when the cable control body 976 is pivoted relative to the base member 40 about the rotational axis A97 from the first control position P941 to the second control position P942. The inner wire C72 is released (retuned) relative to the outer casing C71 and the base member 40 when the cable control body 976 is returned relative to the base member 40 about the second pivot axis A93 from the second control position P942 to the first control position P941. The cable control body 976 is pivotally coupled to the base member 40 via the third shaft 72 about a rotational axis A97. The third shaft 72 defines the rotational axis A97. As seen in FIG. 39, the rotational axis A97 coincides with the second pivot axis A93 in the state where the brake operating member 42 is at the rest position P11.

As seen in FIG. 37, the second operating member 943 is movable relative to the base member 40 in a first direction D51. The second operating member 943 is coupled to the base member 40 movably from the second rest position P951 to the second operated position P952 in the first direction D51. As seen in FIG. 38, the first operating member 44 is movable relative to the base member 40 from the first rest position P21 to the first operated position P22 in the first direction D51.

As seen in FIG. 43, the cable control body 976 is configured to pull the second mechanical control cable C7 when the second operating member 943 is moved relative to the base member 40 in the first direction D51. The cable control body 976 is configured to release the second mechanical control cable C7 when the second operating member 943 is moved relative to the base member 40 in the first direction D51. In other words, a movement direction of the second operating member 943 to pull the second mechanical control cable C7 is the same as a movement direction of the second operating member 943 to release the second mechanical control cable C7. However, the movement directions of the second operating member 943 to pull and release the second mechanical control cable C7 can be different from each other. For example, the movement direction of the second operating member 943 to pull the second mechanical control cable C7 can be the first direction D51 and the movement direction of the second operating member 943 to release the second mechanical control cable C7 can be the second direction D52.

Specifically, the second operating member 943 is movable relative to the base member 40 in the first direction D51 to provide a first movement M1. In this embodiment, the first movement M1 is a pivotal movement of the second operating member 943. The positioning structure 978 is coupled to the second operating member 943 to move the cable control body 976 such that the second mechanical control cable C7 is moved in the pulling direction D41 and the releasing direction D42 alternatingly in response to the first movement M1 of the second operating member 943.

As seen in FIGS. 40 to 43, the positioning structure 978 includes a positioning member 980 and a first biasing element 981. The positioning member 980 is pivotally coupled to a support structure 982 (FIG. 40) about a positioning pivot axis A94 via a pivot pin 980A. The positioning member 980 includes a positioning pawl. The first biasing element 981 is mounted to the support structure 982 to bias the positioning member 980 to keep in contact with the cable control body 976. The control biasing element 986 is mounted to the support structure 982 to bias the cable control body 976 toward the first control position P941 in the second direction D52. In this embodiment, the control biasing element 986 is mounted to the support structure 982.

The cable control body 976 includes a cable attachment part 983, a first positioning abutment 984, a second positioning abutment 985, and a control biasing element 986. An end of the inner wire C72 of the second mechanical control cable C7 is attached to the cable attachment part 983. The first positioning abutment 984 is circumferentially spaced apart from the second positioning abutment 985.

As seen in FIG. 39, the support structure 982 is secured to the base member 40. As seen in FIG. 40, the support structure 982 includes a first support plate 982A, a second support plate 982B, and a third support plate 982C. The second support plate 982B is coupled to the first support plate 982A and the third support plate 982C. The positioning member 980 is pivotally coupled to the first support plate 982A and the second support plate 982B.

Figure 44:
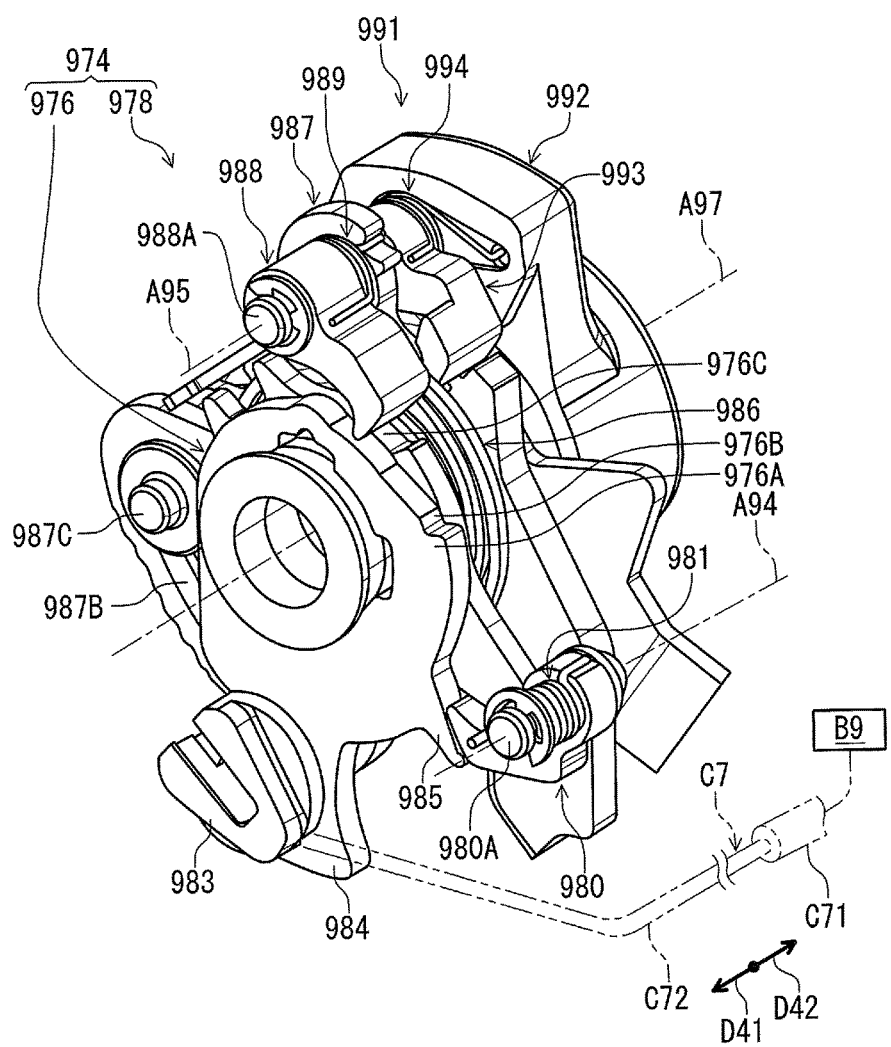
FIG. 44 is a perspective view of the cable operating structure of the bicycle operating device illustrated in FIG. 36, with the support structure omitted (second control position).
Figure 45:
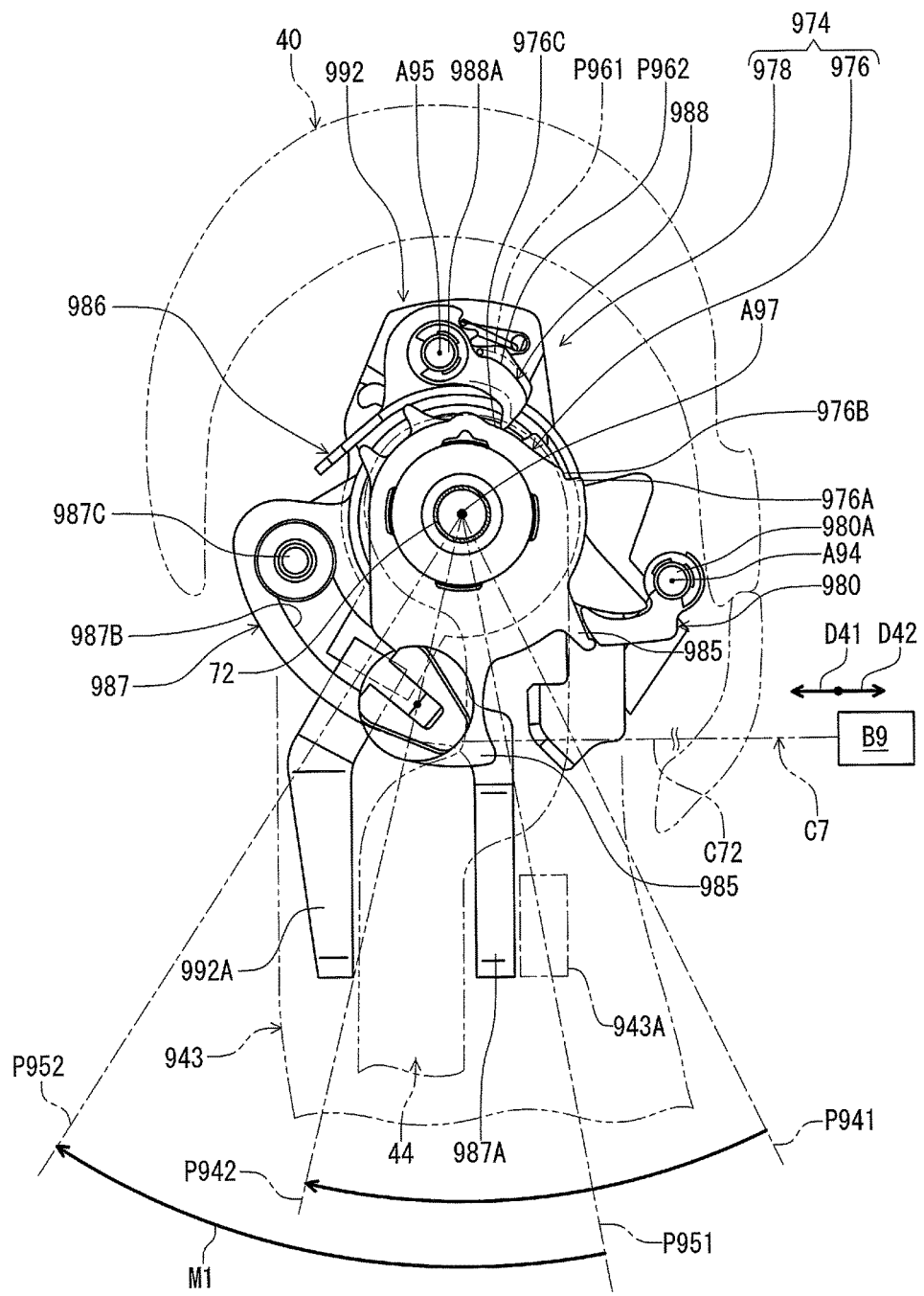
FIG. 45 is a front view of the cable operating structure of the bicycle operating device illustrated in FIG. 36, with the support structure omitted (second control position).

As seen in FIGS. 41 and 43, the cable control body 976 is positioned at the first control position P941 in a state where the positioning member 980 is in contact with the first positioning abutment 984. As seen in FIGS. 44 and 45, the cable control body 976 is positioned at the second control position P942 in a state where the positioning member 980 is in contact with the second positioning abutment 985.

As seen in FIGS. 41 and 43, the positioning structure 978 includes a first input member 987, a first actuation member 988, and a first actuation biasing element 989. The first input member 987 is pivotally coupled to the base member 40 about the rotational axis A97. The first input member 987 is pivotally mounted on the third shaft 72 (FIG. 39). The first input member 987 includes a first transmission part 987A. The first transmission part 987A is contactable with the contact part 943A (FIG. 41) of the second operating member 943. The first input member 987 is pivoted relative to the base member 40 about the rotational axis A97 in the first direction D51 when the second operating member 943 is pivoted relative to the base member 40 about the second pivot axis A93 from the second rest position P951 to the second operated position P952. The first actuation member 988 is pivotally coupled to the first input member 987 about a first actuation pivot axis A95 via a pivot pin 988A. The first actuation member 988 includes a first actuation pawl. The first actuation biasing element 989 is mounted to the pivot pin 988A to bias the first actuation member 988. The first actuation biasing element 989 include a torsion coil spring.

The first input member 987 includes an elongated hole 987B. The elongated hole 987B has a curved shape in a circumferential direction defined about the rotational axis A97. The positioning structure 978 includes a stop pin 987C secured to the support structure 982 (FIG. 42). The stop pin 987C extends through the elongated hole 987B to define a pivot angle of the first input member 987.

The cable control body 976 includes a first actuation abutment 976A, a first contact surface 976B, and a second contact surface 976C. The first actuation abutment 976A is adjacent to the first contact surface 976B. The first contact surface 976B is closer to the first actuation abutment 976A than the second contact surface 976C. The first actuation biasing element 989 biases the first actuation member 988 toward the cable control body 976.

As seen in FIGS. 41 and 43, the first actuation member 988 keeps in contact with the first contact surface 976B in a state where the cable control body 976 is positioned at the first control position P941 because of a biasing force of the first actuation biasing element 989. The first actuation member 988 is positioned at a first engagement position P961 in a state where the first actuation member 988 is in contact with the first contact surface 976B. The first actuation member 988 is contactable with the first actuation abutment 976A in a state where the first actuation member 988 is positioned at a first engagement position P961. In this state, the first movement M1 of the second operating member 943 is transmitted to the cable control body 976 via the first input member 987 and the first actuation member 988.

As seen in FIGS. 44 and 45, the first actuation member 988 keeps in contact with the second contact surface 976C of the cable control body 976 in a state where the cable control body 976 is positioned at the second control position P942 because of the biasing force of the first actuation biasing element 989. The first actuation member 988 is positioned at a second engagement position P962 in a state where the first actuation member 988 is in contact with the second contact surface 976C. The first actuation member 988 is not contactable with the first actuation abutment 976A in a state where the first actuation member 988 is positioned at the second engagement position P962 because of an enough distance between the first actuation member 988 and the first actuation abutment 976A. In this state, the first movement M1 of the second operating member 943 is not transmitted to the cable control body 976 via the first input member 987 and the first actuation member 988.

Figure 46:
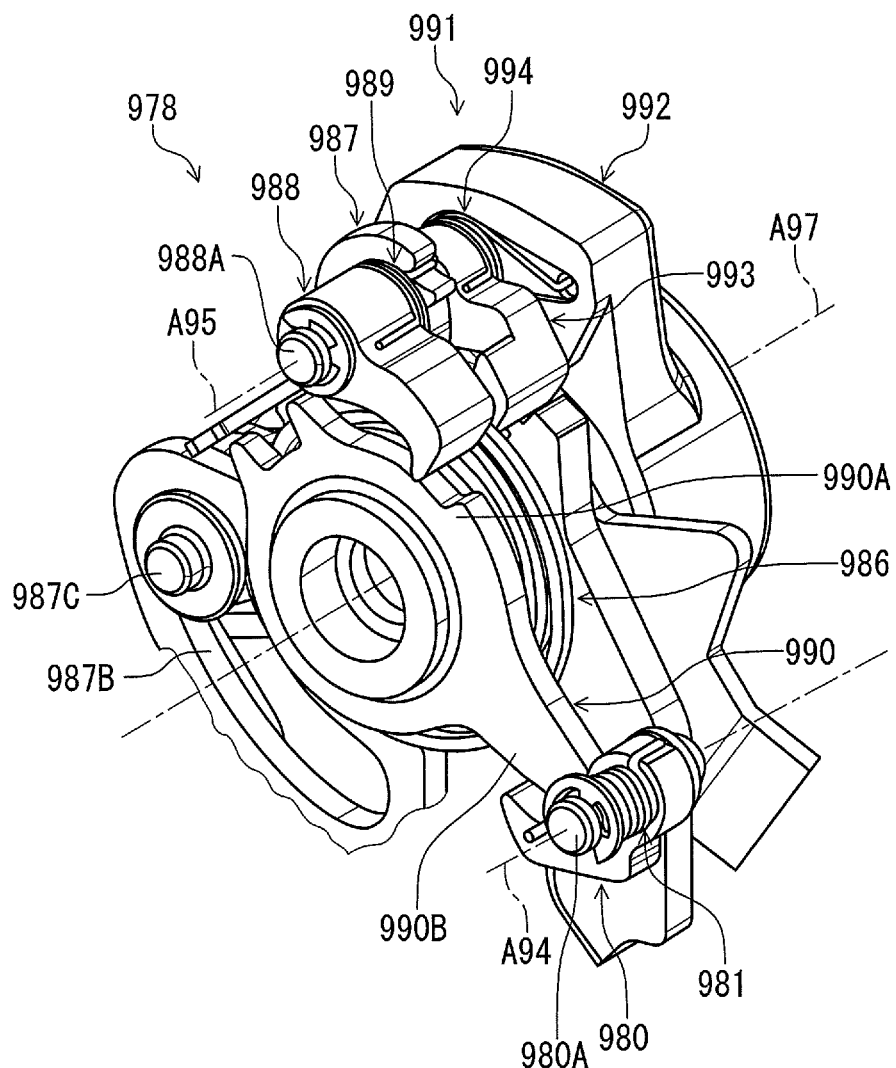
FIG. 46 is a perspective view of the cable operating structure of the bicycle operating device illustrated in FIG. 36, with the support structure and a cable control body omitted.
Figure 47:
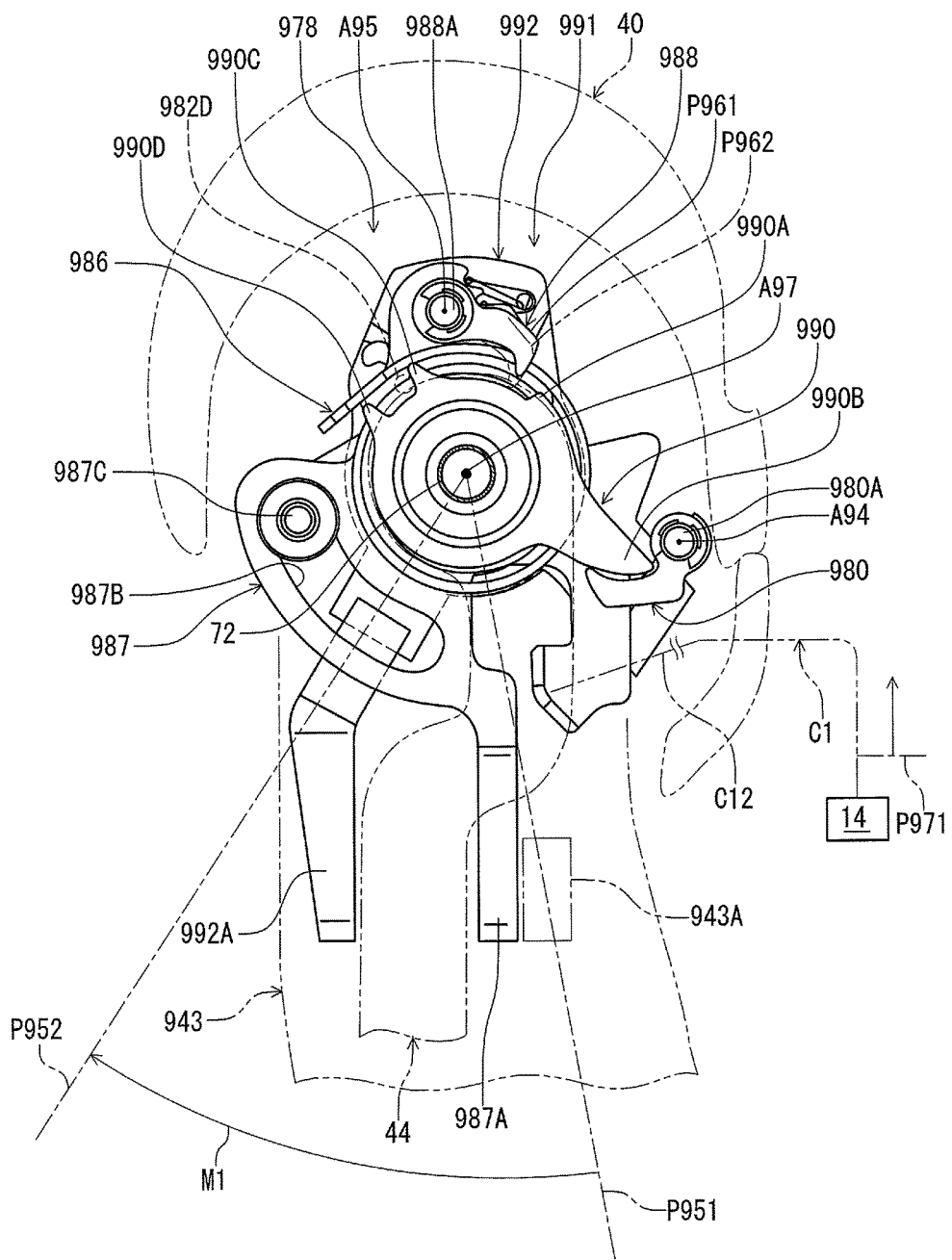
FIG. 47 is a front view of the cable operating structure of the bicycle operating device illustrated in FIG. 36, with the support structure and the cable control body omitted.

As seen in FIGS. 46 and 47, the positioning structure 978 includes a release member 990. The release member 990 is pivotally coupled to the base member 40 about the rotational axis A97. The release member 990 includes a release abutment 990A and a release pawl 990B. The first actuation member 988 is contactable with the release abutment 990A in a state where the first actuation member 988 is positioned at the second engagement position P962. The release pawl 990B is contactable with the positioning member 980 in a state where the first actuation member 988 is engaged with one of the first positioning abutment 984 and the second positioning abutment 985. In this state, the first movement M1 of the second operating member 943 is transmitted to the release member 990 via the first input member 987 and the first actuation member 988. This pivots the positioning member 980 about the positioning pivot axis A94 against a biasing force of the first biasing element 981 to move away from the cable control body 976. The positioning member 980 is not contactable with the second positioning abutment 985 in a state where the release pawl 990B moves the positioning member 980 away from the cable control body 976. However, the positioning member 980 is contactable with the first positioning abutment 984 in the state where the release pawl 990B moves the positioning member 980 away from the cable control body 976.

The first actuation member 988 is spaced apart from the first actuation abutment 976A in a state where the cable control body 976 is positioned at the second control position P942. The first actuation member 988 is not contactable with the first actuation abutment 976A in the state where the first actuation member 988 is positioned at the second engagement position. In this state, the first movement M1 of the second operating member 943 is not transmitted to the cable control body 976 via the first input member 987 and the first actuation member 988.

The release pawl 990B is contactable with the positioning member 980. The release pawl 990B pivots the positioning member 980 about the positioning pivot axis A94 to move away from the cable control body 976 when the release member 990 is pivoted about the rotational axis A97 in response to the first movement M1 of the second operating member 943.

As seen in FIG. 47, the release member 990 includes a first protrusion 990C and a second protrusion 990D. The first protrusion 990C is spaced apart from the second protrusion 990D. A stop pin 987C of the support structure 982 is contactable with the first protrusion 990C and the second protrusion 990D. The stop pin 987C defines a pivot angle of the release member 990. The first biasing element 981 biases the release member 990 via the positioning member 980 so that the first protrusion 990C is in contact with the stop pin 982D.

As seen in FIGS. 48 to 51, the bicycle operating device 916 further comprises an additional cable operating structure 991. The additional cable operating structure 991 is coupled to the first operating member 44 and the second operating member 943 to move the first mechanical control cable C1 from a first cable rest position P971 relative to the base member 40 in response to a movement of only one of the first operating member 44 and the second operating member 943. In this embodiment, the additional cable operating structure 991 is coupled to the first operating member 44 and the second operating member 943 to move the first mechanical control cable C1 from a first cable rest position P971 relative to the base member 40 in response to a movement of only the first operating member 44. Specifically, the additional cable operating structure 991 is coupled to the first operating member 44 and the second operating member 943 to move the inner wire C12 of the first mechanical control cable C1 from the first cable rest position P971 relative to the base member 40 in response to the movement of only the first operating member 44. However, the additional cable operating structure 991 can be coupled to the first operating member 44 and the second operating member 943 to move the first mechanical control cable C1 from a first cable rest position P971 relative to the base member 40 in response to a movement of only the second operating member 943.

As seen in FIG. 36, the one of the first operating member 44 and the second operating member 943 is closer to the first end portion 46 of the base member 40 than the other of the first operating member 44 and the second operating member 943. In this embodiment, the first operating member 44 is closer to the first end portion 46 of the base member 40 than the second operating member 943. However, the second operating member 943 can be closer to the first end portion 46 of the base member 40 than the first operating member 44.

As seen in FIGS. 37 and 38, the first operating member 44 includes a first longitudinal axis LA2 and a first length L92 defined along the first longitudinal axis LA2. The second operating member 943 includes a second longitudinal axis LA3 and a second length L93 defined along the second longitudinal axis LA3. The first length L92 is different from the second length L93. While the first length L92 is shorter than the second length L93 in this embodiment, the first length L92 can be equal to or longer than the second length L93. In this embodiment, each of the first longitudinal axis LA2 and the second longitudinal axis LA3 intersects with the second pivot axis A93. Each of the first length L92 and the second length L93 is defined from the second pivot axis A93.

As seen in FIGS. 48 to 51, the additional cable operating structure 991 includes a second input member 992, a second actuation member 993, a second actuation biasing element 994, and an additional cable control body 995. The second input member 992 is pivotally coupled to the base member 40 about the rotational axis A97. The second input member 992 is pivotally mounted on the third shaft 72 (FIG. 39). The second input member 992 includes a second transmission part 992A. The second transmission part 992A is contactable with the first operating member 44. The second input member 992 is pivoted relative to the base member 40 about the rotational axis A97 in the first direction D51 when the first operating member 44 is pivoted relative to the base member 40 about the first pivot axis A2 (the second pivot axis A93) from the first rest position P21 to the first operated position P22. The first and second input members 987 and 992 are pivoted relative to the base member 40 about the rotational axis A97 in the first direction D51 when the second operating member 943 is pivoted relative to the base member 40 about the second pivot axis A93 from the second rest position P951 to the second operated position P952.

The second actuation member 993 is pivotally coupled to the second input member 992 about a second actuation pivot axis A96 via a pivot pin 996. The second actuation member 993 includes a second actuation pawl. The second actuation biasing element 994 is mounted to the second input member 992 to bias the second actuation member 993 to keep in contact with the additional cable control body 995.

Figure 50:
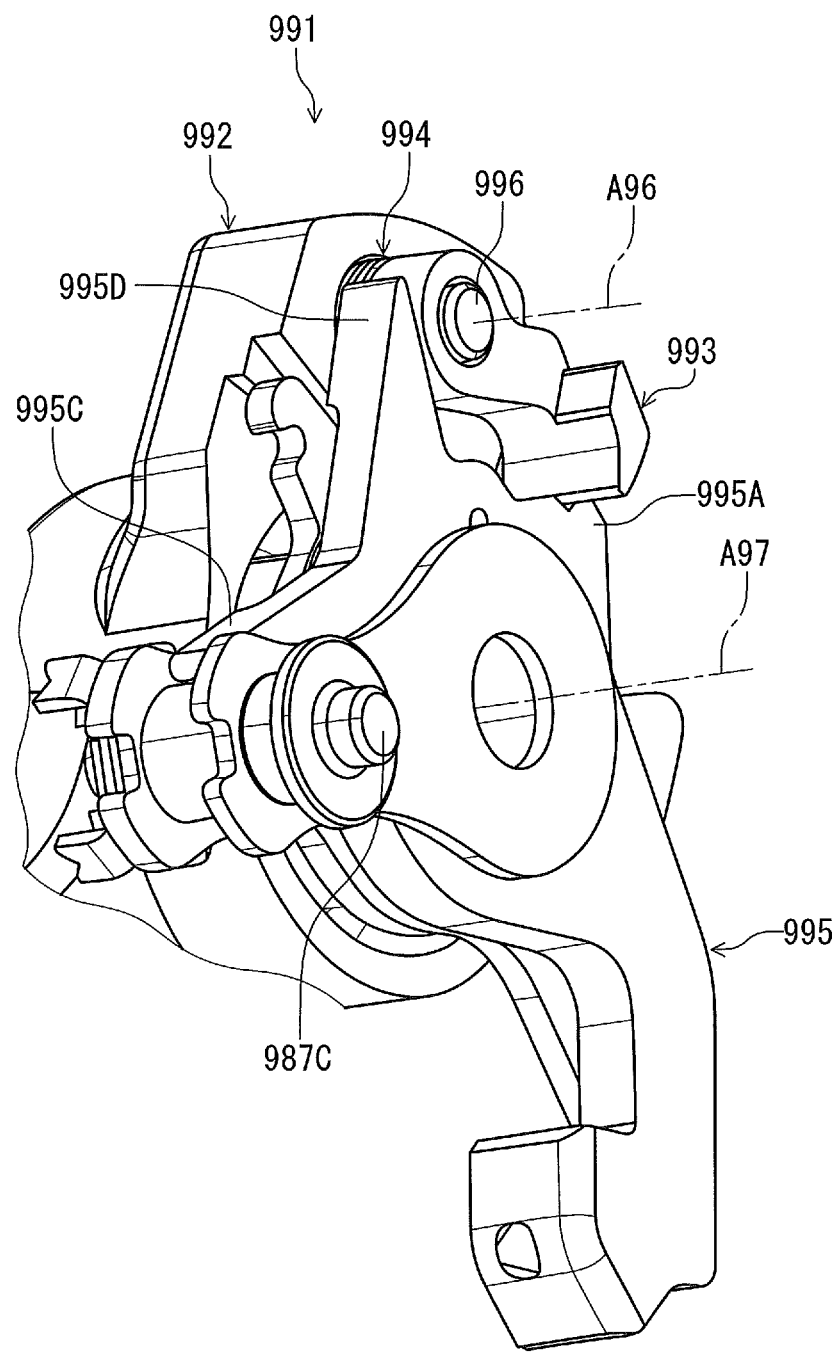
FIG. 50 is a perspective view of the cable operating structure of the bicycle operating device illustrated in FIG.

As seen in FIGS. 50 and 51, the additional cable control body 995 includes a second actuation abutment 995A and a third contact surface 995B. The second actuation abutment 995A is adjacent to the third contact surface 995B. The second actuation member 993 is contactable with the second actuation abutment 995A in a state where the second actuation member 993 is in contact with the third contact surface 995B. The second actuation biasing element 994 is mounted to the second input member 992 to bias the second actuation member 993 to keep in contact with the third contact surface 995B. In this state, a pivotal movement of the first operating member 44 is transmitted to the additional cable control body 995 via the second input member 992 and the second actuation member 993.

The additional cable control body 995 includes a stopper 995C and a receiving portion 995D. The stopper 995C is contactable with the stop pin 987C. The receiving portion 995D is contactable with the second actuation member 993. The additional cable control body 995 is at an additional rest position P991 in a state where the stopper 995C is in contact with the stop pin 987C. The second input member 992 is at a rest position in a state where the receiving portion 995D is in contact with the second actuation member 993. The first mechanical control cable C1 is at the first cable rest position P971 in a state where the additional cable control body 995 is at the additional rest position P991.

As seen in FIG. 51, the additional cable operating structure 991 is coupled to the first operating member 44 and the second operating member 943 to maintain a position of the first mechanical control cable C1 at the first cable rest position P971 relative to the base member 40 in response to the movement of the second operating member 943. Specifically, the additional cable operating structure 991 is coupled to the first operating member 44 and the second operating member 943 to maintain a position of the first mechanical control cable C1 at the first cable rest position P971 relative to the base member 40 in response to a simultaneous movement of both the first operating member 44 and the second operating member 943. The additional cable operating structure 991 is coupled to the first operating member 44 and the second operating member 943 to maintain a position of the inner wire C12 of the first mechanical control cable C1 at the first cable rest position P971 relative to the base member 40 in response to the simultaneous movement of both of the first operating member 44 and the second operating member 943.

Figure 48:
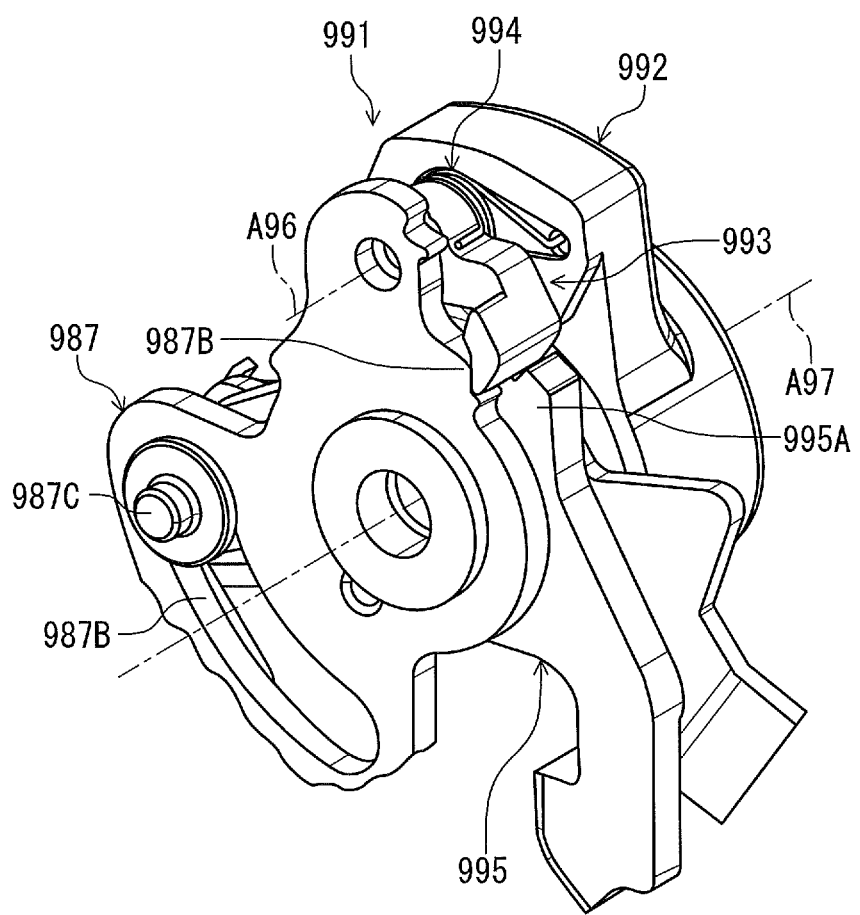
FIG. 48 is a perspective view of the cable operating structure of the bicycle operating device illustrated in FIG. 36, with the support structure, the cable control body, and a release member omitted.
Figure 49:
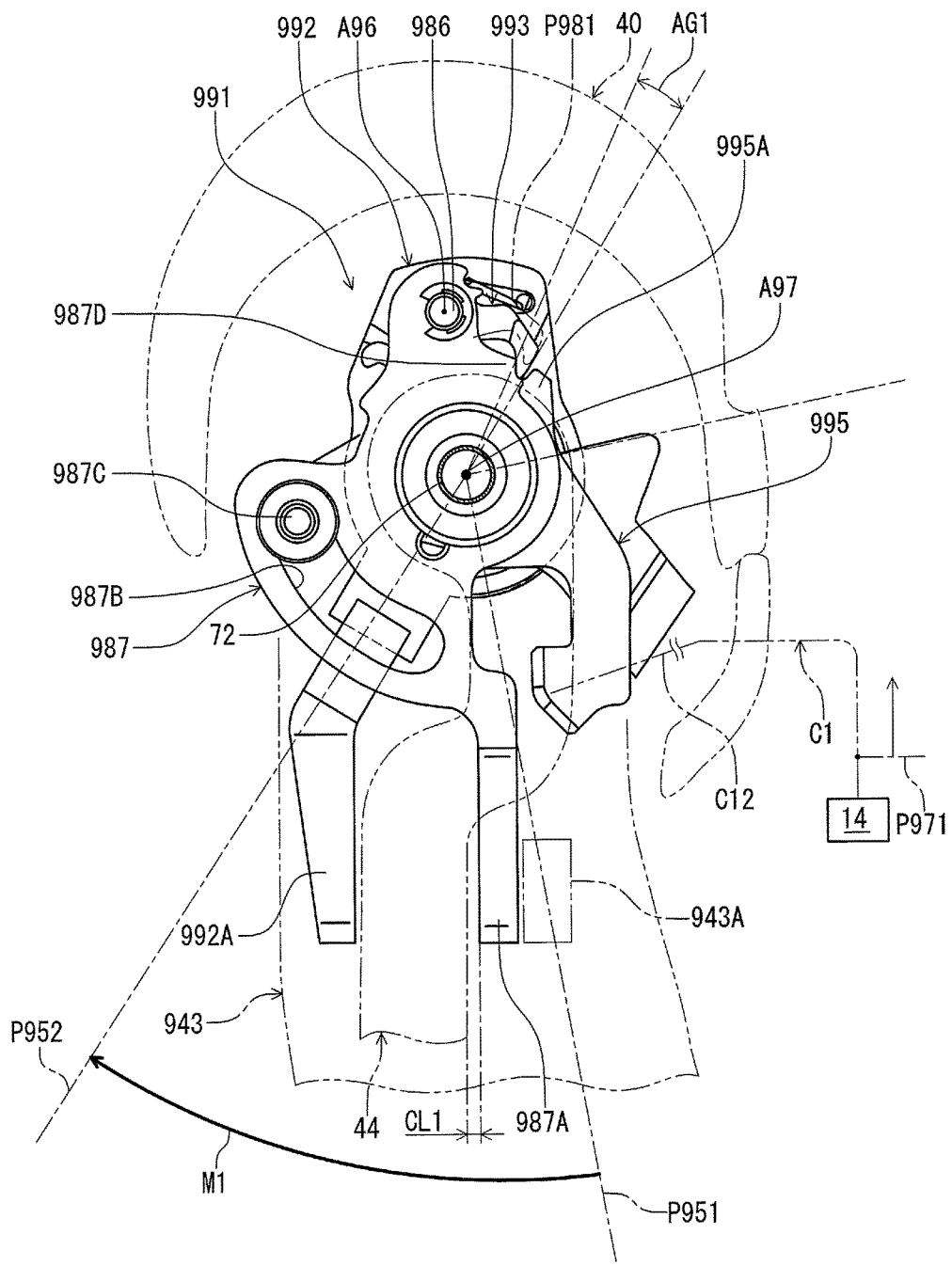
FIG. 49 is a front view of the cable operating structure of the bicycle operating device illustrated in FIG. 36, with the support structure, the cable control body, and the release member omitted.

As seen in FIGS. 48 and 49, the first input member 987 includes a release part 987D. The release part 987D is contactable with the second actuation member 993. The release part 987D pivots the second actuation member 993 relative to the second input member 992 about the second actuation pivot axis A96 when the first input member 987 is pivoted relative to the second input member 992 about the rotational axis A97. The release part 987D keeps the second actuation member 993 at a disengagement position P981 when the first input member 987 is pivoted relative to the second input member 992 by a pivotal angle AG1. The pivotal angle AG1 is defined by a clearance CL1 between the first operating member 44 and the first transmission part 987A. The second actuation member 993 is not contactable with the second actuation abutment 995A even when the second input member 992 is pivoted about the rotational axis A97 in a state where the second actuation member 993 is positioned at the third disengagement position P981 by the release part 987D.

Namely, the additional cable control body 995 is stationary relative to the base member 40 when the first operating member 44 and the second operating member 943 are pivoted together relative to the base member 40 about the second pivot axis A93. Thus, the first mechanical control cable C1 is not pulled when the first operating member 44 and the second operating member 943 are pivoted together relative to the base member 40 about the second pivot axis A93. The first mechanical control cable C1 is pulled when only the first operating member 44 is pivoted relative to the base member 40 about the first pivot axis A2 (the second pivot axis A93).

The pulling and releasing operation of the bicycle operating device 916 for the first mechanical control cable C1 will be described in detail below referring to FIGS. 52 to 54. FIG. 52 show the bicycle operating device 916 in a non-operated state where the illustrated parts are in their rest positions. FIGS. 52 to 54 show the parts of the bicycle operating device 916 that are sequentially moved as the first operating member 44 is pivoted from the first rest position P21 to the first operated position P22 to perform the pulling operation of the first mechanical control cable C1.

As seen in FIGS. 52 and 53, when the first operating member 44 is pivoted by the user relative to the base member 40 about the second pivot axis A93 from the first rest position P21 toward the first operated position P22, the second transmission part 992A of the second input member 992 is pressed by the first operating member 44. Thus, the second input member 992 is pivoted relative to the base member 40 about the rotational axis A97 in the first direction D51 while the second operating member 943 and the first input member 987 are stationary relative to the base member 40. This brings the second actuation member 993 into engagement with the second actuation abutment 995A of the additional cable control body 995.

As seen in FIGS. 53 and 54, when the first operating member 44 and the second input member 992 are further pivoted relative to the base member 40 about the rotational axis A97 in the first direction D51, the additional cable control body 995 is pivoted relative to the base member 40 about the rotational axis A97 in the first direction D51. Thus, the inner wire C12 of the first mechanical control cable C1 is pulled from the first cable rest position P971 in response to the pivotal movement of the first operating member 44.

As seen in FIG. 54, a contact part 992B (FIGS. 40 and 54) of the second input member 992 comes into contact with a receiving part 982C1 (FIGS. 40 and 54) of the support structure 982 when the first operating member 44 reaches the first operated position P22. The second input member 992 is mechanically positioned at only both ends of a rotational angle of the second input member 992. However, the second input member 992 is pivoted relative to the base member 40 about the rotational axis A97 without being mechanically positioned relative to the base member 40 during a movement of the additional cable control body 995 occurring between the both ends of the rotational angle. Thus, when the second operating member 943 is returned to the second rest position P951 by removing or reducing an operation force applied from the user to the second operating member 943, the inner wire C12 of the first mechanical control cable C1 is released (returned) to the first cable rest position P971.

The pulling operation of the bicycle operating device 916 for the second mechanical control cable C7 will be described in detail below referring to FIGS. 42 and 55 to 60. FIG. 42 show the bicycle operating device 916 in a non-operated state where the illustrated parts are in their rest positions. FIGS. 55 to 60 show the parts of the bicycle operating device 916 that are sequentially moved as the second operating member 943 is pivoted from the second rest position P951 to the second operated position P952 and then back to the second rest position P951 to perform the pulling operation of the second mechanical control cable C7.

Figure 55:
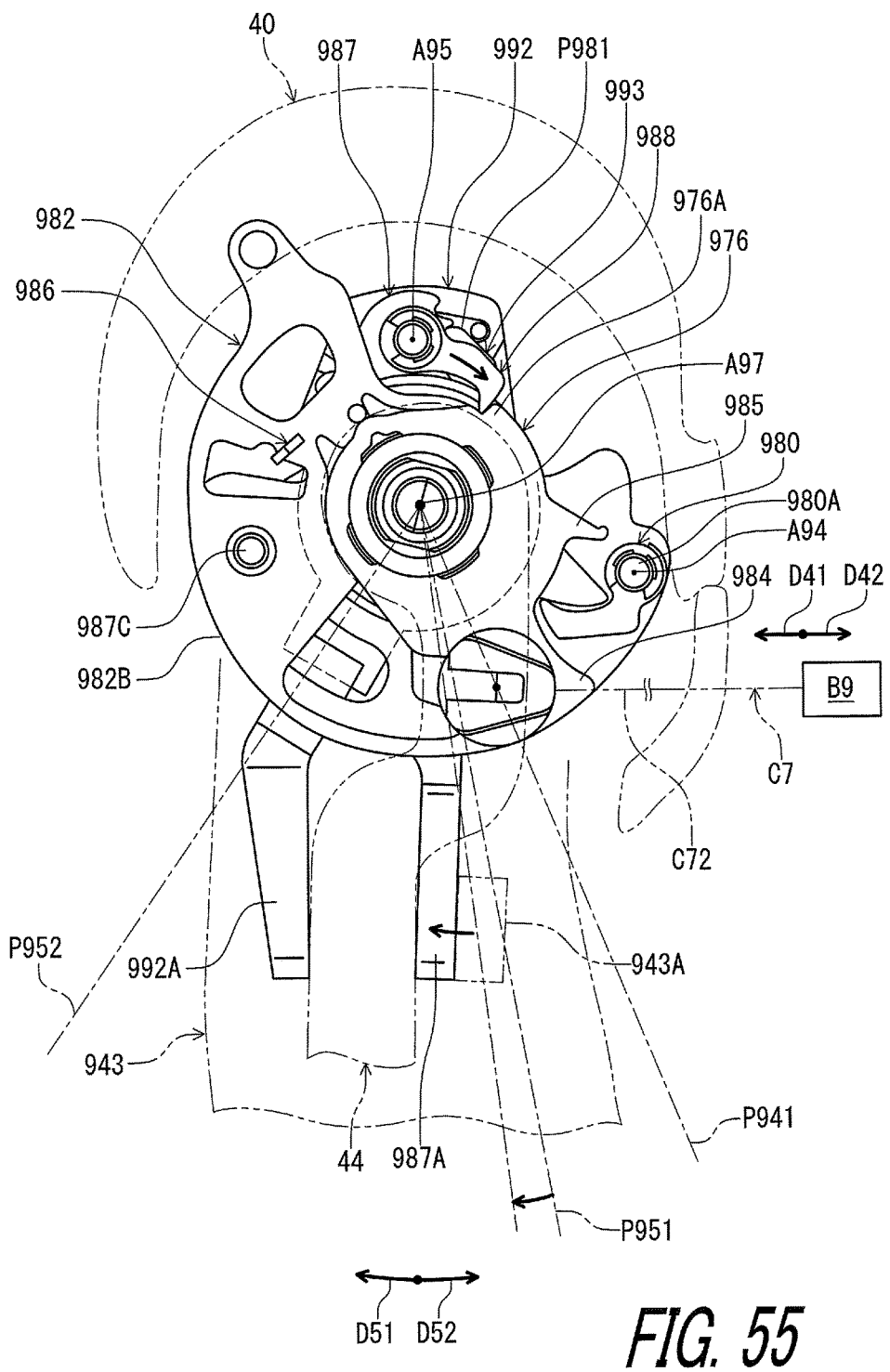
Figure 56:
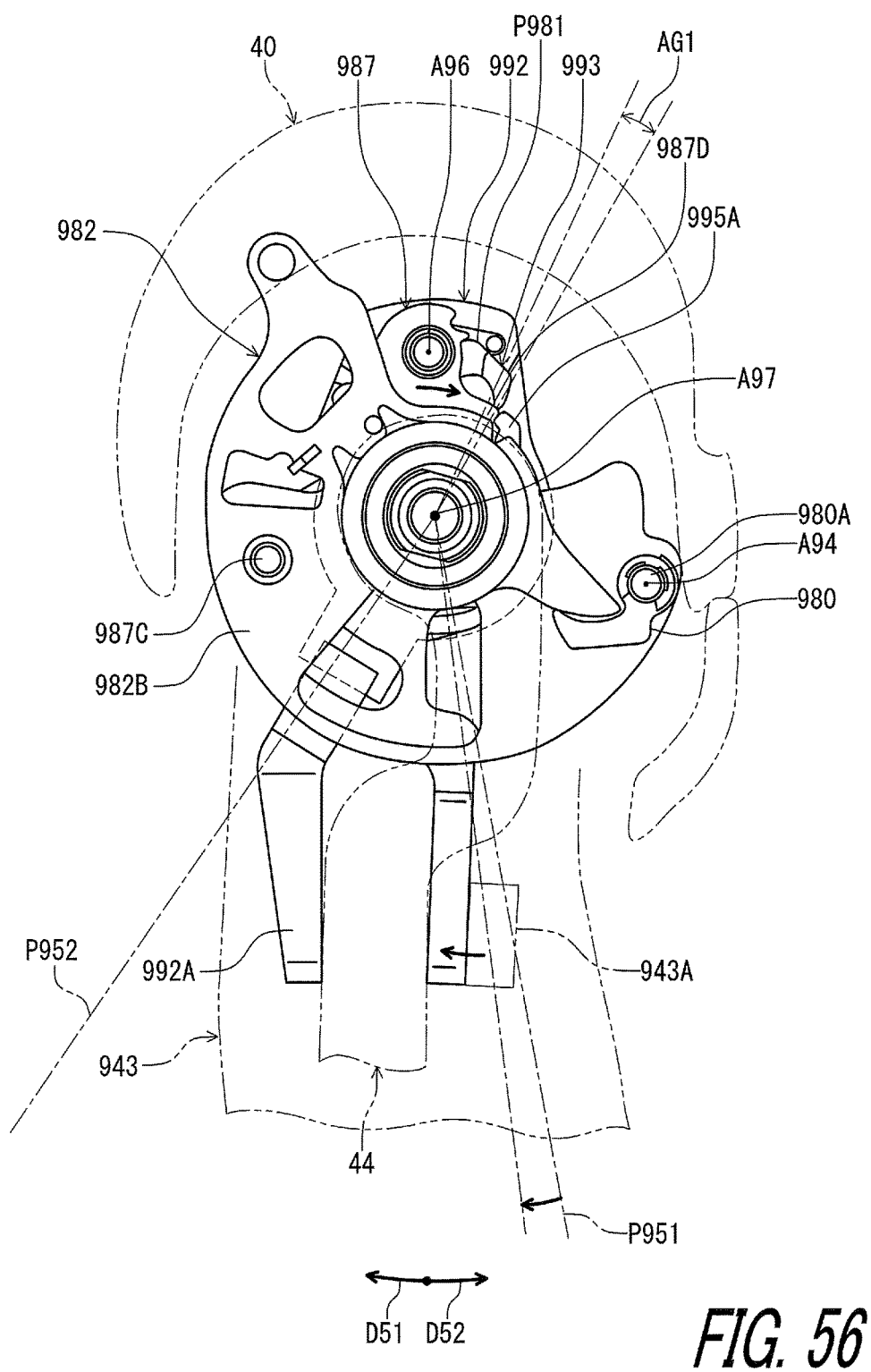

Specifically, as seen in FIG. 55, when the second operating member 943 is pivoted by the user relative to the base member 40 about the second pivot axis A93 from the second rest position P951 toward the second operated position P952, the first transmission part 987A of the first input member 987 is pressed toward the first operating member 44 by the contact part 943A of the second operating member 943. At this time, the first input member 987 is pivoted relative to the second input member 992 about the rotational axis A97 in the first direction D51 by the pivotal angle AG1 (FIG. 56). This prevents the second actuation member 993 from being engaged with the second actuation abutment 995A of the additional cable control body 995 even if the second input member 992 is pivoted relative to the additional cable control body 995 in the first direction D51.

In this embodiment, as seen in FIG. 56, the second actuation member 993 is pivoted by the release part 987D about the second actuation pivot axis A96 to the disengagement position P981 in response to the relative pivotal movement between the first input member 987 and the second input member 992 by the pivotal angle AG1.

Figure 57:
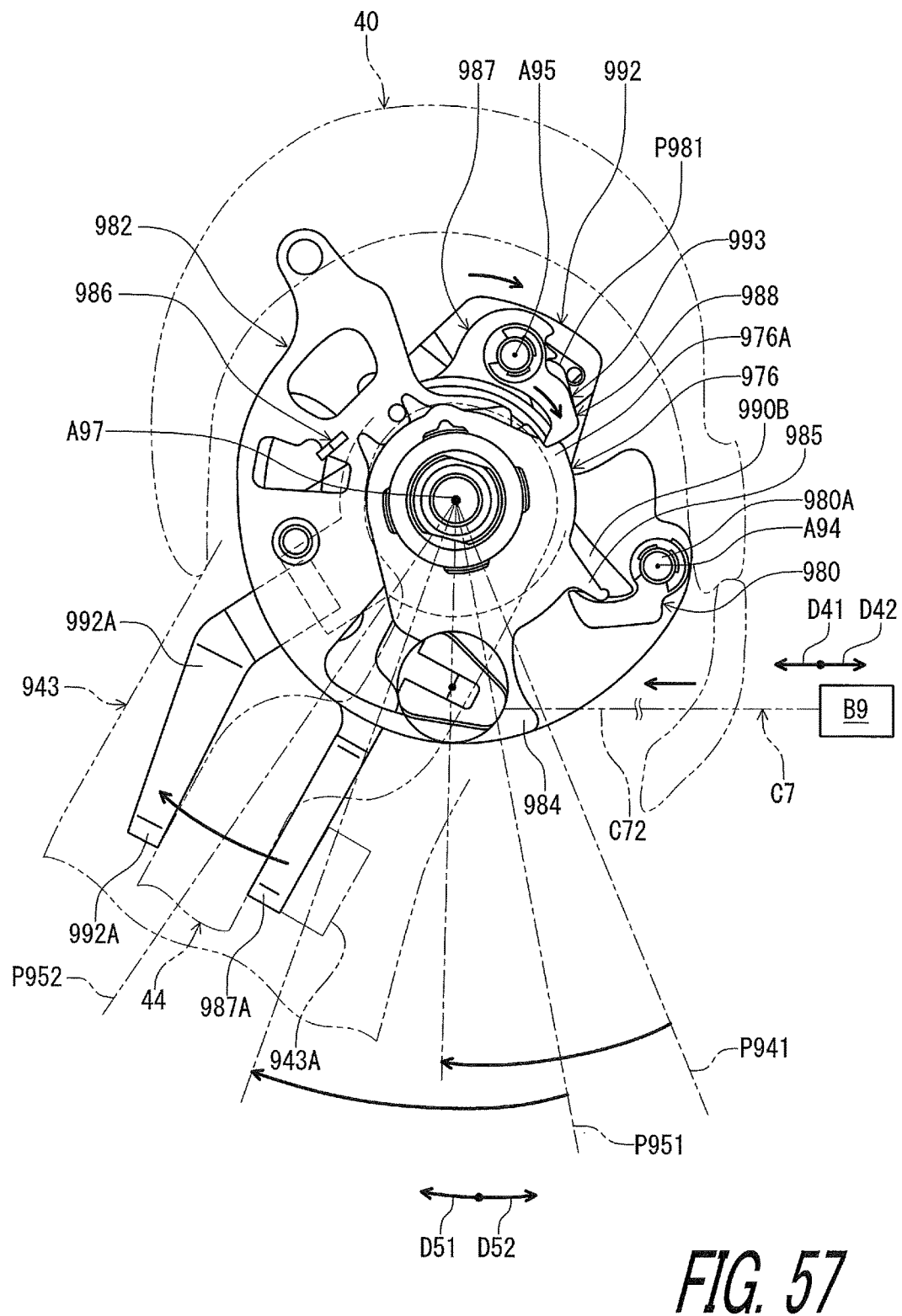

As seen in FIG. 57, the first input member 987, the second input member 992, and the first operating member 44 are integrally pivoted relative to the base member 40 together with the second operating member 943 in the first direction D51 when the second operating member 943 is further pivoted relative to the base member 40 about the second pivot axis A97 in the first direction D51. This pivots the cable control body 976 relative to the base member 40 from the first control position P941 toward the second control position P942.

Figure 58:
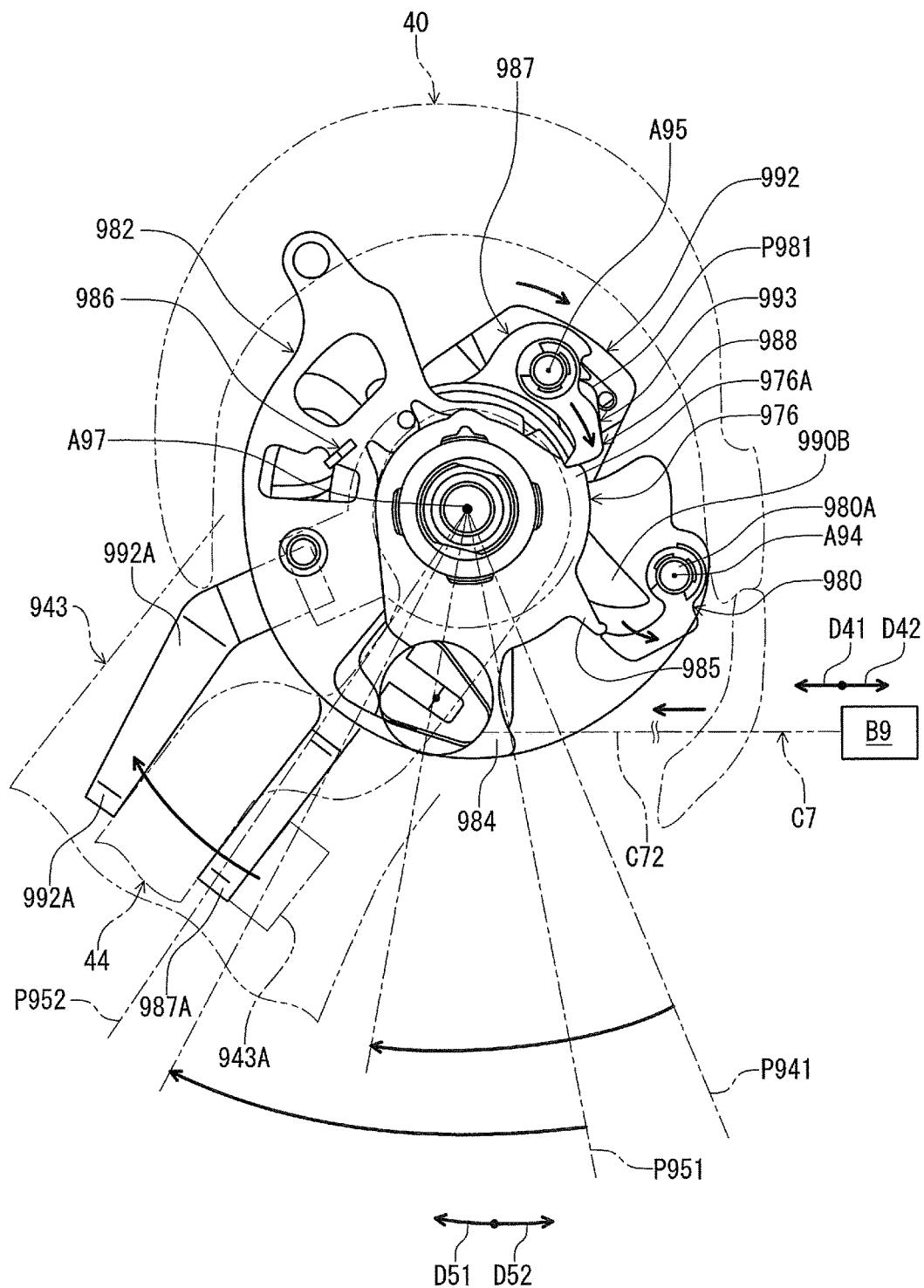

As seen in FIG. 58, the positioning member 980 is pivoted relative to the base member 40 about the positioning pivot axis P94 by the second positioning abutment 985 in response to the pivotal movement of the cable control body 976.

Figure 59:
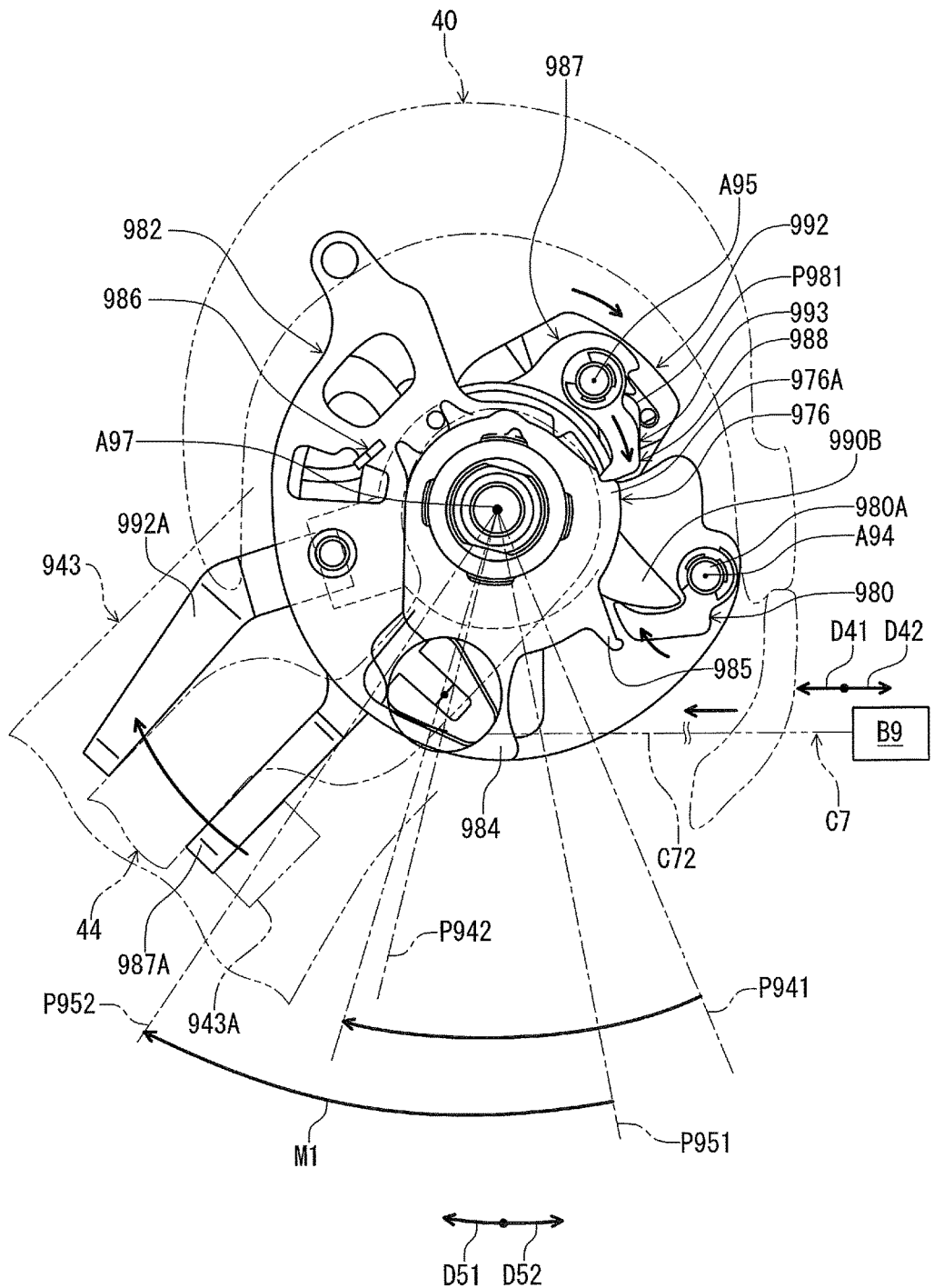

As seen in FIG. 59, the positioning member 980 is returned to an engagement position by the biasing force of the first biasing element 981 when the cable control body 976 is further pivoted relative to the base member 40 beyond the second control position P942 in the first direction D51. In this state, the positioning member 980 is disposed between the second positioning abutment 985 and the release abutment 990A.

Figure 60:
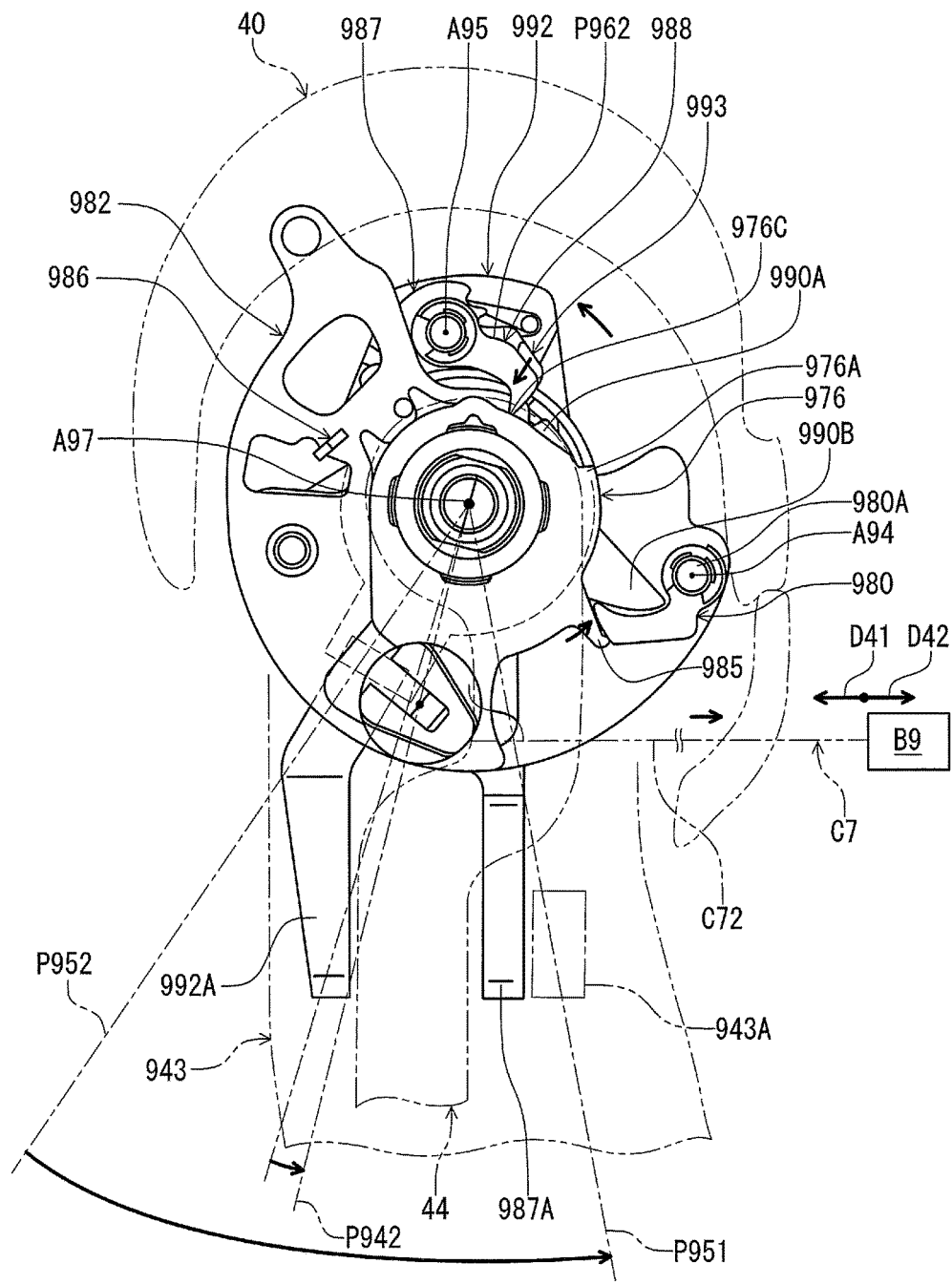

As seen in FIG. 60, the first input member 987, the second input member 992, and the first operating member 44 are returned to their rest positions when the second operating member 943 is returned to the second rest position P951. At this time, the cable control body 976 is pivoted relative to the base member 40 in the second direction D52, bringing the positioning member 980 into engagement with the second positioning abutment 985. Thus, the cable control body 976 is positioned at the second control position P942 relative to the base member 40, positioning the inner wire C72 of the second mechanical control cable C7 at a cable operated position.

Figure 61:
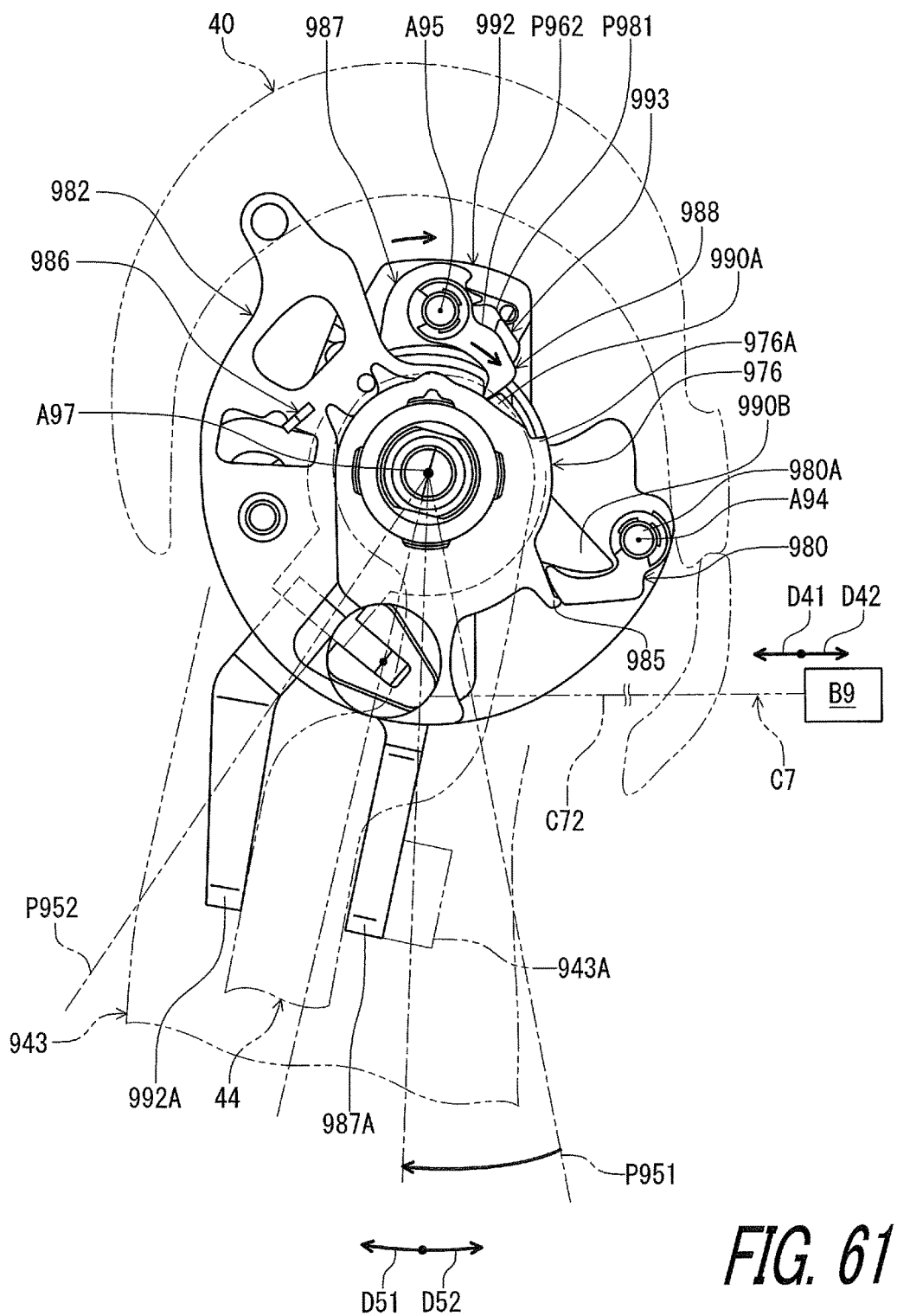

The releasing operation of the bicycle operating device 916 will be described in detail below referring to FIGS. 60 to 63. As seen in FIGS. 60 and 61, the first actuation member 988 is positioned at the second engagement position P962 by the second contact surface 976C in a state where the cable control body 976 is at the second control position P942. This allows the first actuation member 988 to come into contact with the release abutment 990A of the release member 990 when the first input member 987 and the second input member 992 are pivoted relative to the base member 40 in the first direction D51.

Figure 62:
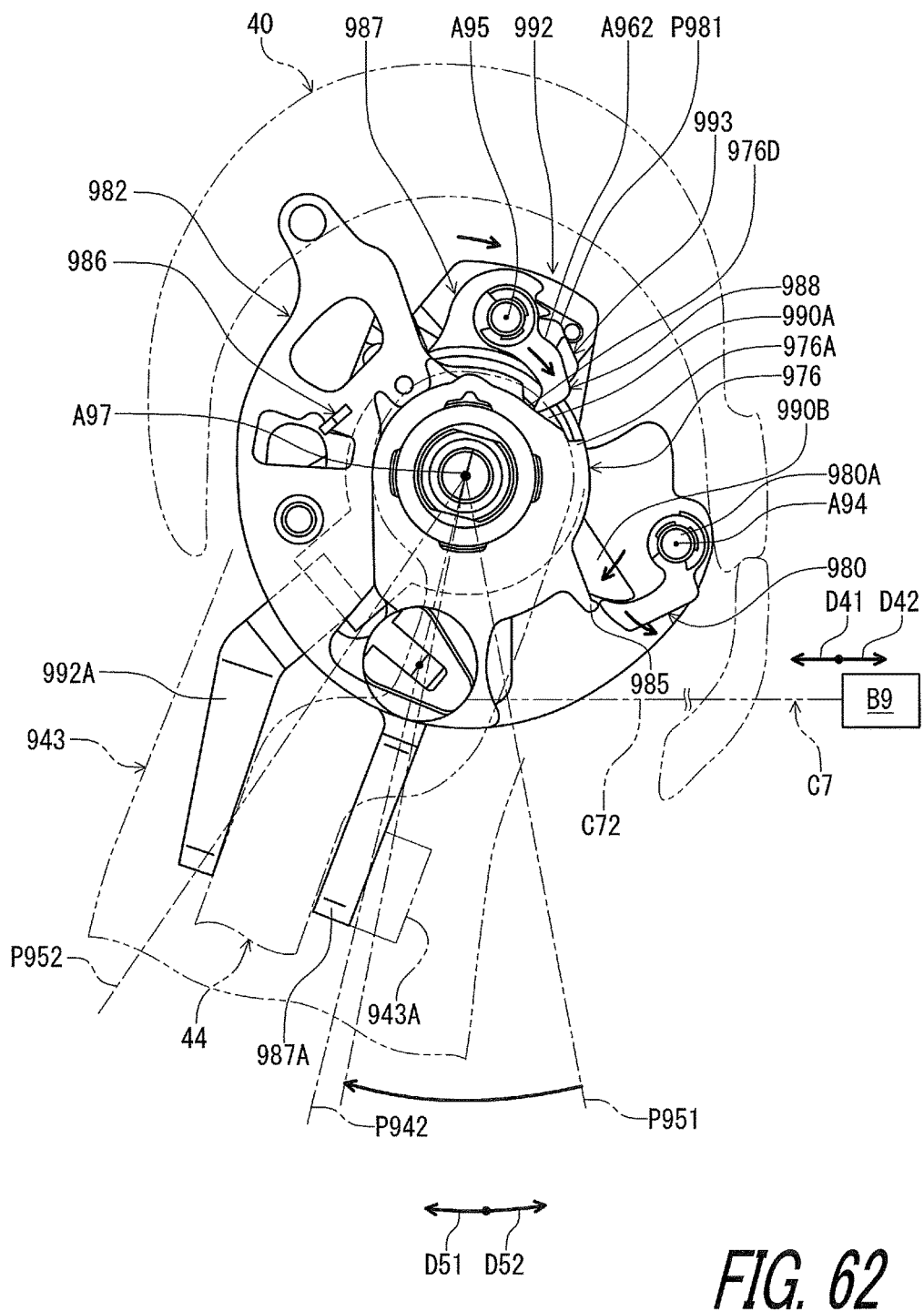

As seen in FIG. 62, the release member 990 is pivoted relative to the base member 40 in the first direction D51 when the first input member 987 and the second input member 992 are pivoted relative to the base member 40 in the first direction D51. At this time, the first actuation member 988 is not engaged with the first actuation abutment 976A.

Figure 63:
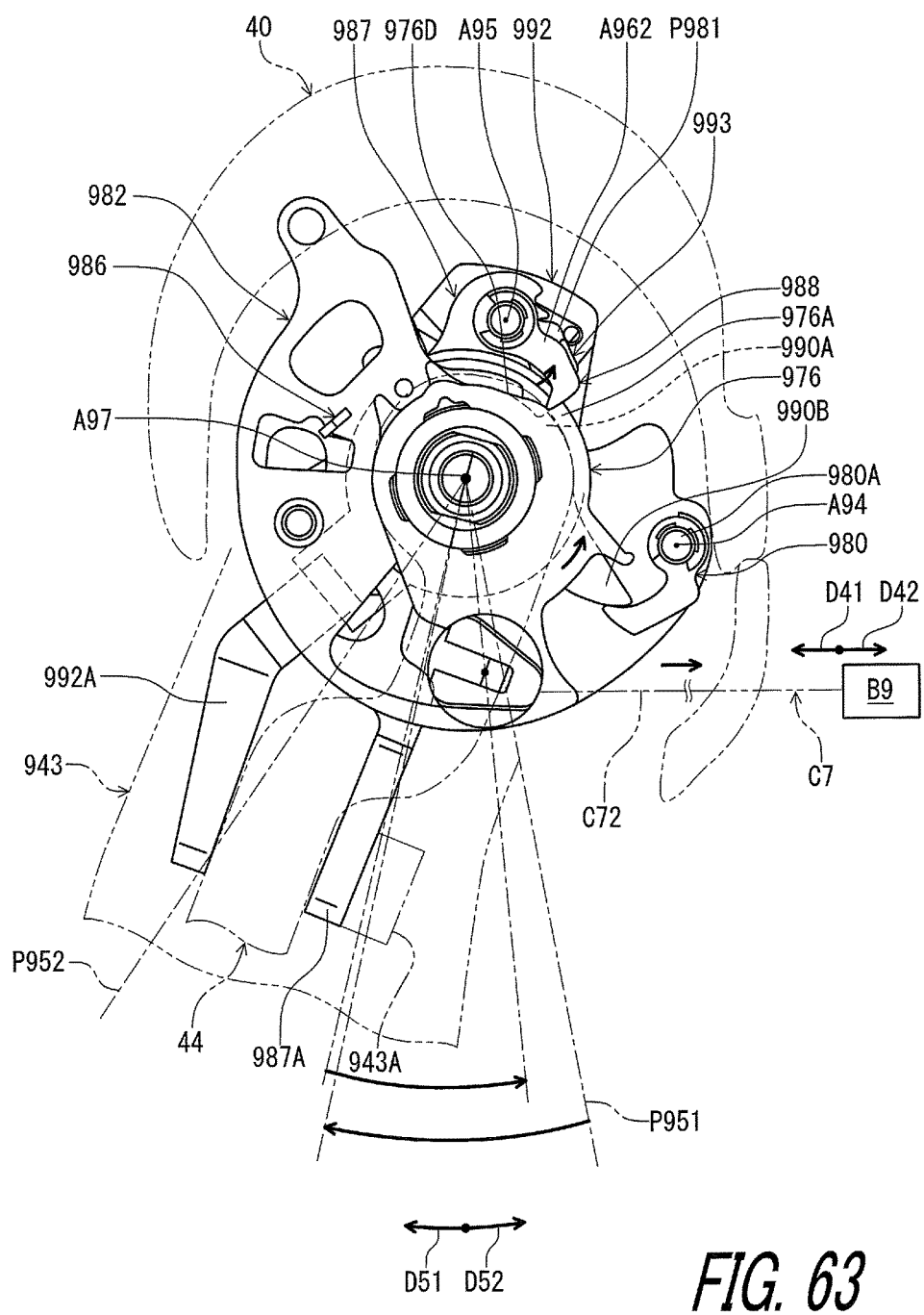

As seen in FIG. 63, the positioning member 980 is pivoted relative to the base member 40 to move away from the second positioning abutment 985 when the first input member 987 and the second input member 992 are further pivoted relative to the base member 40 in the first direction D51. This allows the cable control body 976 to pivot relative to the base member 40 in the second direction D52 by the biasing force of the control biasing element 986. Thus, a guide surface 976D of the cable control body 976 guides the first actuation member 988 to the first engagement position P961 in response to the pivotal movement of the cable control body 976. This brings the first actuation member 988 into engagement with the first actuation abutment 976A to stop the pivotal movement of the cable control body 976.

Figure 64:
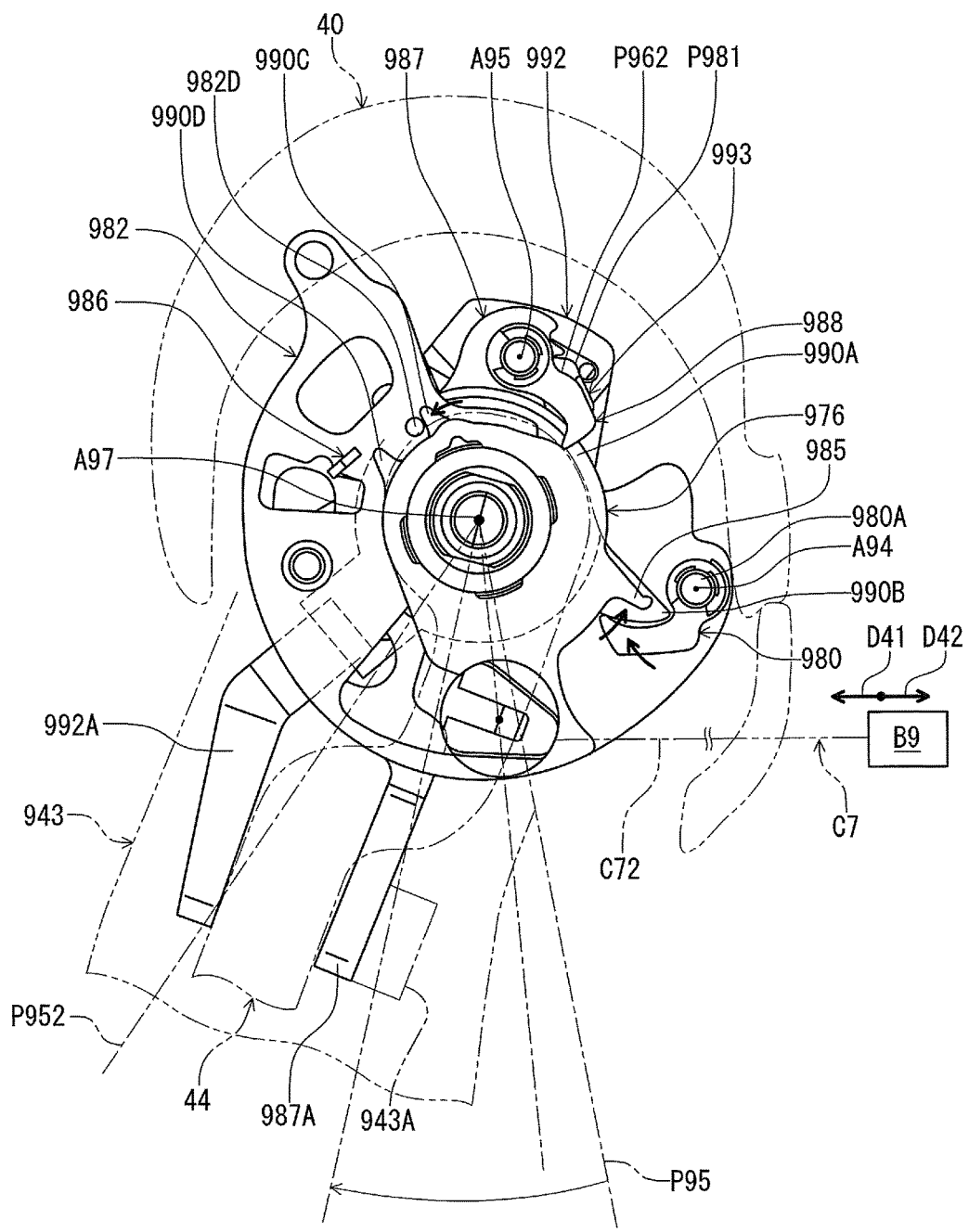

As seen in FIG. 64, the positioning member 980 is disengaged from the release abutment 990A when the first actuation member 988 is pivoted to the first engagement position P961. This allows the release member 990 to return to the rest position by the biasing force of the first biasing element 981 via the positioning member 980. The release member 990 is stopped by the first protrusion 990C and the stop pin 982D at the rest position.

As seen in FIG. 42, the first input member 987, the second input member 992, and the first operating member 44 are returned to their rest positions when the second operating member 943 is returned to the second rest position P951. At this time, the cable control body 976 is pivoted relative to the base member 40 in the second direction D52, bringing the positioning member 980 into engagement with the first positioning abutment 984. Thus, the cable control body 976 is positioned at the first control position P941 relative to the base member 40, positioning the inner wire C72 of the second mechanical control cable C7 at a first cable rest position.

With the bicycle seatpost apparatus 912 and the bicycle operating device 916, it is possible to obtain substantially the same effects as those of the bicycle seatpost apparatus 12 and the bicycle operating device 16 of the first embodiment.

The bicycle seatpost apparatus 912 and the bicycle operating device 916 further include the following features.

(1) The cable control body 976 is configured to be coupled to the second operating member 943 to move the second mechanical control cable C7 relative to the base member 40 in the pulling direction D41 and the releasing direction D42 opposite to the pulling direction D41 in response to a movement of the second operating member 943. The positioning structure 978 is configured to selectively maintain the cable control body 976 at a plurality of control positions. Accordingly, it is possible to operate an additional bicycle component having a plurality of positions corresponding to the plurality of control positions using the second operating member 943.

(2) One of the first operating member 44 and the second operating member 943 is integrally provided with the brake operating member 42 as a one-piece unitary member. Accordingly, it is possible to simplify the structure of the bicycle operating device 916.

(3) The second operating member 943 is integrally provided with the brake operating member 42 as a one-piece unitary member. The second operating member 943 is coupled to the base member 40 pivotally about the second pivot axis A93 which is non-parallel to the brake pivot axis A1. Accordingly, it is possible to differentiate the movement of the second operating member 943 from the movement of the brake operating member 42 even if the second operating member 943 is integrally provided with the brake operating member 42 as a one-piece unitary member. This allows the user to easily recognize each of the movement of the brake operating member 42 and the movement of the second operating member 943 with simplifying the structure of the bicycle operating device 916.

(4) The cable control body 976 is configured to pull the second mechanical control cable C7 when the second operating member 943 is moved relative to the base member 40 in the first direction D51. The cable control body 976 is configured to release the second mechanical control cable C7 when the second operating member 943 is moved relative to the base member 40 in the first direction D51. Accordingly, it is possible to pull and release the second mechanical control cable C7 to operate the additional bicycle component with a simple operation of the second operating member 943.

(5) The positioning structure 978 is coupled to the second operating member 943 to move the cable control body 976 such that the second mechanical control cable C7 is moved in the pulling direction D41 and the releasing direction D42 alternatingly in response to the first movement M1 of the second operating member 943. Accordingly, it is possible to move the second mechanical control cable C7 alternatingly in the pulling direction D41 and the releasing direction D42 with a simple operation of the second operating member 943.

(6) The positioning structure 978 is coupled to the cable control body 976 to position the cable control body 976 relative to the base member 40 at each of the first control position P941 and the second control position P942 relative to the base member 40. Accordingly, it is possible to operate the additional bicycle component having positions respectively corresponding to the first and second control positions P941 and P942 via the second mechanical control cable C7.

(7) The first operating member 44 is movable relative to the base member 40 from the first rest position P21 to the first operated position P22 in the first direction D51. The second operating member 943 is coupled to the base member 40 movably from the second rest position P951 to the second operated position P952 in the first direction D51. Accordingly, it is possible to operate the additional bicycle component using a simple operation of the first operating member 44 and the second operating member 943.

(8) The additional cable operating structure 991 is coupled to the first operating member 44 and the second operating member 943 to move the first mechanical control cable C1 from the first cable rest position P971 relative to the base member 40 in response to the movement of only one of the first operating member 44 and the second operating member 943. The additional cable operating structure 991 is coupled to the first operating member 44 and the second operating member 943 to maintain a position of the first mechanical control cable C1 at the first cable rest position P971 relative to the base member 40 in response to the movement of the second operating member 943. Accordingly, it is possible to prevent wrong operation of the first mechanical control cable C1 when both the first operating member 44 and the second operating member 943 are operated.

(9) Since the first length L92 is different from the second length L93, it is possible to easily recognize the first operating member 44 and the second operating member 943 based on the first length L92 and the second length L93.

(10) The one of the first operating member 44 and the second operating member 943 is closer to the first end portion 46 of the base member 40 than the other of the first operating member 44 and the second operating member 943. Accordingly, it is possible to easily recognize the first operating member 44 and the second operating member 943 based on the arrangement of the first operating member 44 and the second operating member 943.

(11) The first operating member 44 is movable relative to the base member 40 between the first rest position P21 and the first operated position P22 without mechanically positioning the first mechanical control cable C1 relative to the base member 40 during a movement of the first operating member 44 occurring between the first rest position P21 and the first operated position P22. The second operating member 943 is movably coupled to the base member 40. One of the first operating member 44 and the second operating member 943 is integrally provided with the brake operating member 42 as a one-piece unitary member. The cable operating structure 974 is coupled to the second operating member 943 to move the second mechanical control cable C7 relative to the base member 40 in response to a movement of the second operating member 943. Accordingly, it is possible to operate the brake device, a bicycle component, and an additional bicycle component using the brake operating member 42, the first operating member 44, and the second operating member 943.

Tenth Embodiment

A bicycle seatpost apparatus 1012 including a bicycle operating device 1016 in accordance with a tenth embodiment will be described below referring to FIGS. 65 to 94. The bicycle seatpost apparatus 1012 has the same structures as those of the bicycle seatpost apparatus 912 except for the first operating member 44 and the bicycle operating device 916. Thus, elements having substantially the same function as those in the above embodiments will be numbered the same here, and will not be described and/or illustrated again in detail here for the sake of brevity.

As seen in FIGS. 65 to 67, the bicycle operating device 1016 further comprises a first operating member 1044. The first operating member 1044 is coupled to the base member 40 movably between a first rest position P1021 and a first operated position P1022 to move the first mechanical control cable C1 relative to the base member 40. The first operating member 1044 is movable relative to the base member 40 between the first rest position P1021 and the first operated position P1022 without mechanically positioning the first mechanical control cable C1 relative to the base member 40 during a movement of the first operating member 1044 occurring between the first rest position P1021 and the first operated position P1022.

The first operating member 1044 has substantially the same structure as that of the first operating member 44 of the first embodiment. Unlike the first operating member 44 of the first embodiment, however, the first operating member 1044 is integrally provided with the brake operating member 42 as a one-piece unitary member. The brake operating member 42 and the first operating member 1044 are pivotable relative to the base member 40 about the first pivot axis A2 between the first rest position P1021 and the first operated position P1022.

The bicycle operating device 1016 has substantially the same structure as that of the bicycle operating device 916 of the ninth embodiment. Unlike the bicycle operating device 916 of the ninth embodiment, however, the bicycle operating device 1016 further comprises a second operating member 1043 movably coupled to the base member 40. One of the first operating member 1044 and the second operating member 1043 is integrally provided with the brake operating member 42 as a one-piece unitary member. In this embodiment, the first operating member 1044 is integrally provided with the brake operating member 42 as a one-piece unitary member. The second operating member 1043 is a separate member from the brake operating member 42 and the first operating member 1044 and is movable relative to the brake operating member 42 and the first operating member 1044. However, the second operating member 1043 can be integrally provided with the brake operating member 42 as a one-piece unitary member. In this embodiment, the front derailleur B9 is operated via the second operating member 1043. Other bicycle components can be operated via the second operating member 1043.

As seen in FIG. 67, the second operating member 1043 is coupled to the base member 40 pivotally about a second pivot axis A103 which is non-parallel to the brake pivot axis A1. In this embodiment, the second pivot axis A103 coincides with the first pivot axis A2 of the first operating member 1044. However, the second pivot axis A103 can be offset from the first pivot axis A2. The brake operating member 42 and the second operating member 1043 are pivotable relative to the base member 40 about the second pivot axis A93 between a second rest position P1051 and a second operated position P1052.

As seen in FIG. 68, the first operating member 1044 is coupled to the base member 40 movably between a first rest position P1021 and an first operated position P1022 to move the first mechanical control cable C1 relative to the base member 40. The first operating member 1044 is movable relative to the base member 40 between the first rest position P1021 and the first operated position P1022 without mechanically positioning the first mechanical control cable C1 relative to the base member 40 during a movement of the first operating member 1044 occurring between the first rest position P1021 and the first operated position P1022.

As seen in FIG. 67, the first operating member 1044 is pivoted together with the second operating member 1043 relative to the base member 40 from the first rest position P1021 to the first operated position P1022 when the second operating member 1043 is pivoted relative to the base member 40 from the second rest position P1051 to the second operated position P1052 even if the first operating member 1044 is not operated. As seen in FIG. 38, the first operating member 1044 is pivoted relative to the base member 40 and the brake and second operating members 42 and 1043 from the first rest position P1021 to the first operated position P1022 when only the first operating member 1044 is operated.

As seen in FIG. 69, the brake operating member 42 and the first operating member 1044 are pivotally coupled to the coupling member 274 about the first pivot axis A2 via the second shaft 64. The second operating member 1043 is pivotally coupled to the coupling member 274 about the second pivot axis A93 via the second shaft 64. The second biasing member 265 is mounted on the second shaft 64 to bias the brake operating member 42 and the first operating member 1044 toward the first rest position P1021 (FIG. 37). The second biasing member 65 is mounted on the second shaft 64 to bias the second operating member 1043 toward the second rest position P1051 (FIG. 38).

As seen in FIG. 69, the bicycle operating device 1016 further comprises a cable operating structure 1074. The cable operating structure 1074 is mounted on the third shaft 72. The third shaft 72 defines a rotational axis A107. As seen in FIGS. 70 and 71, the cable operating structure 1074 includes the cable control body 976 and a positioning structure 1078. The cable control body 976 is configured to be coupled to the second operating member 1043 to move the second mechanical control cable C7 relative to the base member 40 in the pulling direction D41 and the releasing direction D42 opposite to the pulling direction D41 in response to a movement of the second operating member 1043. The positioning structure 1078 is configured to selectively maintain the cable control body 976 at a plurality of control positions.

As seen in FIGS. 72 and 73, the positioning structure 1078 is coupled to the cable control body 976 to position the cable control body 976 relative to the base member 40 at each of the first control position P941 and the second control position P942 relative to the base member 40. The inner wire C72 is pulled relative to the outer casing C71 and the base member 40 when the cable control body 976 is pivoted relative to the base member 40 about the rotational axis A107 from the first control position P941 to the second control position P942. The inner wire C72 is released (retuned) relative to the outer casing C71 and the base member 40 when the cable control body 976 is returned relative to the base member 40 about the second pivot axis A103 from the second control position P942 to the first control position P941. The cable control body 976 is pivotally coupled to the base member 40 via the third shaft 72 about a rotational axis A107. The third shaft 72 defines the rotational axis A107. As seen in FIG. 69, the rotational axis A107 coincides with the second pivot axis A103 in the state where the brake operating member 42 is at the rest position P11.

As seen in FIG. 67, the second operating member 1043 is movable relative to the base member 40 in the first direction D51. The second operating member 1043 is coupled to the base member 40 movably from a second rest position P1051 to an second operated position P1052 in the first direction D51. As seen in FIG. 68, the first operating member 1044 is movable relative to the base member 40 from the first rest position P1021 to the first operated position P1022 in the first direction D51.

As seen in FIG. 73, the cable control body 976 is configured to pull the second mechanical control cable C7 when the second operating member 1043 is moved relative to the base member 40 in the first direction D51. The cable control body 976 is configured to release the second mechanical control cable C7 when the second operating member 1043 is moved relative to the base member 40 in the first direction D51.

Specifically, the second operating member 1043 is movable relative to the base member 40 in the first direction D51 to provide a first movement M101. In this embodiment, the first movement M101 is a pivotal movement of the second operating member 1043. The positioning structure 1078 is coupled to the second operating member 1043 to move the cable control body 976 such that the second mechanical control cable C7 is moved in the pulling direction D41 and the releasing direction D42 alternatingly in response to the first movement M101 of the second operating member 1043.

As seen in FIGS. 70 to 73, the positioning structure 1078 includes the positioning member 980, the pivot pin 980A, and the first biasing element 981, and the release member 990. Thus, they will not be described in detail here for the sake of brevity.

As seen in FIGS. 71 and 73, the positioning structure 1078 includes a first input member 1092, a first actuation member 1088, and a first actuation biasing element 1089. The first input member 1092 is pivotally coupled to the base member 40 about the rotational axis A107. The first input member 1092 is pivotally mounted on the third shaft 72. The first input member 1092 includes a first transmission part 1092A. The first transmission part 1092A is contactable with the second operating member 1043. The first input member 1092 is pivoted relative to the base member 40 about the rotational axis A107 when the second operating member 943 is pivoted relative to the base member 40 about the second pivot axis A103 from the second rest position P1051 to the second operated position P1052. The first actuation member 1088 is pivotally coupled to the first input member 1092 about a first actuation pivot axis A105 via a pivot pin 1088A. The first actuation member 1088 includes a first actuation pawl. The first actuation biasing element 1089 is mounted to the first input member 1092 to bias the first actuation member 1088 toward the cable control body 976. The first actuation biasing element 1089 include a torsion coil spring. The first input member 1092 includes the elongated hole 987B.

As seen in FIGS. 78 to 81, the bicycle operating device 1016 further comprises an additional cable operating structure 1091. The additional cable operating structure 1091 is coupled to the first operating member 1044 and the second operating member 1043 to move the first mechanical control cable C1 from the first cable rest position P971 relative to the base member 40 in response to a movement of the first operating member 1044. Specifically, the additional cable operating structure 1091 is coupled to the first operating member 1044 and the second operating member 1043 to move the first mechanical control cable C1 from the first cable rest position P971 relative to the base member 40 in response to a simultaneous movement of both the first operating member 1044 and the second operating member 1043. The additional cable operating structure 1091 is coupled to the first operating member 1044 and the second operating member 1043 to move the inner wire C12 of the first mechanical control cable C1 from the first cable rest position P971 relative to the base member 40 in response to the simultaneous movement of both the first operating member 1044 and the second operating member 1043.

As seen in FIG. 66, the one of the first operating member 1044 and the second operating member 1043 is closer to the first end portion 46 of the base member 40 than the other of the first operating member 1044 and the second operating member 1043. In this embodiment, the second operating member 1043 is closer to the first end portion 46 of the base member 40 than the brake operating member 42 and the first operating member 1044. However, the first operating member 1044 can be closer to the first end portion 46 of the base member 40 than the second operating member 1043.

As seen in FIGS. 67 and 68, the first operating member 1044 includes a first longitudinal axis LA102 and a first length L102 defined along the first longitudinal axis LA102. The second operating member 1043 includes a second longitudinal axis LA103 and a second length L103 defined along the second longitudinal axis LA103. The first length L102 is different from the second length L103. While the second length L103 is shorter than the first length L102 in this embodiment, the second length L103 can be equal to or longer than the first length L102. In this embodiment, each of the first longitudinal axis LA102 and the second longitudinal axis LA103 intersects with the second pivot axis A103. Each of the first length L102 and the second length L103 is defined from the second pivot axis A103.

As seen in FIGS. 78 to 81, the additional cable operating structure 1091 includes a second input member 1087, a second actuation member 1093, and an additional cable control body 1095. The second input member 1087 is pivotally coupled to the base member 40 about the rotational axis A107. The second input member 1087 is pivotally mounted on the third shaft 72. The second input member 1087 includes a second transmission part 1087A. The second transmission part 1087A is contactable with the first operating member 1044. The second input member 1087 is pivoted relative to the base member 40 about the second pivot axis A103 when the first operating member 1044 is pivoted relative to the base member 40 about the second pivot axis A103 from the first rest position P1021 to the first operated position P1022. The first and second input members 1092 and 1087 are pivoted relative to the base member 40 about the rotational axis A107 in the first direction D51 when the first operating member 1044 is pivoted relative to the base member 40 about the first pivot axis A2 from the first rest position P1021 to the first operated position P1022.

As seen in FIG. 78, the second actuation member 1093 is pivotally coupled to the first input member 1092 about the first actuation pivot axis A105 via the pivot pin 1088A. The second actuation member 1093 includes a second actuation pawl. The first actuation biasing element 1089 is mounted to the pivot pin 1088A to bias the first actuation member 1088 and the second actuation member 1093. The first actuation biasing element 1089 biases the first actuation member 1088 and the second actuation member 1093 to respectively pivot in directions different from each other about the first actuation pivot axis A105.

As seen in FIG. 79, the second input member 1087 includes a release part 1087B. The release part 1087B is in contact with the first actuation member 1088 in a state where the first and second operating members 1044 and 1043 are respectively positioned at the rest positions P1021 and P1051. The first actuation biasing element 1089 biases the first actuation member 1088 to keep in contact with the release part 1087B. In this state, the release part 1087B positions the first actuation member 1088 at an engagement position P1061.

As seen in FIGS. 80 and 81, the first input member 1092 includes a stopper 1092B. the first actuation biasing element 1089 biases the second actuation member 1093 to keep in contact with the stopper 1092B. In this state, the stopper 1092B positions the second actuation member 1093 at a disengagement position P1081.

The additional cable control body 1095 includes a second actuation abutment 1095A. The second actuation member 1093 is provided radially outward of the second actuation abutment 1095A in a state where the second actuation member 1093 is at the disengagement position P1081. Thus, the second actuation member 1093 is not contactable with the second actuation abutment 1095A in a state where the second actuation member 1093 is at the disengagement position P1081 even if the first input member 1092 is pivoted relative to the base member 40 in the first direction D51. Thus, the first mechanical control cable C1 is pulled when the second operating member 1043 is pivoted relative to the base member 40 about the second pivot axis A103 without a pivotal movement of the first operating member 1044. The first control cable C1 is released (returned) when the second operating member 1043 is returned to the second rest position P1051.

As seen in FIGS. 81 and 82, the second input member 1087 includes an actuation part 1087C. The second actuation member 1093 includes an actuated part 1093A. The actuation part 1087C is spaced apart from the actuated part 1093A in a state where the first and second operating members 1044 and 1043 are respectively positioned at the rest positions P1021 and P1051. The actuation part 1087C pushes the actuated part 1093A when the second input member 1087 is pivoted relative to the first input member 1092 by a pivotal angle AG2. This pivots the second actuation member 1093 relative to the first input member 1092 about the first actuation pivot axis A105 from the disengagement position P1081 to an engagement position P1082 (FIG. 81). The pivotal angle AG2 is defined by a clearance CL2 between the second operating member 1043 and the second transmission part 1087A. The second actuation member 1093 is contactable with the second actuation abutment 1095A in a state where the second actuation member 1093 is at the engagement position P1082.

As seen in FIG. 79, the release part 1087B moves the first actuation member 1088 away from the cable control body 976 when the second input member 1087 is pivoted relative to the first input member 1092 by the pivotal angle AG2. This pivots the first actuation member 1088 relative to the first input member 1092 about the first actuation pivot axis A105 from the engagement position P1061 to a disengagement position P1062. The first actuation member 1088 is provided radially outward of the first actuation abutment 976A. Thus, the first actuation member 1088 is not contactable with the first actuation abutment 976A when the second input member 1087 is pivoted relative to the first input member 1092 by the pivotal angle AG2.

Thus, the additional cable operating structure 1091 is coupled to the first operating member 1044 and the second operating member 1043 to maintain a position of the first mechanical control cable C1 at the first cable rest position P971 relative to the base member 40 in response to the movement of only one of the first operating member 1044 and the second operating member 1043. In this embodiment, the additional cable operating structure 1091 is coupled to the first operating member 1044 and the second operating member 1043 to maintain the position of the first mechanical control cable C1 at the first cable rest position P971 relative to the base member 40 in response to the movement of only the second operating member 1043. Specifically, the additional cable operating structure 1091 is coupled to the first operating member 1044 and the second operating member 1043 to maintain a position of the inner wire C12 of the first mechanical control cable C1 at the first cable rest position P971 relative to the base member 40 in response to the movement of only the second operating member 1043. However, the additional cable operating structure 1091 can be coupled to the first operating member 1044 and the second operating member 1043 to maintain the position of the first mechanical control cable C1 at the first cable rest position P971 relative to the base member 40 in response to the movement of only the first operating member 1044.

As seen in FIG. 75, the first actuation member 1088 comes into contact with the second contact surface 976C when the first input member 1092 is pivoted relative to the second input member 1087 by a pivotal angle AG3 in the first direction D51 in a state where the cable control body 976 is positioned at the second control position P942 because of the biasing force of the first actuation biasing element 1089. In this state, the first actuation member 1088 is positioned at a second engagement position P1062. For example, the pivotal angle AG3 is larger than the pivotal angle AG2 (FIG. 73).

As seen in FIGS. 76 and 77, the first actuation member 1088 is contactable with the release abutment 990A before the first actuation member 1088 comes into contact with the first actuation abutment 976A in a state where the first actuation member 1088 is positioned at the second engagement position P1062 (FIG. 75). In this state, the first movement M101 of the second operating member 943 is transmitted to the release member 990 via the first input member 1092 and the first actuation member 1088. This pivots the positioning member 980 about the positioning pivot axis A104 against a biasing force of the first biasing element 981 to move away from the cable control body 976.

Figure 83:
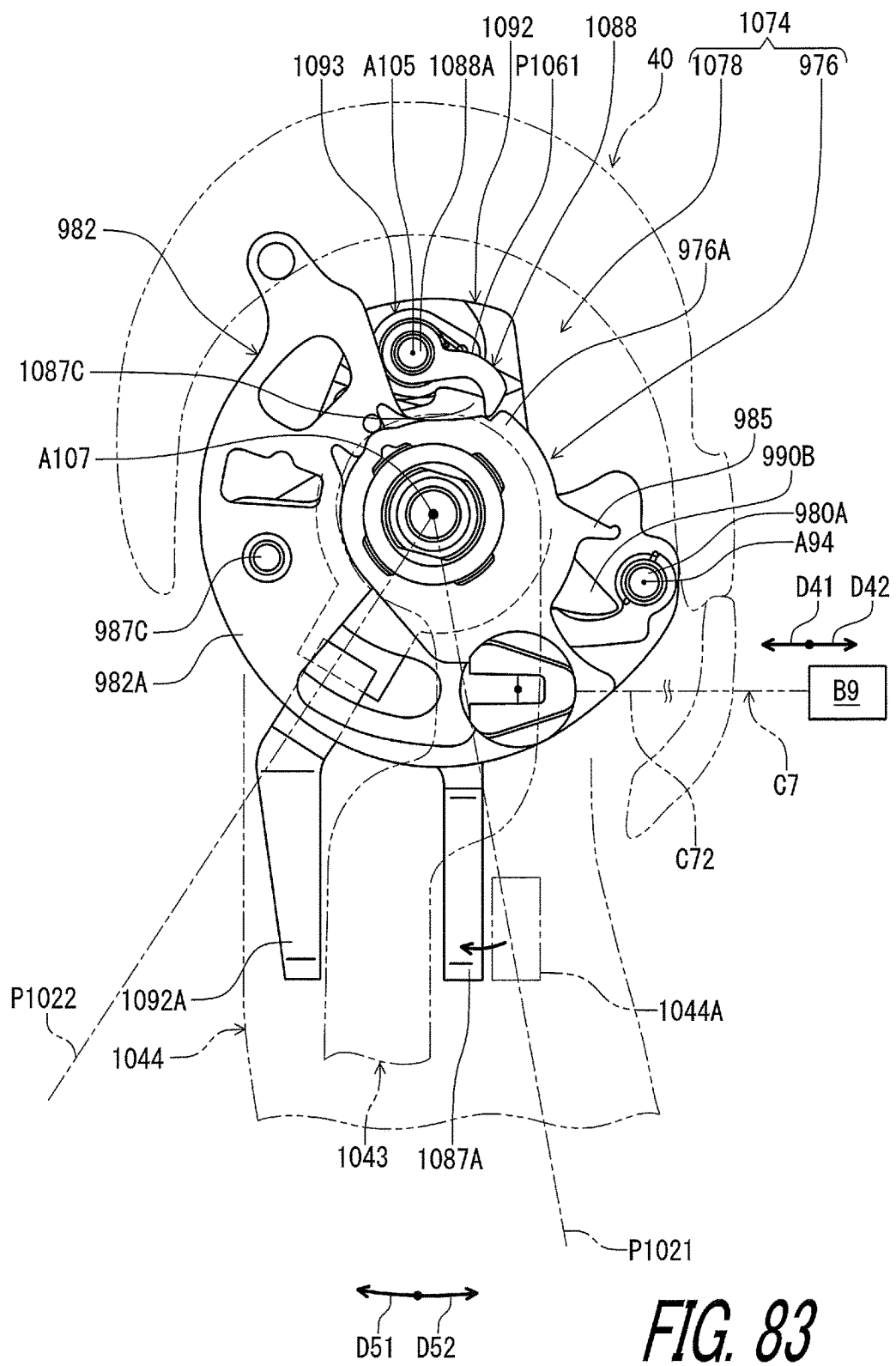

The pulling and releasing operation of the bicycle operating device 1016 for the first mechanical control cable C1 will be described in detail below referring to FIGS. 83 to 88. FIG. 83 show the bicycle operating device 1016 in a non-operated state where the illustrated parts are in their rest positions. FIGS. 83 to 88 show the parts of the bicycle operating device 1016 that are sequentially moved as the first operating member 1044 is pivoted from the first rest position P1021 to the first operated position P1022 to perform the pulling operation of the first mechanical control cable C1.

Figure 84:
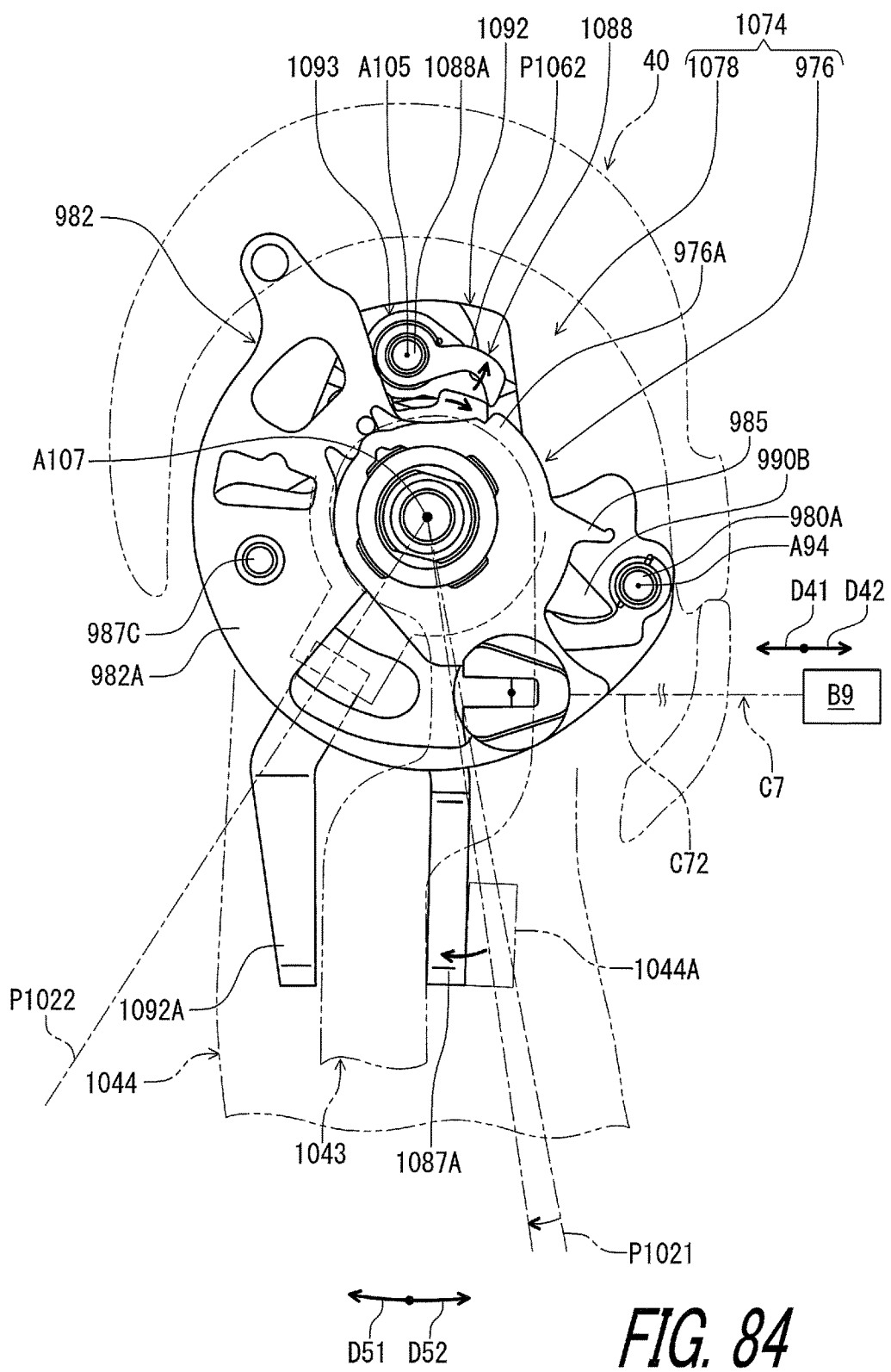

Specifically, as seen in FIGS. 83 and 84, when the first operating member 1044 is pivoted by the user relative to the base member 40 about the first pivot axis A2 from the first rest position P1021 toward the first operated position P1022, the second transmission part 1087A of the second input member 1087 is pressed toward the second operating member 1043 by the contact part 1044A of the first operating member 1044. At this time, the second input member 1087 is pivoted relative to the first input member 1092 about the rotational axis A107 in the first direction D51 by the pivotal angle AG2 (FIG. 73). This pivots the first actuation member 1088 from the engagement position P1061 to the disengagement position P1062. This prevents the first actuation member 1088 from being engaged with the first actuation abutment 976A of the cable control body 976 even if the first input member 1092 is pivoted relative to the cable control body 976 in the first direction D51.

Figure 85:
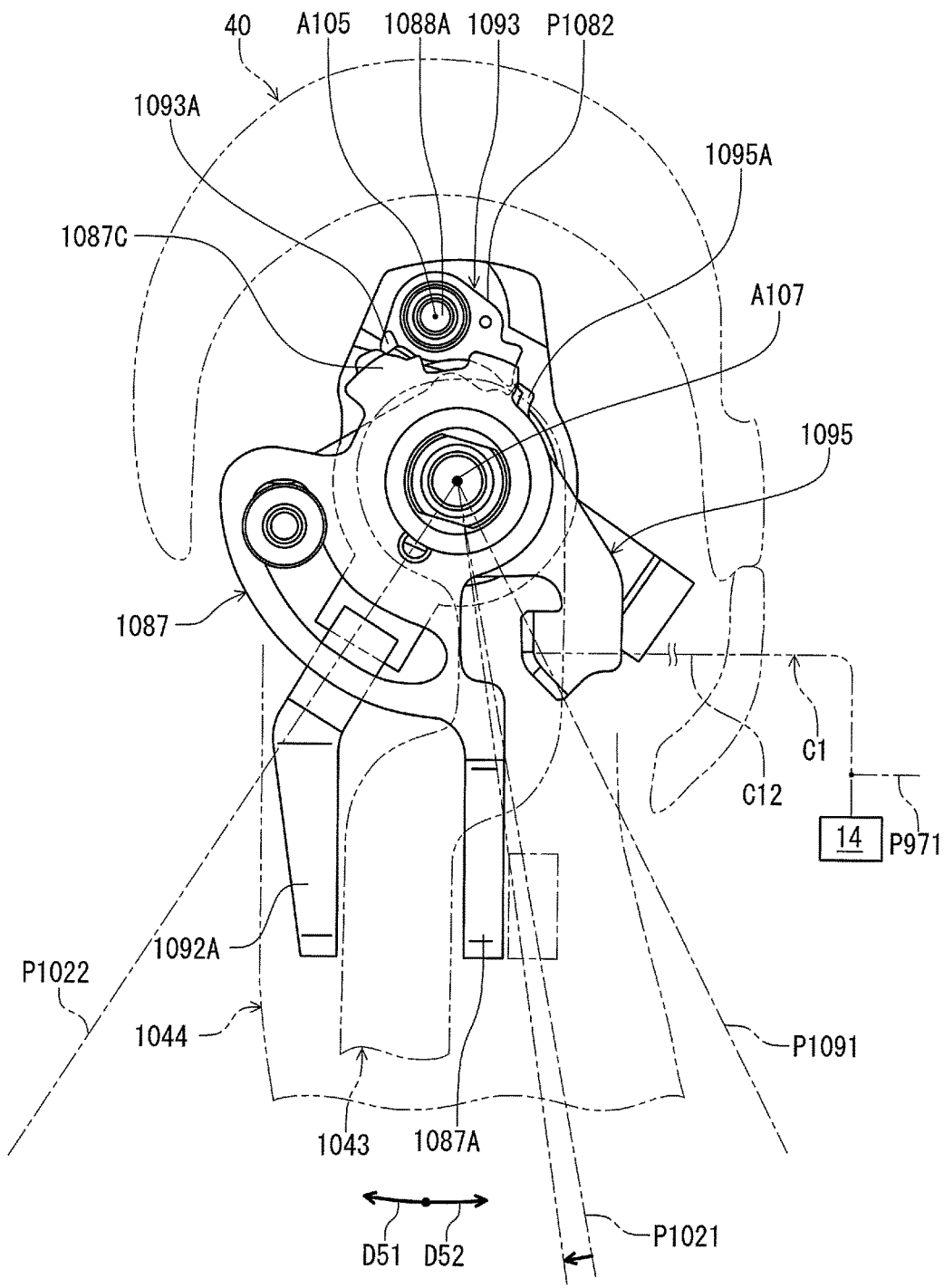

Furthermore, as seen in FIG. 85, the actuation part 1087C moves the actuated part 1093A to pivot the second actuation member 1093 when the second input member 1087 is pivoted relative to the first input member 1092 about the rotational axis A107 in the first direction D51 by the pivotal angle AG2 (FIG. 73). This allows the second actuation member 1093 to be engaged with the second actuation abutment 1095A when the first input member 1092 is pivoted relative to the base member 40 in the first direction D51.

Figure 86:
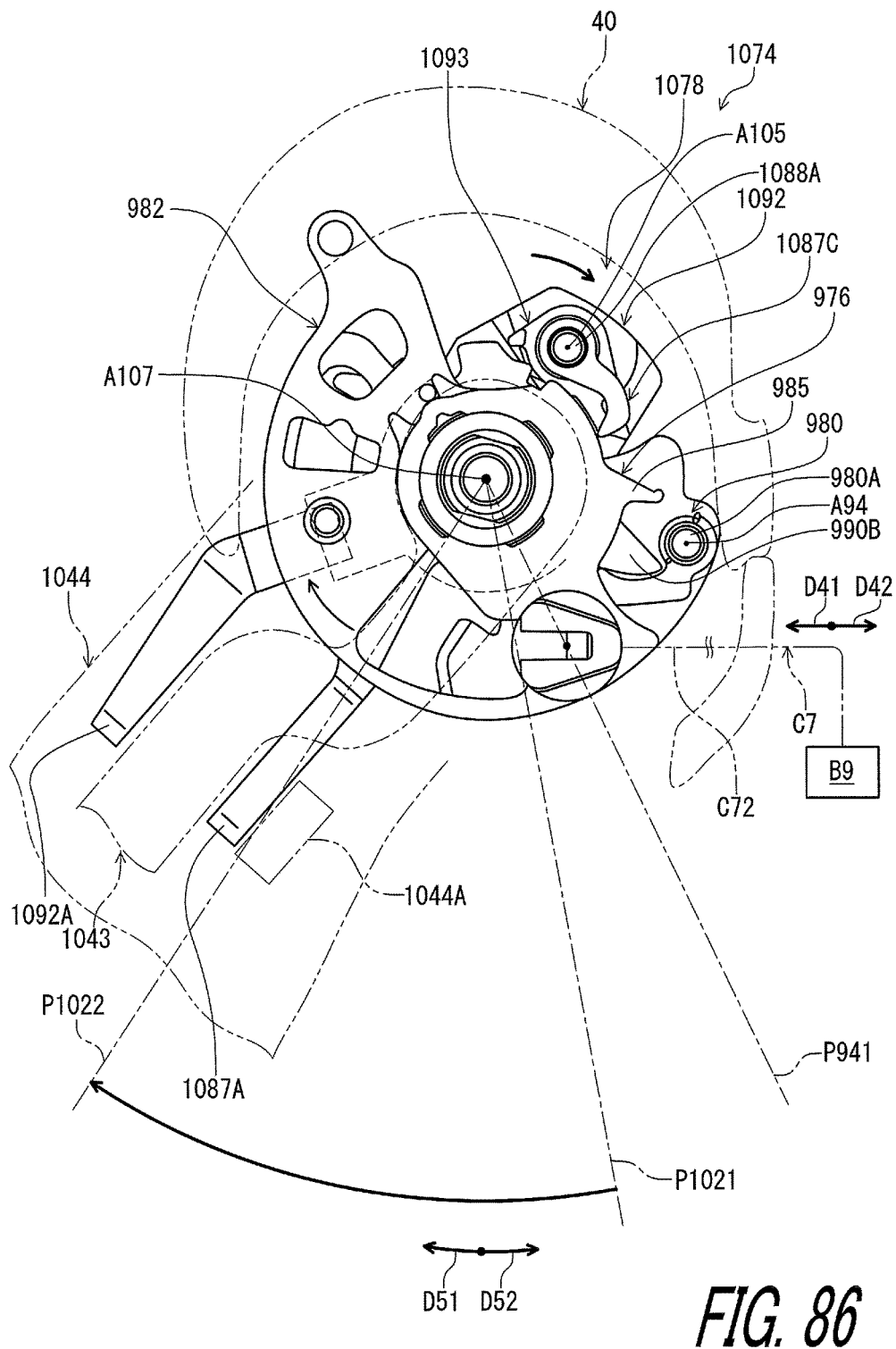
Figure 87:
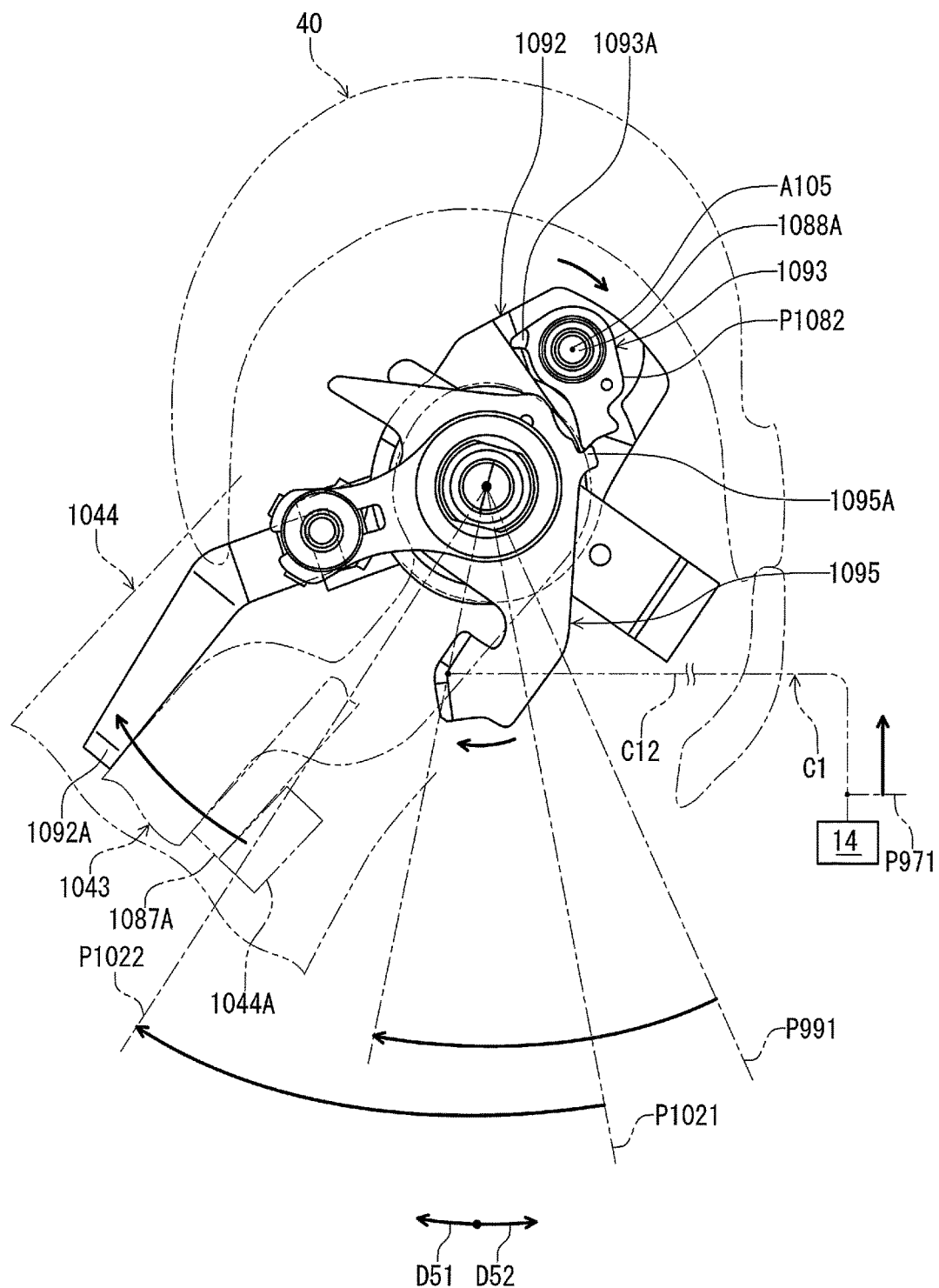

As seen in FIGS. 86 and 87, the second input member 1087, the first input member 1092, and the first operating member 1044 are integrally pivoted relative to the base member 40 together with the second operating member 1043 in the first direction D51 when the second operating member 1043 is further pivoted relative to the base member 40 about the second pivot axis A103 in the first direction D51. This pivots the additional cable control body 1095 relative to the base member 40 from the additional rest position P991 in the first direction D51 while the cable control body 976 is at the first control position P941. Thus, the inner wire C12 of the first mechanical control cable C1 is pulled when the first operating member 1044 and the second operating member 1043 are pivoted together relative to the base member 40 about the second pivot axis A103. When the first operating member 1044 is returned to the first rest position P1021 by removing or reducing an operation force applied from the user to the first operating member 1044, the inner wire C12 of the first mechanical control cable C1 is released (returned) to the first cable rest position P971.

The pulling operation of the bicycle operating device 1016 for the second mechanical control cable C7 will be described in detail below referring to FIGS. 73 and 88 to 90. FIG. 73 show the bicycle operating device 1016 in a non-operated state where the illustrated parts are in their rest positions. FIGS. 88 to 93 show the parts of the bicycle operating device 1016 that are sequentially moved as the second operating member 1043 is pivoted from the second rest position P1051 to the second operated position P1052 and then back to the second rest position P1051 to perform the pulling operation of the second mechanical control cable C7.

As seen in FIGS. 73 and 88, when the second operating member 1043 is pivoted by the user relative to the base member 40 about the second pivot axis A103 from the second rest position P1051 toward the second operated position P1052, the first transmission part 1092A of the first input member 1092 is pressed by the second operating member 1043. Thus, the first input member 1092 is pivoted relative to the base member 40 about the rotational axis A107 in the first direction D51 while the first operating member 1044 and the second input member 1087 are stationary relative to the base member 40. This brings the first actuation member 1088 into engagement with the first actuation abutment 976A of the cable control body 976.

Figure 90:
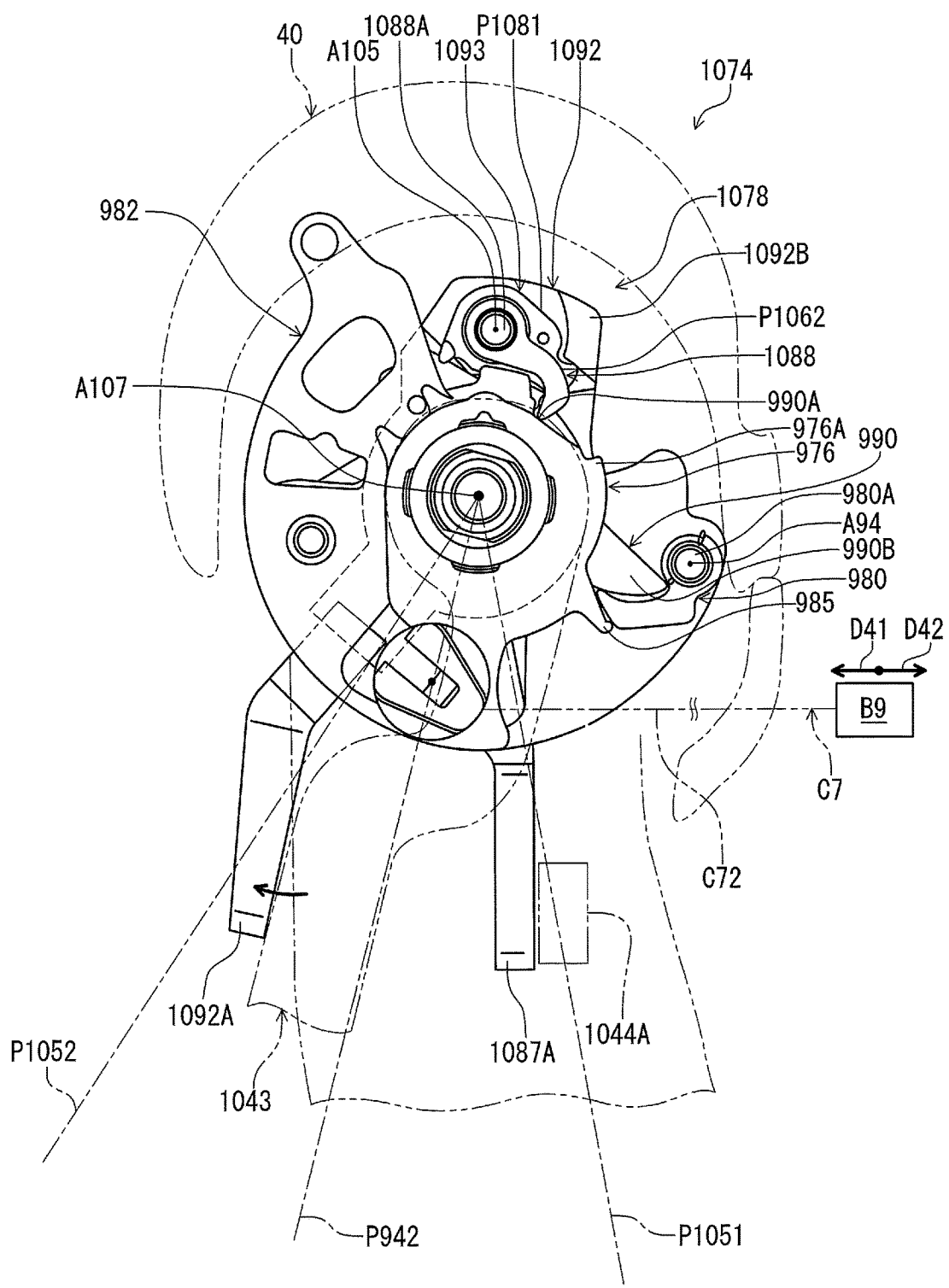

As seen in FIGS. 89 and 90, when the second operating member 1043 is further pivoted relative to the base member 40 about the rotational axis A107 in the first direction D51, the cable control body 976 is pivoted relative to the base member 40 about the rotational axis A107 in the first direction D51. Thus, the inner wire C72 of the second mechanical control cable C7 is pulled from the first cable rest position P971 in response to the pivotal movement of the second operating member 1043. The cable control body 976 is positioned at the second control position P942 relative to the base member 40 by the positioning member 980 and the second positioning abutment 985. This positions the inner wire C72 of the second mechanical control cable C7 at the cable operated position.

The releasing operation of the bicycle operating device 1016 for the second mechanical control cable C7 will be described in detail below referring to FIGS. 90 to 93. As seen in FIG. 90, the first actuation member 988 is positioned at the second engagement position P962 by the second contact surface 976C in a state where the cable control body 976 is at the second control position P942. This allows the first actuation member 988 to come into contact with the release abutment 990A of the release member 990 when the second operating member 1043 and the first input member 1092 are pivoted relative to the base member 40 in the first direction D51.

Figure 91:
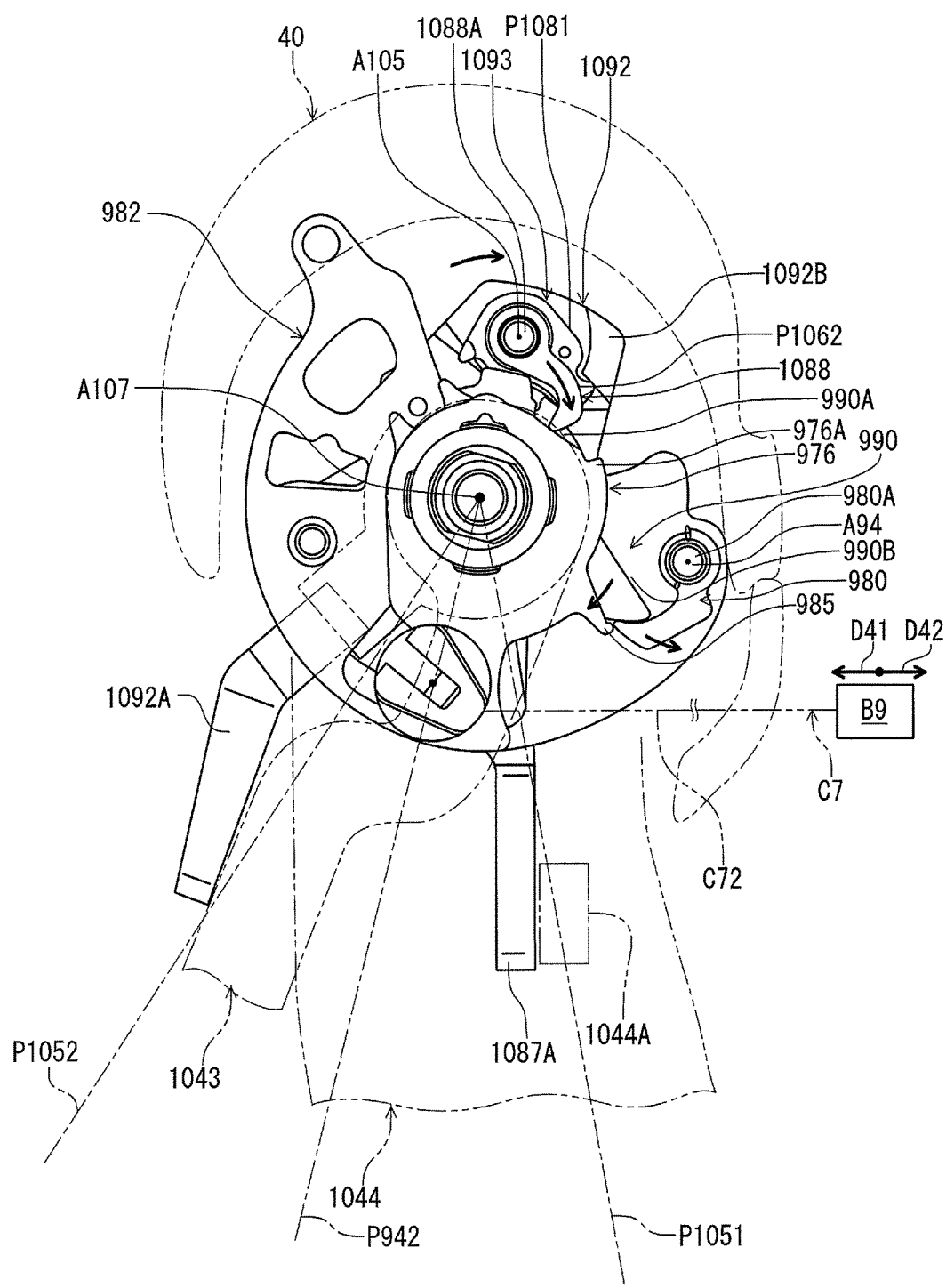

As seen in FIG. 91, the release member 990 is pivoted relative to the base member 40 in the first direction D51 when the second operating member 1043 and the first input member 1092 are pivoted relative to the base member 40 in the first direction D51. At this time, the first actuation member 988 is not engaged with the first actuation abutment 976A.

Figure 92:
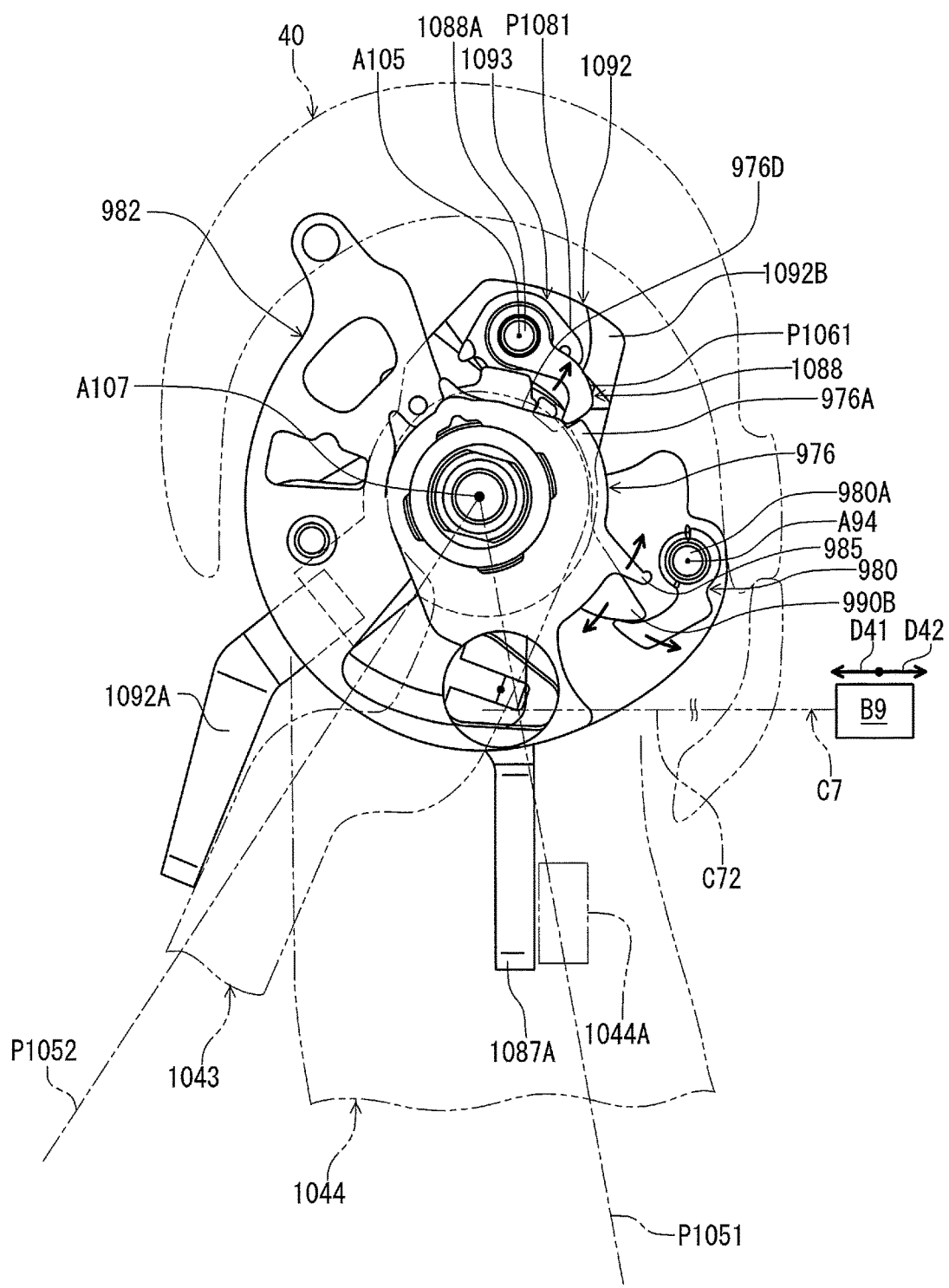

As seen in FIGS. 91 and 92, the positioning member 980 is pivoted relative to the base member 40 to move away from the second positioning abutment 985 when the second operating member 1043 and the first input member 1092 are further pivoted relative to the base member 40 in the first direction D51. This allows the cable control body 976 to pivot relative to the base member 40 in the second direction D52 by the biasing force of the control biasing element 986 (FIG. 72). Thus, the guide surface 976D of the cable control body 976 guides the first actuation member 988 to the first engagement position P961 in response to the pivotal movement of the cable control body 976. This brings the first actuation member 988 into engagement with the first actuation abutment 976A to stop the pivotal movement of the cable control body 976.

Figure 93:
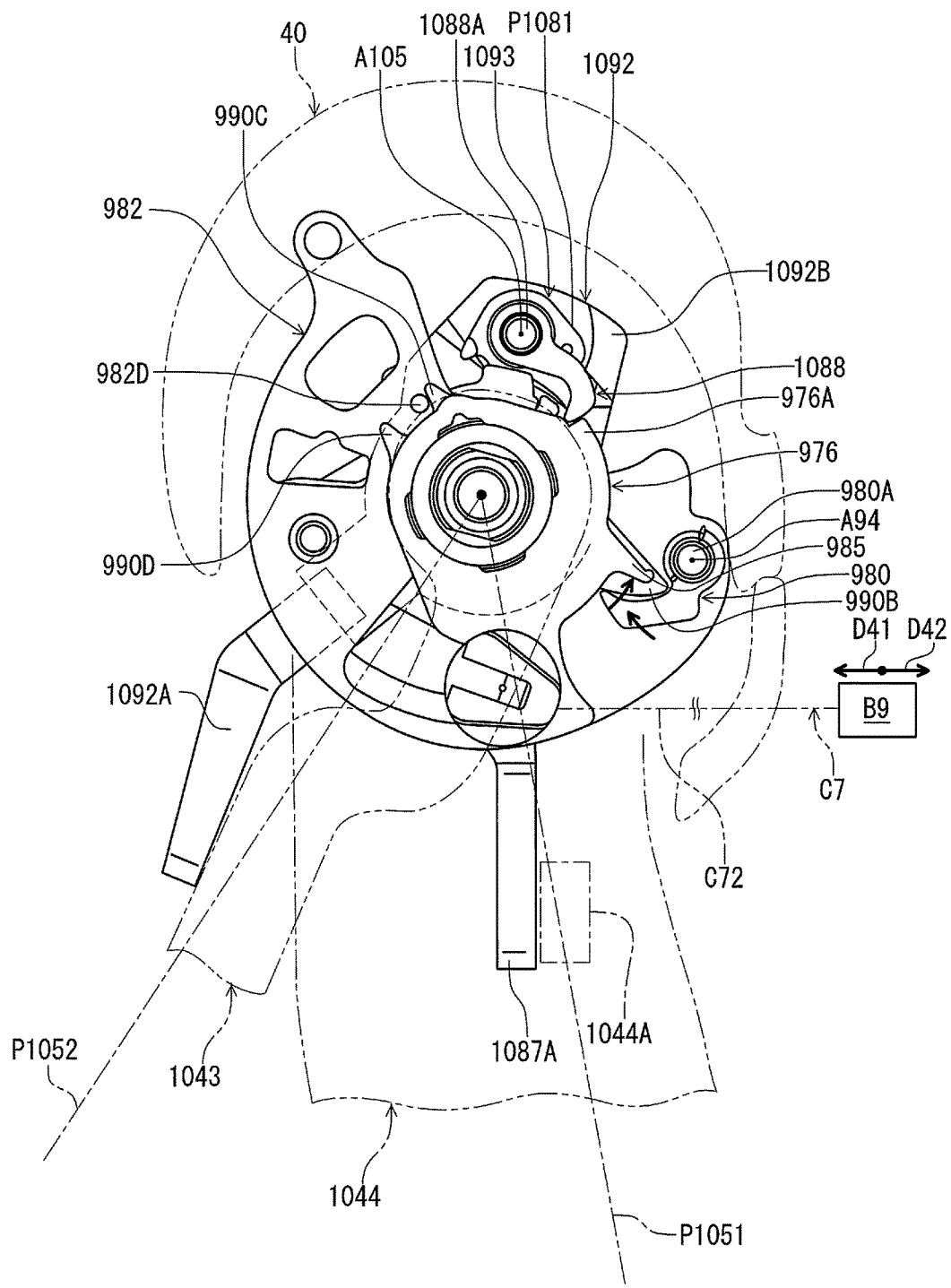

As seen in FIG. 93, the positioning member 980 is disengaged from the release abutment 990A when the first actuation member 988 is pivoted to the first engagement position P961. This allows the release member 990 to return to the rest position by the biasing force of the first biasing element 981 via the positioning member 980. The release member 990 is stopped by the first protrusion 990C and the stop pin 982D at the rest position.

As seen in FIGS. 83 and 93, the second operating member 1043 and the first input member 1092 are returned to their rest positions when the second operating member 1043 is returned to the second rest position P1051. At this time, the cable control body 976 is pivoted relative to the base member 40 in the second direction D52, bringing the positioning member 980 into engagement with the first positioning abutment 984. Thus, the cable control body 976 is positioned at the first control position P941 relative to the base member 40, positioning the inner wire C72 of the second mechanical control cable C7 at a first cable rest position.

With the bicycle seatpost apparatus 1012 and the bicycle operating device 1016, it is possible to obtain substantially the same effects as those of the bicycle seatpost apparatus 912 and the bicycle operating device 916 of the ninth embodiment.

Eleventh Embodiment

A bicycle seatpost apparatus 1112 including a bicycle operating device 1116 in accordance with an eleventh embodiment will be described below referring to FIGS. 94 to 113. The bicycle seatpost apparatus 1112 has the same structures as those of the bicycle seatpost apparatus 312 except for the bicycle operating device 316. Thus, elements having substantially the same function as those in the above embodiments will be numbered the same here, and will not be described and/or illustrated again in detail here for the sake of brevity.

As seen in FIG. 94, the bicycle operating device 1116 comprises the base member 40 and the brake operating member 42. The bicycle operating device 1116 has substantially the same structure as that of the bicycle operating device 316 of the third embodiment. As seen in FIG. 95, the bicycle operating device 1116 comprises the first operating member 344. The first operating member 344 is provided on the first lateral surface 40A. Unlike the bicycle operating device 316 of the third embodiment, however, the bicycle operating device 1116 further comprises a second operating member 1143 movably coupled to the base member 40. The second operating member 1143 is movable relative to the base member 40 in a first direction D51. Specifically, the second operating member 1143 is coupled to the base member 40 movably from a second rest position P1150 to a second operated position P1151 or P1152 in the first direction D51. The second operated position P1151 can also be referred to as the first second operated position P1151. The operated position P1152 can also be referred to as the second operated position P1152.

As seen in FIGS. 95 and 96, one of the first operating member 344 and the second operating member 1143 is integrally provided with the brake operating member 42 as a one-piece unitary member. In this embodiment, the second operating member 1143 is integrally provided with the brake operating member 42 as a one-piece unitary member. However, the second operating member 1143 can be a separate member from the brake operating member.

As seen in FIG. 95, the second operating member 1143 is coupled to the base member 40 pivotally about a second pivot axis A113 which is non-parallel to the brake pivot axis A1. In this embodiment, as seen in FIGS. 95 to 97, the brake operating member 42 and the second operating member 1143 are pivotable together relative to the base member 40 about each of the brake pivot axis A1 and the second pivot axis A3.

As seen in FIG. 96, the bicycle operating device 1116 further comprises a cable operating structure 1174. The cable operating structure 1174 is coupled to the second operating member 1143 to move the second mechanical control cable C7 relative to the base member 40 in response to a movement of the second operating member 1143. The cable operating structure 1174 includes a cable control body 1176 and a positioning structure 1178.

As seen in FIGS. 95 and 96, the cable control body 1176 is configured to be coupled to the second operating member 1143 to move the second mechanical control cable C7 relative to the base member 40 in the pulling direction D41 and the releasing direction D42 opposite to the pulling direction D41 in response to a movement of the second operating member 1143. The positioning structure 1178 is configured to selectively maintain the cable control body 1176 at a plurality of control positions. The positioning structure 1178 is coupled to the cable control body 1176 to position the cable control body 1176 relative to the base member 40 at each of at least three control positions relative to the base member 40. In this embodiment, the positioning structure 1178 is coupled to the cable control body 1176 to position the cable control body 1176 relative to the base member 40 at each of three control positions relative to the base member 40. The front derailleur B9 has three shift positions (e.g., top, middle, and low shift positions). The control positions of the positioning structure 1178 respectively correspond to the shift positions of the front derailleur B9.

The cable control body 1176 is configured to pull the second mechanical control cable C7 when the second operating member 1143 is moved relative to the base member 40 in the first direction D51. The cable control body 1176 is configured to release the second mechanical control cable C7 when the second operating member 1143 is moved relative to the base member 40 in the first direction D51.

The second operating member 1143 is movable relative to the base member 40 in the first direction D51 to provide a first movement M111 and a first additional movement M112 different from the first movement M111. In this embodiment, a movement distance (e.g., a pivot angle) of the first additional movement M112 is different from a movement distance (e.g., a pivot angle) of the first movement M111. The positioning structure 1178 is coupled to the second operating member 1143 to move the cable control body 1176 such that the second mechanical control cable C7 is moved in the releasing direction D42 in response to the first movement M111 of the second operating member 1143. The positioning structure 1178 is coupled to the second operating member 1143 to move the cable control body 1176 such that the second mechanical control cable C7 is moved in the pulling direction D41 in response to the first additional movement M112 of the second operating member 1143.

As seen in FIGS. 95 to 98, the brake operating member 42 and the second operating member 1143 are movably coupled relative to the base member 40. The brake operating member 42 is coupled to the base member 40 to perform a braking operation upon being moved along a braking path B (FIG. 96). The second operating member 1143 is coupled to the base member 40 to perform a shifting operation upon being moved along a shifting path S (FIG. 95) differing from the braking path B.

As seen in FIGS. 96 and 97, the brake operating member 42 (the second operating member 1143) is rotatably or pivotally attached to a lever support 1138 of the cable operating structure 1174 to pivot about brake pivot axis A1 to perform the braking operation upon being moved along the braking path B. The lever support 1138 is pivotally coupled to the base member 40 about the second pivot axis A113. Thus, the second operating member 1143 (the brake operating member 42) attached to the lever support 1138 is further pivotally mounted to the cable operating structure 1174 to pivot about the second pivot axis A113 to perform the shifting operation upon being moved along the shifting path S which differs from the braking path B. In this embodiment, the brake pivot axis A1 is substantially perpendicular to the second pivot axis A113.

The brake operating member 42 includes a receiving portion 1141 for receiving an end of the inner wire C22, which extends through a cable passageway 1142 of the cable operating structure 1174. The other end of the inner wire C22 is attached to the brake device (not shown), as discussed above. The inner wire C22 is slidably received in the outer casing C21. The cable passageway 1142 of the cable operating structure 1174 is configured to receive the outer casing C21 of the mechanical control cable C2.

As seen in FIG. 99, the outer casing C21 extends through a hollow cable receiving shaft 1144. In other words, the cable passageway 1142 is formed in the hollow cable receiving shaft 1144. The hollow cable receiving shaft 1144 is attached to the base member 40. A return spring 1145 is disposed about the hollow cable receiving shaft 1144. The return spring 1145 biases the lever support 1138 so as to position the brake operating member 42 (the second operating member 1143) at the second rest position P1150 (FIG. 95) with respect to the shifting path S (FIGS. 95 and 98). Further, the brake operating member 42 is biased by a return spring (not shown) to position the brake operating member 42 (the second operating member 1143) at the rest position P11 (FIG. 96) with respect to the braking path B.

As seen in FIG. 97, when the brake operating member 42 (the second operating member 1143) is pivoted about the brake pivot axis A1 along the braking path B toward the handlebar B2, the inner wire C22 of the mechanical control cable C2 is pulled by the brake operating member 42 (the second operating member 1143).

As seen in FIGS. 96 and 99, the cable operating structure 1174 is coupled to the base member 40, and is configured to be actuated in response to movement of the second operating member 1143 along the shifting path S (FIGS. 95 and 98). As seen in FIGS. 95, 96, and 98, when the second operating member 1143 is pivoted along the shifting path S, this movement actuates the cable operating structure 1174 to pull or release the inner cable C52 of the second mechanical control cable C7 to change gear speed of the front derailleur B9.

As seen in FIG. 99, in this embodiment, the cable passageway 1142 extends through the cable control body 1176. Further, in this embodiment, the lever support 1138 is pivotally mounted on the hollow cable receiving shaft 1144 about a rotational axis R. In this embodiment, the movable part 1148 of the cable operating structure 1174 further includes a ratchet wheel 1152 fixed to the cable control body 1176 so as to rotate together with the cable control body 1176 about the rotational axis R. The cable operating structure 1174 further includes a holding mechanism 1154 and a drive mechanism 1156. The cable control body 1176 includes a groove 1176A along its periphery, for windably receiving the inner cable C52 of the second mechanical control cable C7. The cable control body 1176 is biased in a first or cable-release direction D1 (FIG. 102) by tension in the inner cable C52 and by a return spring 1158. The return spring 1158 operatively connects the cable control body 1176 to the base member 40.

As seen in FIGS. 100 to 105, the ratchet wheel 1152 includes a periphery and a plurality of ratchet teeth 1160 disposed about the periphery. The holding mechanism 1154 includes a positioning member 1162 engageable with the ratchet teeth 1160 to prevent rotating or unwinding of the cable control body 1176. The positioning member 1162 includes a positioning pawl. The ratchet wheel 1152 is rotatably mounted to the hollow cable receiving shaft 1144 and rotates with the cable control body 1176. The ratchet teeth 1160 respectively correspond to gear positions of the cable operating structure 1174. Alternatively, the ratchet wheel 1152 and the cable control body 1176 may be formed as a single piece. The positioning member 1162 is rotatable about a first pivot 1164 fixed to the base member 40 and is axially positioned by a retaining ring 1166. The positioning member 1162 includes a body 1168 and a first nose 1170 extending from the body 1168. The first nose 1170 is biased to engage one of the ratchet teeth 1160 by a preloaded spring 1172 (FIG. 99) coaxially mounted to the first pivot 1164.

The cable operating structure 1174 includes a winding pawl 1175 rotatably mounted about a second pivot 1177 mounted to the lever support 1138. The winding pawl 1175 is axially positioned by a retaining ring 1175A. The winding pawl 1175 includes a body 1180, a second nose 1182 extending from the body 1180, and a tail 1184. A preloaded spring 1186 (FIG. 99) biases the winding pawl 1175 such that the second nose 1182 moves toward the ratchet teeth 1160 when the second operating member 1143 is operated from the second rest position P1150 along the shifting path S. The tail 1184 of the winding pawl 1175 rests against a declutching element (e.g., in this embodiment, a declutching wall 1124A) of the base member 40, when the second operating member 1143 is in the second rest position P1150.

As illustrated in FIGS. 95, 96, and 98, to actuate the cable operating structure 1174, the second operating member 1143 is pivoted about the second pivot axis A113 along the shifting path S causing the first movement M111, which releases the inner cable C52 of the second mechanical control cable C7. As the cable operating structure 1174 is further pivoted about the second pivot axis A113 along the shifting path S, the first additional movement M112 is caused, pulling or winding the inner cable C52. The first movement M111 and the first additional movement M112 are in the same direction and the first additional movement M112 is greater than the first movement M111. In these shift operations, the second operating member 1143 is moved along the shifting path S without substantially actuating or pulling the inner wire C22 of the mechanical control cable C2.

Returning to FIGS. 100 to 105, a cable-release operation is described. Before the second operating member 1143 is actuated, the tail 1184 of the winding pawl 1175 rests against the declutching wall 1124A (FIG. 100), and the second operating member 1143 is positioned in the second rest position P1150 (FIG. 95). Further, the cable control body 1176 and the ratchet wheel 1152 are retained in a selected gear position by the positioning member 1162, shown engaging a corresponding first ratchet tooth 1160A.

Figure 101:
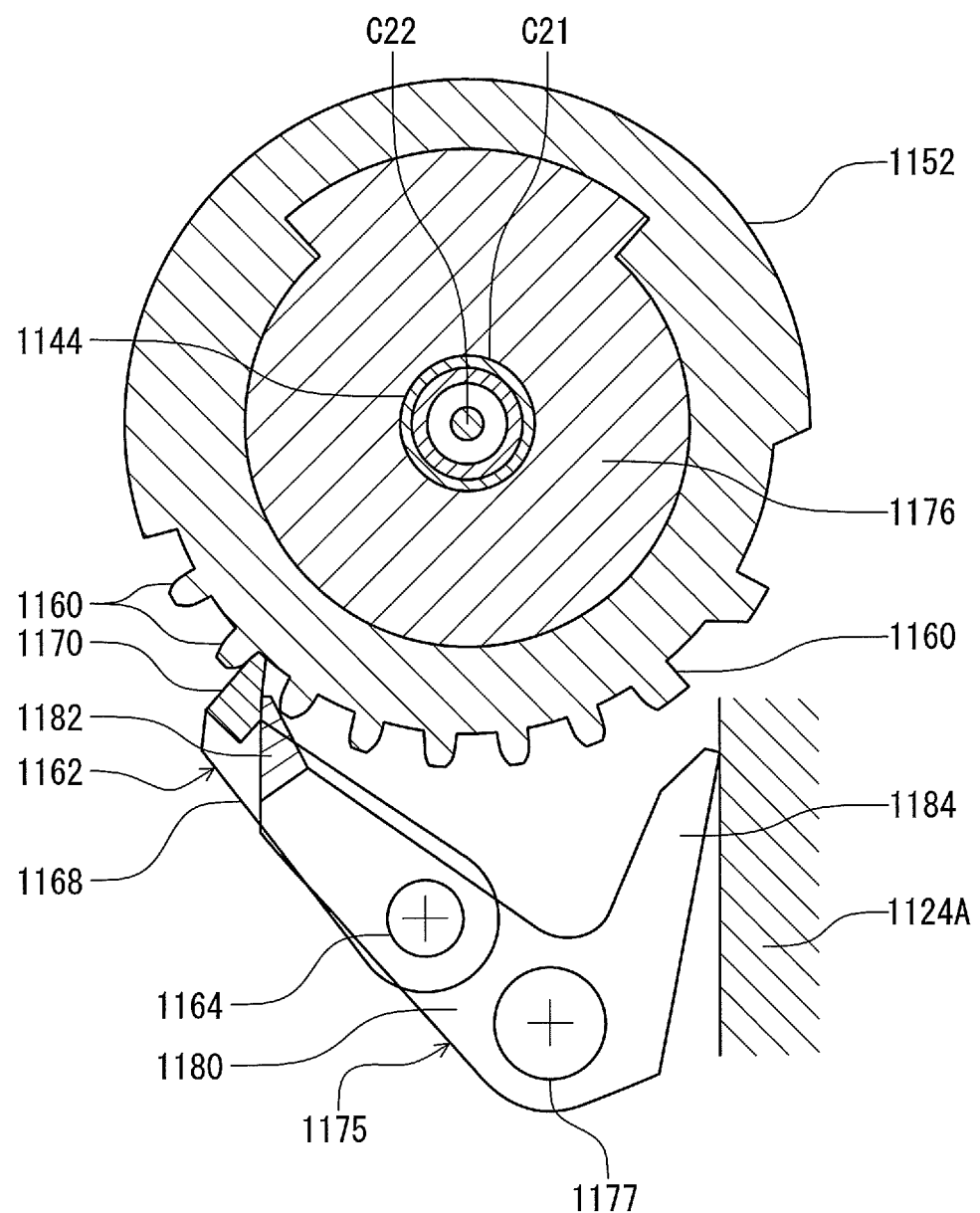
Figure 102:
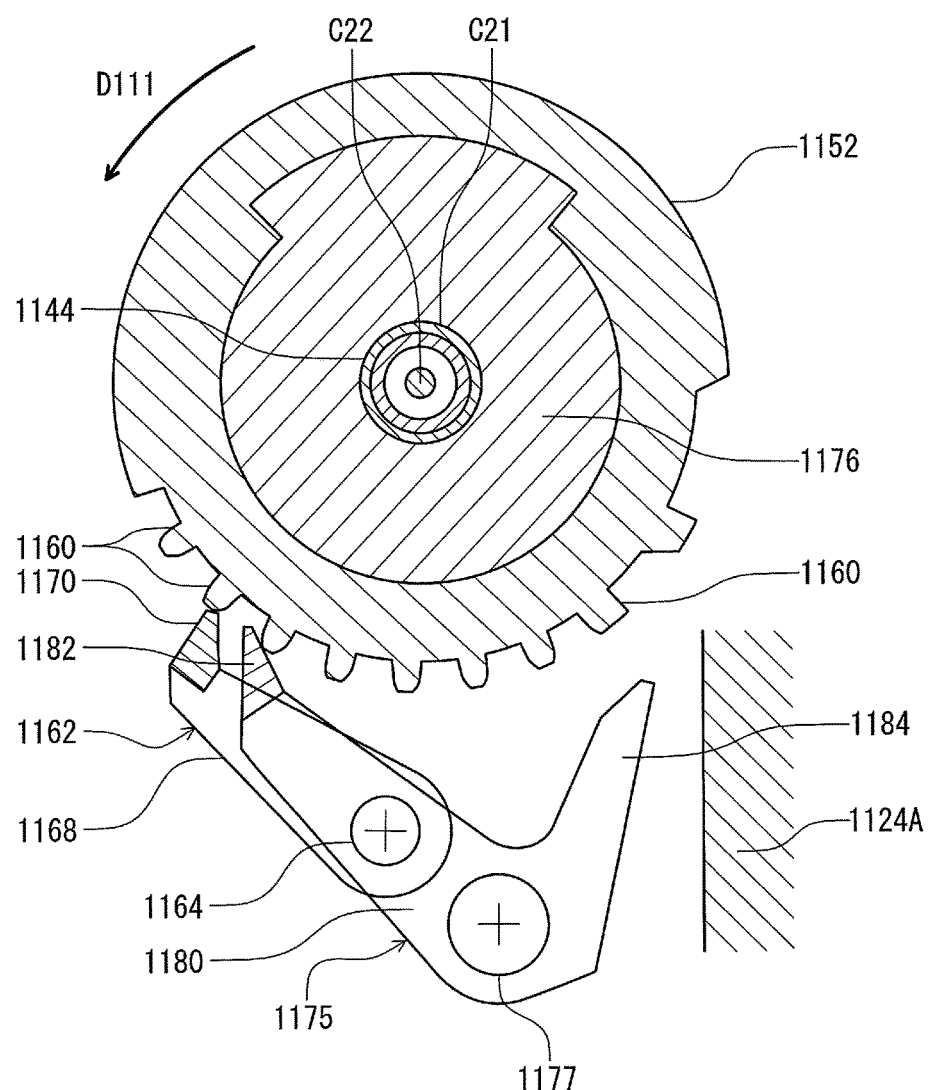
Figure 112:
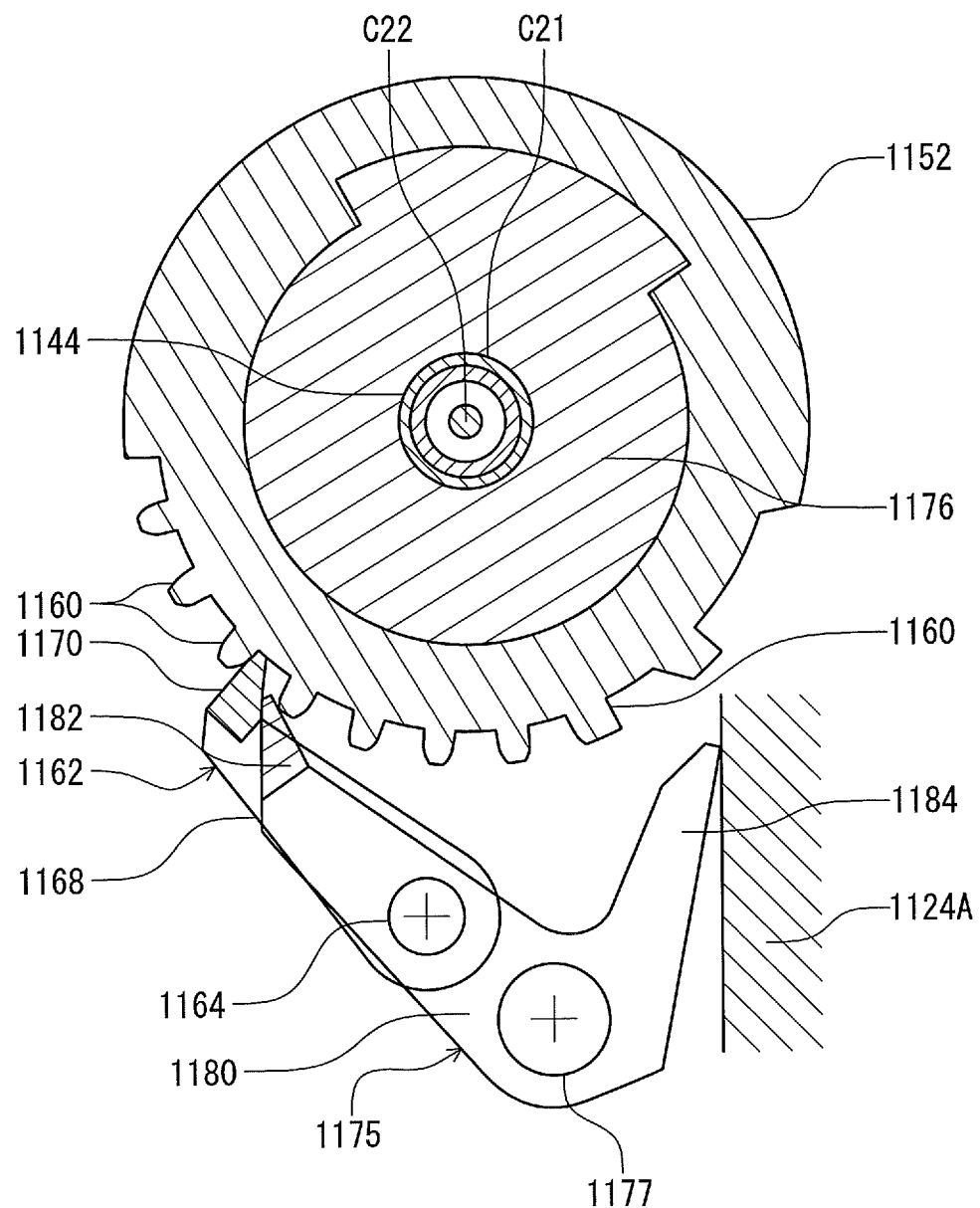

Turning to FIG. 101, as the second operating member 1143 is actuated by the rider, the second operating member 1143 and the lever support 1138 pivot about the second pivot axis A113 (FIG. 99), moving the winding pawl 1175 away from the declutching wall 1124A and pivoting the second nose 1182 toward the ratchet teeth 1160. As seen in FIG. 112, as the second operating member 1143 is further pivoted, the second nose 1182 engages with the first nose 1170, causing the positioning member 1162 to release the first ratchet tooth 1160A of the ratchet wheel 1152. Once released, the ratchet wheel 1152 rotates about the rotational axis R in a first rotational direction D111, until the first ratchet tooth 1160A engages the second nose 1182. This action provides both audible and tactile feedback to the rider, signaling the rider to release the second operating member 1143, if a cable-release operation is desired.

Figure 103:
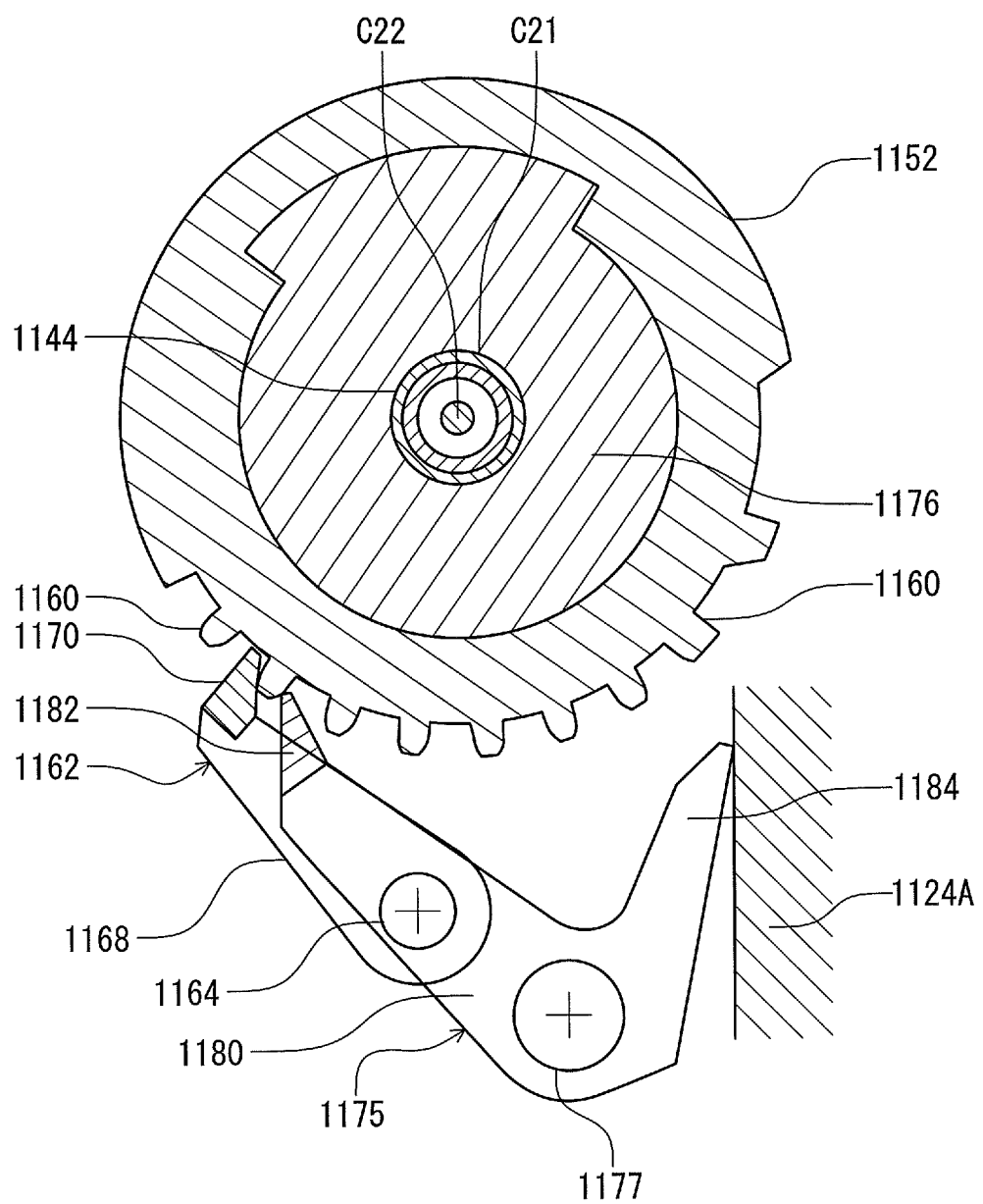
Figure 104:
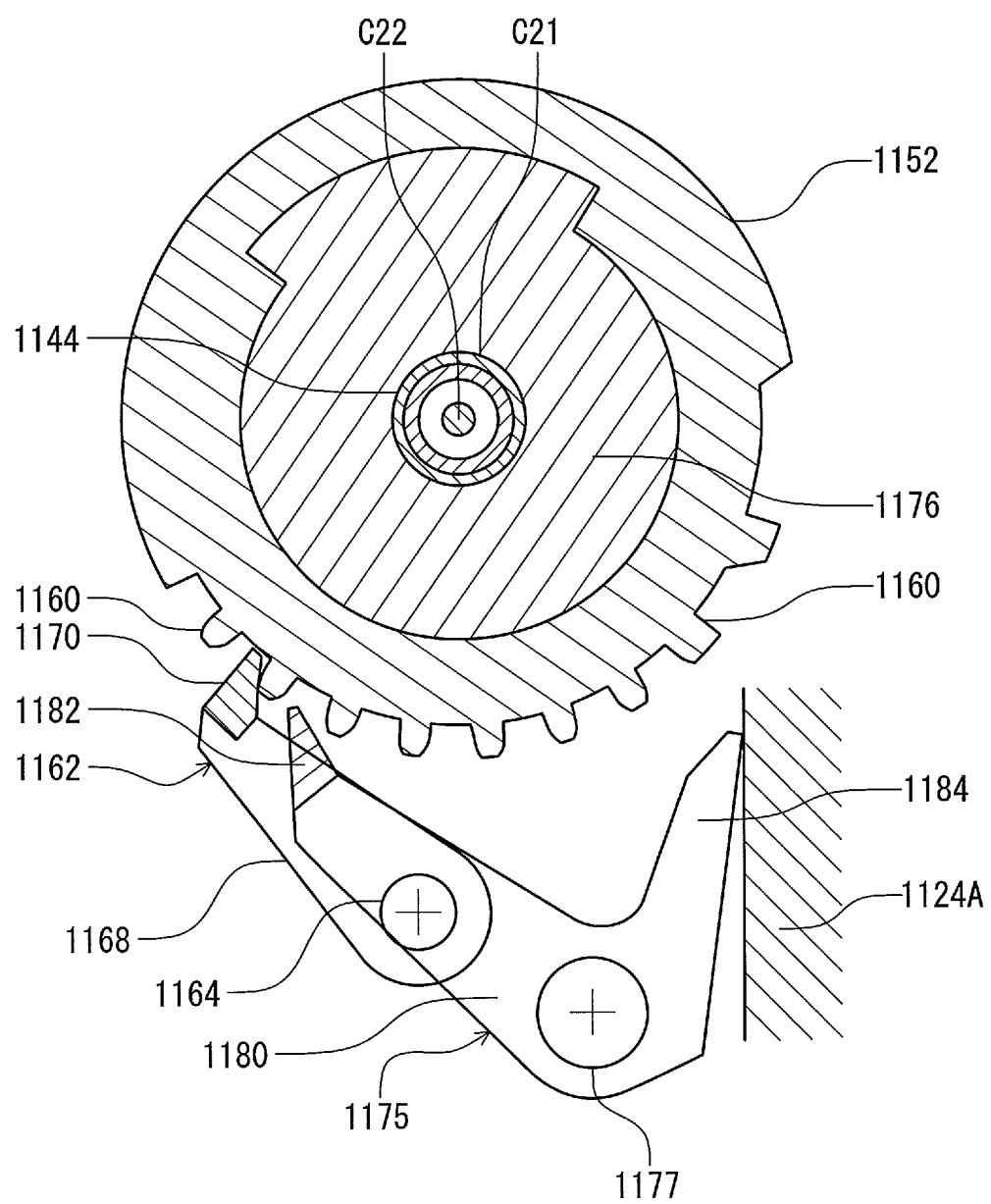
Figure 105:
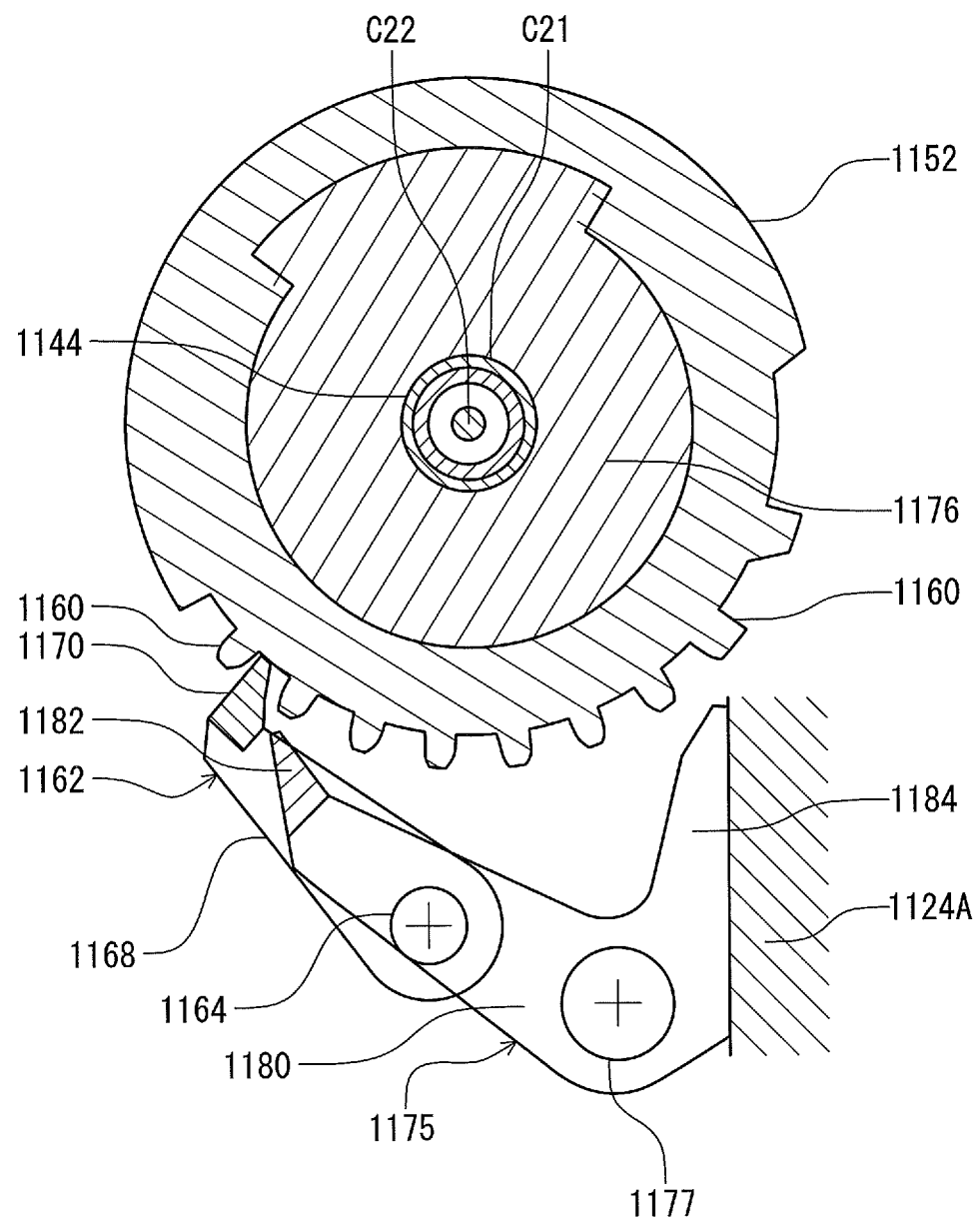
Figure 106:
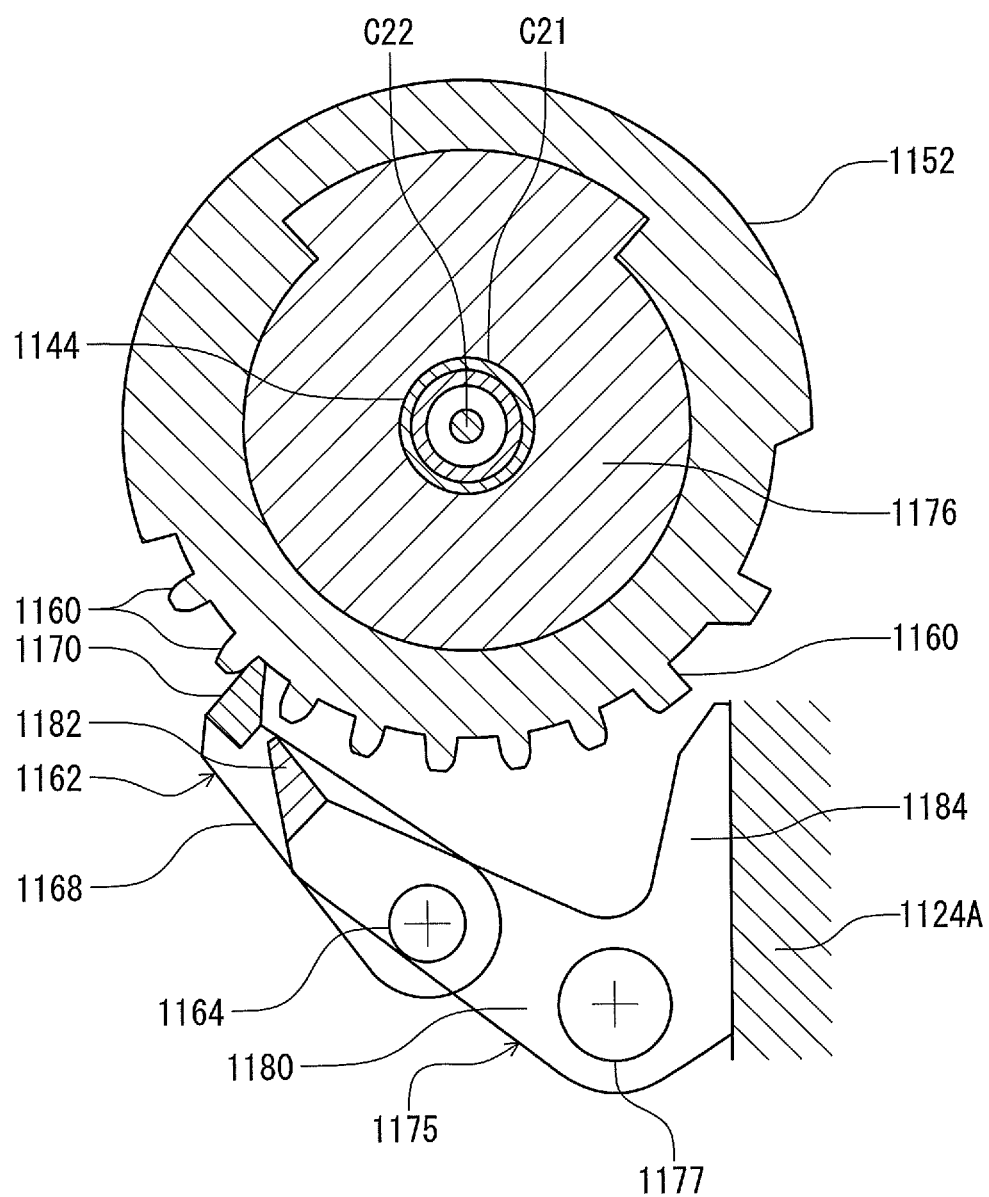

Turning to FIG. 103, as the second operating member 1143 is released, the second operating member 1143 is pivoted towards the second rest position P1150 under the biasing force of the spring 1145 (FIGS. 96 and 98), and the ratchet wheel 1152 rotates in the first rotational direction D111. Further, the first nose 1170 moves toward engagement with a recess associated with an adjoining second ratchet tooth 1160B of the ratchet wheel 1152, and the tail 1184 moves toward engagement with the declutching wall 1124A. As the second operating member 1143 is pivoted further toward the second rest position P1150, the second nose 1182 is further pivoted away from the ratchet teeth 1160, due to the torque created as the tail 1184 bears against the declutching wall 1124A (FIG. 104). When the winding pawl 1175 disengages from the ratchet teeth 1160, the ratchet wheel 1152 rotates in the first rotational direction D111 under the force of the inner cable C52 of the second mechanical control cable C7 and the return spring 1158, until the first nose 1170 engages the second ratchet tooth 60b, resulting in a gear shift, by one gear increment, in the first rotational direction D111. At the end of the cable-release operation, the winding pawl 1175 moves back to its rest position against the declutching wall 1124A (FIG. 105), positioning the second operating member 1143 in the second rest position P1150.

FIGS. 106 to 113 illustrate one embodiment of a cable-pull operation. In this embodiment, before the second operating member 1143 is actuated, the tail 1184 rests against the declutching wall 1124A (FIG. 106), and the second operating member 1143 is positioned in its second rest position P1150 (FIG. 96). Further, the cable control body 1176 and the ratchet wheel 1152 are retained in a selected gear position by the positioning member 1162, shown engaging a corresponding first ratchet tooth 1160A.

Figure 107:
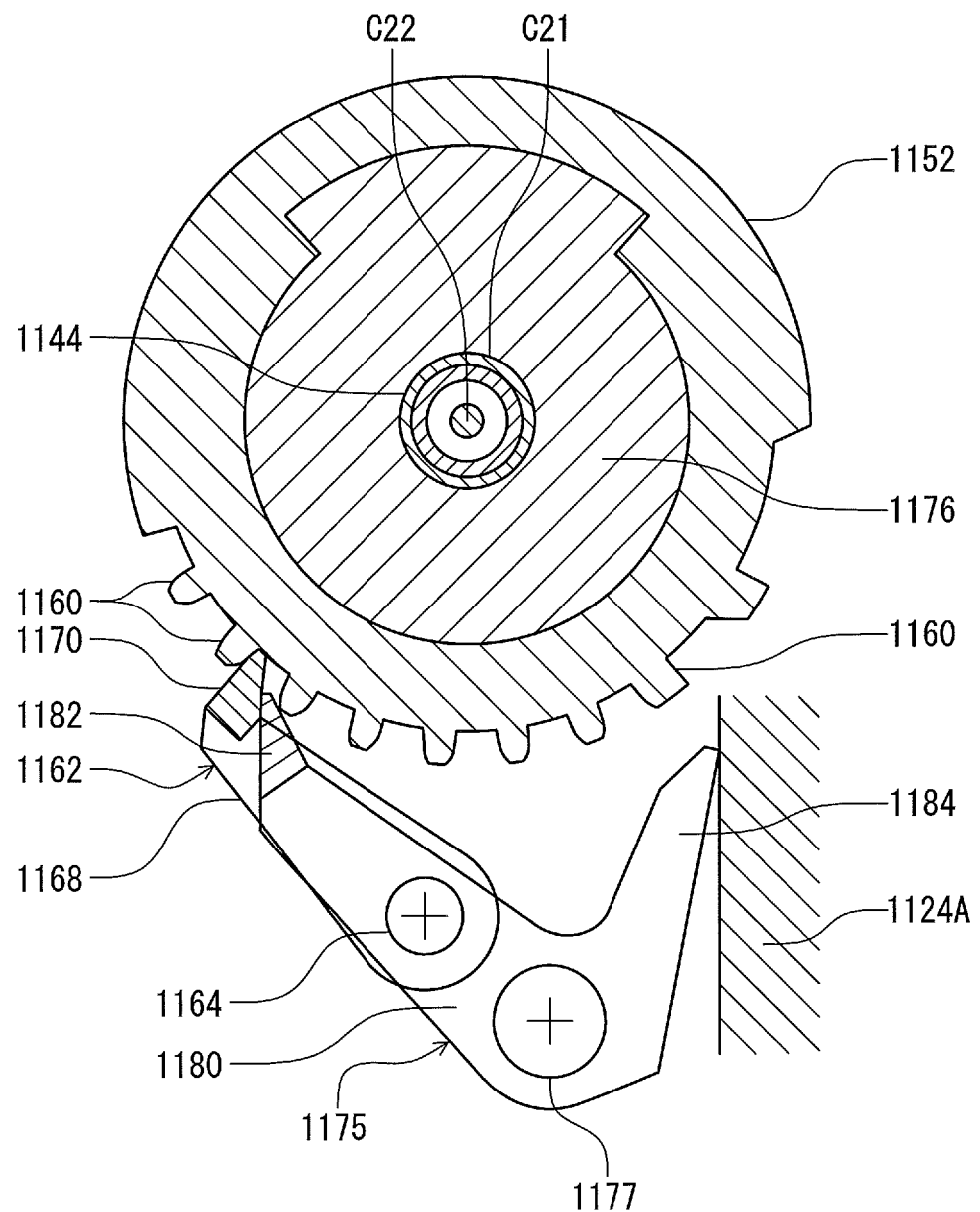
Figure 108:
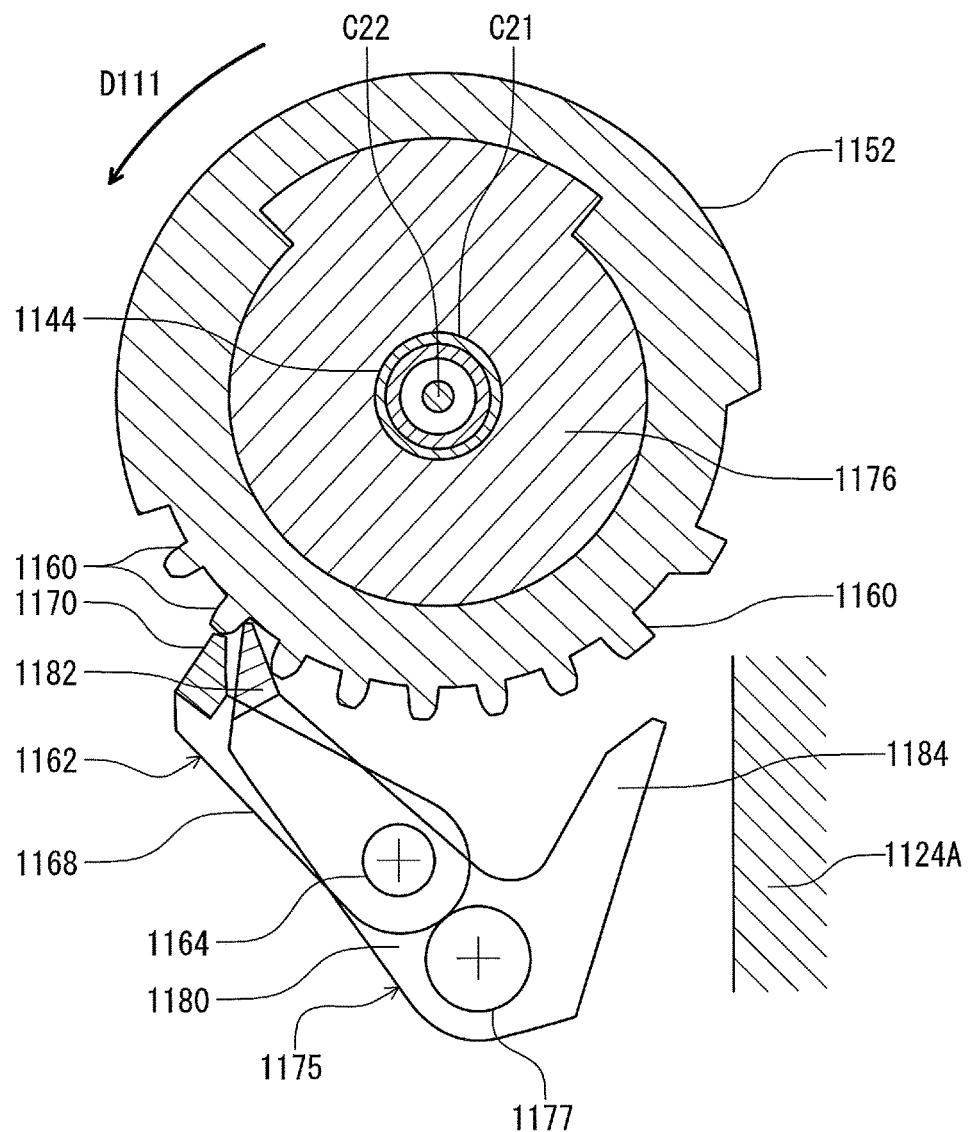
Figure 109:
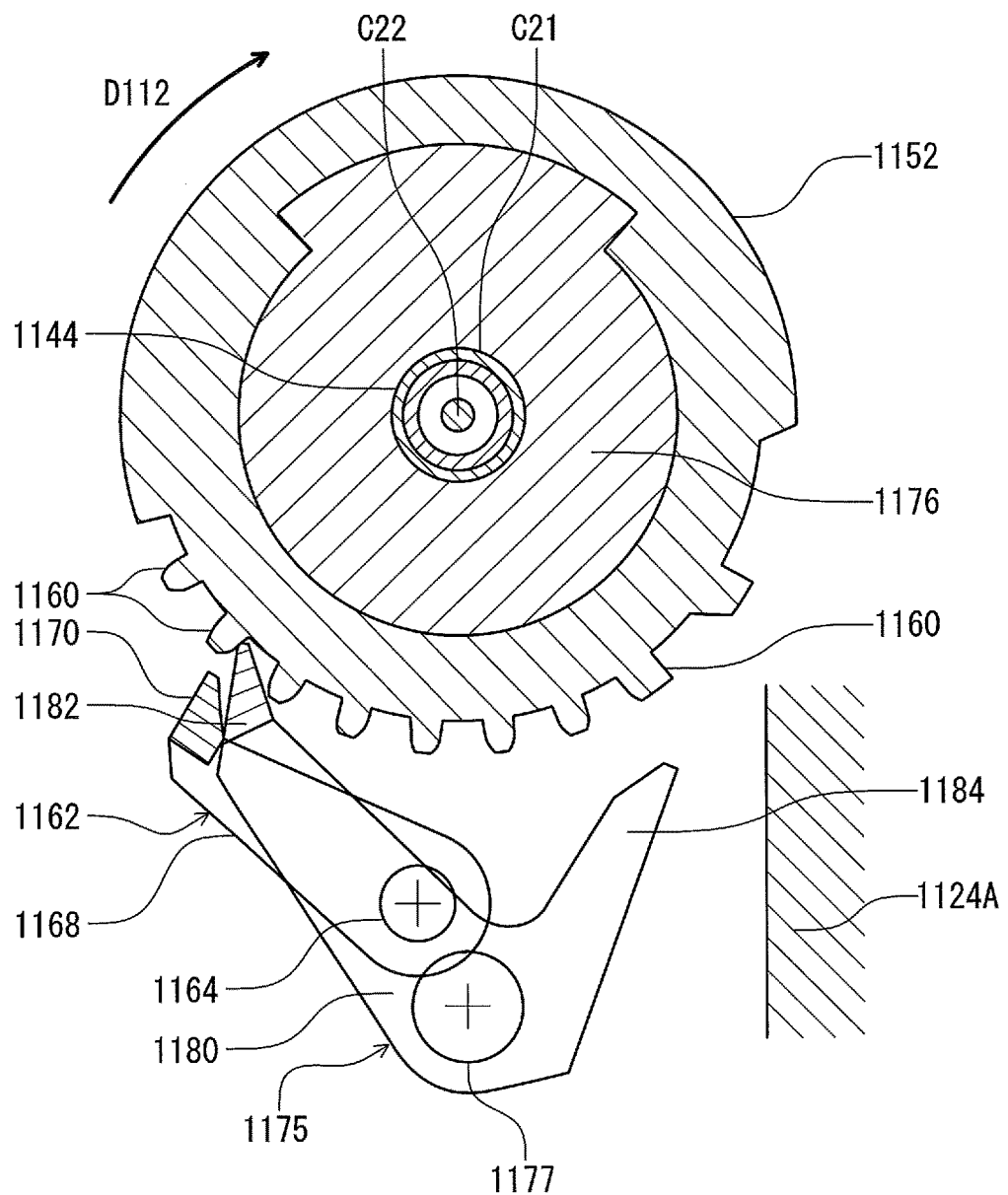

Turning to FIG. 107, as the second operating member 1143 is actuated by the rider, the second operating member 1143 and the lever support 1138 pivot about the second pivot axis A113 (FIG. 99), moving the winding pawl 1175 away from the declutching wall 1124A and pivoting the second nose 1182 toward the ratchet teeth 1160. As seen in FIG. 108, as the second operating member 1143 is further pivoted, the second nose 1182 engages the first nose 1170, driving the first nose 1170 out of engagement with the first ratchet tooth 1160A. Once released, the ratchet wheel 1152 rotates in the first rotational direction D111 until the first ratchet tooth 1160A engages the second nose 1182. As the brake operating member 42 (the second operating member 1143) is further pivoted along the shifting path S, the winding pawl 1175 drives the ratchet wheel 1152 in a second rotational direction D112 (FIG. 109) being opposite to the first rotational direction D111. As the positioning member 1162 free-clutches, the ratchet wheel 1152 freely rotates with respect to the winding pawl 1175 (FIG. 109).

Figure 110:
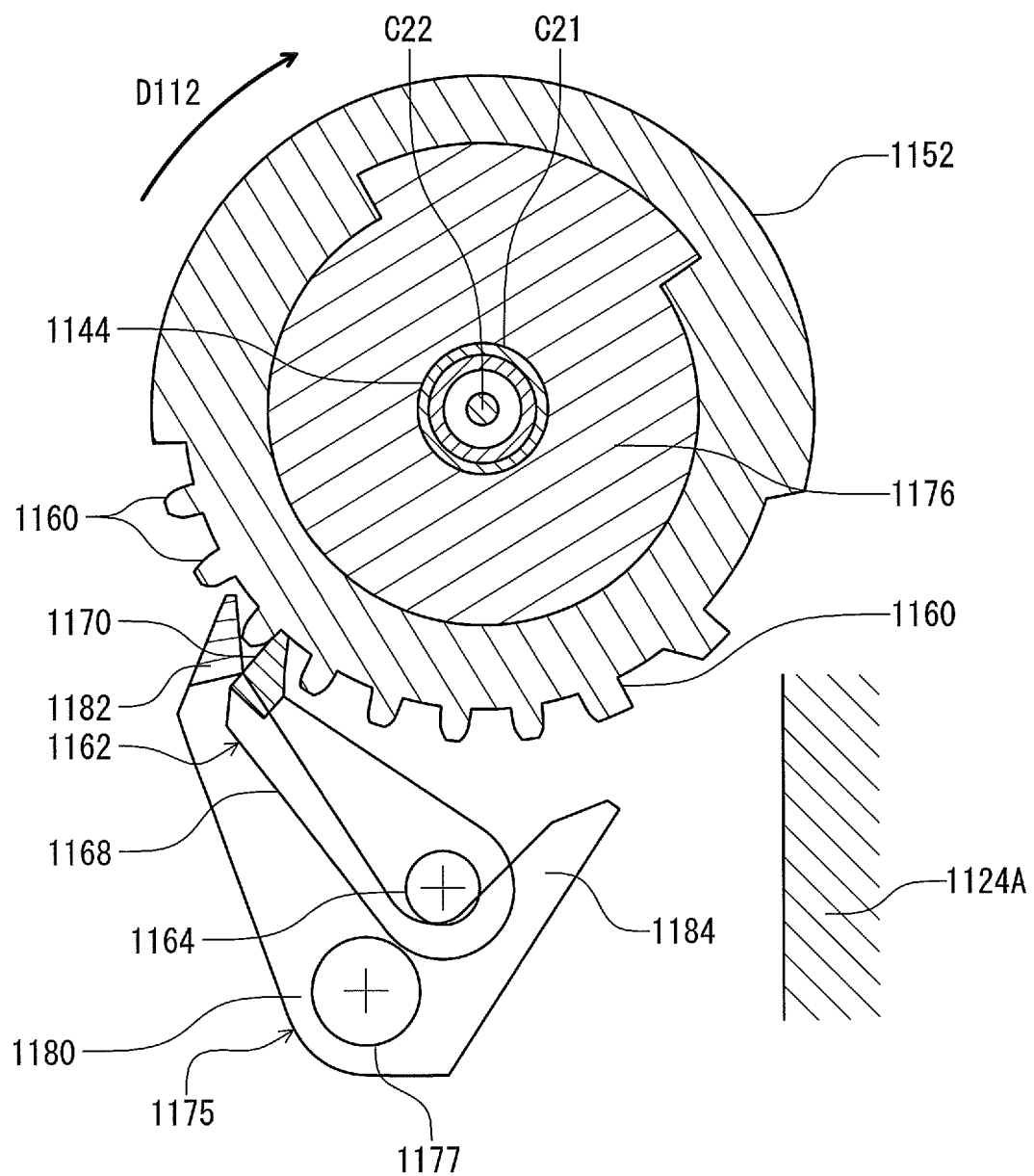

As seen in FIG. 110, as the second operating member 1143 is further pivoted, the winding pawl 1175 further rotates the ratchet wheel 1152 in the second rotational direction D112 until the positioning member 1162 engages a next third ratchet tooth 1160C on the ratchet wheel 1152, resulting in a single gear shift in the second rotational direction D112. The rider may readily shift multiple gear increments in the second rotational direction D112 by simply continuing to move the second operating member 1143 along the shifting path S, until the desired gear position is reached. Audible and tactile feedback is provided to the rider as each gear shift increment is passed.

Figure 111:
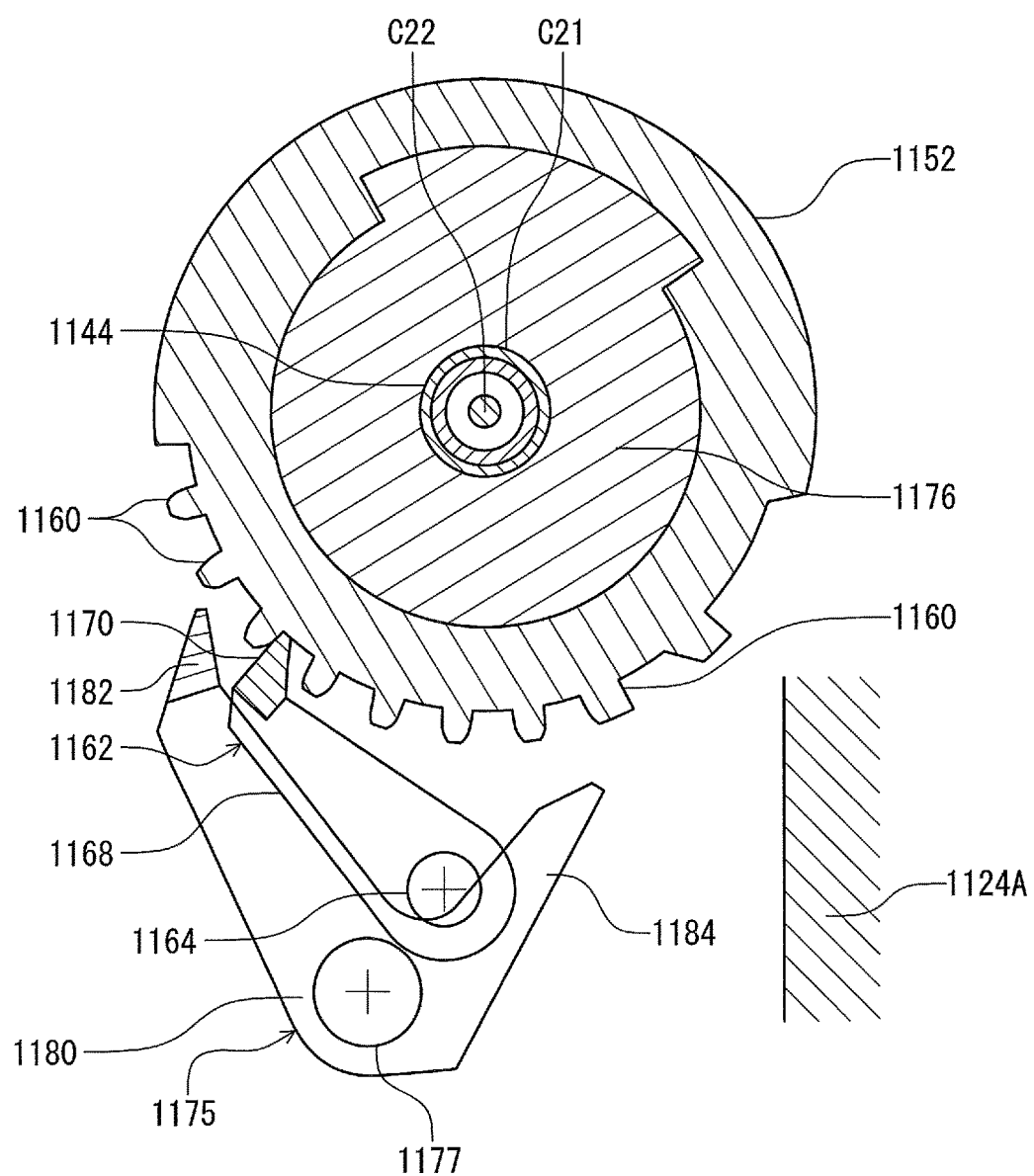
Figure 113:
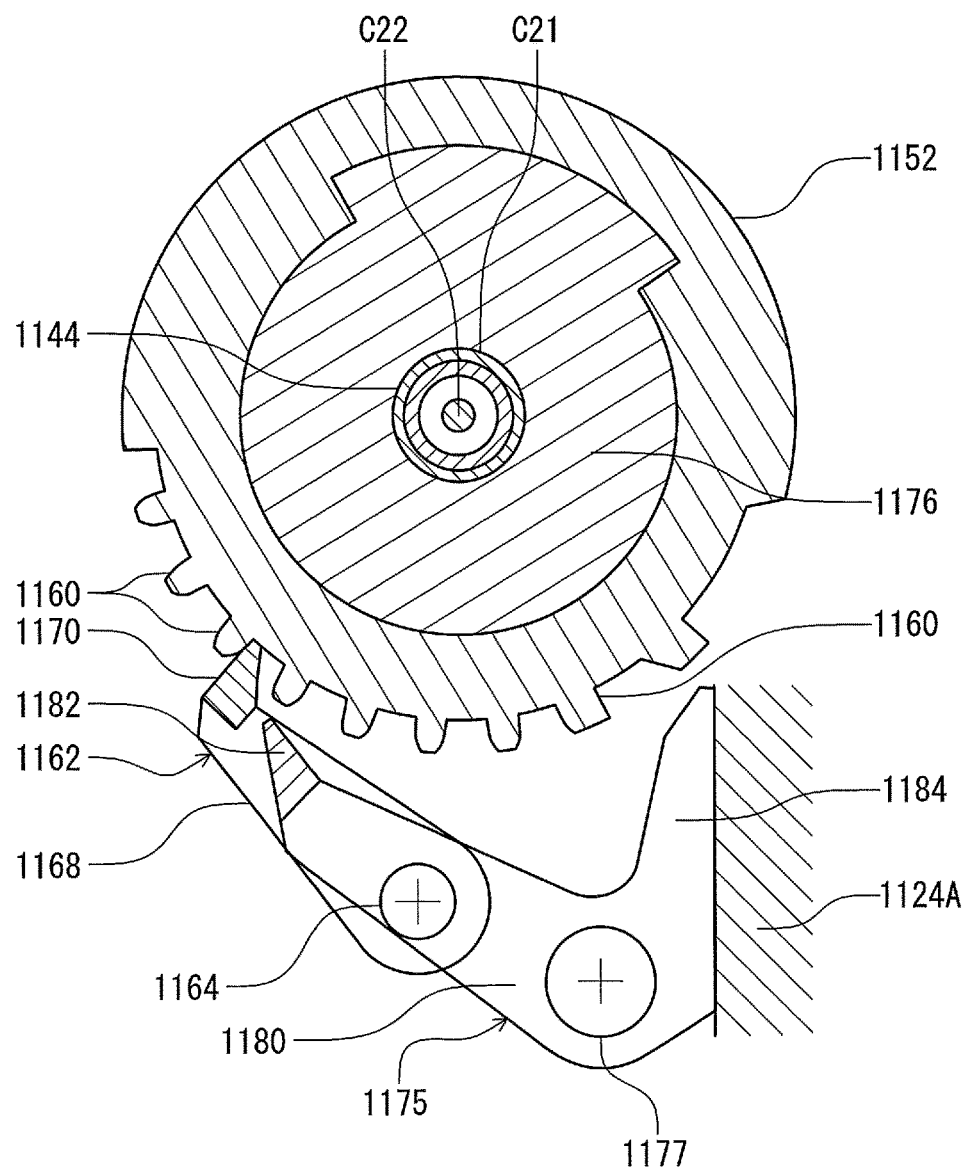

As seen in FIG. 111, after the desired gear position is reached, the rider releases the second operating member 1143 causing the second operating member 1143 and the winding pawl 1175 to pivot toward their rest positions under the force of the return spring 1145. As the second operating member 1143 is further pivoted toward its rest position, the tail 1184 bears against the declutching wall 1124A, creating a torque that pivots the winding pawl 1175 away from the ratchet teeth 1160 (FIG. 112). Turning to FIG. 113, the winding pawl 1175 is in the rest position against the declutching wall 1124A, with the second nose 1182 disengaged from the ratchet wheel 1152.

In other words, to shift a transmission device such as the front derailleur B9, as shown in FIGS. 95 and 98, the second operating member 1143 is configured to be moved along the shifting path S from the second rest position P1150 to the first second operated position P1151 to actuate the cable operating structure 1174, and is configured to be moved along the shifting path S from the second rest position P1150 to the second operated position P1152 to actuate the cable operating structure 1174. The first second operated position P1151 is farther from the second rest position P1150 than the second operated position P1152. That is, the movable part 1148 including the cable control body 1176 is configured to rotate about the rotational axis R in the first rotational direction D111 (FIG. 108) and the second direction (FIG. 109) opposite to the first rotational direction D111. The cable operating structure 1174 is configured to rotate the cable control body 1176 in the first rotational direction D111 as the second operating member 1143 is moved from the second rest position P1150 to the first second operated position P1151 and is configured to rotate cable control body 1176 in the second rotational direction D112 as the second operating member 1143 is moved from the second rest position P1150 to the second operated position P1152.

As is discussed herein, the second operating member 1143 is pivoted about the second pivot axis A113 along the shifting path S to provide the first movement M111 for releasing the inner cable C52 of the second mechanical control cable C7, and in the same direction to provide the first additional movement M112 for pulling the inner cable C52. In this embodiment, the first additional movement M112 is greater than the first movement M111. However, the first additional movement M112 can be smaller than the first movement M111. The second operating member 1143 is moved along the shifting path S without pulling the inner wire C22 of the mechanical control cable C2, since the mechanical control cable C2 extends through the cable operating structure 1174. More specifically, since the mechanical control cable C2 extends along the second pivot axis A113 in the cable operating structure 1174 and a position relationship or distance between the end of the inner wire C22 and the second pivot axis A113 is unchanged, the inner wire C22 of the mechanical control cable C2 is not pulled in the shifting operation. In other words, according to the bicycle operating device 1116, the shifting operation and the braking operation can be provided simultaneously.

With the bicycle seatpost apparatus 1112 and the bicycle operating device 1116, it is possible to obtain substantially the same effects as those of the bicycle seatpost apparatus 312 and the bicycle operating device 316 of the third embodiment.

The bicycle seatpost apparatus 1112 and the bicycle operating device 1116 further include the following features.

(1) One of the first operating member 344 and the second operating member 1143 is integrally provided with the brake operating member 42 as a one-piece unitary member. Accordingly, it is possible to simplify the structure of the bicycle operating device 1116.

(2) The second operating member 1143 is integrally provided with the brake operating member 42 as a one-piece unitary member. The second operating member 1143 is coupled to the base member 40 pivotally about the second pivot axis A113 which is non-parallel to the brake pivot axis A1. Accordingly, it is possible to differentiate the movement of the second operating member 1143 from the movement of the brake operating member 42 even if the second operating member 1143 is integrally provided with the brake operating member 42 as a one-piece unitary member. This allows the user to easily recognize each of the movement of the brake operating member 42 and the movement of the second operating member 1143 with simplifying the structure of the bicycle operating device 1116.

(3) The cable control body 1176 is configured to pull the second mechanical control cable C7 when the second operating member 1143 is moved relative to the base member 40 in the first direction D51. The cable control body 1176 is configured to release the second mechanical control cable C7 when the second operating member 1143 is moved relative to the base member 40 in the first direction D51. Accordingly, it is possible to pull and release the second mechanical control cable C7 to operate an additional bicycle component with a simple operation of the second operating member 1143.

(4) The positioning structure 1178 is coupled to the second operating member 1143 to move the cable control body 1176 such that the second mechanical control cable C7 is moved in the releasing direction D42 in response to the first movement M111 of the second operating member 1143.

The positioning structure 1178 is coupled to the second operating member 1143 to move the cable control body 1176 such that the second mechanical control cable C7 is moved in the pulling direction D41 in response to the first additional movement M112 of the second operating member 1143. Accordingly, it is possible to move the second mechanical control cable C7 in the pulling direction D41 and the releasing direction D42 with a simple operation of the second operating member 1143.

(5) The positioning structure 1178 is coupled to the cable control body 1176 to position the cable control body 1176 relative to the base member 40 at each of at least three control positions relative to the base member 40. Accordingly, it is possible to operate an additional bicycle component having at least three positions respectively corresponding to the at least three control positions via the second mechanical control cable C7.

Twelfth Embodiment

A bicycle seatpost apparatus 1212 including a bicycle operating device 1216 in accordance with a twelfth embodiment will be described below referring to FIGS. 114 to 116. The bicycle seatpost apparatus 1212 has the same structures as those of the bicycle seatpost apparatus 12 except for the second operating member 1143. Thus, elements having substantially the same function as those in the above embodiments will be numbered the same here, and will not be described and/or illustrated again in detail here for the sake of brevity.

As seen in FIGS. 114 to 116, the bicycle operating device 1216 comprises the base member 40, the brake operating member 42, the first operating member 344, and a second operating member 1243. The bicycle operating device 1216 has substantially the same structure as that of the bicycle operating device 1116 of the eleventh embodiment. The second operating member 1243 has substantially the same structure as that of the second operating member 1143 of the eleventh embodiment. Unlike the bicycle operating device 1116 of the eleventh embodiment, however, the second operating member 1243 is a separate member from the brake operating member 42.

The brake operating member 42 is pivotally coupled to the base member 40 about the brake pivot axis A1 without via the lever support 1138 of the cable operating structure 1174. The second operating member 1243 is movably coupled to the base member 40. The second operating member 1243 is pivotally coupled to the lever support 1138 about the second pivot axis A113. The second operating member 1243 is pivotally coupled to the lever support 1138 about a third pivot axis A124 which is non-parallel to the second pivot axis A113.

With the bicycle seatpost apparatus 1212 and the bicycle operating device 1216, it is possible to obtain substantially the same effects as those of the bicycle seatpost apparatus 1112 and the bicycle operating device 1116 of the eleventh embodiment.

Thirteenth Embodiment

A bicycle seatpost apparatus 1312 including a bicycle operating device 1316 in accordance with a thirteenth embodiment will be described below referring to FIGS. 117 to 125. The bicycle seatpost apparatus 1312 has the same structures as those of the bicycle seatpost apparatus 312 except for the bicycle operating device 316. Thus, elements having substantially the same function as those in the above embodiments will be numbered the same here, and will not be described and/or illustrated again in detail here for the sake of brevity.

As seen in FIGS. 117 and 118, the bicycle operating device 1316 comprises the base member 40, a brake operating member 1342, and the first operating member 344. The brake operating member 1342 is movably coupled to the base member 40 to operate the brake device B7. The first operating member 344 is provided on the first lateral surface 40A. However, the first operating member 344 can be provided on a second lateral surface 40B opposite to the first lateral surface 40A. The bicycle operating device 1316 has substantially the same structure as that of the bicycle operating device 316 of the third embodiment.

As seen in FIG. 119, unlike the bicycle operating device 316 of the third embodiment, the brake operating member 1342 is pivotally coupled to the base member 40 about a second pivot axis A133 in addition to the brake pivot axis A1. The brake operating member 1342 is pivotable relative to the base member 40 about the second pivot axis A133 between a third rest position P1331 and a third operated position P1332.

Furthermore, as seen in FIGS. 120 and 121, the bicycle operating device 1316 further comprises a second operating member 1343 and a cable operating structure 1374. The second operating member 1343 is movably coupled to the base member 40. Specifically, the second operating member 1343 is coupled to the base member 40 movably from a second rest position P1341 to a second operated position P1342 in the first direction D51.

As seen in FIG. 120, the second operating member 1343 is coupled to the base member 40 pivotally about the second pivot axis A133 which is non-parallel to the brake pivot axis A1. In this embodiment, the second operating member 1343 is pivotable relative to the base member 40 about the second pivot axis A133 between the second rest position P1341 and the second operated position P1342.

As seen in FIG. 119, the brake operating member 1342 and the second operating member 1343 are pivoted together relative to the base member 40 about the second pivot axis A133 when the brake operating member 1342 is pivoted relative to the base member 40 from the third rest position P1331 toward the third operated position P1332. As seen in FIG. 120, the second operating member 1343 is pivoted relative to the base member 40 about the second pivot axis A133 without pivoting the brake operating member 1342 when the second operating member 1343 is pivoted relative to the base member 40 about the second pivot axis A133 from the second rest position P1341 toward the second operated position P1342.

As seen in FIG. 121, the cable operating structure 1374 is coupled to the second operating member 1343 to move the second mechanical control cable C7 relative to the base member 40 in response to a movement of the second operating member 1343. The cable operating structure 1374 includes a cable control body 1376 and a positioning structure 1378.

As seen in FIGS. 122 and 123, the cable control body 1376 is configured to be coupled to the second operating member 1343 to move the second mechanical control cable C7 relative to the base member 40 in one of the pulling direction D41 and the releasing direction D42 opposite to the pulling direction D41 in response to a movement of the second operating member 1343. The cable control body 1376 is coupled to one of the brake operating member 42 and the first operating member 344 to move the second mechanical control cable C7 relative to the base member 40 in the other of the pulling direction D41 and the releasing direction D42 in response to a movement of the one of the brake operating member 1342 and the first operating member 344.

In this embodiment, the cable control body 1376 is configured to be coupled to the second operating member 1343 to move the second mechanical control cable C7 relative to the base member 40 in the releasing direction D42 in response to a movement of the second operating member 1343. The cable control body 1376 is coupled to the second operating member 1343 to move the second mechanical control cable C7 relative to the base member 40 in the pulling direction D41 in response to a movement of the brake operating member 1342.

The positioning structure 1378 is configured to selectively maintain the cable control body 1376 at a plurality of control positions. The positioning structure 1378 is coupled to the cable control body 1376 to position the cable control body 1376 relative to the base member 40 at each of at least three control positions relative to the base member 40. In this embodiment, the positioning structure 1378 is coupled to the cable control body 1376 to position the cable control body 1376 relative to the base member 40 at each of three control positions relative to the base member 40. The total number of the control positions is not limited to this embodiment.

A first return spring 1377 (FIG. 96) is configured to bias the brake operating member 1342 from the third operated position P1332 toward the third rest position P1331. A second return spring 1379 (FIG. 96) is configured to bias the second operating member 1343 from the second operated position P1342 toward the second rest position P1341.

As illustrated in FIGS. 123 and 124, the cable operating structure 1374 includes a first input member 1380 and a second input member 1382. The cable control body 1376 is rotatably provided about a rotational axis A137 relative to the base member 40. The cable control body 1376 is pivotally coupled to the base member 40 about the rotational axis A137 via the third shaft 72. The inner wire C72 of the second mechanical control cable C7 is wound about the cable control body 1376. An end of the inner wire C72 of the second mechanical control cable C7 is attached to the cable control body 1376.

As seen in FIG. 125, the cable control body 1376 has a substantially cylindrical shape and includes a cable attachment part 1376A to which the end of the inner wire C72 of the second mechanical control cable C7 is to be attached. When the cable control body 1376 is rotated relative to the base member 40 in a first pivot direction R1, the inner wire C72 of the second mechanical control cable C7 is taken up by the cable control body 1376. When the cable control body 1376 is pivoted about the second pivot axis A133 relative to the base member 40 in a second pivot direction R2, the inner wire C72 of the second mechanical control cable C7 is released (unwound) from the cable control body 1376. The cable control body 1376 is biased in the second pivot direction R2 by a take-up return spring (not shown). Specifically, the take-up return spring applies a biasing force to the cable control body 1376 so as to pivot relative to the base member 40 in the second pivot direction R2. Namely, the cable control body 1376 is biased in the second pivot direction R2 by the take-up return spring to release (unwind) the inner wire C72 of the second mechanical control cable C7.

In this embodiment, as seen in FIGS. 122, 123 and 125, when the brake operating member 1342 is operated from the third rest position P1331 toward the third operated position P1332, the cable control body 1376 rotates about the second pivot axis A133 relative to the base member 40 in the first pivot direction R1 to take up the inner wire C72 of the second mechanical control cable C7. When the second operating member 1343 is operated from the second rest position P1341 toward the second operated position P1342, the cable control body 1376 rotates about the second pivot axis A133 in the second pivot direction R2 to release (unwind) the inner wire C72 of the second mechanical control cable C7.

As seen in FIG. 122, the first input member 1380 is pivoted about the second pivot axis A133 in response to the pivotal movement of the brake operating member 1342 about the second pivot axis A133. More specifically, an end of the first input member 1380 is configured to contact the brake operating member 1342 to be pressed by a contact part 1342A of the brake operating member 1342 from the third rest position P1331 to the third operated position P1332. Thus, when the brake operating member 1342 is pivoted about the second pivot axis A133 relative to the base member 40 from the third rest position P1331 to the third operated position P1332, the first input member 1380 is pivoted about the second pivot axis A133 relative to the base member 40 together with the brake operating member 1342. The pivotal movement of the brake operating member 1342 is transmitted to the positioning structure 1378 via the first input member 1380.

As seen in FIG. 123, the second input member 1382 is pivoted about the second pivot axis A133 in response to the pivotal movement of the second operating member 1343 about the second pivot axis A133. More specifically, an end of the second input member 1382 is configured to contact the second operating member 1343 to be pressed by the second operating member 1343 from the second rest position P1341 to the second operated position P1342. Thus, when the second operating member 1343 is pivoted about the second pivot axis A133 relative to the base member 40 from the second rest position P1341 to the second operated position P1342, the second input member 1382 is pivoted about the second pivot axis A133 relative to the base member 40 together with the second operating member 1343. The pivotal movement of the second operating member 1343 is transmitted to the positioning structure 1378 via the second input member 1382.

Furthermore, the second operating member 1343 is pivoted about the second pivot axis A133 in response to a pivotal movement of the brake operating member 1342. More specifically, the second operating member 1343, the first input member 1380, and the second input member 1382 are pivoted about the second pivot axis A133 relative to the base member 40 together with the brake operating member 1342 when the brake operating member 1342 is pivoted about the second pivot axis A133 relative to the base member 40 toward the third operated position P1332.

As seen in FIG. 125, the positioning structure 1378 includes a positioning plate 1384, a take-up plate 1385, a positioning member 1386, a take-up pawl 1387, a release pawl 1388, a release plate 1389, and an arrest pawl 1390.

As seen in FIG. 124, the positioning plate 1384 and the take-up plate 1385 are attached to the cable control body 1376 to rotate about the second pivot axis A133 together with the cable control body 1376. Namely, the cable control body 1376, the positioning plate 1384, and the take-up plate 1385 are integrally rotatable about the second pivot axis A133 relative to the base member 40.

As seen in FIG. 125, the cable control body 1376, the positioning plate 1384, and the take-up plate 1385 are biased by the take-up return spring (not shown) in the second pivot direction R2. The positioning plate 1384 includes positioning teeth 1384A. The take-up plate 1385 includes take-up teeth 1385A. The positioning member 1386 is in engagement with each of the positioning teeth 1384A of the positioning plate 1384 to keep the rotational position of the positioning plate 1384 against the biasing force of the take-up return spring. The positioning member 1386 includes a positioning pawl. The positioning member 1386 is biased by a first pawl biasing member (not shown) to keep engaging with the positioning teeth 1384A of the positioning plate 1384. Thus, the cable control body 1376 is kept at a predetermined shift position after either a take-up operation using the brake operating member 1342 or a release operation using the second operating member 1343.

As seen in FIG. 123, the take-up pawl 1387 is pivotally provided on the first input member 1380. The take-up pawl 1387 and the first input member 1380 are pivoted about the second pivot axis A133 relative to the base member 40 in the first pivot direction R1 when the brake operating member 1342 is operated from the third rest position P1331 toward the third operated position P1332.

As seen in FIG. 125, the take-up pawl 1387 is in engagement with one of the take-up teeth 1385A of the take-up plate 1385. The take-up pawl 1387 is biased by a second pawl biasing member (not shown) to engage with the take-up teeth 1385A of the take-up plate 1385. The first input member 1380 and the take-up pawl 1387 are rotated about the second pivot axis A133 relative to the base member 40 in the first pivot direction R1 when the brake operating member 1342 is operated from the third rest position P1331 toward the third operated position P1332. The pivotal movement of the first input member 1380 is transmitted to the take-up plate 1385 via the take-up pawl 1387. This causes the take-up plate 1385, the cable control body 1376, and the positioning plate 1384 to be pivoted about the second pivot axis A133 relative to the base member 40 in the first pivot direction R1 against the biasing force of the take-up return spring. At this time, one of the positioning teeth 1384A of the positioning plate 1384 lifts the positioning member 1386 against the biasing force of the first pawl biasing member in response to the rotating of the positioning plate 1384. After the positioning member 1386 gets over the one of the positioning teeth 1384A, the positioning member 1386 engages with another of the positioning teeth 1384A. This allows the take-up plate 1385, the cable control body 1376, and the positioning plate 1384 to be stepwise rotated about the second pivot axis A133 relative to the base member 40 at a pitch of the positioning teeth 1384A in the first pivot direction R1.

As seen in FIG. 125, the release plate 1389 is pivoted about the second pivot axis A133 by the release pawl 1388 in the first pivot direction R1. The release plate 1389 is configured to release the positioning plate 1384 from the positioning member 1386 to rotate the positioning plate 1384 relative to the base member 40 in the second pivot direction R2.

As seen in FIG. 123, the release pawl 1388 is pivotally provided on the second input member 1382. The release pawl 1388 and the second input member 1382 are rotated about the second pivot axis A133 relative to the base member 40 in the first pivot direction R1 when the second operating member 1343 is operated from the second rest position P1341 toward the second operated position P1342. The release pawl 1388 is configured to be disposed at a disengaging position and an engaging position with respect to the second input member 1382. The release pawl 1388 is disposed at the disengaging position with respect to the second input member 1382 when the second operating member 1343 is pivoted from the second rest position P1341 toward the second operated position P1342 in response to the pivotal movement of the brake operating member 1342. The release pawl 1388 is disposed at the engaging position with respect to the second input member 1382 when the second operating member 1343 is operated from the second rest position P1341 toward the second operated position P1342 without the pivotal movement of the brake operating member 1342.

The engaging position allows the release pawl 1388 to contact the release plate 1389 to transmit the pivotal movement of the second operating member 1343 to the release plate 1389. The disengaging position prevents the pivotal movement of the second operating member 1343 from being transmitted to the release plate 1389 via the release pawl 1388. Namely, the release plate 1389 is rotated about the second pivot axis A133 by the release pawl 1388 in the first pivot direction R1 when the second operating member 1343 is operated from the second rest position P1341 toward the second operated position P1342 without the pivotal movement of the brake operating member 1342.

When the second operating member 1343 is pivoted about the second pivot axis A133 relative to the base member 40 and the brake operating member 1342, the release pawl 1388 engages with the release plate 1389 to rotate the release plate 1389 in the first pivot direction R1. The rotation of the release plate 1389 causes the arrest pawl 1390 to be inserted between the positioning teeth 1384A of the positioning plate 1384 at a different position from the positioning member 1386. On the other hand, the rotation of the release plate 1389 causes the positioning member 1386 to disengage from the positioning teeth 1384A of the positioning plate immediately after the engaging of the arrest pawl 1390. Furthermore, the rotation of the release plate 1389 causes the take-up pawl 1387 to disengage from the take-up teeth 1385A of the take-up plate 1385. Accordingly, the cable control body 1376, the positioning plate 1384, and the take-up plate 1385 are rotated by the biasing force of the take-up return spring until the arrest pawl 1390 contacts one of the positioning teeth 1384A of the positioning plate 1384. When the second operating member 1343 is returned to the second rest position P1341, the release plate 1389 is returned to its initial position, causing the positioning member 1386 and the take-up pawl 1387 to engage with the positioning teeth 1384A and the take-up teeth 1385A, respectively. Also, when the second operating member 1343 is returned to the second rest position P1341, the arrest pawl 1390 is returned to its initial position. Thus, the take-up plate 1385, the cable control body 1376, and the positioning plate 1384 can be stepwise rotated about the second pivot axis A133 relative to the base member 40 at a pitch of the positioning teeth 1384A in the second pivot direction R2.

With the bicycle seatpost apparatus 1312 and the bicycle operating device 1316, it is possible to obtain substantially the same effects as those of the bicycle seatpost apparatus 312 and the bicycle operating device 316 of the third embodiment.

The bicycle seatpost apparatus 1312 and the bicycle operating device 1316 further include the following features.

(1) The positioning structure 1378 is coupled to the cable control body 1376 to position the cable control body 1376 relative to the base member 40 at each of at least three control positions relative to the base member 40. Accordingly, it is possible to operate an additional bicycle component having at least three positions respectively corresponding to the at least three control positions via the second mechanical control cable C7.

(2) The cable control body 1376 is configured to be coupled to the second operating member 1343 to move the second mechanical control cable C7 relative to the base member 40 in one of the pulling direction D41 and the releasing direction D42 opposite to the pulling direction D41 in response to the movement of the second operating member 1343. The cable control body 1376 is coupled to one of the brake operating member 42 and the first operating member 344 to move the second mechanical control cable C7 relative to the base member 40 in the other of the pulling direction D41 and the releasing direction D42 in response to the movement of the one of the brake operating member 1342 and the first operating member 344. Accordingly, it is possible to easily recognize a relationship between a direction (the pulling direction D41 and the releasing direction D42) and an operating member (the second operating member 1343, and the brake operating member 1342 or the first operating member 344).

Fourteenth Embodiment

A bicycle seatpost apparatus 1412 including a bicycle operating device 1416 in accordance with a fourteenth embodiment will be described below referring to FIGS. 126 to 143. The bicycle seatpost apparatus 1412 has the same structures as those of the bicycle seatpost apparatus 12 except for the bicycle operating device 316. Thus, elements having substantially the same function as those in the above embodiments will be numbered the same here, and will not be described and/or illustrated again in detail here for the sake of brevity.

As seen in FIGS. 126 to 128, the bicycle operating device 1416 comprises the base member 40, the brake operating member 42, and the first operating member 344. The first operating member 344 is provided on the first lateral surface 40A. The bicycle operating device 1416 has substantially the same structure as that of the bicycle operating device 316 of the third embodiment. Unlike the bicycle operating device 316 of the third embodiment, however, the bicycle operating device 1416 further comprises a second operating member 1443 and a cable operating structure 1474. The second operating member 1443 is movably coupled to the base member 40.

As seen in FIG. 129, the second operating member 1443 is coupled to the base member 40 movably from a second rest position P1450 to a second operated position P1451 in the first direction D51. The second operating member 1443 is coupled to the base member 40 movably from the second rest position P1450 to an opposite operated position P1452 in the second direction D52. The second operating member 1443 is coupled to the base member 40 pivotally about a second pivot axis A142 or A143 which is non-parallel to the brake pivot axis A1. The second operating member 1443 is a separate member from each of the brake operating member 42 and the first operating member 344. However, the second operating member 1443 can be integrally provided with one of the brake operating member 42 and the first operating member 344 as a one-piece unitary member.

The second operating member 1443 is movable relative to the base member 40 in the first direction D51 to provide a first movement M141 and is movable relative to the base member 40 in a second direction D52 to provide a second movement M142 different from the first movement M141. The second direction D52 is different from the first direction D51. The first direction D51 is opposite to the second direction D52. In this embodiment, the first movement M141 of the second operating member 1443 is a pivotal movement of the second operating member 1443 from the second rest position P1450 to the second operated position P1451 in the first direction D51. The second movement M142 of the second operating member 1443 is a pivotal movement of the second operating member 1443 from the second rest position P1450 to the opposite operated position P1452 in the second direction D52.

As seen in FIG. 130, the cable operating structure 1474 includes a cable control body 1476 and a positioning structure 1478. The cable control body 1476 is configured to be coupled to the second operating member 1443 to move the second mechanical control cable C7 relative to the base member 40 in the pulling direction D41 and the releasing direction D42 opposite to the pulling direction D41 in response to a movement of the second operating member 1443. The positioning structure 1478 is configured to selectively maintain the cable control body 1476 at a plurality of control positions. The positioning structure 1478 is coupled to the cable control body 1476 to position the cable control body 1476 relative to the base member 40 at each of at least three control positions relative to the base member 40.

The second operating member 1443 is movable with respect to the base member 40 in the first direction D51 such that the cable control body 1476 pulls the inner wire C72 of the second mechanical control cable C7. The second operating member 1443 is movable with respect to the base member 40 in the second direction D52 such that the cable control body 1476 releases the inner wire C72 of the second mechanical control cable C7. In other words, the second operating member 1443 is movably disposed with respect to the base member 40 from the second rest position P1450 to each of the second operated position P1451 and the opposite operated position P1452. The opposite operated position P1452 is opposite to the second operated position P1451 with respect to the second rest position P1450. However, the opposite operated position P1452 may not be opposite to the second operated position P1451 with respect to the second rest position P1450, if the second direction D52 from the second rest position P1450 to the opposite operated position P1452 is different from the first direction D51 from the second rest position P1450 to the second operated position P1451.

The positioning structure 1478 is coupled to the second operating member 1443 to move the cable control body 1476 from one of the control positions to another of the control positions in a first control direction R141 such that the second mechanical control cable C7 is pulled in response to the first movement M141 of the second operating member 1443. The positioning structure 1478 is coupled to the second operating member 1443 to move the cable control body 1476 from one of the control positions to another of the control positions in a second control direction such that the second mechanical control cable C7 is released in response to the second movement M142 of the second operating member 1443. The second control direction is opposite to the first control direction R141.

As seen in FIGS. 130 and 131, the positioning structure 1478 includes a receiving part 1446 and a biasing member 1448. The biasing member 1448 (e.g., a torsion spring) is arranged to bias the second operating member 1443 towards the second rest position P1450.

The cable control body 1476 is connected to the front derailleur B9 via the second mechanical control cable C7. The inner wire C72 of the second mechanical control cable C7 is pulled or released by the movement of the cable control body 1476 as a result of the operation of the second operating member 1443. The cable control body 1476 is biased in the second control direction R142 by a biasing member 1471 (e.g., a torsion spring).

The cable control body 1476 is configured to move in the first control direction R141 in response to an operation of the second operating member 1443 toward the second operated position P1451. The cable control body 1476 is configured to move in the second control direction R142 in response to an operation of the second operating member 1443 toward the opposite operated position P1452. In other words, the second operating member 1443 is movably disposed with respect to the base member 40 to change a current position of the cable control body 1476 for pulling and releasing the inner wire C72 of the second mechanical control cable C7. In this way, the cable control body 1476 is movably disposed on the base member 40 for pulling and releasing the inner wire C72 of the second mechanical control cable C7 that is coupled to the front derailleur B9. In particular, the cable control body 1476 is rotatably mounted on the third shaft 72.

As seen in FIG. 130, in the illustrated embodiment, the cable control body 1476 rotates in the first control direction R141 for pulling the inner wire C72 of the second mechanical control cable C7, and rotates in the second control direction R142 for releasing the inner wire C72 of the second mechanical control cable C7. In other words, the cable control body 1476 is movably disposed with respect to the base member 40 in the first control direction R141 for pulling the inner wire C72 of the second mechanical control cable C7 that is coupled to the front derailleur B9 and movably disposed with respect to the base member 40 in the second control direction R142 for releasing the inner wire C72 of the second mechanical control cable C7. The cable control body 1476 is disposed in the base member 40.

As seen in FIGS. 130 and 131, the cable operating structure 1474 of the bicycle operating device 1416 further includes a pulling member 1472 for rotating the cable control body 1476 in the first control direction R141. The pulling member 1472 is pivotally disposed on the second operating member 1443 about a first axis A141. The pulling member 1472 contacts the cable control body 1476 while the second operating member 1443 is in the second rest position P1450. The pulling member 1472 is disposed on the second operating member 1443 to move the cable control body 1476 in the first control direction R141 in response to an operation of the second operating member 1443 toward the second operated position P1451. The cable operating structure 1474 further includes a biasing member 1473 (e.g., a torsion spring) that is arranged for biasing the pulling member 1472 contact the cable control body 1476.

The second operating member 1443 is configured to move the pulling member 1472 away from the cable control body 1476 in response to the operation of the second operating member 1443 toward the opposite operated position P1452. In this way, the pulling member 1472 does not interfere with the cable control body 1476 moving in the second control direction R142 in response to the operation of the second operating member 1443 toward the opposite operated position P1452.

The cable operating structure 1474 further includes a second position maintaining member 1479 for holding the cable control body 1476 in a selected one of a plurality of predetermined positions. In particular, the second position maintaining member 1479 is movably disposed with respect to the base member 40 to selectively maintain the cable control body 1476 in one of the plurality of predetermined positions. More particularly, the second position maintaining member 1479 is movably disposed with respect to the base member 40 to move between a holding position and a releasing position. In the holding position, the second position maintaining member 1479 holds the cable control body 1476 in one of the plurality of predetermined positions. In the releasing position, the second position maintaining member 1479 releases the cable control body 1476 for rotational movement. In the illustrated embodiment, the second position maintaining member 1479 engages the cable control body 1476 to selectively establish three predetermined positions. Of course, it will be apparent from this disclosure that the cable control body 1476 can be configured such that the second position maintaining member 1479 engages the cable control body 1476 to selectively establish two or more than three predetermined positions. Thus, preferably, the cable control body 1476 has more than or equal to three predetermined positions. The cable operating structure 1474 further includes a biasing member 1475 (e.g., a torsion spring) that is arranged for biasing the second position maintaining member 1479 towards engagement with the cable control body 1476.

The cable operating structure 1474 further includes a second releasing member 1477 for releasing the cable control body 1476 for rotational movement from a selected one of the predetermined positions so that the cable control body 1476 can move to the next predetermined position in the second control direction R142. The second releasing member 1477 is configured to move the second position maintaining member 1479 to the releasing position in response to the operation of the second operating member 1443 toward the opposite operated position P1452. When the cable operating structure 1474 is in the rest position, the second position maintaining member 1479 is biased against the second releasing member 1477 by the biasing member 1475 such that the second releasing member 1477 is biased in the second control direction R142.

Referring now to FIGS. 130 to 143, the cable operating structure 1474 will now be discussed in greater detail. Basically, as mentioned above, the cable operating structure 1474 is operated by moving the second operating member 1443 from the second rest position P1450 to each of the second operated position P1451 and the opposite operated position P1452. As a result of the operation of the second operating member 1443 in the first direction D51 toward the second operated position P1451, the pulling member 1472 rotates the cable control body 1476 to perform a pulling operation. As a result of the operation of the second operating member 1443 in the second direction D52 toward the opposite operated position P1452, the pulling member 1472 rotates the second releasing member 1477 to perform a releasing operation.

In the cable operating structure 1474, the pulling member 1472 rotates about the first axis A141. The cable control body 1476 is rotatably mounted to the base member 40 about the first axis A141.

The second operating member 1443 will be discussed in greater detail. The second operating member 1443 is configured to rotate about the second pivot axis A142 as the second operating member 1443 moves from the second rest position P1450 toward the second operated position P1451. However, the second operating member 1443 is configured to rotate about a second pivot axis A143 as the second operating member 1443 moves from the second rest position P1450 toward the opposite operated position P1452. The second pivot axis A143 is established by the pivot axle 1455. The second pivot axis A143 is different from the second pivot axis A142. Also the first axis A141 is different from the second and third axes A142 and A143.

The receiving part 1446 is rotatably disposed with respect to the base member 40 about the second pivot axis A142. The second operating member 1443 is rotatably disposed with respect to the base member 40 about the second pivot axis A143. During a pulling operation, the receiving part 1446 and the second operating member 1443 rotate together about the second pivot axis A142 in response to the operation of the second operating member 1443 toward the second operated position P1451. During a releasing operation, the receiving part 1446 rotates about the second pivot axis A142 and the second operating member 1443 rotates about the second pivot axis A143 in response to the operation of the second operating member 1443 toward the opposite operated position P1452. The second operating member 1443 includes a first axle 1488 that pivotally supports the pulling member 1472 on the second operating member 1443 about the first axis A141.

The receiving part 1446 is a ring-shaped member that is rotatably mounted on the third shaft 72. In the illustrated embodiment, the receiving part 1446 is a rigid member that is made of a suitable rigid material such as a rigid plastic material or a metallic material. The receiving part 1446 includes a contact projection 1446A and an opening 1446B. The contact projection 1446A of the receiving part 1446 is configured to engage the second operating member 1443 such that the biasing force of the biasing member 1448 is transmitted to both the receiving part 1446 and the second operating member 1443 as explained below. The biasing member 1448 is attached to the receiving part 1446 via the opening 1446B such that the receiving part 1446 is biased in the second control direction R142. In the illustrated embodiment, the biasing member 1448 is a flat coiled torsion spring that is coiled around the third shaft 72. The biasing member 1448 has a first end disposed in the opening 1446B of the opening 1446B and a second end hooked onto the second releasing member 1477. Thus, the biasing member 1448 also biases in the second releasing member 1477 in the first control direction R141.

The second operating member 1443 constitutes the user operating part of the second operating member 1443 that extends out of the base member 40. The second operating member 1443 is movably mounted relative to the base member 40 on the pivot axle 1455. The pulling member 1472 is pivotally mounted on the second operating member 1443 by the first axle 1488. The first axle 1488 defines the first axis A141. The first axis A141 rotates about the second pivot axis A143 in response to the operation of the second operating member 1443 toward the opposite operated position P1452. The pulling member 1472 is biased to contact the cable control body 1476 by the biasing member 1473. The biasing member 1473 has a coiled portion mounted on the first axle 1488. A first end of the biasing member 1473 contacts the pulling member 1472, and a second end of the biasing member 1473 is attached to the internal portion 1443B of the second operating member 1443. In this way, the biasing member 1473 applies a biasing force on the pulling member 1472 to bias the pulling member 1472 towards the cable control body 1476.

The second operating member 1443 of the second operating member 1443 includes an elongated slot 1443C through which the second pivot axis A143 extends. In particular, the second operating member 1443 is mounted on the pivot axle 1455 such that an end of the pivot axle 1455 is disposed in the elongated slot 1443C. Preferably, the elongated slot 1443C is an arcuate slot. The second operating member 1443 slides on the pivot axle 1455 when the second operating member 1443 is operated in the first direction D51 from the second rest position P1450. Thus, during a pulling operation, the second pivot axis A143 relatively moves along the elongated slot 1443C while the second operating member 1443 is operated from the second rest position P1450 toward the second operated position P1451. When the second operating member 1443 is in the second rest position P1450, the pivot axle 1455 abuts the end of the elongated slot 1443C to define the second rest position P1450 of the second operating member 1443. Also, during the pulling operation, the pivot axle 1455 abuts the other end of the elongated slot 1443C to restrict a movement of the second operating member 1443 in the first direction D51. Also during a pulling operation, the second operating member 1443 and the receiving part 1446 and 47 pivot together about the second pivot axis A142. On the other hand, the second operating member 1443 is pivoted on the pivot axle 1455 when the second operating member 1443 is operated in the second direction D52 from the second rest position P1450. Thus, during a releasing operation, the second pivot axis A143 remains stationary within the elongated slot 1443C in a direction along the elongated slot 1443C while the second operating member 1443 is operated from the second rest position P1450 toward the opposite operated position P1452. Also during a releasing operation, the second operating member 1443 is pivoted on the second pivot axis A143 and the receiving part 1446 is pivoted on the second pivot axis A142. During the releasing operation, a pivoting direction of the receiving part 1446 about the second pivot axis A142 and a pivoting direction of the second operating member 1443 about the second pivot axis A143 are different from each other.

The internal portion 1443B of the second operating member 1443 further includes a first contact projection 1443D, a second contact projection 1443E and a third contact projection 1443F. In the second rest position P1450 of the second operating member 1443, the first and second contact projections 1443D and 1443E are held in contact with the outer peripheral edge of the receiving part 1446 by the biasing force of the biasing member 1448. In particular, the biasing member 1448 biases the receiving part 1446 in the releasing direction D2 such that the contact projection 1446A of the receiving part 1446 contacts and applies the biasing force of the biasing member 1448 to the first contact projection 1443D of the second operating member 1443. As a result of this transmission of the biasing force to the first contact projection 1443D, the second operating member 1443 is biased on the third shaft 72 such that the second contact projection 1443E contacts the outer peripheral edge of the receiving part 1446.

The second contact projection 1443E further engages and moves the pulling member 1472 upon operation of the second operating member 1443 from the second rest position P1450 toward the opposite operated position P1452. In this way, the second contact projection 1443E pivots the pulling member 1472 away from the cable control body 1476 so that the pulling member 1472 will not interfere with the rotation of the cable control body 1476 in the second control direction R142.

The third contact projection 1443F of the second operating member 1443 forms a release actuation abutment. In other words, the third contact projection 1443F is configured to rotate the second releasing member 1477 in response to the second operating member 1443 being operated in the second direction D52 from the second rest position P1450 to perform a releasing operation. During a releasing operation, the second operating member 1443 is pivoted on the second pivot axis A143. This pivoting of the second operating member 1443 causes the first contact projection 1443D of the second operating member 1443 to apply a force on the contact projection 1446A of the receiving part 1446 and to rotate the receiving part 1446 on the second pivot axis A142 in the first control direction R141. As the second operating member 1443 is pivoted on the second pivot axis A143, the third contact projection 1443F contacts the second releasing member 1477 and rotates the second releasing member 1477 in the releasing direction D2.

The cable control body 1476 is rotatably mounted on the third shaft 72. Thus, the cable control body 1476 is configured to rotate about a second pivot axis A142. The cable control body 1476 is a rigid member that is made from a suitable rigid material such as a hard plastic material or a metallic material. The cable control body 1476 includes a cable attachment portion 1476A, a plurality of pulling teeth or abutments 1476B and a plurality of positioning teeth or abutments 1476C. While the cable control body 1476 is formed as a one-piece member, it will be apparent from this disclosure that the cable control body 1476 can be made of several separate elements such as, for example, the cable control body 976. In this embodiment, the plurality of pulling teeth or abutments 1476B and the plurality of positioning teeth or abutments 1476C are formed as a one piece unitary member with the cable attachment portion 1476A. However, each pulling tooth or abutment may be formed at a ratchet wheel which is a separate member from the cable attachment portion 1476A and non-rotatably attached to cable attachment portion 1476A, if needed and/or desired. The cable attachment portion 1476A is located adjacent the outer periphery of the cable control body 1476. The cable attachment portion 1476A is a conventional part that is configured to receive a nipple that is fixed to the inner wire C72. The pulling abutments 1476B are arranged to be engaged by the pawl of the pulling member 1472 for pivoting the cable control body 1476 in the first control direction R141 about the third shaft 72. In other words, the pawl of the pulling member 1472 contacts one of the pulling abutments 1476B during a pulling operation of the cable operating structure 1474. The pulling member 1472 is facing one of the pulling abutments 1476B when the second operating member 1443 is in the second rest position P1450. In other words, the pulling member 1472 is intersecting with a rotational pass of the one of the pulling abutments 1476B about the second pivot axis A142. Preferably, the pulling member 1472 may be in contacting with one of the pulling abutments 1476B when the second operating member 1443 is in the second rest position P1450 or slightly spaced apart from the one of the pulling abutments 1476B in the second control direction R142. Thus, upon starting the pulling operation of the cable operating structure 1474, the pulling member 1472 can abut and move the one of the pulling abutments 1476B quickly. The positioning abutments 1476C are arranged to be engaged by the pawl of the second position maintaining member 1479 for holding the cable control body 1476 in one of the predetermined positions against the biasing force of the biasing member 1471. Thus, the cable control body 1476 is prevented from rotating in the second control direction R142 about the second pivot axis A142.

In the illustrated embodiment, the pulling member 1472 is arranged to engage the cable control body 1476 for pulling the second mechanical control cable C7. In particular, as the second operating member 1443 is pivoted from the second rest position P1450 to the take-up position, the pulling member 1472 rotates the cable control body 1476 to pull the second mechanical control cable C7. Upon releasing the second operating member 943 from the second operated position P1451, the second operating member 943 and the pulling member 1472 all automatically returns their rest positions.

The second position maintaining member 1479 is pivotally disposed relative to the base member 40 about a fourth axis A144. In particular, the second position maintaining member 1479 is pivotally mounted on a pivot pin 1490 that establishes the fourth axis A144. The pivot pin 1490 is mounted between a first support plate 1452 and a second support plate 1453. The second position maintaining member 1479 is biased towards the cable control body 1476 by the biasing member 1475. The biasing member 1475 has a coiled portion mounted on the pivot pin 1490. A first end of the biasing member 1475 contacts the second position maintaining member 1479, and a second end of the biasing member 1475 is attached to the first support plate 1452.

The second releasing member 1477 is a rigid member that is made of a suitable rigid material such as a rigid plastic material or a metallic material. The second releasing member 1477 is rotatably mounted on the third shaft 72. As mentioned above, the second releasing member 1477 is biased in the first control direction R141 by the biasing force of the biasing member 1448. The second releasing member 1477 includes an actuation tab or abutment 1477A and a cam surface 1477B. The actuation abutment 1477A is configured and arranged to be contacted by the third contact projection 1443F of the second operating member 1443 as the second operating member 1443 is operated in the second direction D52 from the second rest position P1450 to perform a releasing operation. In other words, the second releasing member 1477 is rotated about the second pivot axis A142 in the second control direction R142 as the second operating member 1443 is operated in the second direction D52 from the second rest position P1450 to perform a releasing operation. As the second releasing member 1477 rotates in the second control direction R142, the cam surface 1477B contacts the pawl of the second position maintaining member 1479 and pivots the second position maintaining member 1479 about the fourth axis A144. The second position maintaining member 1479 is then disengaged from the positioning abutment 1476C that was engaged with the second position maintaining member 1479. When the second operating member 1443 is released, the second releasing member 1477 rotated in the first control direction R141 and the second position maintaining member 1479 is pivoted back into engagement with one of the positioning abutments 1476C. In this way, the second releasing member 1477 is configured to move the second position maintaining member 1479 to the releasing position in response to the operation of the second operating member 1443 toward the opposite operated position P1452. Consequently, the engagement between the second position maintaining member 1479 and the positioning abutment 1476C is shifted so that the second mechanical control cable C7 is released.

Figure 132:
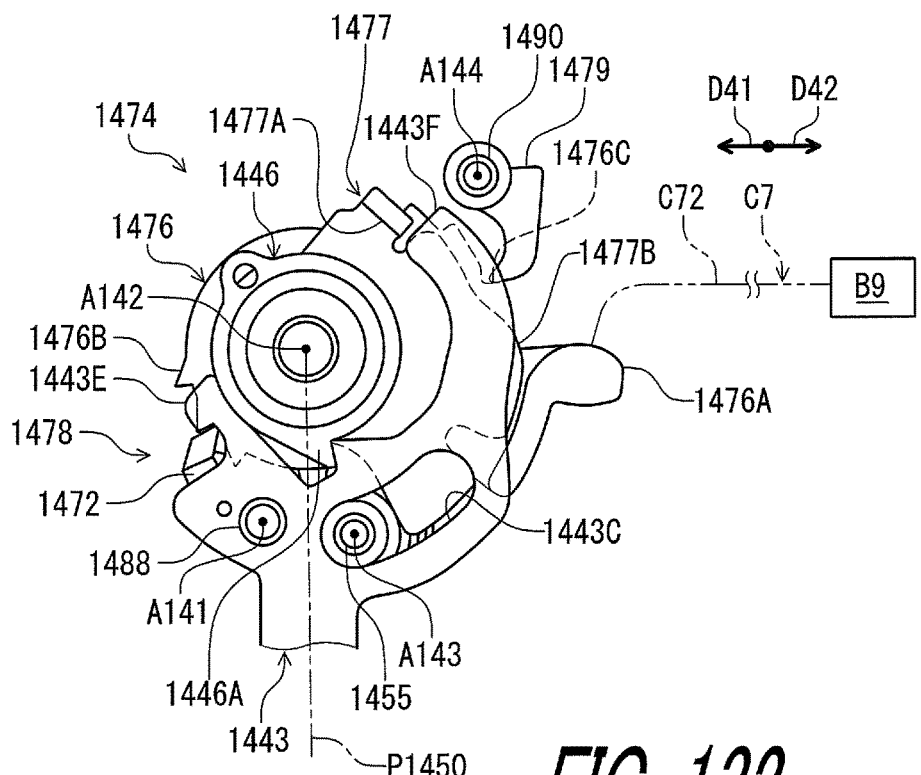
Figure 133:
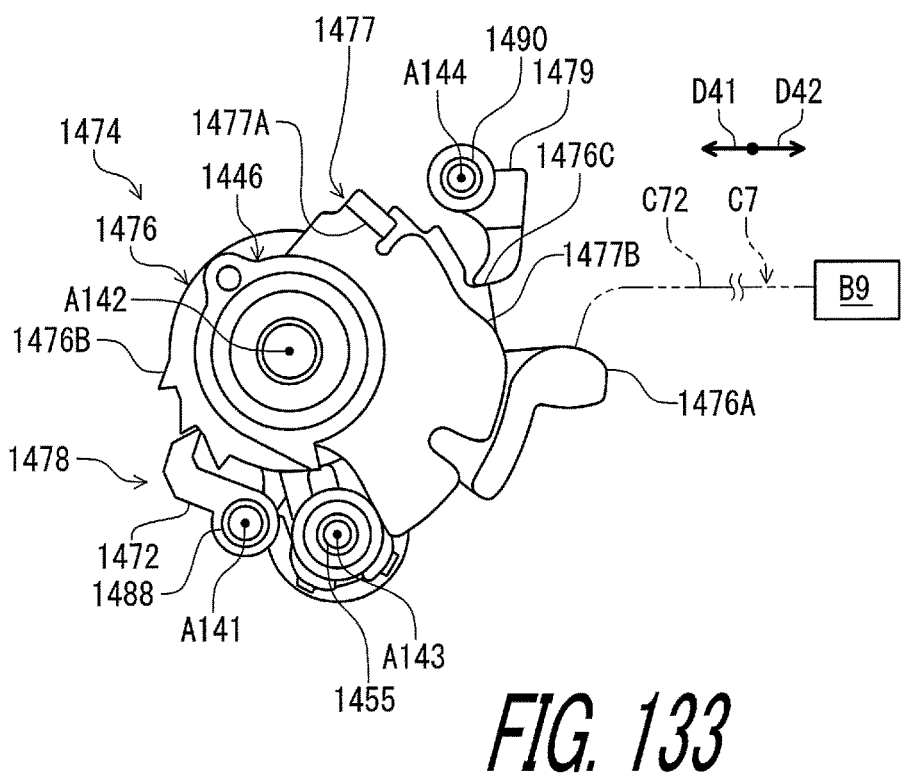
Figure 134:
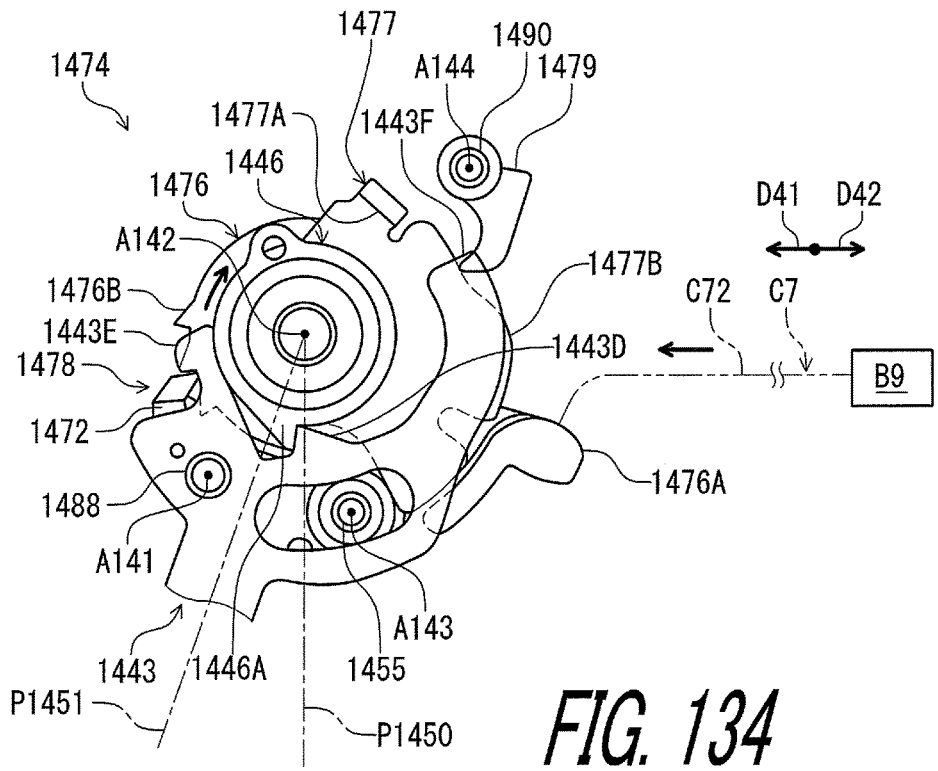
Figure 135:
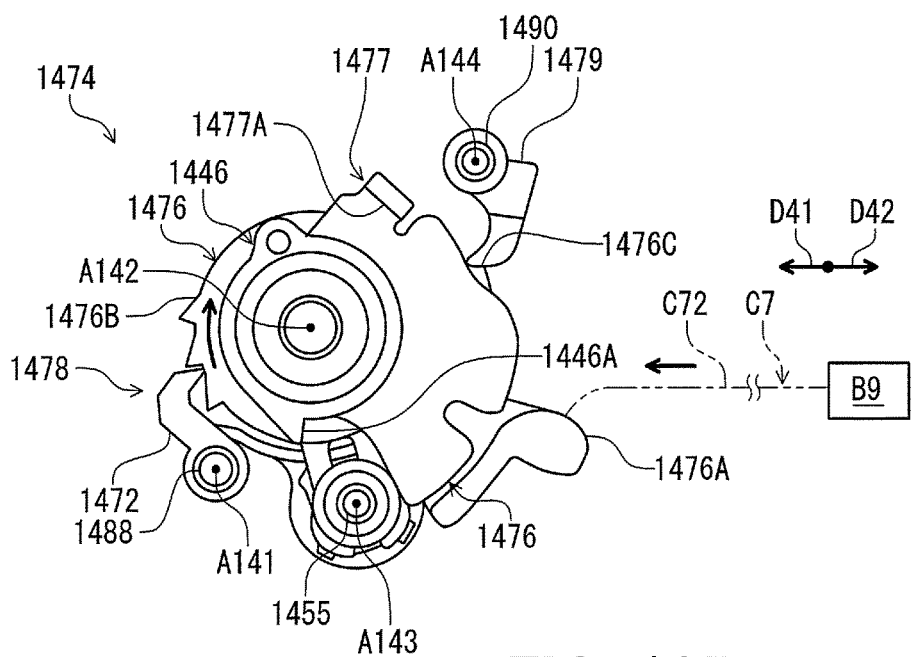
Figure 136:
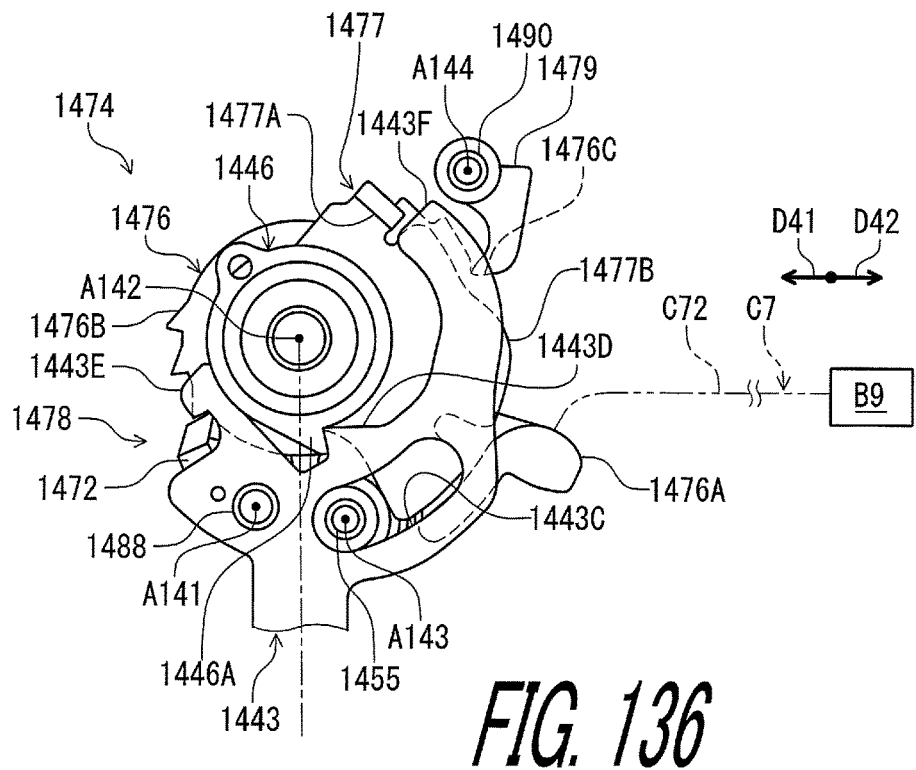
Figure 137:
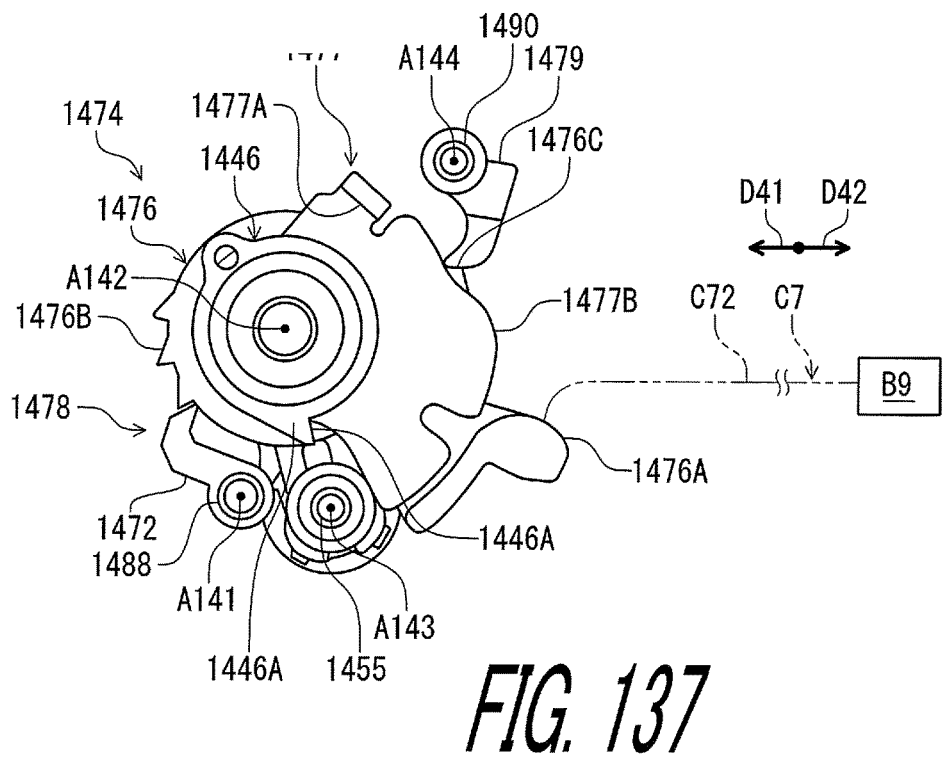

Referring to FIGS. 132 to 137, the bicycle operating device 1416 is illustrated in which the cable operating structure 1474 performs a pulling operation of the second mechanical control cable C7 by pivoting the second operating member 1443 from the rest (non-operated) position P1450 to the second operated position P1451. FIGS. 132 and 133 show parts of the bicycle operating device 1416 that pertain the cable operating structure 1474 in their rest positions. FIGS. 134 to 137 show the parts of the bicycle operating device 1416 be sequentially moved as the second operating member 1443 is pivoted from the rest (non-operated) position to the second operated position P1451 and then back to the rest position. FIGS. 132 and 133 show the cable control body 1476 in the middle predetermined position.

Basically, during the pulling operation of the second mechanical control cable C7 by operating the second operating member 1443, the pawl of the pulling member 1472 engages one of the pulling abutments 1476B of the cable control body 1476 to rotate the cable control body 1476 as seen in FIGS. 134 to 137. As the cable control body 1476 rotates, the pawl of the second position maintaining member 1479 slides along the peripheral edge of the cable control body 1476 to engage the next one of the positioning abutments 1476C of the cable control body 1476. Thus, the second position maintaining member 1479 holds the cable control body 1476 in the next predetermined position. Meanwhile, upon releasing the second operating member 1443, the second operating member 1443 returns to the second rest position P1450.

Figure 138:
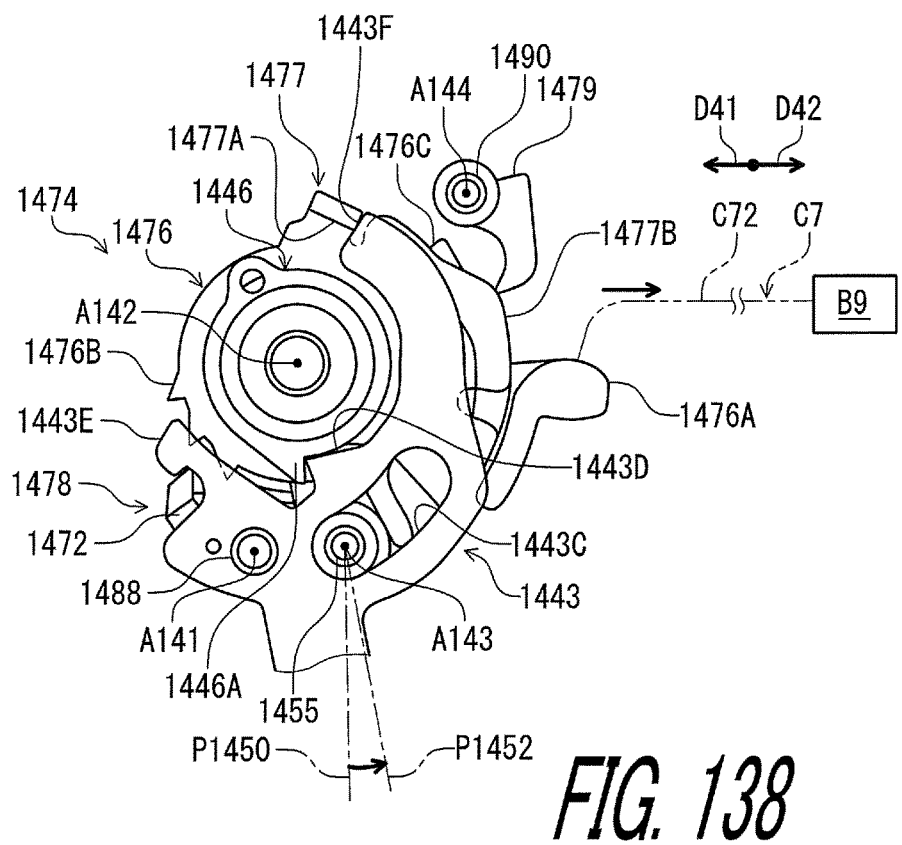
Figure 139:
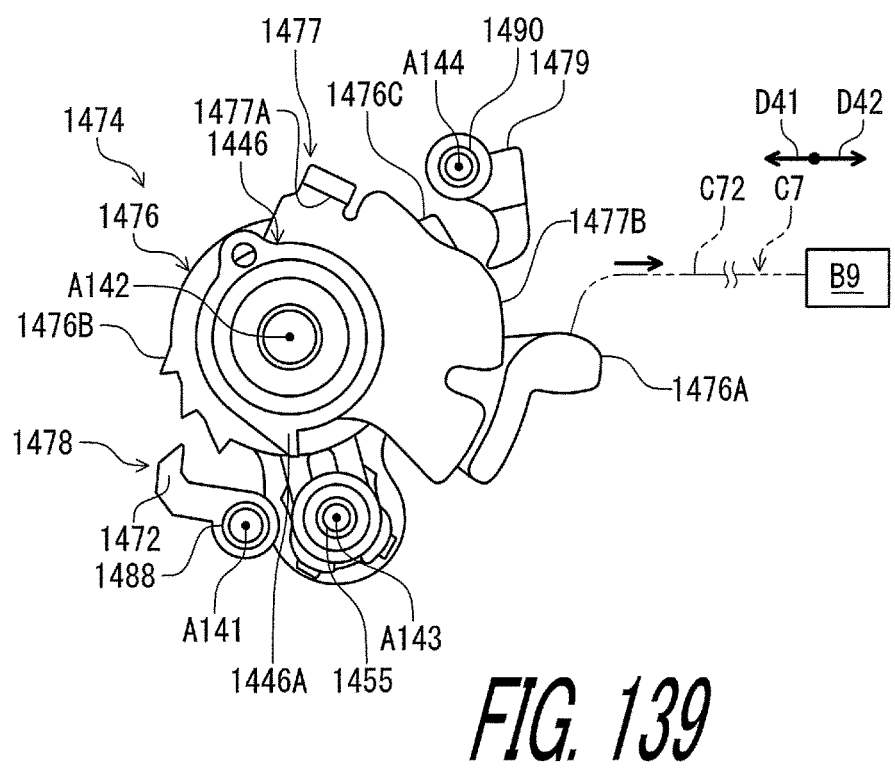
Figure 140:
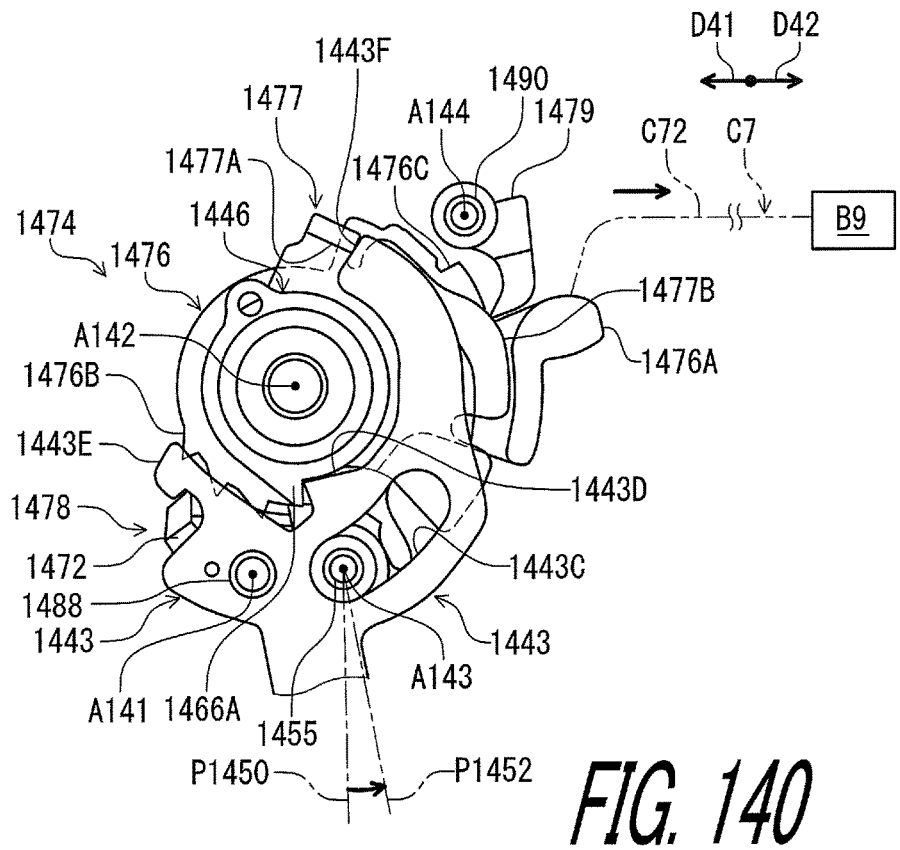
Figure 141:
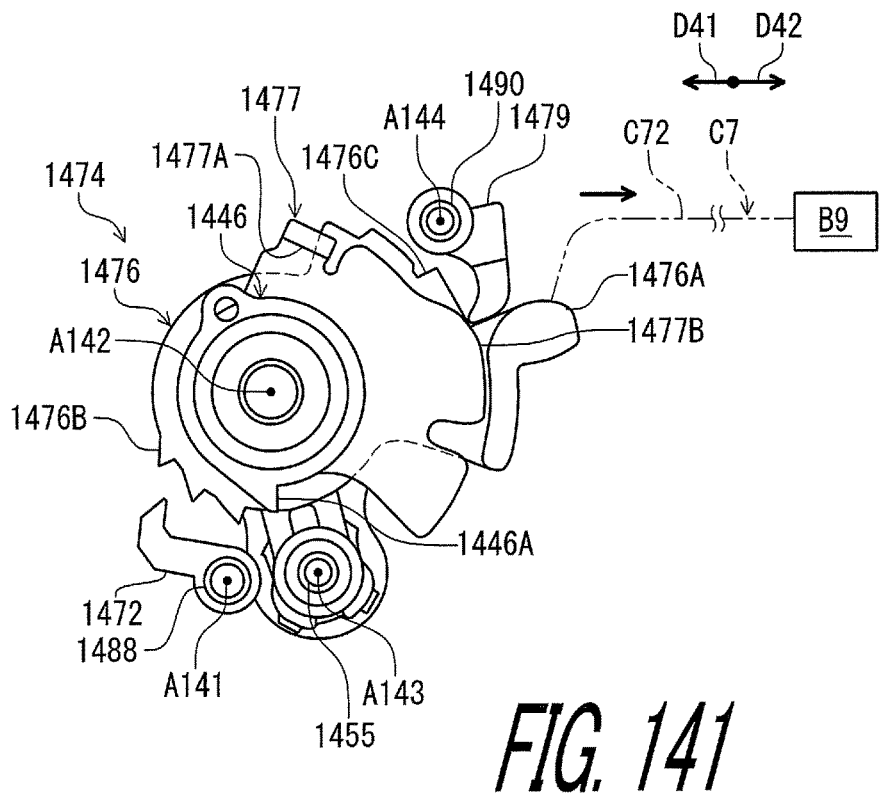
Figure 142:
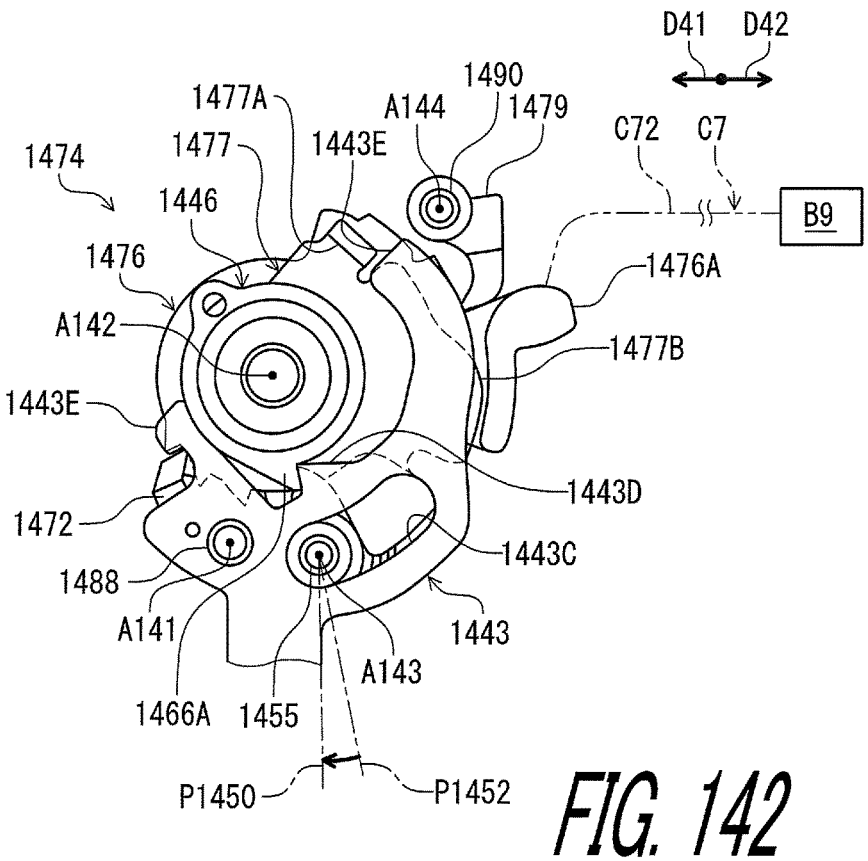
Figure 143:
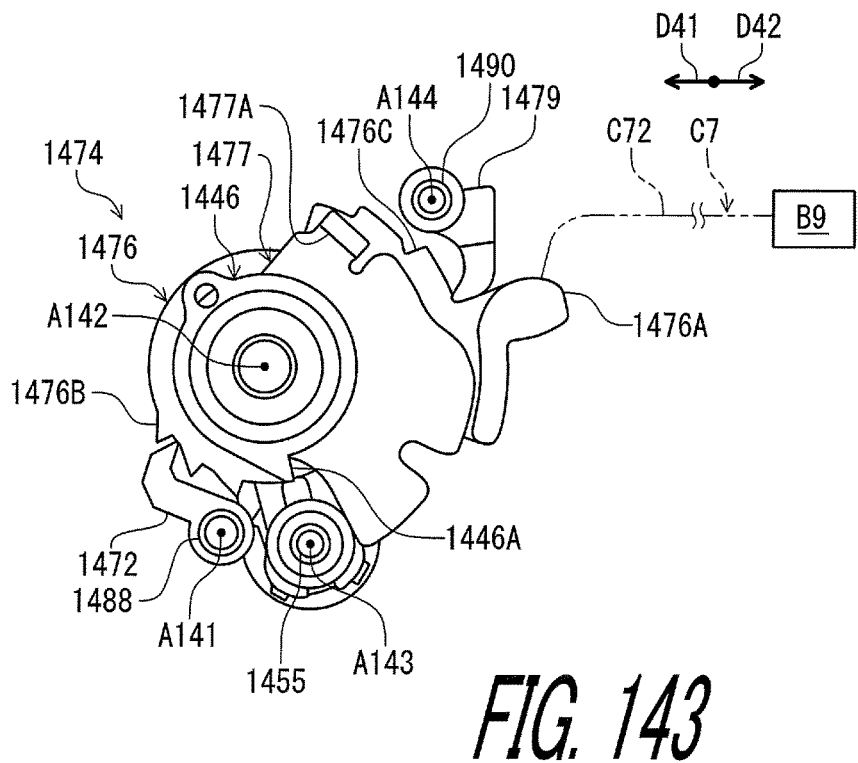

Referring to FIGS. 138 to 143, the bicycle operating device 1416 is illustrated in which the cable operating structure 1474 performs a releasing operation of the second mechanical control cable C7 by pivoting the second operating member 1443 from the rest (non-operated) position P1450 to the opposite operated position P1452. FIGS. 138 and 139 show parts of the bicycle operating device 1416 that pertain the cable operating structure 1474 in their rest positions. FIGS. 140 to 143 show the parts of the bicycle operating device 1416 be sequentially moved as the second operating member 1443 is pivoted from the rest (non-operated) position to the opposite operated position P1452 and then back to the rest position. FIGS. 142 and 143 show the cable control body 1476 in the predetermined position corresponding to the fully released position.

Basically, during the releasing operation of the second mechanical control cable C7 by operating the second operating member 1443, the second operating member 1443 is pivoted on the second pivot axis A143. This pivoting of the second operating member 1443 causes the first contact projection 1443D of the second operating member 1443 to apply a force on the contact projection 1446A of the receiving part 1446 and to rotate the receiving part 1446 on the second pivot axis A142 in the first control direction R141. As the second operating member 1443 is pivoted on the second pivot axis A143, the third contact projection 1443F contacts the second releasing member 1477 and rotates the second releasing member 1477 in the releasing direction D2. Also this pivoting of the second operating member 1443 causes the second contact projection 1443E to pivot the pulling member 1472 away from the pulling abutments 1476B of the cable control body 1476 so that the pulling member 1472 will not interfere with the rotation of the cable control body 1476 in the second control direction R142. As the second releasing member 1477 rotates, the pawl of the second position maintaining member 1479 slides along the cam surface 1477B of the second releasing member 1477 so that the pawl of the second position maintaining member 1479 disengages from the positioning abutments 1476C of the cable control body 1476. Meanwhile, upon releasing the second operating member 1443, the second operating member 1443 returns to the second rest position P1450.

With the bicycle seatpost apparatus 1412 and the bicycle operating device 1416, it is possible to obtain substantially the same effects as those of the bicycle seatpost apparatus 312 and the bicycle operating device 316 of the third embodiment.

The bicycle seatpost apparatus 1412 and the bicycle operating device 1416 further include the following features.

(1) The positioning structure 1478 is coupled to the cable control body 1476 to position the cable control body 1476 relative to the base member 40 at each of at least three control positions relative to the base member 40. Accordingly, it is possible to operate an additional bicycle component having at least three positions respectively corresponding to the at least three control positions via the second mechanical control cable C7.

(2) The positioning structure 1478 is coupled to the second operating member 1443 to move the cable control body 1476 from one of the control positions to another of the control positions in the first control direction R141 such that the second mechanical control cable C7 is pulled in response to the first movement M141 of the second operating member 1443. The positioning structure 1478 is coupled to the second operating member 1443 to move the cable control body 1476 from one of the control positions to another of the control positions in a second control direction such that the second mechanical control cable C7 is released in response to the second movement M142 of the second operating member 1443, the second control direction being opposite to the first control direction R141. Accordingly, it is possible to move the second mechanical control cable C7 in the pulling direction D41 and the releasing direction D42 with a simple operation of the second operating member 1443.

(3) Since the first direction D51 is opposite to the second direction D52. it is possible to easily recognize each of the first direction D51 and the second direction D52 of the second operating member 1443.

Fifteenth Embodiment

A bicycle seatpost apparatus 1512 including a bicycle operating device 1516 in accordance with a fifteenth embodiment will be described below referring to FIGS. 144 and 145. The bicycle seatpost apparatus 1512 has the same structures as those of the bicycle seatpost apparatus 12 except for the bicycle operating device 16. Thus, elements having substantially the same function as those in the above embodiments will be numbered the same here, and will not be described and/or illustrated again in detail here for the sake of brevity.

As seen in FIG. 144, the bicycle operating device 1516 comprises the base member 40, the brake operating member 42, and a first operating member 1544. The first operating member 1544 has substantially the same structure as that of the first operating member 44 of the first embodiment. In this embodiment, as seen in FIG. 145, the first operating member 1544 is pivotally coupled to the base member 40 about a pivot axis A152. Instead of the first operating member 1544, the same structure as that of the first operating member 344 can be applied to this embodiment.

As seen in FIG. 145, the bicycle operating device 1516 further comprises a second operating member 1543 and an electrical switch SW to operate an electrical shifting device B159. The electrical shifting device B159 can also be referred to as an electrical front derailleur B159. The second operating member 1543 is pivotally coupled to one of the base member 40 and the brake operating member 42. In this embodiment, the second operating member 1543 is pivotally coupled to the brake operating member 42 about a pivot axis A153. However, the second operating member 1543 can be pivotally coupled to the base member 40.

The electrical switch SW is disposed at the second operating member 1543. However, the electrical switch SW can be disposed at another member such as the base member 40, the brake operating member 42 or the first operating member 1544. The electrical switch SW is mounted to the second operating member 1543 to provide an electric signal in response to a movement of the second operating member 1543 relative to the brake operating member 42. In this embodiment, for example, the electrical switch SW is a normally open switch. The electrical switch SW is pressed by an actuation part 42X of the brake operating member 42 when the second operating member 1543 is pivoted relative to the brake operating member 42 from a rest position to an operated position.

The bicycle operating member 1516 further comprises a wireless communication unit WU and a power supply PS. The wireless communication unit WU is electrically connected to the electrical switch SW to transmit a wireless signal based on the electric signal. In this embodiment, the wireless communication unit WU is disposed at the second operating member 1543. However, the wireless communication unit WU can be disposed at another member such as the base member 40, the brake operating member 42 or the first operating member 1544. The wireless communication unit WU includes a processor 48A, a memory 48B, a signal generating circuit 48C, a signal transmitting circuit 48D, and a signal receiving circuit 48E. Since the configuration of the wireless communication unit WU has been known in the bicycle field, it will not be described and/or illustrated in detail here for the sake of brevity.

The power supply PS is electrically connected to the wireless communication unit WU to supply electric power to the wireless communication unit WU. In this embodiment, the power supply PS is disposed at the second operating member 1543. However, the power supply PS can be disposed at another member such as the brake operating member 42, the first operating member 1544 or the base member 40. The power supply PS includes a battery such as a primary battery or a secondary battery.

The electrical switch SW is configured to operate a shifting device such as an electric front derailleur B159 or an electric rear derailleur B1584. The electrical switch SW receives an input in response to the movement of the second operating member 1543. The electrical switch SW is closed to provide the electric signal when the second operating member 1543 is pivoted relative to the brake operating member 42. The wireless communication unit WU wirelessly transmits a shift control signal based on the electric signal from the electrical switch SW. In this embodiment, for example, the wireless communication unit WU transmits the shift control signal to operate the front derailleur B159. However, the wireless communication unit WU can transmit the shift control signal as one of a downshifting signal and an upshifting signal for the rear derailleur B1584. In such an embodiment, for example, the electric front derailleur B159 is operated by concurrently operating the electrical switch SW and an additional electrical switch (not shown) mounted to an additional bicycle operating device 1518. The additional bicycle operating device 1518 includes an additional wireless communication unit (not shown) electrically connected to the additional electrical switch to transmit an additional wireless signal based on an electric signal from the additional electrical switch. The additional wireless communication unit wirelessly transmits the additional wireless signal as the other of the downshifting signal and the upshifting signal. While the electric signal is transmitted via the wireless communication unit WU in this embodiment, the electric signal may be transmitted to control the electric front derailleur B159 or the rear derailleur B1584 via an electric control cable. In such an embodiment, the power supply PS to supply electric power to the wireless communication unit WU can also be omitted.

With the bicycle seatpost apparatus 1512 and the bicycle operating device 1516, it is possible to obtain substantially the same effects as those of the bicycle seatpost apparatus 12 and the bicycle operating device 16 of the first embodiment.

Furthermore, since the bicycle operating device 1516 further comprises the electrical switch SW, it is possible to operate the electrical shifting device B159 in addition to the brake device and a mechanical bicycle component.

It will be apparent to those skilled in the bicycle field from the present disclosure that the structures of the bicycle operating devices of the above embodiments can be applied to a bicycle operating device for other type of handlebar such as a flat handlebar. For example, at least one of the first end portion 46, the second end portion 48, and the grip portion 50 can be omitted from the base member 40. The base member 40 does not include the grip portion 50 in a state where the bicycle operating device of each of the above embodiments is mounted to the flat handlebar.

It will be apparent to those skilled in the bicycle field from the present disclosure that the constructions of the above embodiments can at least partly combined with each other if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
 a base member comprising:
   a first end portion configured to be coupled to a handlebar in a mounting state where the bicycle operating device is mounted to the handlebar;
   a second end portion opposite to the first end portion; and
   a grip portion provided between the first end portion and the second end portion;
 a brake operating member pivotally coupled to the base member about a brake pivot axis to operate a brake device; and
 a first operating member pivotally coupled to the base member about a first pivot axis which is non-parallel to the brake pivot axis, the first operating member being movable between a first rest position and a first operated position to move a first mechanical control cable relative to the base member to perform an operation other than a shift operation, the first operating member being movable relative to the base member between the first rest position and the first operated position without mechanically positioning the first mechanical control cable relative to the base member during a movement of the first operating member occurring between the first rest position and the first operated position.

2. The bicycle operating device according to claim 1, wherein
 the first end portion is configured to be coupled to a bending portion of the handlebar in the mounting state where the bicycle operating device is mounted to the handlebar.

3. The bicycle operating device according to claim 1, wherein
 the first operating member is pivotally coupled to the brake operating member to be movably coupled to the base member.

4. The bicycle operating device according to claim 1, wherein
 the brake operating member is integrally formed with the first operating member as a one-piece unitary member.

5. The bicycle operating device according to claim 1, wherein
 the base member includes a first lateral surface facing in a transverse direction of a bicycle in the mounting state, and
 the first operating member is provided on the first lateral surface.

6. The bicycle operating device according to claim 5, wherein
 the first lateral surface faces a transverse center plane of the bicycle in the mounting state.

7. The bicycle operating device according to claim 1, wherein
 the brake operating member includes a first end pivotally coupled to the base member, and
 the first operating member is closer to the first end portion of the base member than the first end of the brake operating member.

8. The bicycle operating device according to claim 1, wherein
 the first end portion of the base member is configured to be coupled to a left part of the handlebar in the mounting state.

9. The bicycle operating device according to claim 8, wherein
 the base member includes a first lateral surface facing a transverse center plane of a bicycle in the mounting state, and
 the first operating member is provided on the first lateral surface.

10. The bicycle operating device according to claim 1, wherein
 the bicycle operating device is free of a shift operating structure to operate a shift changing device.

11. The bicycle operating device according to claim 1, wherein the first operating member is configured to be detachably mounted to one of the brake operating member and the base member.

12. The bicycle operating device according to claim 1, further comprising:
a cable attachment structure movably coupled to one of the brake operating member and the base member to transmit a movement of the first operating member to the first mechanical control cable without mechanically positioning the first mechanical control cable relative to the base member.

13. The bicycle operating device according to claim 12, wherein
the first operating member and the cable attachment structure are detachably mounted to the one of the brake operating member and the base member.

14. The bicycle operating device according to claim 1, further comprising:
a second operating member movably coupled to the base member; and
a cable operating structure including
a cable control body configured to be coupled to the second operating member to move a second mechanical control cable relative to the base member in a pulling direction and a releasing direction opposite to the pulling direction in response to a movement of the second operating member, and
a positioning structure configured to selectively maintain the cable control body at a plurality of control positions.

15. The bicycle operating device according to claim 14, wherein
one of the first operating member and the second operating member is integrally provided with the brake operating member as a one-piece unitary member.

16. The bicycle operating device according to claim 14, wherein
the second operating member is integrally provided with the brake operating member as a one-piece unitary member, and
the second operating member is coupled to the base member pivotally about a second pivot axis which is non-parallel to the brake pivot axis.

17. The bicycle operating device according to claim 14, wherein
the second operating member is integrally provided with the brake operating member as a one-piece unitary member,
the base member includes a first lateral surface facing in a transverse direction of a bicycle in the mounting state, and
the first operating member is provided on the first lateral surface.

18. The bicycle operating device according to claim 14, wherein
the second operating member is movable relative to the base member in a first direction,
the cable control body is configured to pull the second mechanical control cable when the second operating member is moved relative to the base member in the first direction, and
the cable control body is configured to release the second mechanical control cable when the second operating member is moved relative to the base member in the first direction.

19. The bicycle operating device according to claim 14, wherein the second operating member is movable relative to the base member in a first direction to provide a first movement, and
the positioning structure is coupled to the second operating member to move the cable control body such that the second mechanical control cable is moved in the pulling direction and the releasing direction alternatingly in response to the first movement of the second operating member.

20. The bicycle operating device according to claim 14, wherein
the second operating member is movable relative to the base member in a first direction to provide a first movement and a first additional movement different from the first movement,
the positioning structure is coupled to the second operating member to move the cable control body such that the second mechanical control cable is moved in the releasing direction in response to the first movement of the second operating member, and
the positioning structure is coupled to the second operating member to move the cable control body such that the second mechanical control cable is moved in the pulling direction in response to the first additional movement of the second operating member.

21. The bicycle operating device according to claim 14, wherein
the positioning structure is coupled to the cable control body to position the cable control body relative to the base member at each of a first control position and a second control position relative to the base member.

22. The bicycle operating device according to claim 14, wherein
the positioning structure is coupled to the cable control body to position the cable control body relative to the base member at each of at least three control positions relative to the base member.

23. The bicycle operating device according to claim 14, wherein
the second operating member is movable relative to the base member in a first direction to provide a first movement and is movable relative to the base member in a second direction to provide a second movement different from the first movement, the second direction being different from the first direction,
the positioning structure is coupled to the second operating member to move the cable control body from one of the control positions to another of the control positions in a first control direction such that the second mechanical control cable is pulled in response to the first movement of the second operating member, and
the positioning structure is coupled to the second operating member to move the cable control body from one of the control positions to another of the control positions in a second control direction such that the second mechanical control cable is released in response to the second movement of the second operating member, the second control direction being opposite to the first control direction.

24. The bicycle operating device according to claim 23, wherein
the first direction is opposite to the second direction.

25. The bicycle operating device according to claim 14, wherein
the first operating member is movable relative to the base member from the first rest position to the first operated position in a first direction, and the second operating member is coupled to the base member movably from a second rest position to a second operated position in the first direction.

26. The bicycle operating device according to claim 14, further comprising:
an additional cable operating structure coupled to the first operating member and the second operating member to move the first mechanical control cable from a first cable rest position relative to the base member in response to a movement of only one of the first operating member and the second operating member, wherein
the additional cable operating structure is coupled to the first operating member and the second operating member to maintain a position of the first mechanical control cable at the first cable rest position relative to the base member in response to a movement of the second operating member.

27. The bicycle operating device according to claim 26, wherein
the first operating member includes a first longitudinal axis and a first length defined along the first longitudinal axis,
the second operating member includes a second longitudinal axis and a second length defined along the second longitudinal axis, and
the first length is different from the second length.

28. The bicycle operating device according to claim 26, wherein
the one of the first operating member and the second operating member is closer to the first end portion of the base member than the other of the first operating member and the second operating member.

29. The bicycle operating device according to claim 14, further comprising:
an additional cable operating structure coupled to the first operating member and the second operating member to maintain a position of the first mechanical control cable from a first cable rest position relative to the base member in response to a movement of only one of the first operating member and the second operating member, wherein
the additional cable operating structure is coupled to the first operating member and the second operating member to move the first mechanical control cable at the first cable rest position relative to the base member in response to a movement of the first operating member.

30. The bicycle operating device according to claim 29, wherein
the first operating member includes a first longitudinal axis and a first length defined along the first longitudinal axis,
the second operating member includes a second longitudinal axis and a second length defined along the second longitudinal axis, and
the first length is different from the second length.

31. The bicycle operating device according to claim 29, wherein
the one of the first operating member and the second operating member is closer to the first end portion of the base member than the other of the first operating member and the second operating member.

32. The bicycle operating device according to claim 1, further comprising:
a second operating member movably coupled to the base member; and a cable operating structure including a cable control body configured to be coupled to the second operating member to move a second mechanical control cable relative to the base member in one of a pulling direction and a releasing direction opposite to the pulling direction in response to a movement of the second operating member, wherein
the cable control body is coupled to one of the brake operating member and the first operating member to move the second mechanical control cable relative to the base member in the other of the pulling direction and the releasing direction in response to a movement of the one of the brake operating member and the first operating member.

33. The bicycle operating device according to claim 32, wherein
the base member includes a first lateral surface facing in a transverse direction of a bicycle in the mounting state, and
the first operating member is provided on the first lateral surface.

34. The bicycle operating device according to claim 1, further comprising:
an electrical switch to operate an electrical shifting device.

35. A bicycle operating device comprising:
a base member;
a brake operating member pivotally coupled to the base member about a brake pivot axis to operate a brake device; and
a first operating member pivotally coupled to the base member about a first pivot axis which is non-parallel to the brake pivot axis, the first operating member being movable between a first rest position and an operated position to operate an additional bicycle component via a first mechanical control cable, the first operating member being rotatable from the first rest position to the operated position without another operated position defined between the first rest position and the operated position by a cable displacement amount that is larger than 12 mm.

36. The bicycle operating device according to claim 35, wherein
the brake operating member is integrally formed with the first operating member as a one-piece unitary member.

37. A bicycle seatpost apparatus comprising:
an adjustable seatpost assembly having an adjustable total length; and
a bicycle operating device to operate the adjustable seatpost assembly, the bicycle operating device including a base member comprising:
a first end portion configured to be directly mounted to a handlebar at a location of the handlebar that is spaced away from a terminal end of the handlebar in a mounting state where the bicycle operating device is mounted to the handlebar;
a second end portion opposite to the first end portion; and
a grip portion provided between the first end portion and the second end portion, wherein the bicycle operating device comprises:
a brake operating member pivotally coupled to the base member about a brake pivot axis to operate a brake device; and
a first operating member pivotally coupled to the base member about a first pivot axis, the first operating member is a seatpost operating member movably coupled to the base member to operate the adjustable seatpost assembly via a first mechanical control cable extending from the bicycle operating device to the seatpost operating member.

38. The bicycle seatpost apparatus according to claim 37, wherein
the bicycle operating device includes an electrical switch to generate a control signal to operate the adjustable seatpost assembly.

39. The bicycle seatpost apparatus according to claim 37, wherein
the bicycle operating device includes a hydraulic operating unit to supply a hydraulic pressure to the adjustable seatpost assembly.

40. The bicycle seatpost apparatus according to claim 37, wherein
the first pivot axis is non-parallel to the brake pivot axis, the first operating member being movable between a first rest position and a first operated position to move the first mechanical control cable relative to the base member to perform an operation other than a shift operation, the first operating member being movable relative to the base member between the first rest position and the first operated position without mechanically positioning the first mechanical control cable relative to the base member during a movement of the first operating member occurring between the first rest position and the first operated position.

41. The bicycle seatpost apparatus according to claim 37, wherein
the first pivot axis is non-parallel to the brake pivot axis.

* * * * *